US008254707B2

(12) United States Patent
Fukuhara et al.

(10) Patent No.: US 8,254,707 B2
(45) Date of Patent: Aug. 28, 2012

(54) ENCODING DEVICE, ENCODING METHOD, ENCODING PROGRAM, DECODING DEVICE, DECODING METHOD, AND DECODING PROGRAM IN INTERLACE SCANNING

(75) Inventors: Takahiro Fukuhara, Kanagawa (JP); Akira Sugiyama, Kanagawa (JP); Kazuhisa Hosaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1154 days.

(21) Appl. No.: 11/815,692

(22) PCT Filed: Dec. 7, 2006

(86) PCT No.: PCT/JP2006/324419
§ 371 (c)(1),
(2), (4) Date: Aug. 7, 2007

(87) PCT Pub. No.: WO2007/066710
PCT Pub. Date: Jun. 14, 2007

(65) Prior Publication Data
US 2009/0092326 A1 Apr. 9, 2009

(30) Foreign Application Priority Data
Dec. 7, 2005 (JP) .................................. 2005-353200

(51) Int. Cl.
*G06K 9/36* (2006.01)
(52) U.S. Cl. ..................... 382/233; 382/236; 375/240.11
(58) Field of Classification Search .................. 382/232, 382/233, 236; 375/240.11
See application file for complete search history.

(56) References Cited

U.S. PATENT DOCUMENTS

| 4,868,658 A | * | 9/1989 | Coleman et al. ......... 375/240.25 |
| 5,418,620 A | | 5/1995 | Nishino et al. |
| 5,880,856 A | | 3/1999 | Ferriere |
| 6,101,284 A | | 8/2000 | Matsubara et al. |
| 6,259,735 B1 | | 7/2001 | Aono et al. |
| 6,678,419 B1 | * | 1/2004 | Malvar ......................... 382/240 |

(Continued)

FOREIGN PATENT DOCUMENTS

JP    05-153550    6/1993
(Continued)

*Primary Examiner* — Chan S Park
*Assistant Examiner* — Eueng-Nan Yeh
(74) *Attorney, Agent, or Firm* — Oblon, Spivak, McClelland, Maier & Neustadt, L.L.P.

(57) ABSTRACT

The present invention relates to an encoding apparatus, an encoding method, an encoding program, a decoding apparatus, a decoding method and a decoding program for encoding and decoding efficiently a video signal in interlace scanning. An adder 12 and a subtractor 13 respectively perform addition and subtraction operations on an odd field and an even field of moving image data in interlace scanning. An intra encoder 14 and an intra encoder 15 wavelet transform addition image data and subtraction image data, quantize transform coefficients W, and entropy encode quantization coefficients q. Encoded data output from the intra encoder 14 and the intra encoder 15 is multiplexed into a single encoded stream to be output. Since data with the addition and subtraction operations performed on the odd field and the even field thereof is encoded, dynamic range is doubled while compression efficiency is increased.

18 Claims, 90 Drawing Sheets

U.S. PATENT DOCUMENTS

| | | |
|---|---|---|
| 6,707,948 B1 | 3/2004 | Cosman et al. |
| 6,813,314 B2 | 11/2004 | Aono et al. |
| 6,847,468 B2 | 1/2005 | Ferriere |
| 6,876,772 B2 | 4/2005 | Fukuhara et al. |
| 7,127,111 B2 | 10/2006 | Fukuhara et al. |
| 2003/0039400 A1* | 2/2003 | Launiainen ............ 382/240 |
| 2003/0198391 A1* | 10/2003 | Fukuhara et al. ......... 382/232 |
| 2004/0062311 A1 | 4/2004 | Hashino et al. |

FOREIGN PATENT DOCUMENTS

| | | |
|---|---|---|
| JP | 06-292179 | 10/1994 |
| JP | 09-130800 | 5/1997 |
| JP | 2002-165098 | 6/2002 |
| JP | 2002-359853 | 12/2002 |
| JP | 2003-319185 | 11/2003 |
| JP | 2004-104694 | 4/2004 |

* cited by examiner

SEGMENTATION LEVEL = 3
(H: HIGH-FREQUENCY REGION,
L: LOW-FREQUENCY REGION)

FIG. 7
A
SEGMENTATION LEVEL = 1
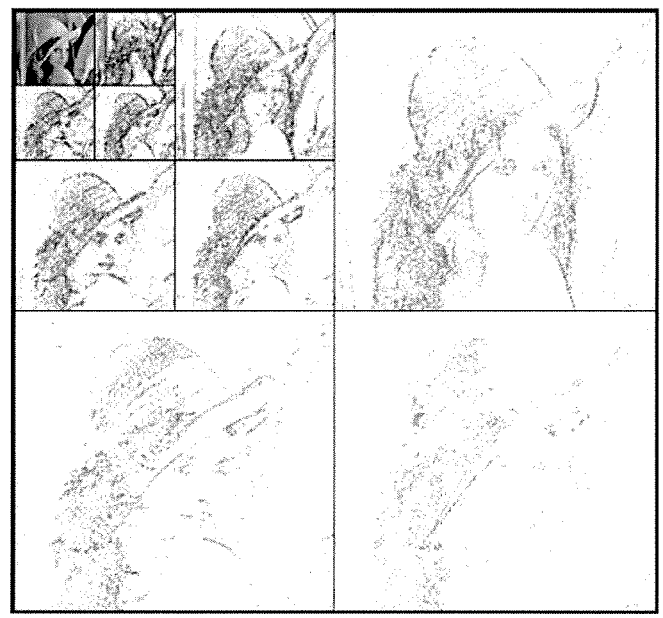
B
SEGMENTATION LEVEL = 3

FIG. 23

| 0LL (1) | 1HL (2) | (5) | (6) | (17) | (18) | ... | |
| 1LH (3) | 1HH (4) | (7) | (8) | | | ... | |
| (9) | (10) | (13) | (14) | | | ... | |
| (11) | (12) | (15) | (16) | | ... | (31) | (32) |
| (33) | (34) | ... | | (49) | (50) | ... | |
| | | ... | | | | ... | |
| | ... | (47) | (48) | | ... | (63) | (64) |

Regions: 2HL, 3HL, 2LH, 2HH, 3LH, 3HH

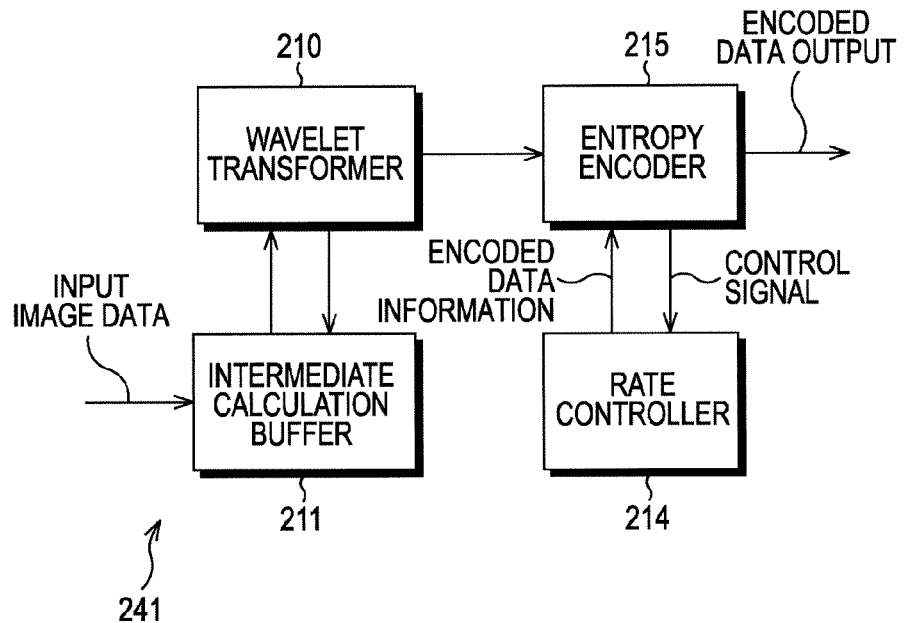
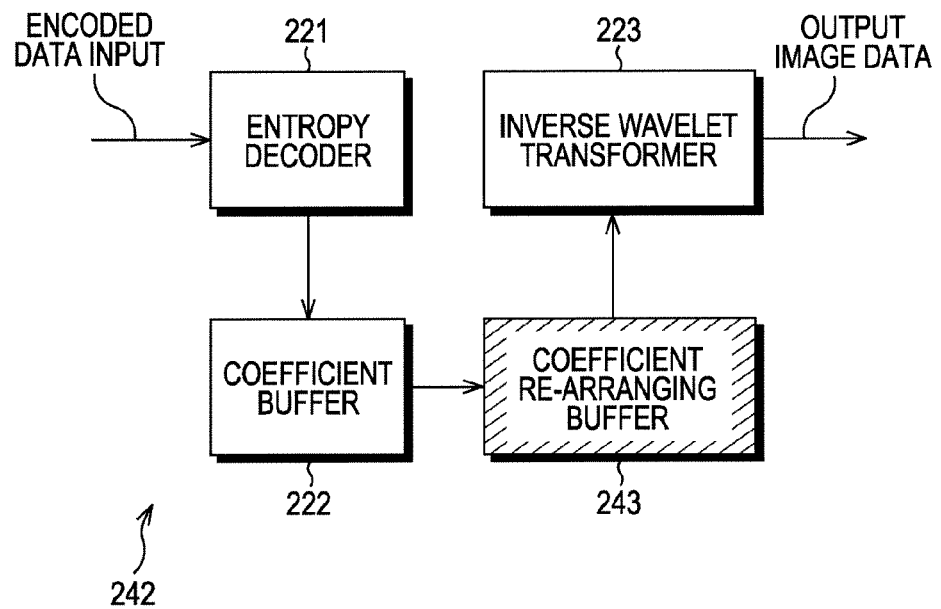

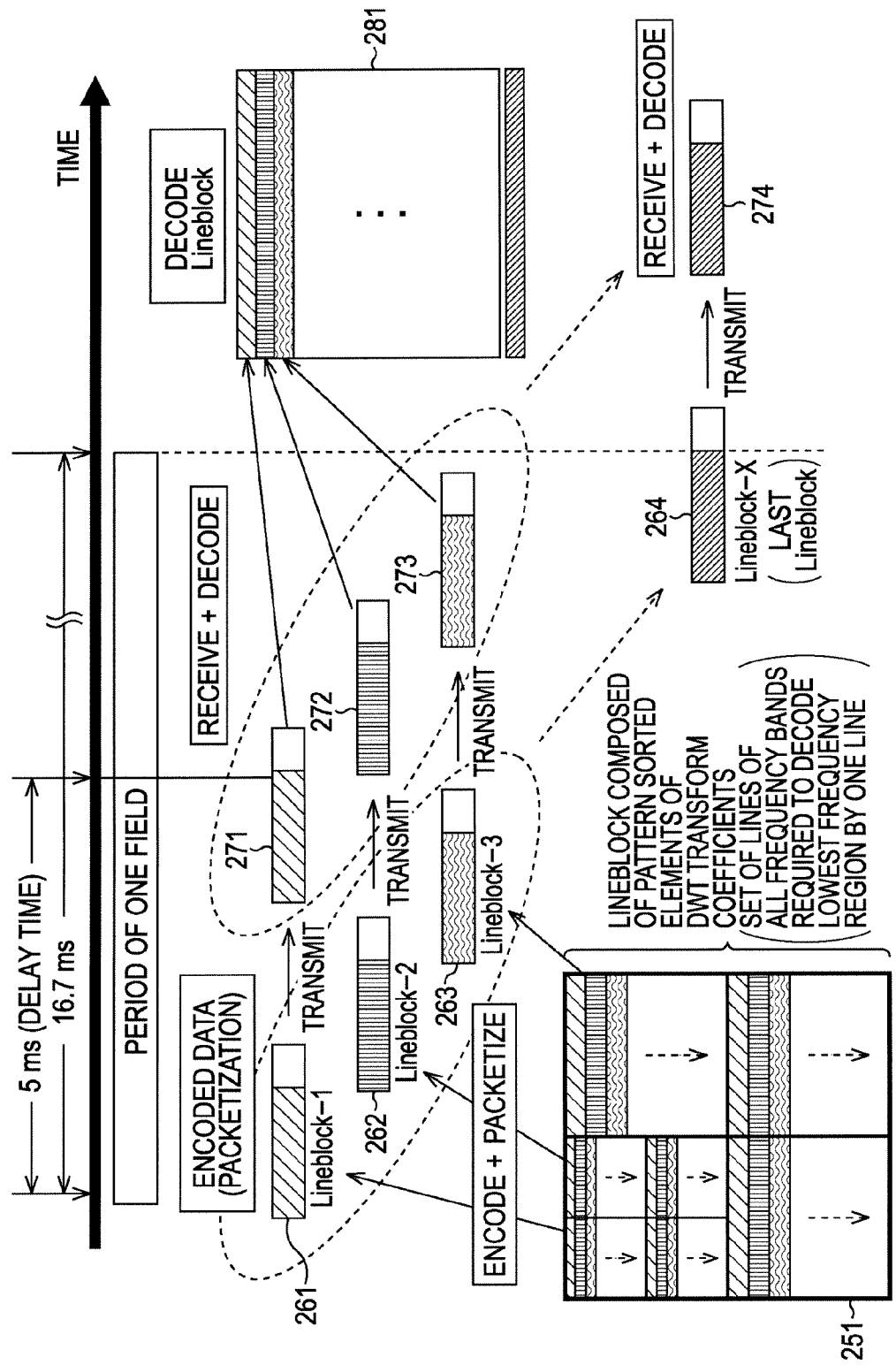

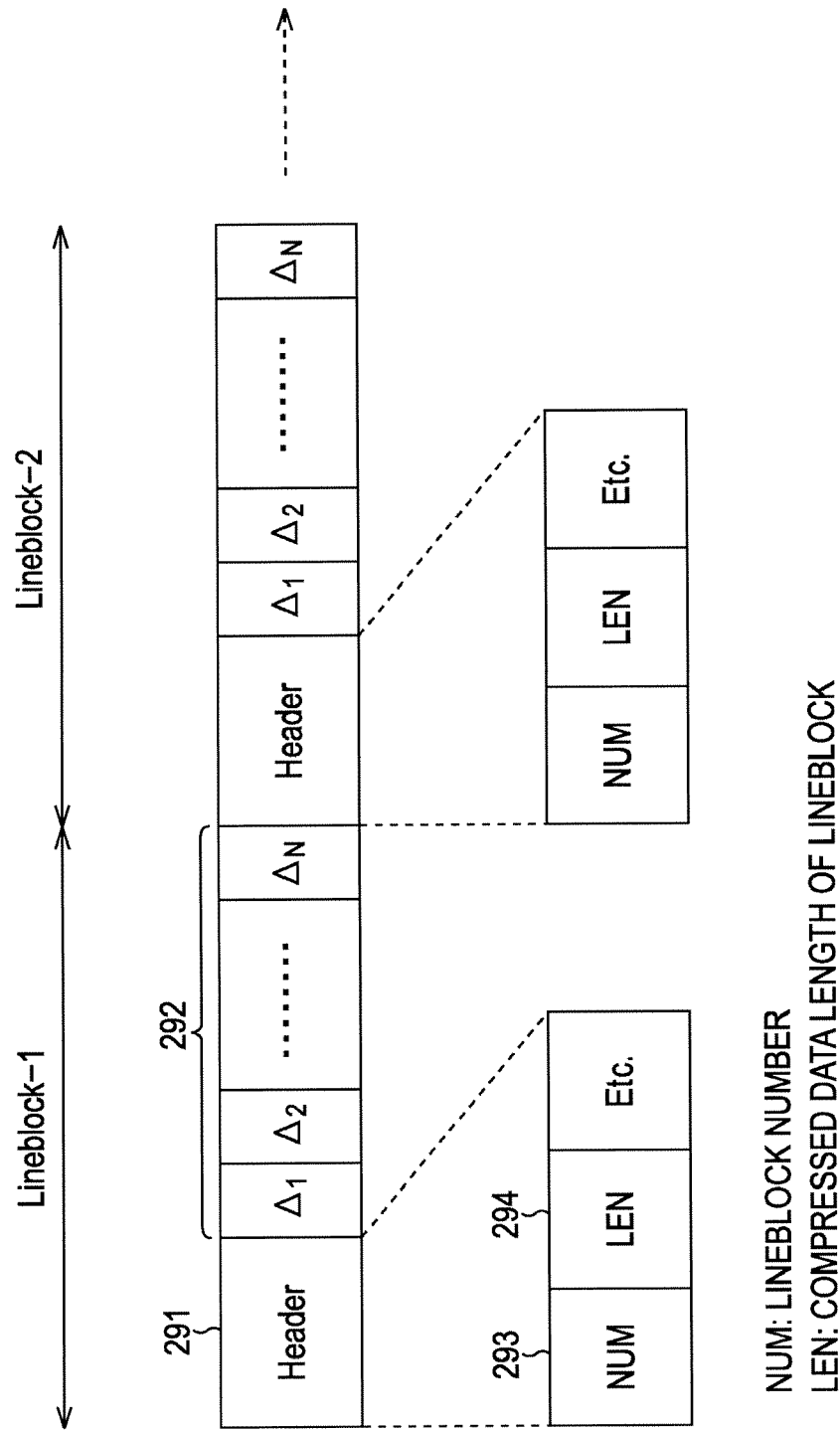

FIG. 46

| | | | | |
|---|---|---|---|---|
| | − − + − | + + | + − | + − + |
| | 0 0 0 0 | 0 0 0 0 | 0 1 0 0 | 1 0 0 1 |
| | 1 0 1 0 | 0 1 0 0 | 1 0 0 1 | 1 1 1 0 |
| | 0 1 1 1 | 1 1 1 0 | 1 1 0 1 | 0 0 1 1 |
| | 1 1 0 0 | 1 0 0 1 | 1 0 0 1 | 1 0 1 0 |

QUANTIZATION COEFFICIENTS EXPRESSED IN BIT PLANE

VALUE OF MAXIMUM NUMBER B OF SIGNIFICANT FIGURES (INITIAL VALUE OF B BEING 0): 3, 3, 4

1 (ALL QUANTIZATION COEFFICIENTS OF LINE TO BE ENCODED BEING NON-ZERO)

1 (MODIFYING B)
0 (INCREASING B)
001 (INCREMENT OF B BEING 3)
101 011 110 010 (ABSOLUTE VALUES OF W QUANTIZATION COEFFICIENTS)
1010 (SIGNS OF W NON-ZERO QUANTIZATION COEFFICIENTS)

0 (B UNMODIFIED)
011 110 000 011 (ABSOLUTE VALUES OF W QUANTIZATION COEFFICIENTS)
001 (SIGNS OF W NON-ZERO QUANTIZATION COEFFICIENTS)

1 (MODIFYING B)
0 (INCREASING B)
1 (INCREMENT OF B BEING 1)
1101 0100 0111 1010 (ABSOLUTE VALUES OF W QUANTIZATION COEFFICIENTS)
0101 (SIGNS OF W NON-ZERO QUANTIZATION COEFFICIENTS)

ENCODING DEVICE, ENCODING METHOD, ENCODING PROGRAM, DECODING DEVICE, DECODING METHOD, AND DECODING PROGRAM IN INTERLACE SCANNING

TECHNICAL FIELD

The present invention relates to an encoding apparatus, an encoding method, an encoding program, a decoding apparatus, a decoding method, and a decoding program for encoding and decoding a video signal efficiently in interlace scanning.

BACKGROUND ART

With BSs (Broadcasting Satellites) starting digital broadcasting, and with DVDs (digital versatile disks) in widespread use, video apparatuses increasingly handle digital video signals.

The digital video signal, because of the large data size thereof, is typically compression encoded in a predetermined method before being transmitted to another apparatus or stored on a recording medium, or transmitted to the other apparatus and stored on the recording medium at the same time. MPEG 2 (Moving Picture Experts Group 2) is currently well known as a standard compression encoding method. In MPEG2, a digital video signal is compression encoded using predictive encoding based on DCT (Discrete Cosine Transform) and motion compensation, and variable length encoding is further used to increase data compression rate.

The above-mentioned BS digital broadcasting uses MPEG2 to compression encode moving image data in interlace scanning of HDTV (High Definition Television). Digital video signals recorded on DVD (Digital Versatile Disk) sold in package medium are typically interlace scanned, and compression encoded using MPEG2.

In MPEG2, an image for use in predictive encoding is adaptively switched between frame and field. DCT has a mode in which macro block serving as a unit of encoding is adaptively switched between frame and field. In MPEG2, the use of encoding means for interlace moving image has successfully increased encoding efficiency.

In professional applications such as broadcasting or production, compression encoding focusing on editing, such as DV or DVC-Pro, is used. Such compression encoding has intra picture (I picture) only as in-frame encoding, and does not perform inter-frame compression. A frame-by-frame editing operation essential for professional applications can thus performed without degrading image quality. In the above-described MPEG2, encoding free from predictive encoding is possible, and the frame-by-frame editing operation can thus be performed.

Patent Document 1 discloses an encoding and decoding method for compression encoding efficiently a digital video signal while editing the digital video signal by frame in 525/60P system (525 lines/frame, 60 frames/second progressive system) or 1080/60P system (1080 lines/frame, 60 frames/second progressive system). In accordance with the Patent Document 1, an addition signal and a difference signal of an image signal between frames are retrieved and encoded, and a ratio of an encoding bit rate of the addition signal and an encoding bit rate of the difference signal are controlled.

[Patent Document 1] Japanese Unexamined Patent Application Publication No. 2004-104694

DISCLOSURE OF INVENTION

Problems to be solved by the Invention

The compression encoding enabling the frame-by-frame editing operation does not perform inter-frame compression, and is thus known to be outperformed in compression efficiency by a compression encoding method using the above-mentioned predictive encoding.

There is a need for compression encoding techniques that provide a high compression efficiency while enabling a frame-by-frame editing operation. In particular, there is a need for an encoding technique that increases compression efficiency in the compression encoding of the moving image data in interlace scanning using intra-frame encoding rather than using inter-frame encoding.

The above-referenced Patent Document 1 obtains the addition signal and the difference signal of two frames, thereby reducing a frame rate by half to reduce a bit rate. Because of this, the frame-by-frame editing process has been difficult.

It is an object of the present invention to provide an encoding apparatus, an encoding method, an encoding program, a decoding apparatus, a decoding method, and a decoding program for compression encoding an interlace digital video signal at a high efficiency and enabling a frame-by-frame editing operation.

Means for Solving the Problems

In accordance with a first aspect of the present invention, an encoding apparatus for compression encoding image data in interlace scanning, includes an adder for performing an addition operation to a first field and a second field, the first and second fields forming one frame of the image data in interlace scanning, a subtractor for performing a subtraction operation between the first field and the second field, and an encoder for encoding addition image data output from the adder and subtraction image data output from the subtractor so that code is in the complete form thereof in each of the addition image data and the subtraction image data.

In accordance with the first aspect of the present invention, an encoding method for compression encoding image data in interlace scanning, includes an adding step of performing an addition operation to a first field and a second field, the first and second fields forming one frame of the image data in interlace scanning, subtracting step of performing a subtraction operation between the first field and the second field, and an encoding step of encoding addition image data output in the adding step and subtraction image data output in the subtracting step so that code is in the complete form thereof in each of the addition image data and the subtraction image data.

In accordance with the first aspect of the present invention, an encoding program causes a computer to perform an encoding method for compression encoding image data in interlace scanning. The encoding method includes an adding step of performing an addition operation to a first field and a second field, the first and second fields forming one frame of the image data in interlace scanning, a subtracting step of performing a subtraction operation between the first field and the second field, and an encoding step of encoding addition image data output in the adding step and subtraction image data output in the subtracting step so that code is in the complete form thereof in each of the addition image data and the subtraction image data.

In accordance with a second aspect of the present invention, a decoding apparatus includes a decoder for decoding data that has been encoded so that addition image data and subtraction image data permit code to be in a complete form thereof independent of each other, the addition image data having undergone an addition operation between a first field and a second field forming one frame of image data in interlace scanning, and the subtraction image data having undergone a subtraction operation between the first field and the second field, an extractor for extracting the first field and the second field from the addition image data and the subtraction image data decoded by the decoder, and an output unit for re-arranging at a correct timing the first field and the second field, extracted by the extractor, and outputting the re-arranged first and second fields.

In accordance with the second aspect of the present invention, a decoding method includes a decoding step of decoding data that has been encoded so that addition image data and subtraction image data permit code to be in a complete form thereof independent of each other, the addition image data having undergone an addition operation between a first field and a second field forming one frame of image data in interlace scanning, and the subtraction image data having undergone a subtraction operation between the first field and the second field, an extracting step of extracting the first field and the second field from the addition image data and the subtraction image data decoded in the decoding step, and an output step of re-arranging at a correct timing the first field and the second field, extracted in the extracting step, and outputting the re-arranged first and second fields.

In accordance with the second aspect of the present invention, a decoding program causes a computer to perform a decoding method. The decoding method includes a decoding step of decoding data that has been encoded so that addition image data and subtraction image data permit code to be in a complete form thereof independent of each other, the addition image data having undergone an addition operation between a first field and a second field forming one frame of image data in interlace scanning, and the subtraction image data having undergone a subtraction operation between the first field and the second field, an extracting step of extracting the first field and the second field from the addition image data and the subtraction image data decoded in the decoding step, and an output step of re-arranging at a correct timing the first field and the second field, extracted in the extracting step, and outputting the re-arranged first and second fields.

In accordance with the first aspect of the present invention, the addition operation is performed to the first field and the second field, the first and second fields forming one frame of the image data in interlace scanning, the subtraction operation is performed between the first field and the second field, and the addition image data resulting from the addition operation and the subtraction image data resulting from the subtraction operation are encoded so that the code is in the complete form thereof in each of the addition image data and the subtraction image data. The dynamic range of each of the first field and the second field is doubled, and the encoding efficiency is heightened.

In accordance with the second aspect of the present invention, the data encoded so that addition image data and subtraction image data permit code to be in a complete form thereof independent of each other is decoded. The addition image data has undergone the addition operation between the first field and the second field forming one frame of image data in interlace scanning, and the subtraction image data has undergone the subtraction operation between the first field and the second field. The first field and the second field are extracted from the decoded addition image data and subtraction image data. The first field and the second field are re-arranged and output at the correct timing. The first field and the second field are thus output in a predetermined order from the encoded data composed of the addition image data and the subtraction image data. The first field and the second field are subjected to the addition operation and the subtraction operation. The encoded data having a doubled dynamic range is thus decoded into image data.

ADVANTAGES

As described above, the addition operation is performed to the first field and the second field, the first and second fields forming one frame of the image data in interlace scanning, the subtraction operation is performed between the first field and the second field, and the addition image data resulting from the addition operation and the subtraction image data resulting from the subtraction operation are encoded so that the code is in the complete form thereof in each of the addition image data and the subtraction image data. The dynamic range of each of the first field and the second field is doubled, and the encoding efficiency is heightened. Subjective image quality of a decoded image is thus improved.

The data encoded so that addition image data and subtraction image data permit code to be in a complete form thereof in each of the addition image data and the subtraction image data is decoded. Smooth operation in the editing of the encoded data is thus assured.

BRIEF DESCRIPTION OF THE DRAWINGS

FIG. 7 diagrammatically illustrates the wavelet transform.

FIG. 23 diagrammatically illustrates an entropy encoding method in accordance with a modification of the embodiment of the present invention.

FIG. 40 is a block diagram illustrating the structure of an image encoding apparatus of the present invention.

FIG. 41 is a block diagram illustrating the structure of an image decoding apparatus of the present invention.

FIG. 42 diagrammatically illustrates how encoded data is exchanged.

FIG. 43 illustrates the structure of a packet.

FIG. 46 illustrates an example of quantization coefficients to be encoded.

REFERENCE NUMERALS

10 switch, 11 field delay unit, 12 adder, 13 subtractor, intra encoder, 15 intra encoder, 16 rate controller, 17 encoded stream multiplexer, 18 addition and subtraction unit, 20 encoded stream demultiplexer, 21 intra decoder, 22 intra decoder, 23 adder, 24 subtractor, 26 field delay unit, 27 switch, 28 addition and subtraction unit, 32 wavelet transformer, 33 quantizer, 34 bit plane decomposer, 35 entropy encoder, 36 code amount controller, 37 code amount adder, 40 entropy decoder, 41 dequantizer, 42 inverse wavelet transformer, 50 intra encoder, 60 intra decoder

BEST MODE FOR CARRYING OUT THE INVENTION

Figure 1:
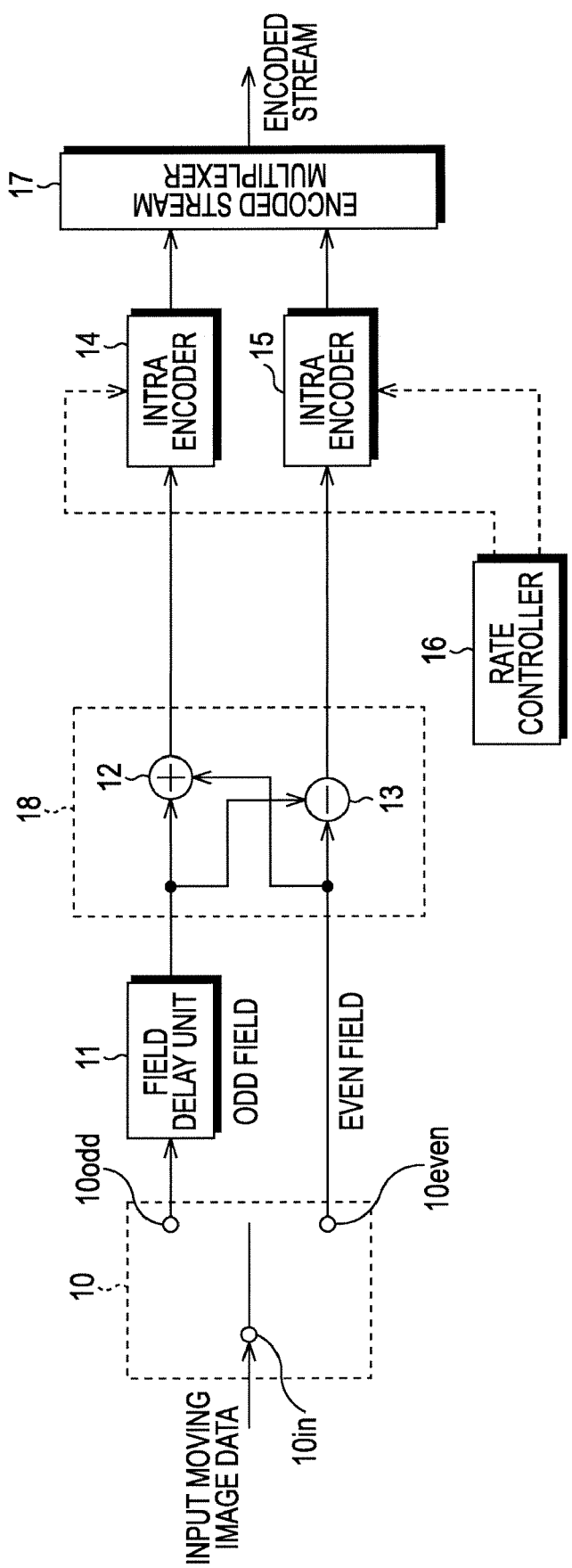
FIG. 1 is a block diagram illustrating an image encoding apparatus in accordance with one embodiment of the present invention.

FIG. 1 illustrates the structure of an image encoding apparatus in accordance with one embodiment of the present invention. As shown in FIG. 1, the image encoding apparatus includes a switch 10, a field delay unit 11, an adder 12, a subtractor 13, an intra encoder 14, an intra encoder 15, a rate controller 16, and an encoded stream multiplexer 17. Hereinafter, the adder 12 and the subtractor 13 are also collectively referred to as an addition and subtraction unit 18.

Moving image data in interlace scanning is input to terminal $10_{in}$ of the switch 10. The switch 10 alternately switches between a selection output terminal $10_{odd}$ and a selection output terminal $10_{even}$ at field timing of the input image data.

Figure 2:
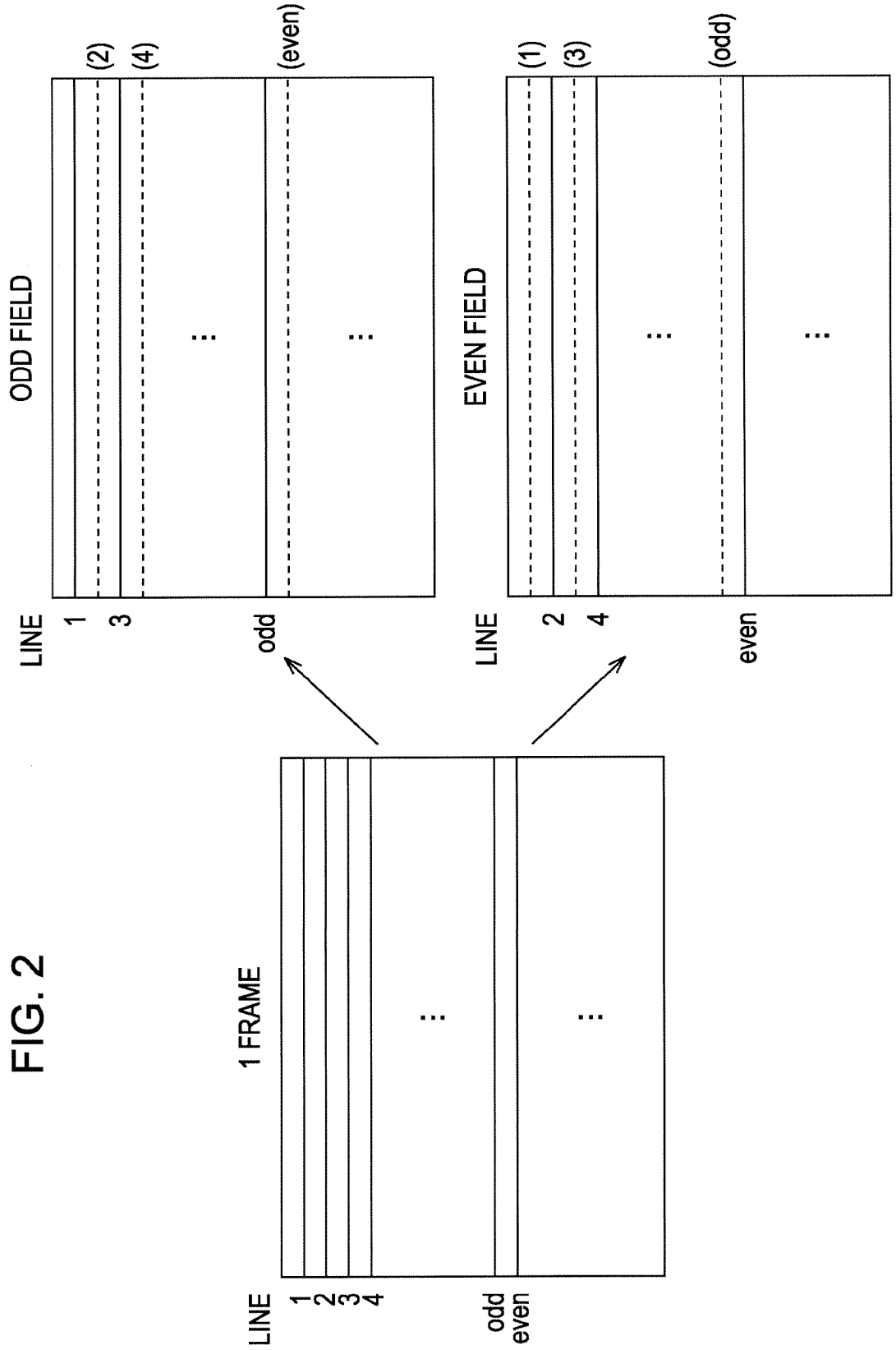
FIG. 2 diagrammatically illustrates moving image data in interlace scanning.

The moving image data in interlace scanning is briefly described here. As diagrammatically shown in FIG. 2, in interlace scanning, two images that are produced by decimating one line every two lines are alternated within one frame period to produce a moving image. More specifically, in the interlace scanning, two fields, each field containing half the number of lines of one frame, are used. The field image is thus transmitted within half the one frame time. In the discussion that follows, the top line of one frame image is a first line, and a field containing odd numbered lines is referred to as an odd field, and a field containing even numbered lines is referred to as an even field.

For example, an odd field and an even field, each having 1920 pixels×540 lines, are alternately transmitted at a field frequency of 60 Hz (59.94 Hz) in HDTV (High Definition Television) moving image data specified as having interlace scanning (referred to as 1080I) of 1920 pixels×1080 lines at a frame frequency of 30 Hz (29.97 Hz).

The switch 10 is controlled to select the selection output terminal $10_{odd}$ during an odd field period of the input moving image data and the selection output terminal $10_{even}$ during an even field period of the input moving image data. The output at the selection output terminal $10_{odd}$ is supplied to the field delay unit 11. The field delay unit 11 delays the supplied odd field image data by one field and then outputs the delayed odd field image data.

The field delay unit 11, including a buffer memory, stores the supplied image data of the odd field on the buffer. The image data of the even field stored on the buffer memory is then read and output at a timing of the even field.

The output of the field delay unit 11 is supplied to each of the adder 12 and the subtractor 13. The output at the selection output terminal $10_{even}$ of the switch 10 is supplied to each of the adder 12 and the subtractor 13. Since the image data of the even field is already delayed by one field by the field delay unit 11 as previously discussed, the adder 12 and the subtractor 13 are supplied with the even field and the odd field at the same timing.

The adder 12 adds the supplied image data of the even field to the supplied image data of the odd field. The subtractor 13 performs a subtraction operation on the supplied image data of the even field and the supplied image data of the odd field. The addition operation of the adder 12 and the subtraction operation of the subtractor 13 are performed on a pixel by pixel basis. Corresponding lines of the odd field and the even field are added or subtracted.

Addition image data as a result of addition by the adder 12 is supplied to the intra encoder 14. Subtraction image data as a result of subtraction by the subtractor 13 is supplied to the intra encoder 15. The rate controller 16 controls an encoding bit rate of each of the intra encoder 14 and the intra encoder 15. The intra encoder 14 and the intra encoder 15 perform intra encoding on the supplied addition image data and subtraction image data so that code is completed in one field.

The encoding method of the intra encoder 14 and the intra encoder 15 is not limited to any method as long as code is completed within one field. For example, the intra encoder 14 and the intra encoder 15 may employ JPEG (Joint Photographic Experts System) that encodes image data using DCT (Discrete Cosine Transform), or JPEG2000 that encodes image data using wavelet transform.

The intra encoder 14 outputs to the encoded stream multiplexer 17 encoded data (hereinafter referred to as addition image encoded data) into which the intra encoder 14 has compression encoded the addition image data and encoded data (hereinafter referred to as subtraction image encoded data) into which the intra encoder 15 has compression encoded the subtraction image data. The encoded stream multiplexer 17 multiplexes the encoded data into an encoded stream and outputs the encoded stream.

A variety of methods is contemplated as the data multiplexing method of the encoded stream multiplexer 17. For example, the outputs of the intra encoder 14 and the intra encoder 15 are packetized according to a predetermined data block unit and output in time division. In this case, each packet is tagged with identification information as header information to identify data stored as a payload of the packet.

By performing the addition operation and the subtraction operation to the image data of the odd field and the even field, the dynamic range of the image data is doubled. If a process of doubling dynamic range is simply performed, a data size of the encoded data becomes large. By controlling the output of the adder 12 and the output of the subtractor 13 to a predetermined balance, the data size of the encoded data is restricted.

Figure 3:
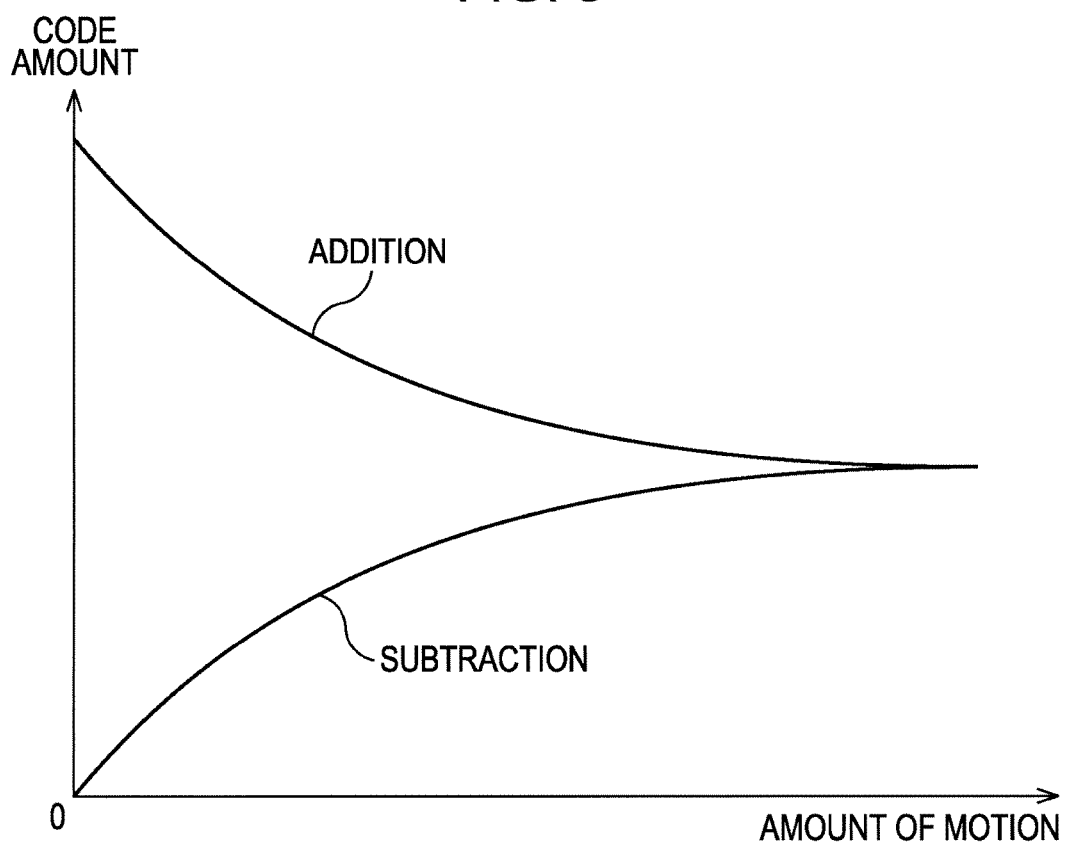
FIG. 3 illustrates addition and subtraction operation results of an odd field and an even field.

More specifically, the addition operation is considered as an operation to determine an average of the two fields, and the subtraction operation is considered as an operation to determine a difference between the two fields. The feature of an amount of code in the addition results of the adder 12 and the subtraction results of the subtractor 13 is described with reference to FIG. 3. As shown in FIG. 3, the ordinate represents an amount of code while the abscissa represents an amount of motion between the odd field and the even field. For example, if the odd field and the even field provide completely the same image, the motion amount becomes zero. For example, the odd field and the even field are random noise on a per pixel basis, the motion amount is maximized.

As shown in FIG. 3, if the motion amount is zero, i.e., the odd field and the even field has the same data, the result of the subtraction operation becomes zero. As the motion amount increases, the code amount tends to converge to a predetermined value. By controlling the compression encoding to the addition results of the adder 12 and the compression encoding to the subtraction results of the subtractor 13 at a predetermined level, the data size of the encoded data is restricted while post encoding image quality is maintained as an excellent level. For example, the rate controller 16 sets a target code amount in the addition results of the intra encoder 14 and a target code amount in the subtraction results of the intra encoder 15. The intra encoder 14 and the intra encoder 15 control encoding process so that the code amount of the encoded data reaches the target code amount.

Figure 4:
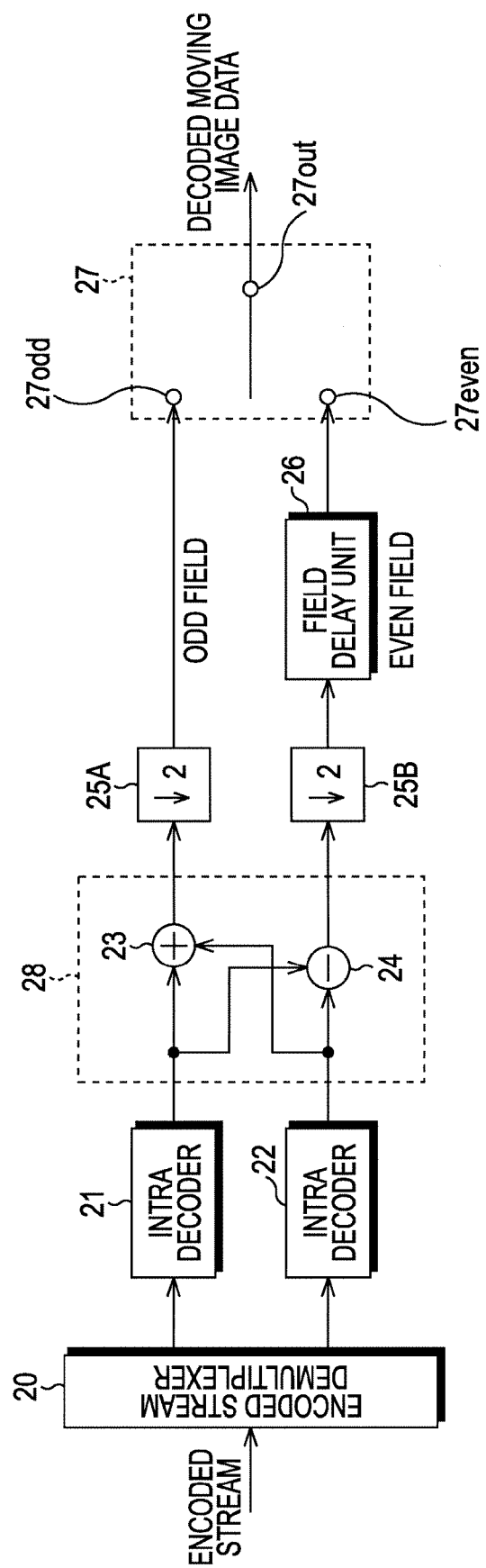
FIG. 4 is a block diagram illustrating an image decoding apparatus in accordance with one embodiment of the present invention.

FIG. 4 illustrates an example of the image decoding apparatus corresponding to the image encoding apparatus of FIG. 1. The image decoding apparatus includes an encoded stream demultiplexer 20, an intra decoder 21, an intra decoder 22, an adder 23, a subtractor 24, a divider 25A, a divider 25B, a field delay unit 26, and a switch 27. Hereinafter, the adder 23 and the subtractor 24 are also collectively referred to as an addition and subtraction unit 28.

The encoded stream output from the encoded stream multiplexer 17 in the image encoding apparatus discussed with reference to FIG. 1 is supplied to the encoded stream demultiplexer 20. The encoded stream demultiplexer 20 demultiplexes the supplied encoded stream into addition image encoded data and subtraction image encoded data.

If the encoded stream multiplexer 17 outputs the addition image encoded data and the subtraction image encoded data in a packetized time division form, the encoded data is demultiplexed according to the header information of each packet. The encoded stream is thus decomposed.

One of the addition image encoded data and the subtraction image encoded data, demultiplexed by the encoded stream demultiplexer 20, is supplied to the intra decoder 21, and the other is supplied to the intra decoder 22. In the discussion that follows, the addition image encoded data is supplied to the intra decoder 21 and the subtraction image encoded data is supplied to the intra decoder 22.

The intra decoder 21 and the intra decoder 22 perform a predetermined decoding process on the respectively supplied encoded data, and outputs decoded image data. One of the decoded outputs of the intra decoder 21 and the intra decoder 22 becomes decoded addition image data and the other becomes decoded subtraction image data. The outputs of the intra decoder 21 and the intra decoder 22 are supplied to each of the adder 23 and the subtractor 24 for addition and subtraction operations. The outputs of the adder 23 and the subtractor 24 are then supplied to the divider 25A and the divider 25B to be divided by 2. As a result, the divider 25A and the divider 25B output the decoded image data of the odd field and the even field, respectively.

Let a represent the image data of the odd field and b represent the image data of the even field in the process of the above-described image encoding apparatus, and addition image data m output from the adder 12 and subtraction image data n output from the subtractor 13 are expressed in the following equations (1) and (2).

$$m = a + b \quad (1)$$

$$n = a - b \quad (2)$$

The addition image data m and the subtraction image data n are thus encoded by the intra encoder 14 and the intra encoder 15, respectively.

On the other hand, the image decoding apparatus decodes the encoded addition image data m using the intra decoder 21, thereby resulting in decoded addition image data m' (=a'+b'). The intra decoder 22 decodes the encoded subtraction image data n, thereby resulting in decoded subtraction image data n' (=a'−b'). The addition results of the adder 23 and the subtraction results of the subtractor 24 are thus represented by the following equation (3) and (4).

$$m' + n' = (a' + b') + (a' - b') = 2a' \quad (3)$$

$$m' - n' = (a' + b') - (a' - b') = 2b' \quad (4)$$

By dividing the outputs of the adder 23 and the subtractor 24 by 2, decoded image data a' of the odd field and decoded image data b' of the even field are extracted.

The decoded image data of the odd field output from the divider 25A is supplied to a selection input terminal $27_{odd}$ of the switch 27. The decoded image data of the even field output from the divider 25B is delayed by one field by the field delay unit 26, and the delayed image data of the even field is then supplied to a selection input terminal $27_{even}$ of the switch 27. The field delay unit 26, having a buffer memory for storing the supplied image data of the even field, controls a reading timing of reading the image data stored on the buffer, thereby achieving a delay of one field to the supplied image data.

The switch 27 alternately switches the selection input terminal $27_{odd}$ and the selection input terminal $27_{even}$ at each field timing. The switch 27 switches between the image data of the odd field supplied to the selection input terminal $27_{odd}$ and the image data of the even field supplied to the selection input terminal $27_{even}$ in response to the timing of the odd field and the even field, thereby reconstructing the odd field and the even field in a correct arrangement. The reconstructed odd field and even field are output from an output terminal $27_{out}$ of the switch 27.

The encoding method applicable to the image encoding apparatus of one embodiment of the present invention is described below. As previously discussed, the encoding method applicable to the intra encoder 14 and the intra encoder 15 in the image encoding apparatus of FIG. 1 is not limited to any particular type as long as the encoding method is completed within the image data of one field. The wavelet transform is here applied as the encoding method to the intra encoder 14 and the intra encoder 15 as described below.

Figure 5:
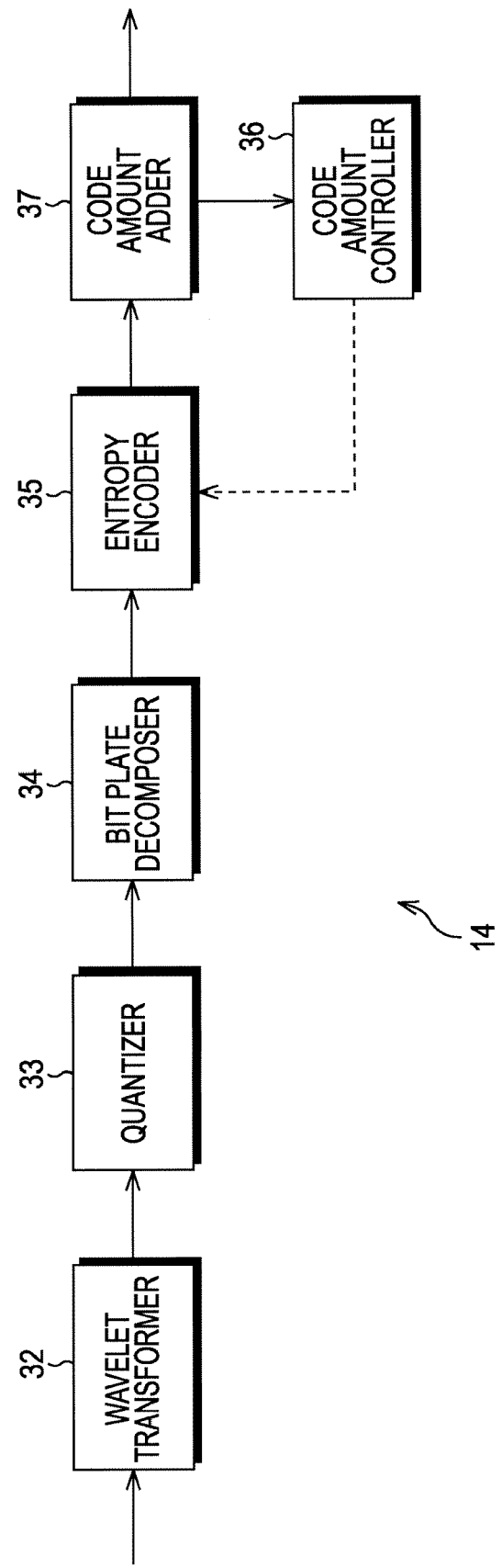
FIG. 5 is a block diagram illustrating an intra encoder in the image encoding apparatus in accordance with one embodiment of the present invention.

FIG. 5 illustrates an example of the intra encoder 14 in the image encoding apparatus in accordance with one embodiment of the present invention. The intra encoder 14 encodes the image data using the wavelet transform. The intra encoder 14 and the intra encoder 15 has the same structure, and for simplicity of explanation, only the intra encoder 14 is representatively described below.

The intra encoder 14 illustrated in FIG. 5 includes a wavelet transformer 32, a quantizer 33, a bit plane decomposer 34, an entropy encoder 35, a code amount controller 36, and a code amount adder 37. The image data output from the adder 12 is supplied to the wavelet transformer 32. The wavelet transformer 32 wavelet transforms the supplied image data.

Figure 6:
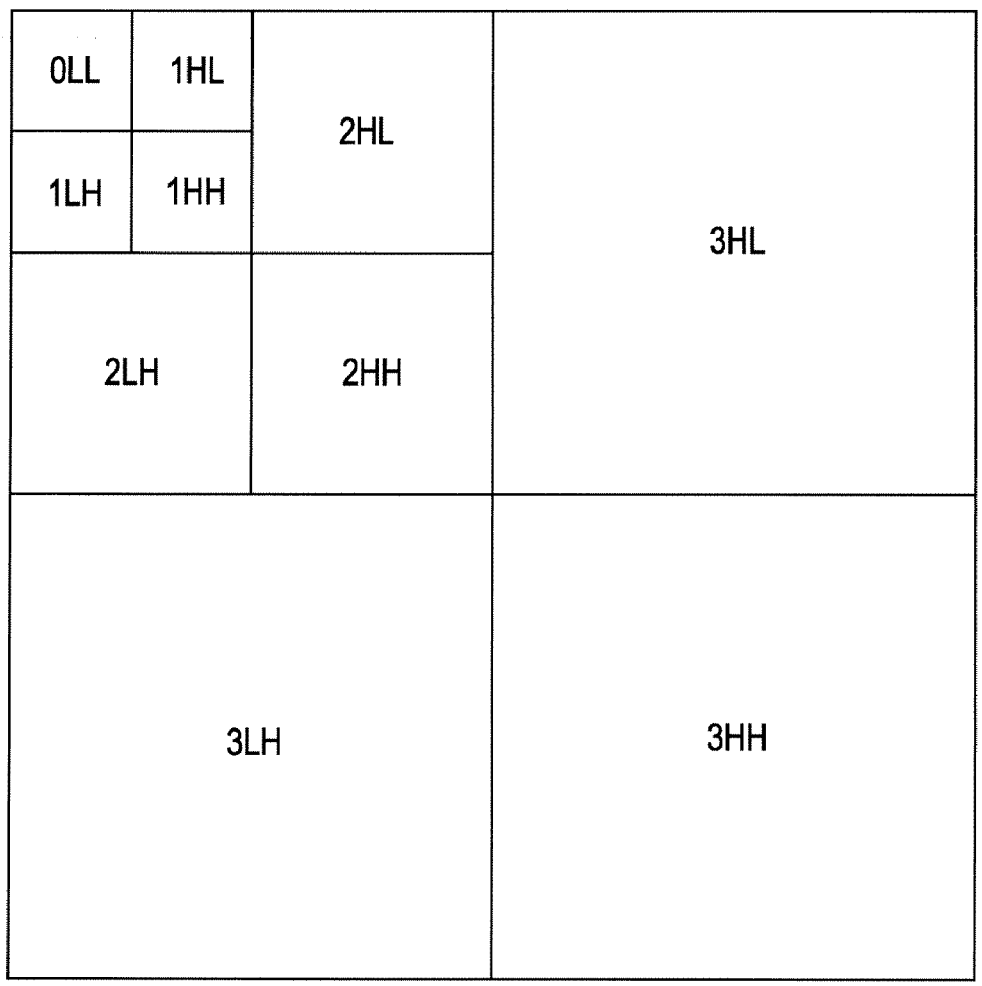
FIG. 6 diagrammatically illustrates a wavelet transform.

The wavelet transform is briefly described herein. In the wavelet transform to the image data, the image data is segmented into a high-frequency region having a high spatial frequency and a low-frequency region having a low spatial frequency as shown in FIG. 6. Data of low frequency band having a low spatial frequency, obtained as a result of partition, is recursively segmented. By segmenting data of band having a low spatial frequency to a smaller region, efficient compression encoding is performed.

As shown in FIG. 6, the lowest frequency component region of image data is segmented into a low frequency component region L and a high frequency component region H. This segmentation process is repeated three times with segmentation level=3. As shown in FIG. 6, "L" and "H" represent a low frequency region and a high frequency region, respectively. The position of "L" and "H" represents that a forward position means a band as a result of segmentation in a horizontal direction and that a backward position means a band as a result of segmentation in a vertical direction. A number preceding "L" and "H" represents a segmentation level of each region.

As shown in FIG. 6, the segmentation process is successively performed from a lower right region to an upper left region on the screen toward a low frequency component. In the example of FIG. 6, the bottom right region on the screen is a region 3HH having the least amount of low frequency component (i.e., having the most amount of high frequency component). The screen is segmented into four regions, and the top left region is further segmented into four. The top left region of the four regions is further segmented into four regions. The resulting top left region is 0LL having the most amount of low frequency component.

Transform and segmentation are performed on the low frequency component because energy of image concentrates on a low frequency component. This may be understood because sub bands are formed as shown in portion B of FIG. 7 as segmentation level is increased from an example of segmentation level=1 shown in portion A of FIG. 7 to an example of segmentation level=3 shown in the portion B of FIG. 7. For example, the segmentation level of the wavelet transform of FIG. 6 is 3, and as a result, 10 sub bands are generated.

The wavelet transformer 32 performs the above-described process using a filter bank containing high-frequency filters and low-frequency filters. Since a digital filter has typically an impulse response having a plurality of tap lengths, namely, a filter factor, and input image data or factor data enough to perform a filtering process needs to be buffered. When the wavelet transform is performed in multiple stages, wavelet transform factors generated in a preceding stage of the number enough to perform the filtering process need to be buffered.

For example, the image data input to the wavelet transformer 32 is temporarily stored on the buffer. The wavelet transformer 32 wavelet transforms the image data stored on the buffer. More specifically, the wavelet transformer 32 reads the image data from the buffer, performs the filtering process on the read image data to generate coefficient data of a low frequency region and a high frequency region, and then stores the coefficient data onto the buffer. The wavelet transformer 32 reads the coefficient data from the buffer, and performs the filtering process on the read coefficient data using an analysis filter, thereby generating further coefficient data of a high frequency region and a low frequency region. The generated coefficient data is stored again onto the buffer.

When the segmentation level reaches a predetermined level through repeating the above process, the wavelet transformer 32 reads the coefficient data from the buffer and outputs the read coefficient data.

As shown in FIG. 6, the segmentation level of the wavelet transform is 3 in the above discussion. The present invention is not limited to the segmentation level=3. The segmentation level may be raised. As the segmentation level is raised, compression rate is increased. In the wavelet transform, the filtering process is repeated typically until the segmentation level=4.

The coefficient data output from the wavelet transformer 32 is supplied to the quantizer 33 for quantization. The quantization method of the quantizer 33 for quantizing the image data may employ scalar quantization adopted in JPEG2000. As shown in the following equation (5), quantization coefficient value q is determined by dividing a wavelet transform coefficient w obtained in the wavelet transform by a quantization step size A in the scalar quantization.

$$q = W/\Delta \quad (5)$$

The quantization coefficient q is output from the quantizer 33 is supplied to the bit plane decomposer 34 to be decomposed in the bit planes. As diagrammatically shown in FIG. 8, the bit plane contains a plane of the same bit position having a plurality of pieces of data represented in bit. As shown in portion B of FIG. 8, by stacking bit planes from LSB (Least Significant Bit) to MSB (Most Significant Bit), a plurality of pieces of data can be easily acquired in terms bit values at the same bit position.

Figure 8:
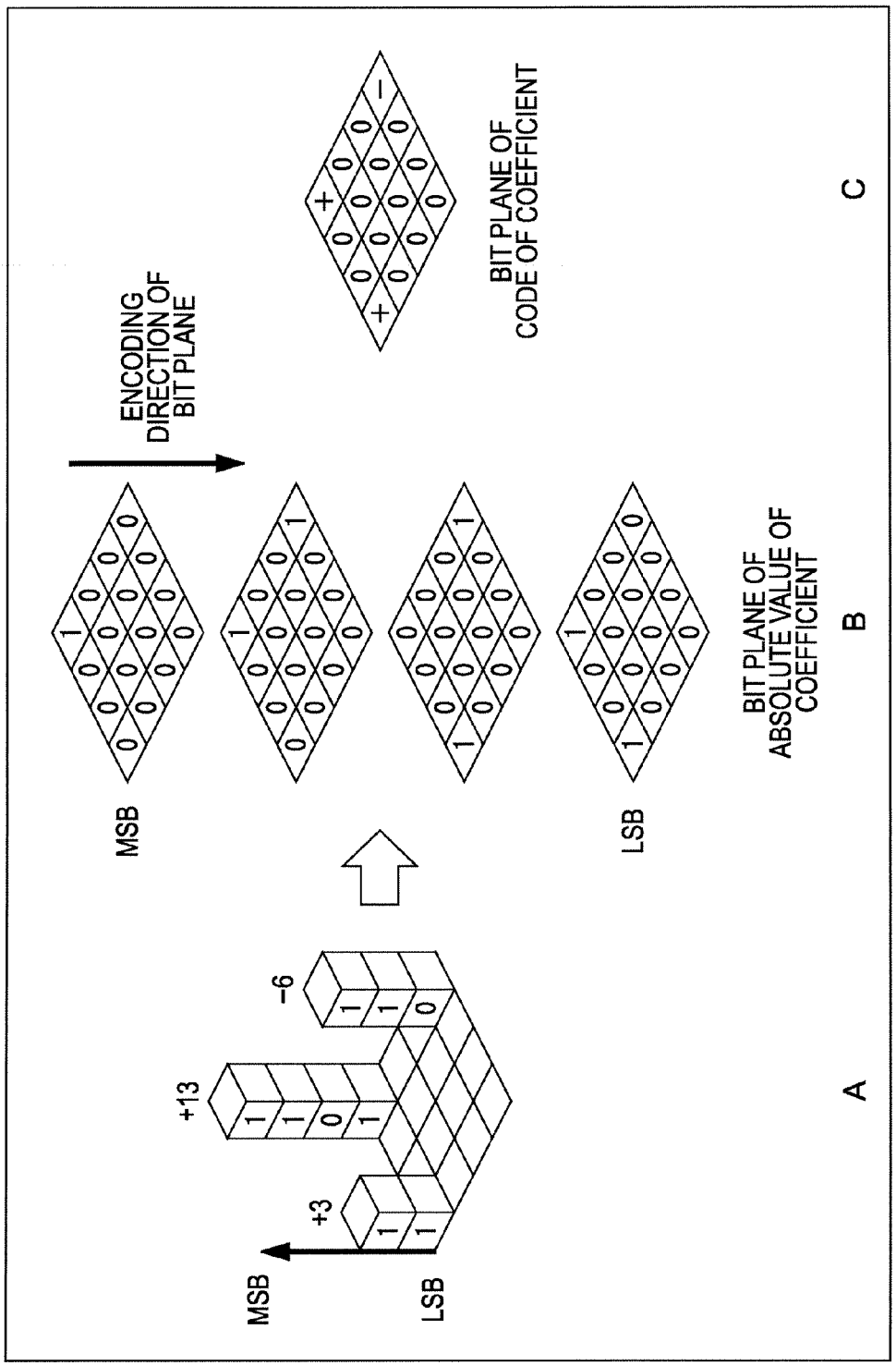
FIG. 8 diagrammatically illustrates bit planes.

If 16 quantization coefficients q are obtained, a bit plane of a matrix of four rows×four columns, namely, 16 coefficients, is formed at each bit position as shown in the portion A of FIG. 8 (portion B of FIG. 8).

As shown in FIG. 8, out of 16 coefficients, one having a maximum absolute value is "13" in decimal system, corresponding to four digit number "1101" in bit representation, namely, binary system. The bit planes of the absolute value of the coefficient include four bit planes as shown in the portion B of FIG. 8. More specifically, the bit plane of bit position $2^0$ is at the most LSB side, followed by the bit plane of bit position $2^1$, the bit plane of bit position $2^2$, and the bit plane of bit position $2^3$ at the most MSB side.

The elements of each bit plane is 0 or 1. The coefficient can take a negative value. A bit plane representing a sign of each coefficient is separately prepared. As shown in the portion A of FIG. 8, the coefficient at the top right corner of the bit plane composed of 4 rows×4 columns is "−6" (decimal system), and thus a negative number. The other values are 0 or a positive value. In this case, the bit plane of the sign is illustrated in portion C of FIG. 8. Any of a positive sign "+," a negative sign "−" and "0" is taken at each data position.

The bit plane decomposer 34 decomposes the supplied quantization coefficient q into bit planes. For example, the bit plane decomposer 34 decomposes the image data of one field into a plurality of blocks, and partitions each block into bit planes. In this way, subsequent entropy encoding can be preferably controlled in a fine-tuned fashion.

The quantization coefficient q, decomposed into bit planes by the bit plane decomposer 34, is supplied to the entropy encoder 35. The entropy encoder 35 encodes the supplied quantization coefficient q on a per bit plane basis using a predetermined entropy encoding method such as Huffman coding or arithmetic coding, and outputs the encoded quantization coefficient q as an encoded stream. The encoded stream output from the entropy encoder 35 is output from the intra encoder 14 via the code amount adder 37.

In the Huffman coding, code is generated by referencing a Huffman coding table produced beforehand in accordance with the frequency of occurrence of a value. The Huffman coding is employed in compression coding of MPEG and JPEG. The arithmetic coding is employed in compression coding of ITU-T (International Telecommunication Union) Recommendation H.264 or JPEG2000.

The code amount adder 37 accumulates the code amount of the supplied encoded stream within one field, thereby supplying the accumulated code amount to the code amount controller 36. In response to the accumulated code amount, the code amount controller 36 outputs to the entropy encoder 35 a control signal to stop the entropy encoding at the moment the target code amount of one field is reached. In response to the control signal, the entropy encoder 35 stops the entropy encoding on the supplied quantization coefficient q.

The code amount control performed by the entropy encoder 35, the code amount controller 36 and the code amount adder 37 is described below. In accordance with one embodiment of the present invention, the code amount is controlled using the structure of the bit plane. The concept of the code amount control using the bit plane is described first.

Figure 9:
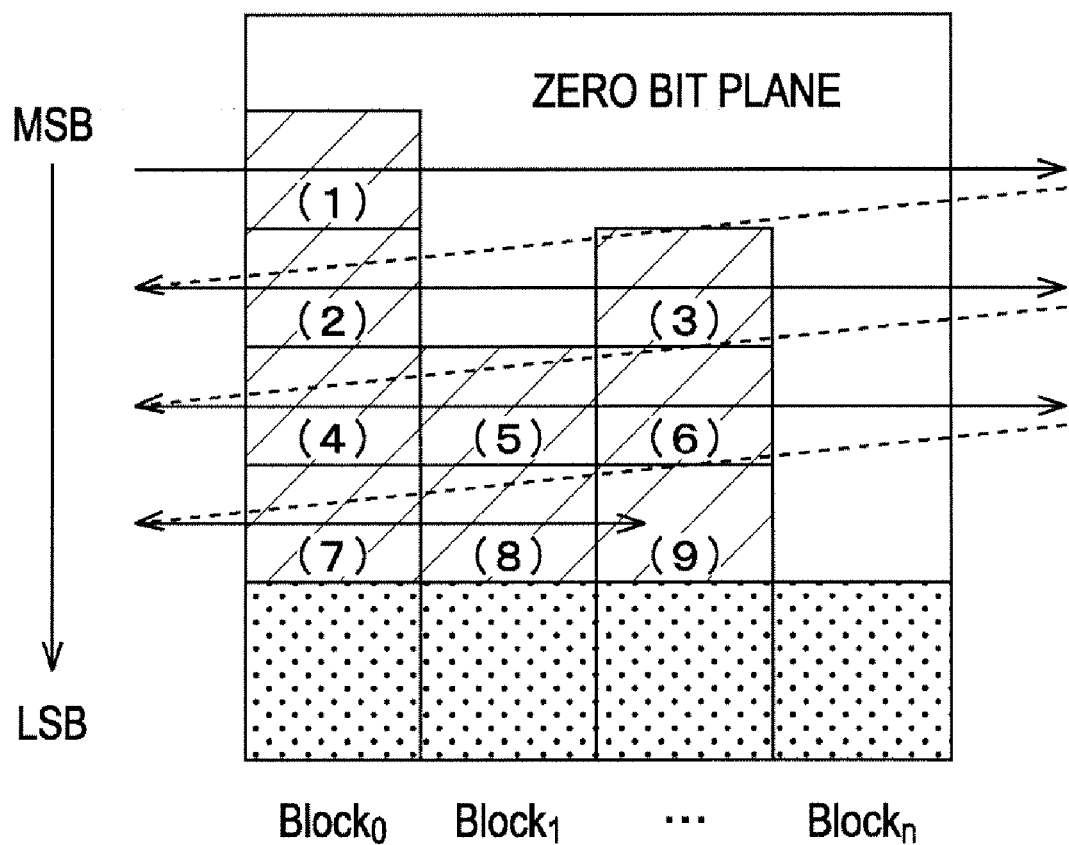
FIG. 9 diagrammatically illustrates the concept of code amount control using the structure of the bit plane.
Figure 10:
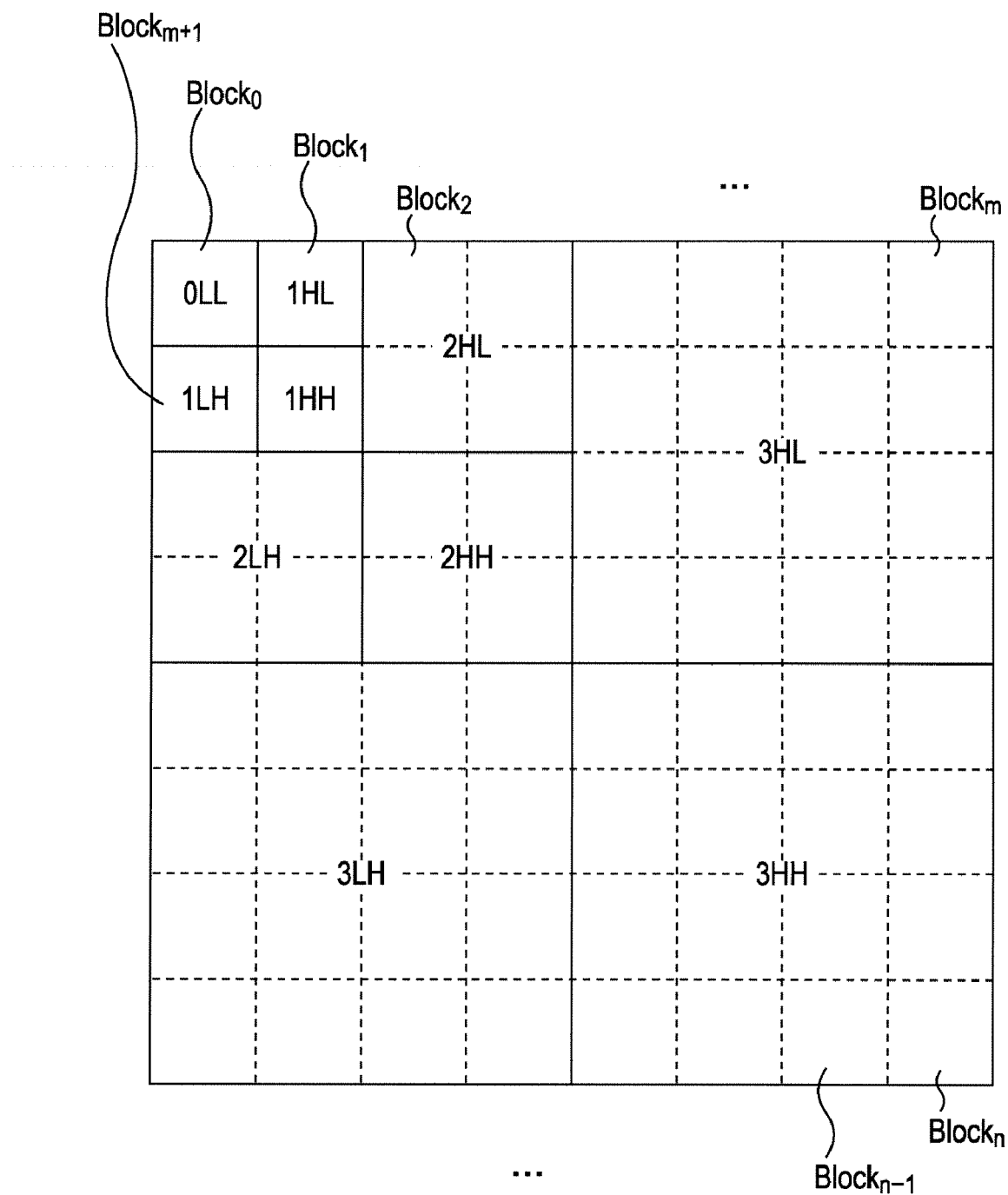
FIG. 10 illustrates how image data having sub bands is partitioned into blocks.

As shown in FIG. 9, the ordinate represents bit position of LSB to MSB from lower to upper position. The abscissa represents rectangular blocks. The image data having sub bands as shown in FIG. 6 is segmented into bit planes composed of bits at bit positions. The image data having sub bands is further segmented into blocks as shown in FIG. 10. More specifically, the image data is segmented into bit planes while also being segmented into $block_0$, $block_1$, ..., $block_n$. Each of segmented $block_0$, $block_1$, ..., $block_n$ has a bit plane structure.

Figure 11:
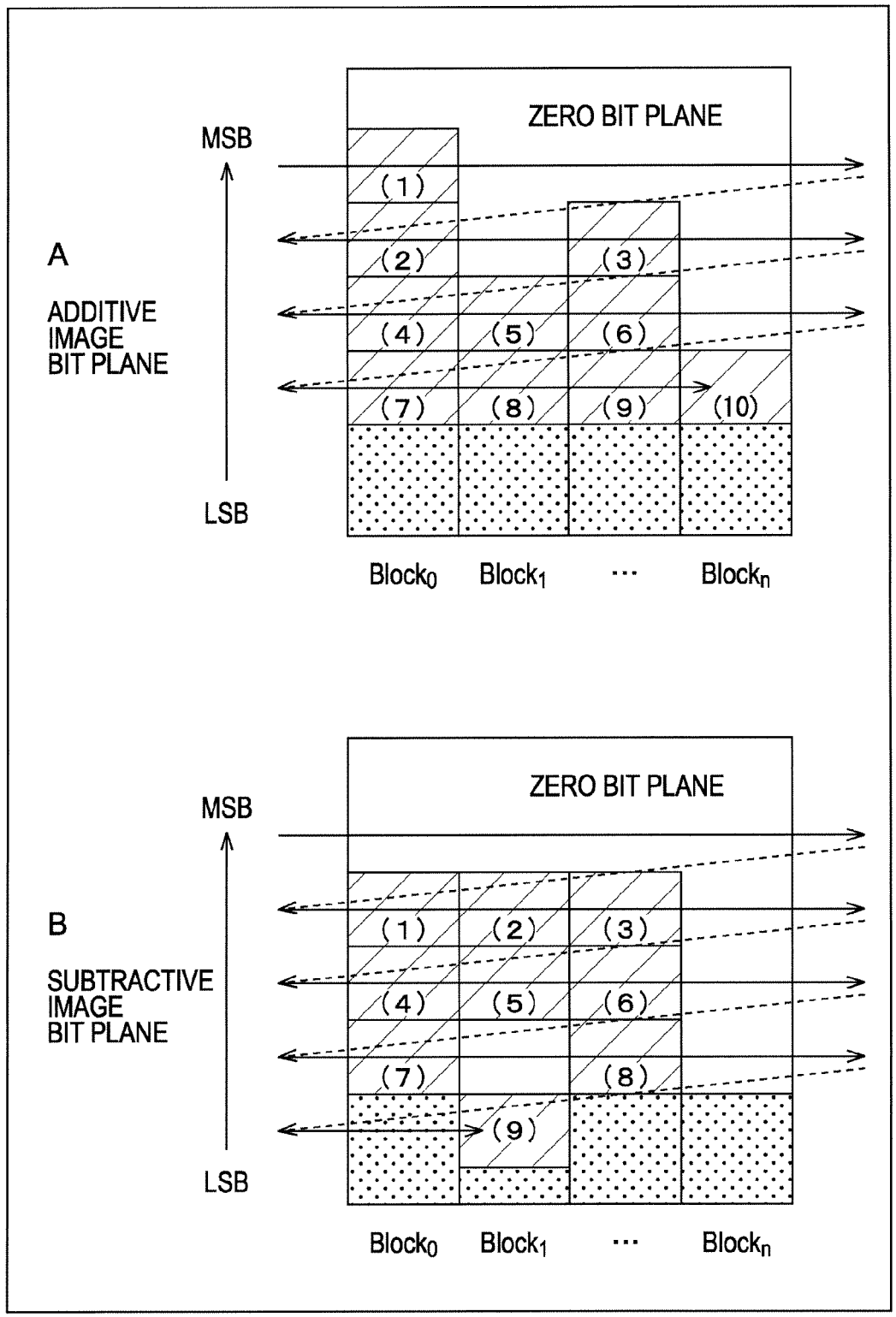
FIG. 11 illustrates an encoding process using the bit plane in accordance with one embodiment of the present invention.
Figure 18:
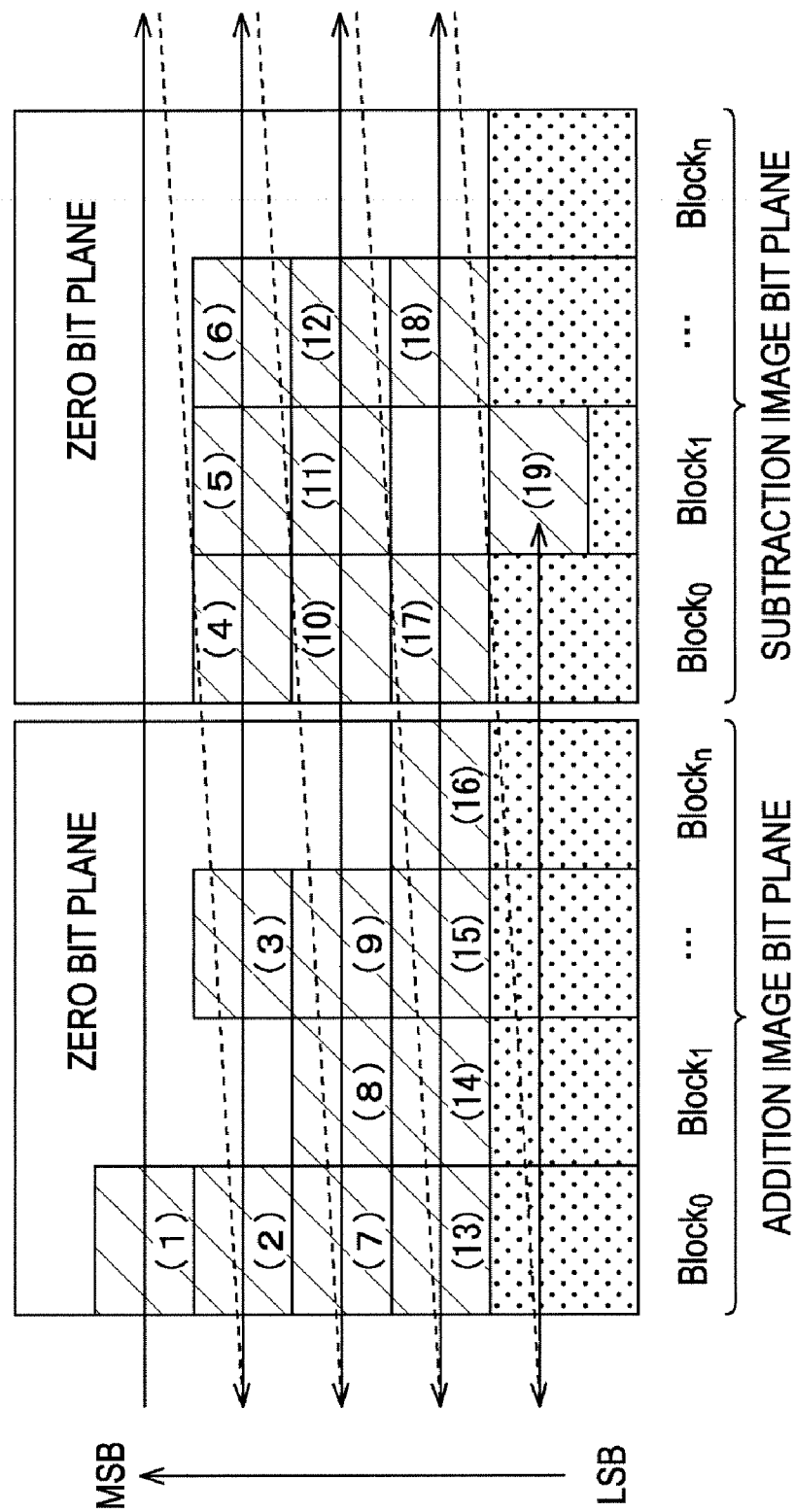
FIG. 18 diagrammatically illustrates an encoding process using the bit plane structure in accordance with a modification of the embodiment of the present invention.
Figure 25:
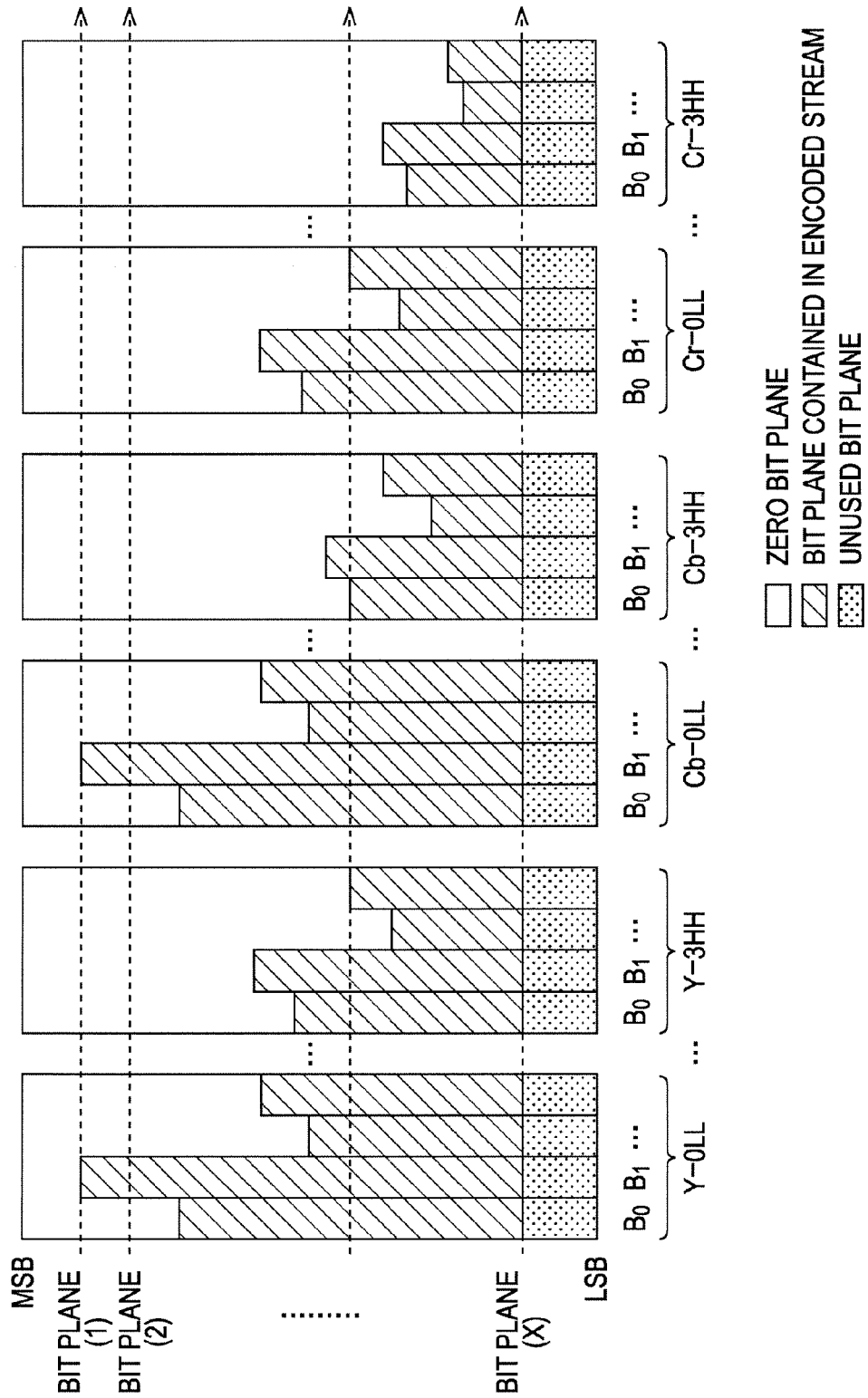
FIG. 25 diagrammatically illustrates an entropy encoding method in accordance with a modification of the embodiment of the present invention.

In practice, each block of FIG. 9 represents a bit plane composed of a plurality of pieces of data. As shown in FIG. 9, each block is represented by a single piece of data for convenience of explanation. In the discussion that follows, data of each block is represented by the single piece of data. The same is true of similar drawings (FIGS. 11, 18, and 25).

The entropy encoding is performed on a per bit plane basis. The code is selected and the code amount is accumulated on a per bit plane basis from MSB to LSB. The entropy encoding is controlled to a stop at the moment the accumulated code amount reaches the target code amount. The closer the bit plane is to MSB, the larger effect the decoded image data has on image quality. As represented by arrow-headed lines in FIG. 9, entropy encoding starts with the bit plane closest to the MSB, and continues with the bit planes toward the LSB side.

As shown in FIG. 9, the $block_0$ of the whole image data has a bit plane closest to the MSB. $Block_1$ has bit planes to bit position two places lower than $block_1$. The block next to $block_1$ has bit planes to a bit position one place lower than $block_0$. $Block_2$ has bit planes to a bit position four places lower than $block_0$.

Entropy encoding is performed on the whole image data on a per bit plane basis. As shown in FIG. 9, entropy encoding starts with the bit plane having the bit position at MSB, and successively continues with the bit planes toward LSB. If viewed from block unit, bit plane (n) of each block of FIG. 9 is successively encoded, i.e., bit plane (1), bit plane (2), bit plane (3), ..., bit plane (9), ... are encoded in that order. The code amount of the entropy encoded data is accumulated. When the accumulated code amount reaches a predetermined target code amount, entropy encoding is controlled to a stop. In the example of FIG. 9, the code amount reaches the target code amount at the moment bit plane (9) has been entropy encoded. The entropy encoding operation is thus stopped.

The code amount is controlled so that entropy encoding is stopped in response to the code amount of the encoded data. The image encoding apparatus can thus control the code amount with a very small workload involved.

As shown in FIG. 9, blank regions are referred to as a zero bit plane with bit value being all zeros, and require no entropy encoding. With reference to FIG. 10, entropy encoding is performed by rectangular block. The present invention is not limited to the unit of rectangular block. For example, entropy encoding may be performed by line. Entropy encoding to be performed by line will be described in detail later.

A bit plane at a bit position a predetermined number of places lower than MSB (in the example of FIG. 9, bit planes four places in bit position lower than MSB) has small effect on image quality of decoded data, and entropy encoding is not performed on such bit plane.

The code amount control using the bit plane structure is described below in connection with the image encoding apparatus discussed with reference to FIG. 1 as one embodiment of the present invention. As previously discussed, the image encoding apparatus of FIG. 1 entropy encodes the addition results and the subtraction results of the image data of the odd and even fields using the intra encoder 14 and the intra encoder 15, respectively.

In accordance with one embodiment of the present invention as shown in FIG. 11, the addition results and the subtraction results of the image data of the odd and even fields are decomposed into bit planes. Each of the bit plane resulting from the addition results and the bit plane resulting from the subtraction results is entropy encoded bit plane by bit plane from MSB to LSB. The code amount control is thus performed appropriately to each of the addition results and the subtraction results. Image quality of the image data subsequent to decoding is thus improved.

As shown in portion A of FIG. 11, the bit planes resulting from the addition results of the adder 12 (hereinafter referred to as addition image bit plane), except the zero bit planes, are entropy encoded from MSB to LSB so that the encoded stream is generated. Similarly, as shown in portion B of FIG. 11, the bit planes resulting from the subtraction results of the subtractor 13 (hereinafter referred to as subtraction image bit plane), except the zero bit planes, are entropy encoded from MSB to LSB so that the encoded stream is generated.

As previously discussed with reference to FIG. 9, rectangular $block_0$, $block_1$, ..., $block_n$ of the image data are entropy encoded on a per block by block basis in FIG. 11 as well. The unit of entropy encoding is not limited to rectangular block. Entropy encoding may be performed by line.

The bit plane decomposition may be performed by mapping data to memory by bit. For example, the addition image bit plane shown in the portion A of FIG. 11 and the subtraction image bit plane shown in the portion B of FIG. 11 at each bit position are mapped to addresses on a memory. The bit plane decomposer 34 decomposes the quantization coefficient q output from the quantizer 33 into a bit value at each bit position, and the resulting bit value is written on a bit plane corresponding to the bit position on the memory. The entropy encoder 35 reads the quantization coefficient q written on the memory from MSB by bit plane, and entropy encodes the read quantization coefficient q. Upon receiving the control signal for stopping entropy encoding from the code amount controller 36, the entropy encoder 35 stops reading the quantization coefficient q from the memory by bit plane.

The image encoding apparatus of FIG. 1 in accordance with one embodiment of the present invention includes the intra encoder 14 encoding the addition results of the adder 12 and the intra encoder 15 encoding the subtraction results of the subtractor 13. The rate controller 16 controls the code amount of each of the intra encoder 14 and the intra encoder 15.

The rate controller 16 exchanges, with the code amount controller 36 included in each of the intra encoder 14 and the intra encoder 15, information concerning the accumulated code amount supplied from the code amount adder 37, thereby controlling the accumulated code amount of the addition image encoded data and the accumulated code amount of the subtraction image encoded data. To this end, the rate controller 16 sets the target code amount in the code amount controller 36 included in each of the intra encoder 14 and the intra encoder 15. In this case, the rate controller 16 can set separate target code amounts, i.e., one target code amount in the code amount controller 36 included in the intra encoder 14 and another target code amount in the code amount controller 36 included in the intra encoder 15.

In the addition image bit plane shown in the portion A of FIG. 11, the target code amount responsive to the addition results is reached at the moment the bit plane (10) of block$_n$ has been entropy encoded. On the other hand, in the subtraction image bit plane shown in the portion B of FIG. 11, the target code amount responsive to the subtraction results is reached at the moment the bit plane (9) of block$_1$ has been entropy encoded.

In the portion B of FIG. 11, the bit planes of the other blocks corresponding to the bit plane (9) of block$_1$ have all zero coefficients.

The encoded data is output by bit plane in the order of entropy encoding. For example, the encoded data of the addition image bit plane shown in the portion A of FIG. 11 is transmitted in the order of bit plane (1), bit plane (2), . . . , bit plane (10). In this case, the encoded data of each bit plane is tagged with identification information. The identification information includes information indicating whether the encoded data is the one of the addition image bit plane or the one of the subtraction image bit plane, information identifying the block, and information indicating the bit position of the bit plane.

Figure 12:
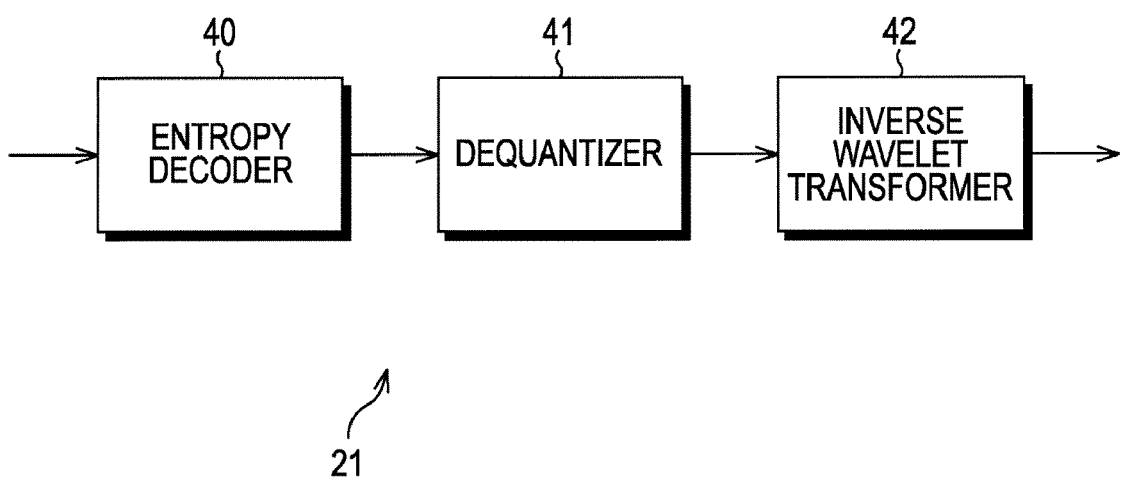
FIG. 12 illustrates an intra decoder in the image decoding apparatus in accordance with one embodiment of the present invention.

FIG. 12 illustrates an example of the intra decoder 21 in the image decoding apparatus discussed with reference to FIG. 4 in accordance with one embodiment of the present invention. The intra decoder 21 and the intra decoder 22 have the same structure. For simplicity of explanation, only the intra decoder 21 is described and the same explanation applies to the intra decoder 22.

The intra decoder 21 includes an entropy decoder 40, an dequantizer 41, and an inverse wavelet transformer 42. The encoded data output from the encoded stream demultiplexer 20 of FIG. 4 is supplied to the entropy decoder 40. The entropy decoder 40 decodes the supplied encoded data through an entropy decoding method corresponding to the entropy encoding method of the entropy encoder 35 discussed with reference to FIG. 5. As a result of decoding, a quantization coefficient q' is generated.

The quantization coefficient q' generated by the entropy decoder 40 is supplied to the dequantizer 41. The dequantizer 41 performs a process inverse to the process represented by equation (5), thereby obtaining a wavelet transform coefficient W' as represented by equation (6).

$$W'=q'\times\Delta \quad (6)$$

The wavelet transform coefficient W' obtained by the dequantizer 41 is supplied to the inverse wavelet transformer 42. The inverse wavelet transformer 42 performs on the supplied wavelet transform coefficient W' an inverse wavelet transform process corresponding to the wavelet transform method performed by the wavelet transformer 32 discussed with reference to FIG. 5. The inverse wavelet transformer 42 thus generates image data of a baseband. The baseband image data is output as decoded image data.

In accordance with one embodiment of the present invention, the target code amount is set to each of the addition results and the subtraction results of the odd field and the even field. In accordance with the set target code amount, the image encoding apparatus entropy encodes the addition results and the subtraction results, starting with a coefficient having a large effect on the image quality subsequent to decoding. The image encoding apparatus in the entropy encoding process thereof can restrict the data rate of the encoded stream output therefrom while assuring high image quality of decoded image data.

Since the intra encoding used in the present invention allows each encoding process to be completed in each of the addition image data and the subtraction image data obtained as a result of the addition and subtraction operations on the odd field and the even field, extremely smooth operation is assured in later editing process of the encoded data.

The image encoding process for encoding the image data and the image decoding process for decoding the encoded image data are described below.

Figure 13:
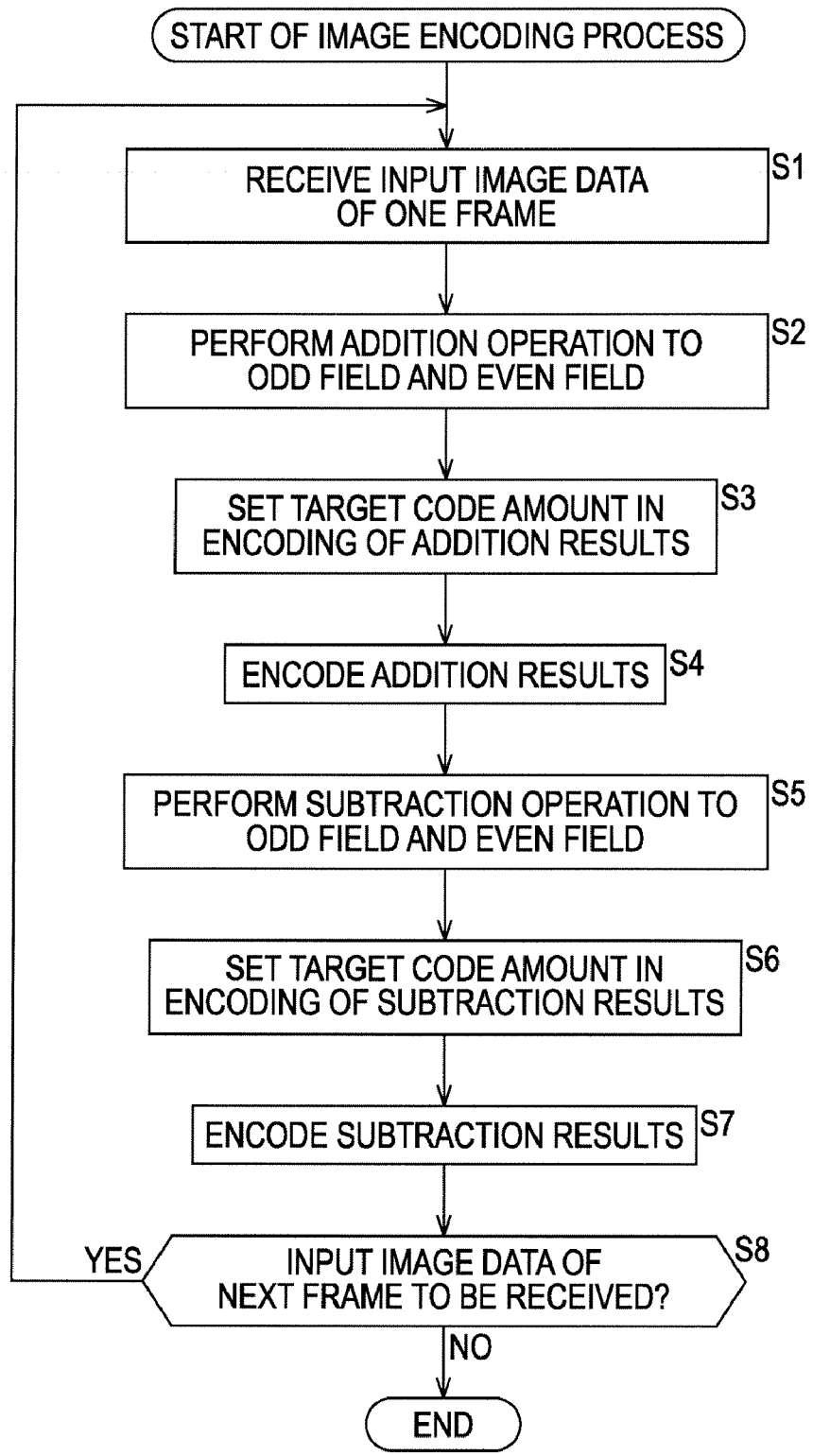
FIG. 13 is a flowchart illustrating a process flow of an image encoding process.

The image encoding process of the image encoding apparatus of FIG. 1 is described below with reference to a flowchart of FIG. 13.

When the image encoding apparatus is switched on, the switch 10 receives image data input of one frame in step S1. Upon receiving the image data input, the switch 10 separates the image data into an odd field and an even field.

In step S2, the adder 12 in the addition and subtraction unit 18 performs an addition operation on the odd field acquired via the field delay unit 11 and the even field acquired not via the field delay unit 11 but directly. In step S3, the rate controller 16 sets a target code amount to be used in the encoding of the addition results. In step S4, the intra encoder 14 encodes the addition results using the target code amount.

In step S5, the subtractor 13 in the addition and subtraction unit 18 performs a subtraction operation on the odd field acquired via the field delay unit 11 and the even field acquired not via the field delay unit 11 but directly. In step S6, the rate controller 16 sets a target code amount to be used in the encoding of the subtraction results. In step S7, the intra encoder 15 encodes the subtraction results using the target code amount.

The addition image data and subtraction image data thus encoded are multiplexed into a single encoded stream by the encoded stream multiplexer 17 as previously discussed.

In step S8, the switch 10 determines whether to receive image data of a next frame. If the image data input is continued and the image data input of the next frame is to be received, processing returns to step S1 to repeat step S1 and subsequent steps. If it is determined in step S8 that the image data input is not to be received, the image encoding process ends.

The image decoding process of the image decoding apparatus of FIG. 4 is described below with reference to a flowchart of FIG. 14.

When the image decoding process starts, the encoded stream demultiplexer 20 receives the encoded stream in step S21. Upon receiving the encoded stream, the encoded stream demultiplexer 20 demultiplexes the encoded stream into the addition image encoded data and the subtraction image encoded data.

In step S22, the intra decoder 21 decodes the addition image encoded data as the encoded stream of the addition results. In step S23, the intra decoder 22 decodes the subtraction image encoded data as the encoded stream of the subtraction results.

The addition and subtraction unit 28, the divider 25A and the divider 25B perform addition and subtraction operations, and a division operation on decoded results of the intra decoder 21 and the intra decoder 22. As a result, image data of the odd field of the base band and image data of the even field of the baseband are generated. These pieces of image data are alternately arranged by the switch 27 into decoded image data. The decoded image data of the baseband is output.

In step S25, the encoded stream demultiplexer 20 determines whether to receive a next encoded stream. If the encoded stream is continuously received, and the next encoded stream is to be received, processing returns to step S21 to repeat step S21 and subsequent steps. If it is determined in step S25 that the encoded stream demultiplexer 20 receives no encoded stream, the image decoding process ends.

Figure 15:
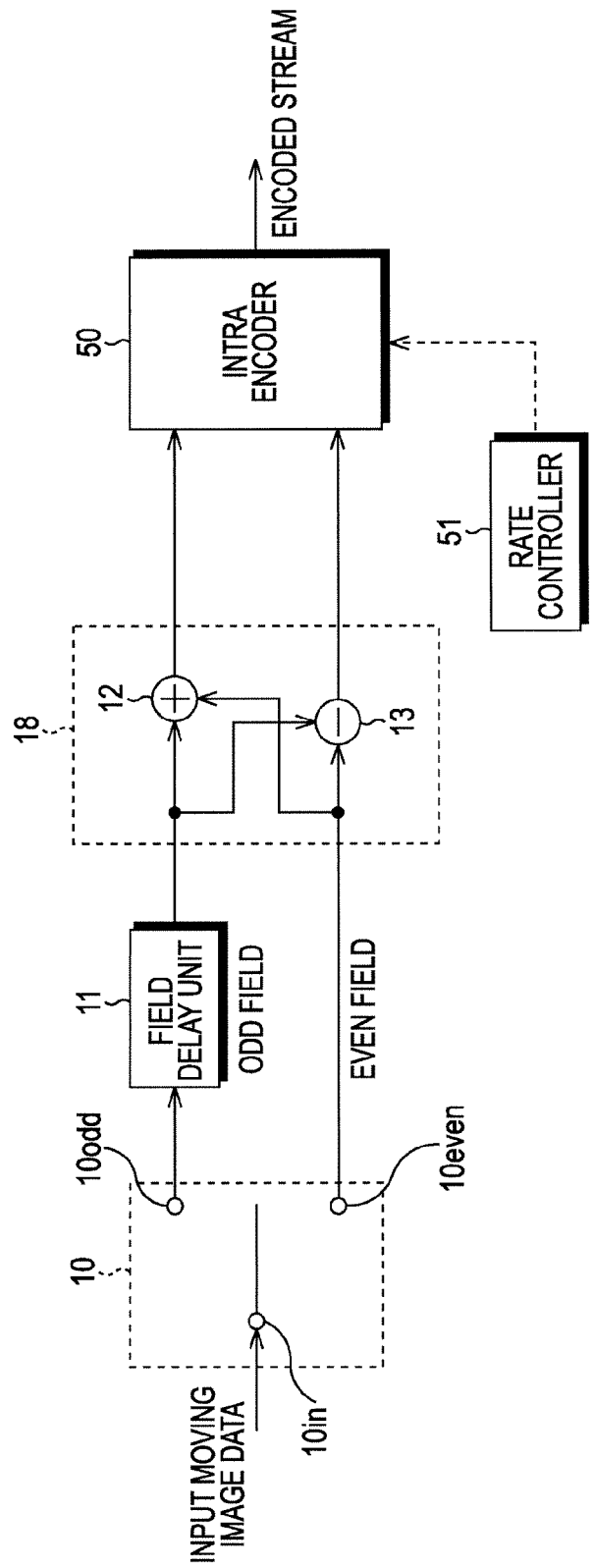
FIG. 15 is a block diagram illustrating an image encoding apparatus in accordance with a modification of the embodiment of the present invention.

Another example of the present embodiment of the invention is described below. FIG. 15 is a block diagram illustrating the structure of an image encoding apparatus. As shown in FIG. 15, elements identical to those shown in FIG. 1 are designated with the same reference numerals, and the discussion thereof is omitted herein.

The image encoding apparatus of FIG. 15 includes a intra encoder 50 instead of the intra encoder 14 and the intra encoder 15 included in the image encoding apparatus of FIG. 1. The intra encoder 50 integrally encode the addition results of the adder 12 with respect to the odd field and the even field and the subtraction results of the subtractor 13 with respect to the odd field and the even field. The code amount of the stream to be encoded by the intra encoder 50 is controlled by the rate controller 51 corresponding to the rate controller 16 of FIG. 1.

The moving image data in interlace scanning is input to a terminal $10_{in}$ of the switch 10. The switch 10 alternately switches between the selection output terminal $10_{odd}$ and the selection output terminal $10_{even}$ at field timing, thereby demultiplexing the moving image data into the odd field and the even field. The image data of the odd field output from the selection output terminal $10_{odd}$ is delayed by one field by the field delay unit 11 and then supplied to each of the adder 12 and the subtractor 13. The image data of the even field output from the selection output terminal $10_{even}$ is supplied to each of the adder 12 and the subtractor 13.

The adder 12 adds the odd field to the even field and supplies addition results to the intra encoder 50. The subtractor 13 subtracts the odd field from the even field and supplies subtraction results to the intra encoder 50.

In response to an encoding bit rate controlled by the rate controller 51, the intra encoder 50 intra encodes the image data as the addition results of the adder 12, and the image data as the subtraction results of the subtractor 13 in a manner such that the encoding process is completed within one field. Encoding is integrally performed on the addition image data and the subtraction image data. The intra encoded stream is thus output from the intra encoder 50.

Figure 16:
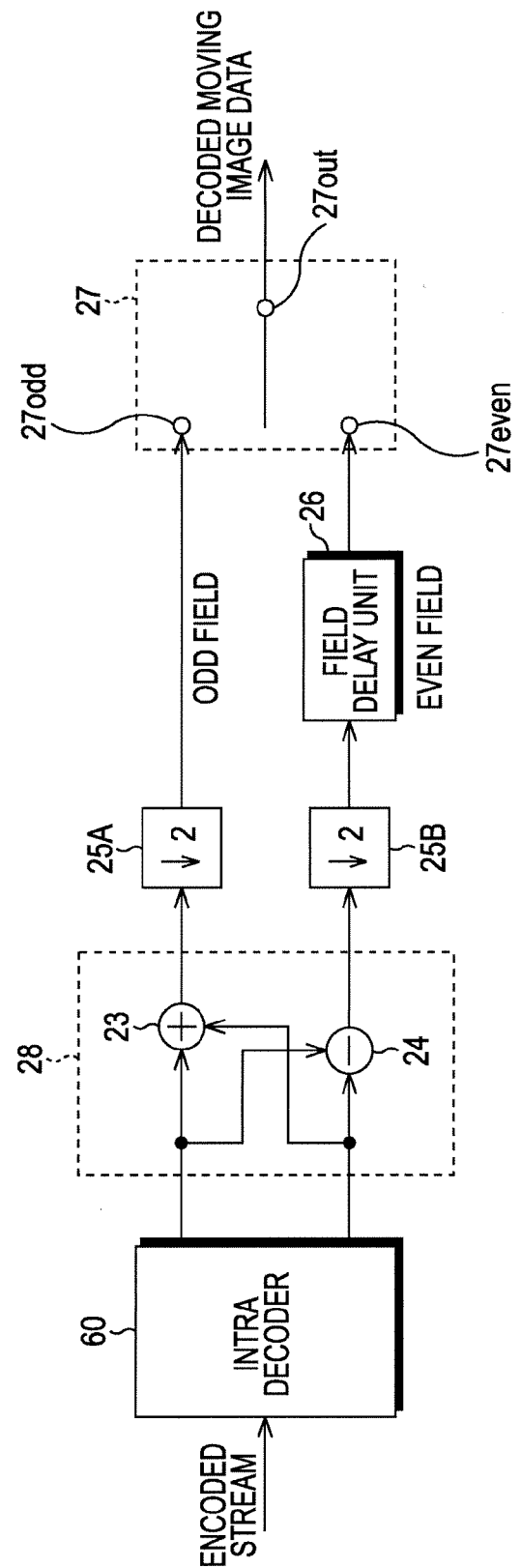
FIG. 16 is a block diagram illustrating an image decoding apparatus in accordance with another modification of the embodiment of the present invention.

FIG. 16 is a block diagram illustrating the structure of an image decoding apparatus corresponding to the image encoding apparatus of FIG. 15. The image decoding apparatus of the present embodiment is basically identical in structure to the image decoding apparatus discussed with reference to FIG. 4. The difference between the two apparatuses is that the image decoding apparatus of FIG. 16 includes an intra decoder 60 instead of the encoded stream demultiplexer 20, the intra decoder 21, and the intra decoder 22 of FIG. 4. As shown in FIG. 16, elements identical to those illustrated in FIG. 4 are designated with the same reference numerals and the discussion thereof is omitted herein.

The intra decoder 60 receives the encoded stream output from the image encoding apparatus discussed with reference to FIG. 15. The intra decoder 60 performs a predetermined decoding process on the supplied encoded stream, thereby outputting addition decoded image data based on the addition results of the odd field and the even field and subtraction decoded image data based on the subtraction results of the odd field and the even field. Each of the addition decoded image data and the subtraction decoded image data is supplied to each of the adder 23 and the subtractor 24 in the addition and subtraction unit 28.

The adder 23 performs an addition operation on the addition decoded image data and the subtraction decoded image data. The subtractor 24 performs a subtraction operation between the addition decoded image data and the subtraction decoded image data. As with the image decoding apparatus of FIG. 4, the adder 23 and the subtractor 24, and the divider 25A and the divider 25B perform the operations thereof in accordance with equations (1) through (4). Decoded image data of the odd field and decoded image of the even field thus result.

The output of the divider 25A is input to the selection input terminal $27_{odd}$ of the switch 27. The output of the divider 25B is delayed by one field by the field delay unit 26 and then input to the selection input terminal $27_{even}$ of the switch 27. The switch 27 alternately switches between the selection input terminal $27_{odd}$ and the selection input terminal $27_{even}$ in response to field timing, thereby outputting the decoded image data of the odd field and the decoded image data of the even field as multiplexed image data.

Figure 17:
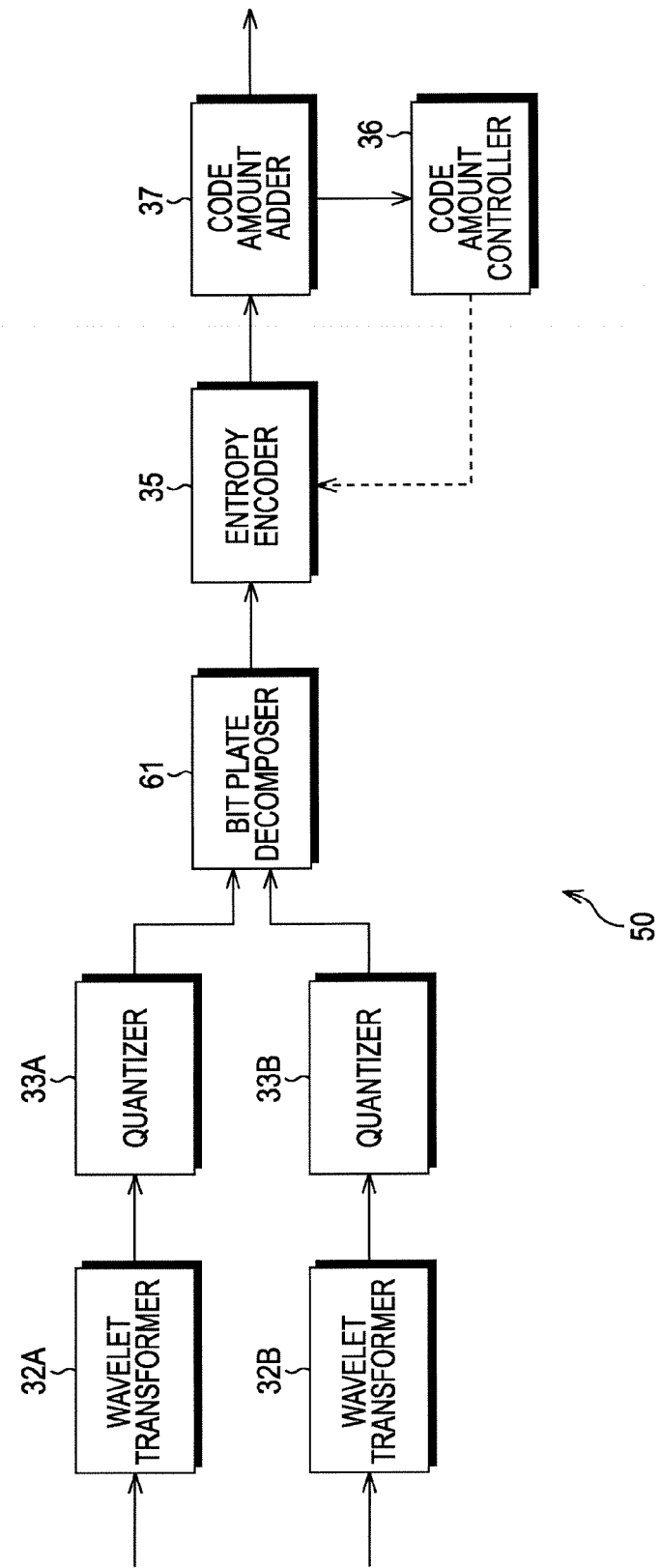
FIG. 17 is a block diagram illustrating an intra encoder in an image encoding apparatus in accordance with a modification of the embodiment of the present invention.

FIG. 17 is a block diagram illustrating the structure of the intra encoder 50 for use in the image encoding apparatus of FIG. 15. The intra encoder 50 is basically identical to the intra encoder 14 previously discussed with reference to FIG. 5. If the wavelet transformer 32 and the quantizer 33 are arranged for each of the outputs of the adder 12 and the subtractor 13 in an intra encoder 14, that intra encoder 14 becomes identical to the intra encoder 50. As shown in FIG. 17, elements identical to those illustrated in FIG. 5 are designated with the same reference numerals, and the discussion thereof is omitted herein.

As shown in FIG. 17, the wavelet transformer 32A wavelet transforms the addition image data output from the adder 12 and the quantizer 33A quantizes the wavelet transform coefficient W. Similarly, the wavelet transformer 32B wavelet transforms the subtraction image data output from the subtractor 13 and the quantizer 33B quantizes the wavelet transform coefficient W.

The quantization coefficient q, into which the quantizer 33A and the quantizer 33B have quantized the addition image encoded data and the subtraction image encoded data, is supplied to the bit plane decomposer 61. The bit plane decomposer 61, corresponding to the bit plane decomposer 34 of FIG. 5, decomposes the encoded data by mapping the quantization coefficient q based on the supplied addition image data and subtraction image data to a memory. The addition image bit plane and the subtraction image bit plane are thus generated.

The entropy encoder 35 successively entropy encodes the quantization coefficient q supplied in bit plane decomposed state by the bit plane decomposer 61.

The entropy encoder 35 integrally entropy encodes the output of the adder 12 and the output of the subtractor 13, corresponding to the input to the intra encoder 50. For this reason, as shown in FIG. 18, the entropy encoder 35 performs entropy encoding across the addition image bit plane and the subtraction image bit plane. More specifically, as shown in FIG. 18, the entropy encoder 35 entropy encodes rectangular blocks of the quantization coefficient q responsive to the output of the adder 12 together with rectangular blocks of the quantization coefficient q responsive to the output from the subtractor 13 from the bit plane on the MSB side toward the bit plane on the LSB side except the zero bit planes.

The entropy encoded data is output in an encoded stream from the code amount adder 37. The code amount adder 37 accumulates the supplied encoded data while supplying the accumulated code amount to the code amount controller 36. In response to the supplied accumulated code amount, the code amount controller 36 supplies to the entropy encoder 35 a control signal to stop the entropy encoding at the moment the encoded data amount has reached the target code amount.

As shown in FIG. 18, the addition image bit plane and the subtraction image bit plane are together entropy encoded by bit plane by bit plane from the MSB side to the LSB side, i.e., in the order of block (1), block (2), . . . by block. When block (19) has been reached, the code amount has reached the target code amount.

The encoded data is output on a per bit plane basis in the order of entropy encoding. For example, the data entropy encoded by the entropy encoder 35 is transmitted by block in each bit plane. As shown in FIG. 18, bit plane (1), bit plane (2), . . . , bit plane (19) are transmitted in that order in terms of bit plane viewed from block. The encoded data of each bit plane is tagged with identification information. The identification information includes information indicating whether the encoded data is the one of the addition image bit plane or the one of the subtraction image bit plane, information identifying the block, and information indicating the bit position of the bit plane.

Figure 19:
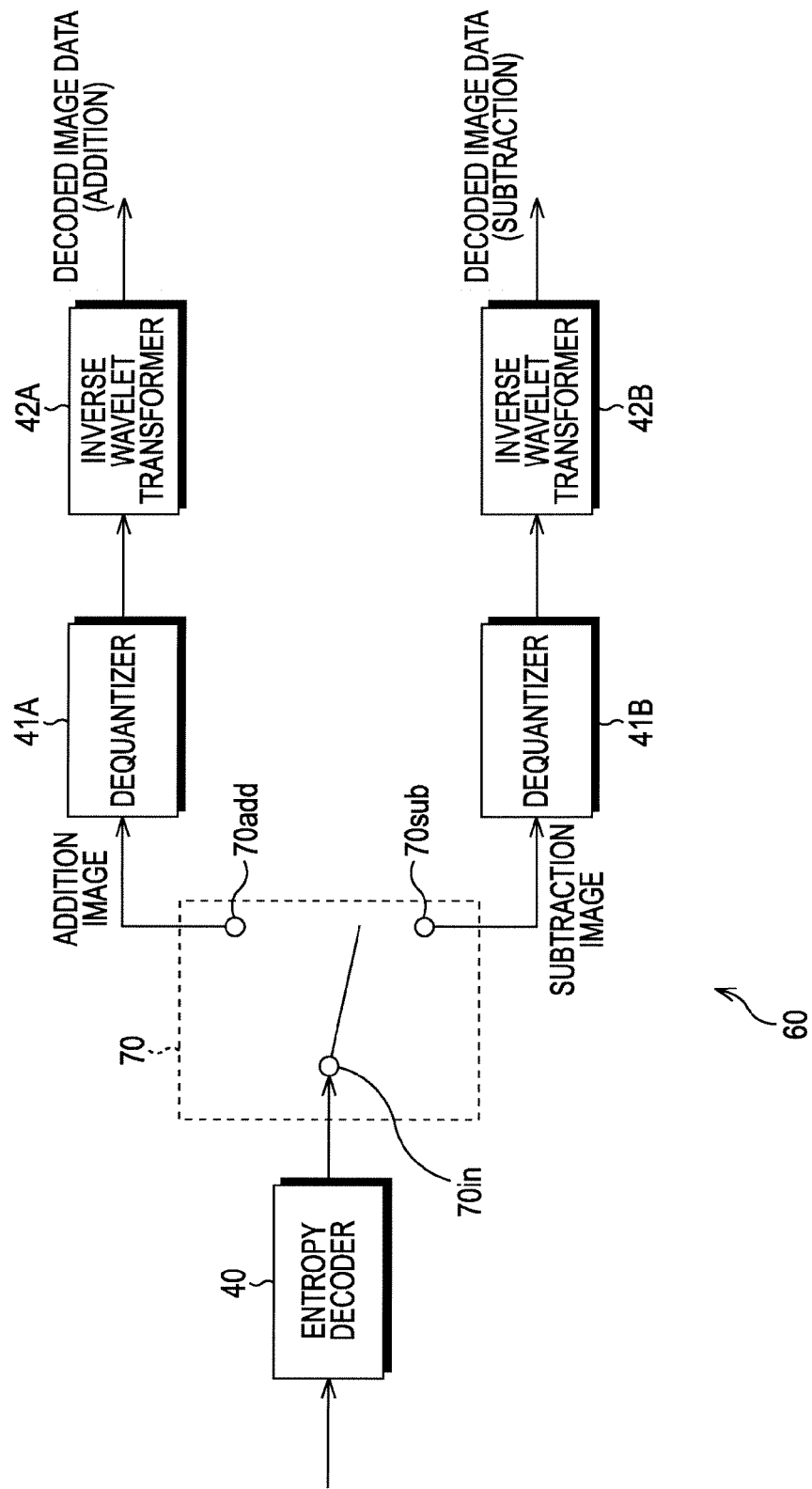
FIG. 19 is a block diagram illustrating the structure of an intra decoder in an image decoding apparatus in accordance with a modification of the embodiment of the present invention.

FIG. 19 is a block diagram illustrating the structure of the intra decoder 60 for use in the image decoding apparatus discussed with reference to FIG. 16. The intra decoder 60 includes an entropy decoder 40, a switch 70, a dequantizer 41A, a dequantizer 41B, an inverse wavelet transformer 42A, and an inverse wavelet transformer 42B.

The entropy decoder 40 entropy decodes the supplied encoded data in accordance with the entropy decoding method corresponding to the entropy encoding method of the entropy encoder 35 discussed with reference to FIG. 17. The entropy decoder 40 is identical to the entropy decoder 40 discussed with reference to FIG. 12. The entropy decoder 40 decodes the bit planes by block in the order according to which the encoded data has been supplied. For example, the entropy decoder 40 decodes bit plane (1), bit plane (2), . . . , bit plane (19) supplied as the encoded data by the entropy encoder 35 discussed with reference to FIG. 18. The decoded data is input to the input terminal $70_{in}$ of the switch 70.

The switch 70 demultiplexes the data input to the input terminal 70 in into data of the addition image bit plane and data of the subtraction image bit plane. For example, if each piece of data is tagged with the identification information identifying the bit plane, the switch 70 demultiplexes the data in accordance with the identification information.

The data of the addition image bit plane demultiplexed by the switch 70 is output from a selection output terminal $70_{add}$, and then supplied to the dequantizer 41A. The data of the subtraction image bit plane demultiplexed by the switch 70 is output from a selection output terminal $70_{sub}$, and then supplied to the dequantizer 41B.

The dequantizer 41A, having a buffer memory, stores one field of the date of the addition image bit plane supplied from the selection output terminal $70_{add}$ of the switch 70 on the buffer memory. When one field of the data of the addition image bit plane is stored on the buffer memory, the dequantizer 41A dequantizes the accumulated data in accordance with the above-referenced equation (6). As shown in FIG. 18, when bit plane (1), bit plane (2), bit plane (3), bit plane (7), bit plane (8), bit plane (9), bit plane (13), bit plane (14), bit plane (15), and bit plane (16) are accumulated by block, the dequantizer 41A dequantizes the accumulated data.

The wavelet transform coefficient W obtained as a result of quantization of the dequantizer 41A is supplied to the inverse wavelet transformer 42A. The inverse wavelet transformer 42A performs on the supplied wavelet transform coefficient W the inverse wavelet transform corresponding to the wavelet transform method of the wavelet transformer 32A discussed with reference to FIG. 17. The image data is thus generated. The image data generated herein is based on the addition image data in the image encoding apparatus.

The process performed by the dequantizer 41B and the inverse wavelet transformer 42B on the subtraction image bit plane remains unchanged from the above-described process performed by the dequantizer 41A and the inverse wavelet transformer 42A, and the discussion thereof is not repeated herein. The image data generated by the inverse wavelet transformer 42B is based on the subtraction image data in the image encoding apparatus.

Through the above-described processes, the intra decoder 60 outputs the decoded image data based on the addition image data and the subtraction image data.

In accordance with the present embodiment, the single intra encoder 50 in the image encoding apparatus is sufficient. The image encoding apparatus is smaller in circuit scale than the image encoding apparatus of FIG. 1. Since the quantization coefficient q having a large effect on image quality subsequent to decoding is present in the bit plane on the MSB side, appropriate code amount control is performed without paying attention to the code budget to the addition results and the subtraction results of the odd field and the even field.

The process flow of the image encoding process for encoding the image data and the image decoding process for decoding the encoded image data is described below.

Figure 20:
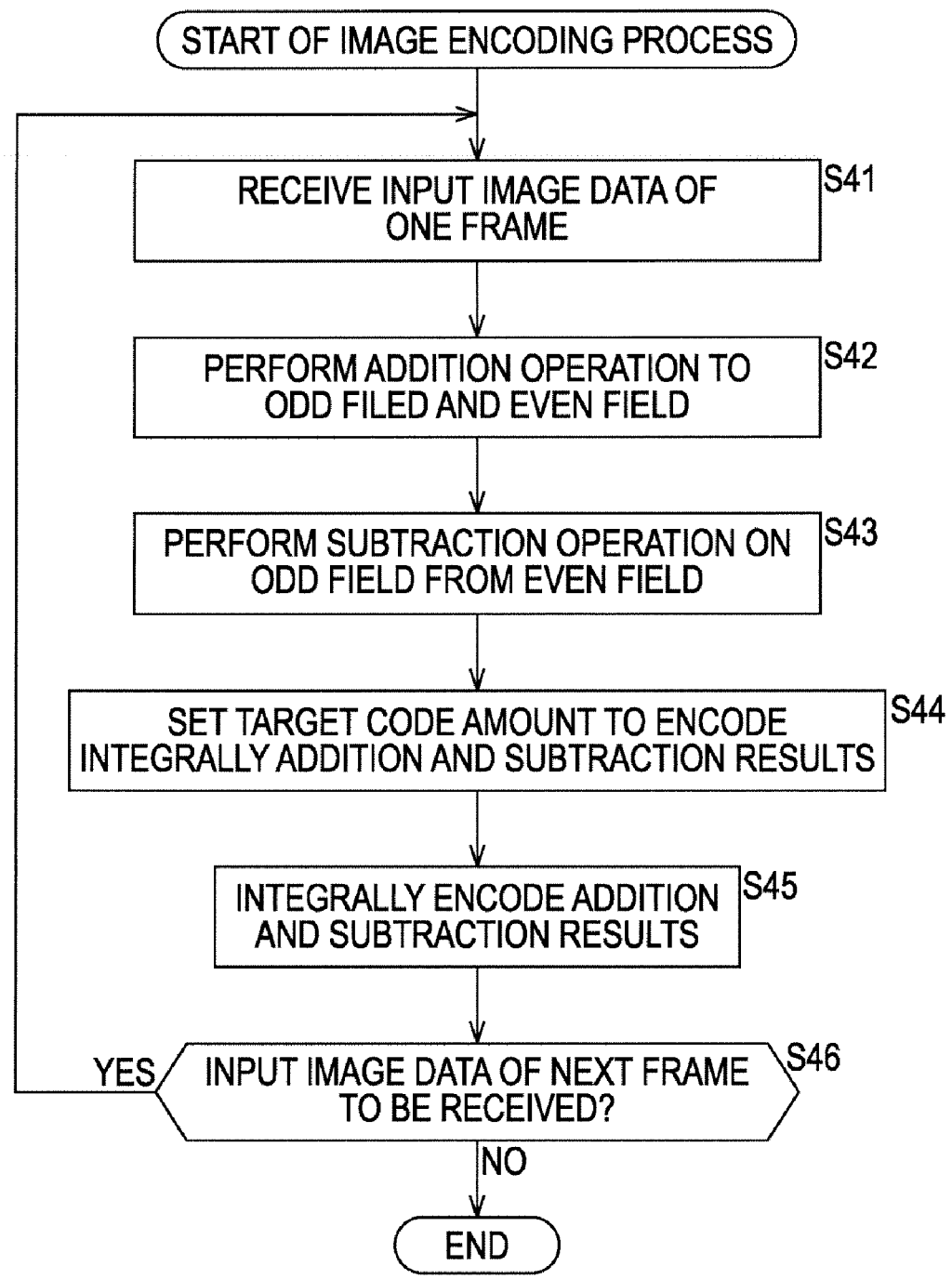
FIG. 20 is a flowchart illustrating a process flow of an image encoding process.

The process flow of the image encoding process of the image encoding apparatus of FIG. 15 is described below with reference to a flowchart of FIG. 20.

When the image encoding process starts, the switch 10 receives the image data of one frame in step S41. Upon receiving the image data, the switch 10 demultiplexes the image data into an odd field and an even field.

In step S42, the adder 12 in the addition and subtraction unit 18 performs an addition operation on the odd field acquired via the field delay unit 11 and an even field acquired not via the field delay unit 11 but directly. In step S43, the subtractor 13 in the addition and subtraction unit 18 performs a subtraction operation between the odd field acquired via the field delay unit 11 and the even field acquired not via the field delay unit 11 but directly.

In step S44, the rate controller 51 sets a target code amount to encode integrally the addition results and the subtraction results. In step S45, the intra encoder 50 integrally encodes the addition results and the subtraction results using the target code amount.

The stream thus encoded is output to the outside from the image encoding apparatus.

In step S46, the switch 10 determines whether to receive image data of a next frame. If the image data is continuously supplied and further image data is to be received, processing returns to step S41 to repeat step S41 and subsequent steps. If it is determined in step S46 that the switch 10 receives no further image data, the image encoding process ends.

The process flow of the image decoding process of the image decoding apparatus of FIG. 16 is described below with reference to a flowchart of FIG. 21.

When the image decoding process starts, the intra decoder 60 receives the encoded stream in step S61. Upon receiving the encoded stream, the intra decoder 60 decodes the encoded stream of the addition results and the subtraction results in step S62.

In step S63, the addition and subtraction unit 28, the divider 25A and the divider 25B perform addition and subtraction operations and a division operation on the decode results of the intra decoder 60, thereby generating the image data of the odd field of the baseband and the image data of the even field of the baseband. These pieces of image data are alternately multiplexed into the decoded image data of the baseband by the switch 27 and then output.

In step S64, the intra decoder 60 determines whether to receive a next encoded stream. If the encoded stream is continuously supplied and the next encoded stream is to be received, processing returns to step S61 to repeat step S61 and subsequent steps. If it is determined in step S64 that the intra decoder 60 receives no further encoded stream, the image decoding process ends.

In each of the image encoding process of the image encoding apparatuses and the image decoding process of the image decoding apparatus in accordance with the preceding embodiments, each element is controlled by an unshown CPU (Central Processing Apparatus) operating under the control of a predetermined program. The program may be stored on an unshown ROM (Read Only Memory). The present invention is not limited to this arrangement. Alternatively, the elements constituting the image encoding apparatus and the image decoding apparatus may exchange timing signals and control signals to operate in cooperation. The image encoding apparatus and the image decoding apparatus may also be implemented by software running on a computer.

Another embodiment of the present invention is described below. In accordance with this embodiment of the present invention, an encoded stream is constructed using a feature of wavelet transform. Subjective image quality of an image subsequent to decoding is thus improved while the bit rate of the encoded stream is restricted.

As previously discussed with reference to FIGS. 6 and 7, a plurality of sub bands are formed with respect to the image data using the wavelet transform. Due to property of image, energy concentrates most on a low frequency region in the plurality of sub bands while a component of an outline of each image is present in a high frequency region (see FIG. 7). Allocating a code amount more to the low frequency region than to the high frequency region during entropy encoding is expected to improve subjective image quality of decoded image and to restrict the bit rate of the encoded stream.

Figure 22:
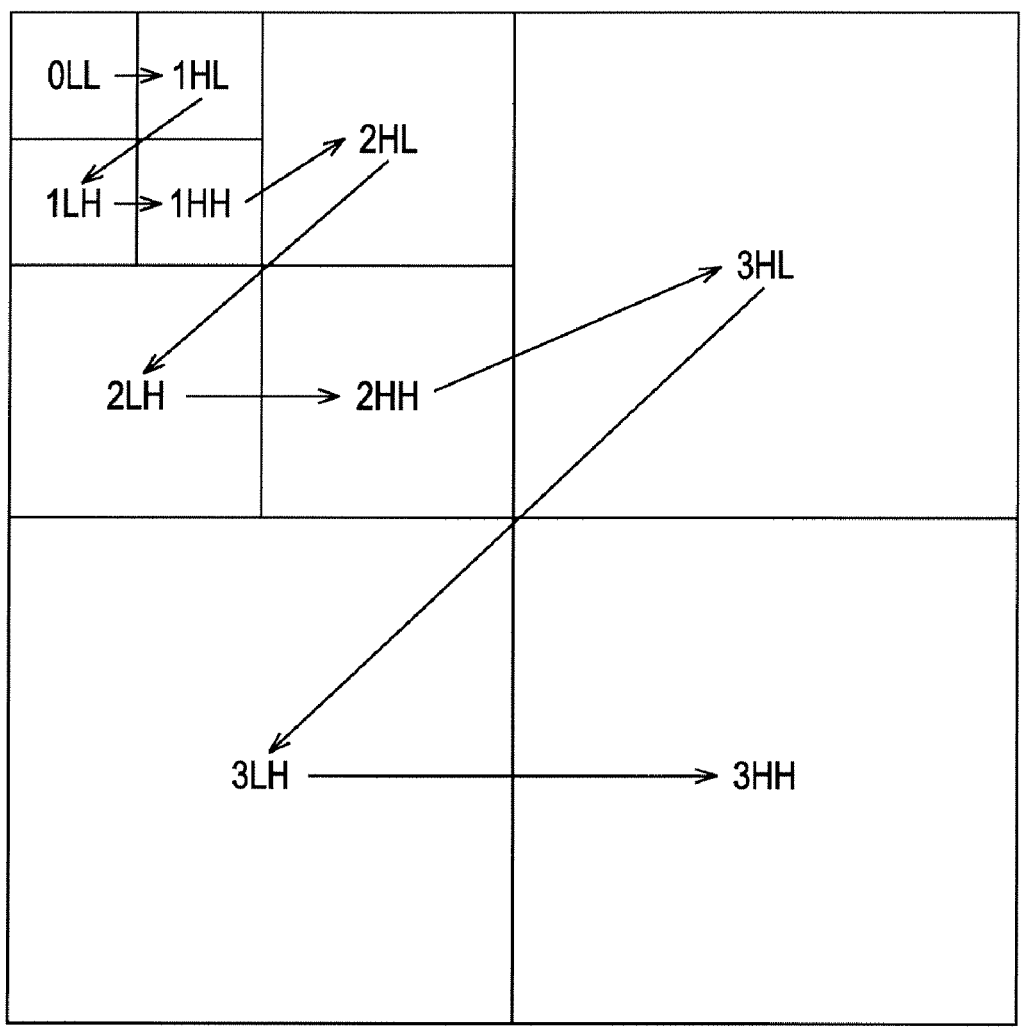
FIG. 22 diagrammatically illustrates an entropy encoding method in accordance with a modification of the embodiment of the present invention.

As previously discussed, the image data is decomposed into bit planes, and then the image data is entropy encoded by block on a per bit plane basis. In this method as shown in FIG. 22, encoding is performed from a sub band in the lowest frequency region to a sub band in the highest frequency region in the bit plane at the same bit position. In the bit plane at the same bit position as shown in FIG. 22, a region 0LL as the lowest frequency region is first entropy encoded, and then region 1HL, region 1LH, region 1HH, region 2HL, ..., region 3LH, and region 3HH are successively entropy encoded in that order from the lowest frequency region to the highest frequency region.

As shown in FIGS. 11 and 18, the smaller, the block number, the lower frequency region, the coefficient belongs, and the larger the block number, the higher frequency region to, the coefficient belongs to. In this way, each bit plane is entropy encoded in the order from the low frequency component to the high frequency component.

More specifically, the image data is segmented into a plurality of blocks as shown in FIG. 23. In the bit plane at the same bit position, block (1) corresponding to the lowest frequency region 0LL with segmentation level=3 is first entropy encoded, and then block (2), block (3), and block (4) corresponding to the lowest frequency region with segmentation level=2 are entropy encoded in that order. Further, block (5), block (6), ..., block (16) corresponding to the lowest frequency region with segmentation level=1 are entropy encoded in that order. Further, block (17), block (18), ..., block (32) corresponding to region 3HL with segmentation level=1 are entropy encoded in that order. Block (33), block (34), ..., block (48) corresponding to region 3LH are entropy encoded in that order. Block (49), block (50), ..., block (64) corresponding to region 3HH are entropy encoded in that order. In this way, the image data is entropy encoded by block from the low frequency region to the high frequency region in the bit plane at the same bit position. The encoding order of the blocks in each region is not limited to the one described above.

By performing entropy encoding in the above-referenced order, entropy encoding is stopped at a desired block in a desired bit plane. In this way, an image providing the highest subjective image quality is obtained in the decoded image data at moment the encoding stops.

During decoding, the image decoding apparatus entropy decodes the bit plane at the same position from the lowest frequency region to the highest frequency region. As shown in FIG. 23, during decoding, block (1), block (2), block (32), block (33), ..., block (64) in the bit plane at the same bit position are entropy decoded in that order. The entropy decoded data is then dequantized, and inverse wavelet transformed. The decoded addition image data and the decoded subtraction image data are thus generated. The addition and subtraction operations and the divide-by-2 division operation are performed on the decoded addition image data and the decoded subtraction image data, and image data of the odd field and image data of the even field result. The region where energy concentrates more is first entropy decoded so that high subjective image quality is achieved in the image subsequent to decoding.

In accordance with the present embodiment, encoding is stopped at any position within the bit plane. Bits placed subsequent to the position where encoding has been stopped may be set to be zero in the bit plane. Entropy encoding is stopped in the bit planes lower in bit position than the bit plane where encoding has been stopped.

The image encoding apparatuses and the image decoding apparatus in accordance with the preceding embodiments are equally applicable to the present embodiment, and the detailed discussion of the image encoding apparatus and the image decoding apparatus of the present embodiment is thus omitted.

Another embodiment of the present invention is described below. In accordance with this embodiment, priority order is set up in encoding depending on the type of data to be encoded. The encoded data is included in a final encoded stream in accordance with the priority order.

Actual moving image data typically contains color information. The color information contains a luminance component and a color component. In accordance with the present embodiment, a luminance component Y, and color difference components Cb and Cr are prioritized with priority. A component having a higher priority is included in the final encoded stream with priority. In this way, the demodulated image data is set to be high in quality while the data rate of the encoded stream is restricted.

The color difference component Cb represents a color difference of a blue component, and the color difference component Cr represents a color difference of a red component. The luminance component Y contains information relating to brightness only and contains no color information.

The addition image data resulting from the addition of the odd field and the even field and the subtraction image data resulting from the subtraction between the odd field and the even field contain the luminance component Y, and the color difference components Cb and Cr. Which component of the addition image data and the subtraction image data to select with priority and to contain in the final encoded stream becomes the important factor to determine the image quality of the decoded image data.

As previously discussed, the addition operation and the subtraction operation are performed on the odd field and the even field in each of the preceding embodiments. The dynamic range of data is twice as large as the dynamic range of the original data. How efficiently the data having the double dynamic range is encoded is important. Generally speaking, the larger the dynamic range, the larger the encoded bit amount becomes.

In accordance with the present embodiment, the addition image data, the subtraction image data, the luminance component Y, the color difference component Cb and the color difference component Cr are prioritized with priority. The higher priority data is taken to be encoded with higher priority. To account for the priority order in the encoded data, data may be weighted in accordance with priority order.

The addition image data, the subtraction image data, the luminance component Y, the color difference component Cb and the color difference component Cr are prioritized with priority in accordance with the following condition (1).

$$Y(\text{addition}) > Cb(\text{addition}) > Cr(\text{addition}) > Y(\text{subtraction}) > Cb(\text{subtraction}) > Cr(\text{subtraction}) \quad \text{condition (1)}$$

Y, Cb, and Cr respectively represent the luminance component Y, the blue color difference component Cb, and the red color difference component Cr. Also, (addition) represents the addition image data and (subtraction) represents the subtraction image data. The symbol ">" represents the left side is greater than the right side. The same is true of condition (2) to be discussed later.

The condition (1) is based on the feature of the moving image data in interlace scanning. More specifically, in interlace scanning, the field frequency is 60 Hz (in NTSC (National Television System Committee)), and the period of each of the odd field and the even field is relatively short, namely, 1/60 second.

In the odd field and the even field adjacent to each other, pixels at corresponding positions are considered to have close values. As described with reference to FIG. 3, the subtraction results between the odd field and the even field converge to the vicinity of zero. On the other hand, the addition results of the odd field and the even field converge close to the value twice as large as the value of the original data. In the case of the moving image data moving at a very high speed, an amount of motion between the adjacent fields becomes large, and the subtraction data also becomes large in value in response to the amount of motion.

It is highly probable that the addition results of the odd field and the even field have a larger dynamic range than the subtraction results. The condition (1) where the addition image data is placed higher in priority order than the subtraction image data is advantageous to achieve high quality in the decoded image data.

The priority order of the addition image data, the subtraction image data, the luminance component Y, the color difference component Cb and the color difference component Cr is not limited to the condition (1). For example, the following condition (2) may be also used to prioritize the components.

$$Y(\text{addition}) > Y(\text{subtraction}) > Cb(\text{addition}) > Cb(\text{subtraction}) > Cr(\text{addition}) > Cr(\text{subtraction}) \quad \text{condition (2)}$$

The condition (2) is based on the feature of the image, more specifically, is based on the fact that the luminance component has more amount of information than the color difference component in the image, and that human vision characteristics to the luminance component of the image are more sensitive to the luminance component than to the color difference component. In other words, degradation in the luminance component is more pronounced to human eyes than degradation in the color difference component. High quality is advantageously achieved in the decoded image if the luminance component is placed higher in priority order than the color difference component throughout the addition results and the subtraction results of the odd field and the even field as shown in the condition (2).

The priority order of the color difference component Cb and the color difference component Cr in each of the conditions (1) and (2) is not limited to the one described above. The priority order may be reversed. More specifically, the priority order of the color difference component Cb and the color difference component Cr may be determined depending on the image to be encoded. For example, if the image is bluish, the color difference component Cb may be set to be higher in priority order than the color difference component Cr. If the image is reddish, the color difference component Cr may be set to be higher in priority order than the color difference component Cb. During entropy encoding, the color information of the image data to be encoded is analyzed beforehand, and the priority order of the color difference component Cb and the color difference component Cr may be adaptively set up in accordance with the analysis results.

In accordance with the present embodiment, the image decoding apparatus performs the decoding process in accordance with the priority order set during the encoding, i.e., starting with data having the highest priority followed by data having the next highest priority.

The image encoding apparatuses and the image decoding apparatus in accordance with the preceding embodiments are equally applicable to the present embodiment, and the detailed discussion of the image encoding apparatus and the image decoding apparatus of the present embodiment is thus omitted herein.

Another embodiment of the present invention is described below. In the above discussion, the image data is weighted in accordance with the priority order set for the addition image data, the subtraction image data, the luminance component Y, the color difference component Cb and the color difference component Cr. In accordance with the present embodiment, however, the priority order set using the above-described bit plane is accounted for in the encoded stream.

Figure 24:
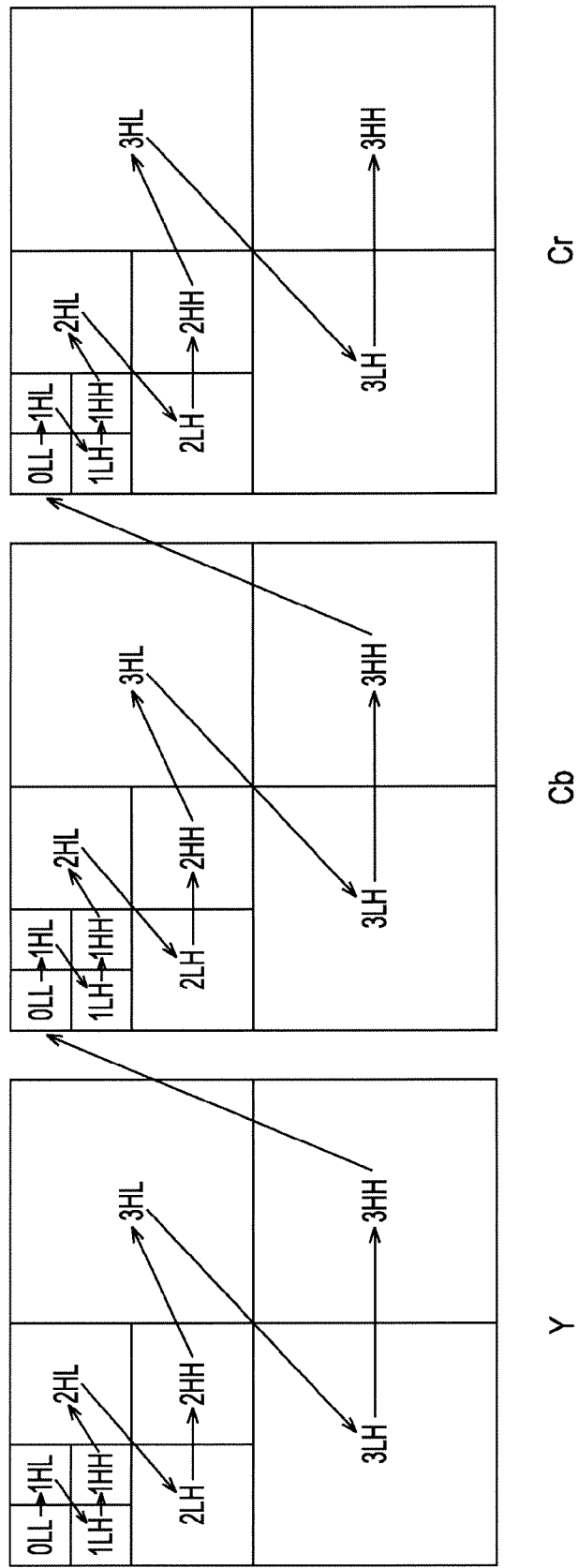
FIG. 24 diagrammatically illustrates an entropy encoding method in accordance with a modification of the embodiment of the present invention.

FIG. 24 illustrates the order of entropy encoding where the priority order of the luminance component Y>the color difference component Cb>the color difference component Cr is set in accordance with one of the conditions (1) and (2). As shown in FIG. 24, the bit plane at the bit position of MSB with respect to the luminance component Y is entropy encoded from the lowest frequency region 0LL to the highest frequency region 3HH. The bit plane, at the same bit position as the bit position of the bit plane of the luminance component Y, with respect to the color difference component Cb is entropy encoded from the lowest frequency region 0LL to the highest frequency region 3HH. After entropy encoding has been completed on the color difference component Cb, the bit plane, at the same bit position as the bit position of the bit plane of the luminance component Y, with respect to the color difference component Cr is entropy encoded from the lowest frequency region 0LL to the highest frequency region 3HH.

When the entropy encoding of the target bit plane of the color difference component Cr has been completed, processing returns to the luminance component Y to repeat the entropy encoding process on the bit plane at the next bit position.

FIG. 25 illustrates the above-referenced process from the viewpoint of the bit plane. As shown, each blank portion within boxes represents a zero bit plane, and is not contained in the encoded stream. Hatched portions are actually contained in the encoded stream.

As shown in FIG. 25, the lowest frequency region Y-0LL to the highest frequency region Y-3HH in the luminance component Y are sub bands of the luminance component Y. Similarly, the lowest frequency region Cb-0LL to the highest frequency region Cb-3HH in the color difference component Cb are sub bands of the color difference component Cb, and the lowest frequency region Cr-0LL to the highest frequency region Cr-3HH in the color difference component Cr are sub bands of the color difference component Cr. Each sub band is segmented into blocks $B_x$ having a predetermined size.

As shown in FIG. 25, each bit plane is entropy encoded by block from a bit plane at an upper bit position to a bit plane at a lower bit position except the zero bit planes from the region Y-0LL in the luminance component Y to a region Cr-3HH in the color difference component Cr. When the code amount has reached the target code amount, entropy encoding is stopped. Entropy encoding is thus controlled.

As shown in FIG. 25, bit plane (1), bit plane (2), are entropy encoded in that order by block. When bit plane (X) has been encoded, the target code amount is reached, and entropy encoding is then stopped. The bit planes lower in bit position than the bit plane (X) are unused in the encoded stream. The unused portion is a bit plane at or close to the bit position LSB, and exclusion of the unused portion from the encoded stream results in no large effect on the decoded image data.

The addition image data and the subtraction image data are not described in the above discussion. Even if the addition image data and the subtraction image data are taken into consideration, the same process works.

In accordance with the condition (1), the addition image bit planes are entropy encoded by bit plane from the region Y-0LL to the region Cr-3HH. When entropy encoding has reached a desired bit plane, the subtraction image bit planes are then entropy encoded by bit plane from the region Y-0LL to the region Cr-3HH.

The condition (1) is set up so that the entropy encoding of the subtraction image data starts when all addition image data has been entropy encoded. The condition (1) is preferably applied to the structure in which the intra encoder 14 for the addition image data and the intra encoder 15 for the subtraction image data remain independent of each other. The image decoding apparatus discussed with reference to each of the preceding embodiments is also applicable to the present embodiment, and the decoding method of each of the preceding embodiments is also applicable.

The image decoding apparatus of the present embodiment decodes the stream encoded in accordance with the condition (1) using the priority order used in entropy encoding. More specifically, the image decoding apparatus decodes the addition image bit planes by bit plane from the region Y-0LL to the region Cr-3HH, and the subtraction image bit planes by bit plane from the region Y-0LL to the region Cr-3HH. The entropy decoded data is then dequantized, and then inverse wavelet transformed, and decoded addition image data and decoded subtraction image data thus result. The addition and subtraction operations and the divide-by-2 division operation are performed on the decoded addition image data and the decoded subtraction image data. The image data of the odd field and the even field is thus obtained.

In the condition (2), the addition image bit planes with respect to the luminance component Y are entropy encoded from the region Y-0LL to the region Y-3HH, and the subtraction image bit planes with respect to the luminance component Y are entropy encoded from the region Y-0LL to the region Y-3HH. When entropy encoding of the luminance component Y is completed, entropy encoding is then performed on the addition image bit planes and the subtraction image bit planes with respect to the color difference component Cb. When entropy encoding of the color difference component Cb is completed, entropy encoding is then performed on the addition image bit planes and the subtraction image bit planes of the color difference component Cr.

The condition (2) is set up so that the entropy encoding of the addition image bit planes and the entropy encoding of the subtraction image bit planes are continuously performed with respect to each of the luminance component Y, the color difference component Cb and the color difference component Cr. The condition (2) is preferably applied to the structure that the single intra encoder 50 as described with reference to preceding embodiments integrally entropy codes the addition image bit plane and the subtraction image bit plane. The image decoding apparatus of the above-described embodiments is applicable to the present embodiment, and the decoding method of the preceding embodiments is also applicable to the present embodiment.

The image decoding apparatus of the present embodiment decodes the encoded stream of the condition (2) with respect to the luminance component Y. More specifically, the image decoding apparatus entropy decodes the addition image bit planes by bit plane from the region Y-0LL to the region Y-3HH, and then the subtraction image bit planes by bit plane from the from the region Y-0LL to the region Y-3HH. When the decoding of the luminance component Y is completed, entropy decoding is performed on the addition image bit planes and the subtraction image bit planes with respect to the color difference component Cb. When the decoding of the color difference component Cb is completed, entropy decoding is performed on the addition image bit planes and the subtraction image bit planes with respect to the color difference component Cr.

The entropy decoded data is dequantized and then inverse wavelet transformed. The decoded addition image data and the decoded subtraction image data are generated. The addition and subtraction operations and the divide-by-2 division operation are performed on the decoded addition image data and the decoded subtraction image data. The image data of the odd field and the even field thus results.

In each of the conditions (1) and (2), all bit planes having data therewithin are successively entropy encoded and when the code amount has reached the target code amount thereof, entropy encoding is stopped. The present invention is not limited to this arrangement. Alternatively, the image encoding apparatus may be preset not to perform entropy encoding in the bit planes below a predetermined bit position.

In the above discussion, the image encoding apparatus encodes separately the addition results and the subtraction results or encodes integrally the addition results and the subtraction results. Also in the above discussion, the image decoding apparatus performs separately the decoding process on the addition results and the decoding process on the subtraction results or performs the decoding process for both the addition results and the subtraction results.

Alternatively, the image encoding apparatus may be designed to select between encoding separately the addition results and the subtraction results and encoding integrally the addition results and the subtraction results. The image decoding apparatus may be designed to decode the code stream in any setting selected by the image encoding apparatus.

For example, in response to the supplied addition results and subtraction results, the intra encoder 50 in the image encoding apparatus of FIG. 15 may select between encoding separately the addition results and the subtraction results and encoding integrally the addition results and the subtraction results, and performs entropy encoding at the selected method.

Figure 26:
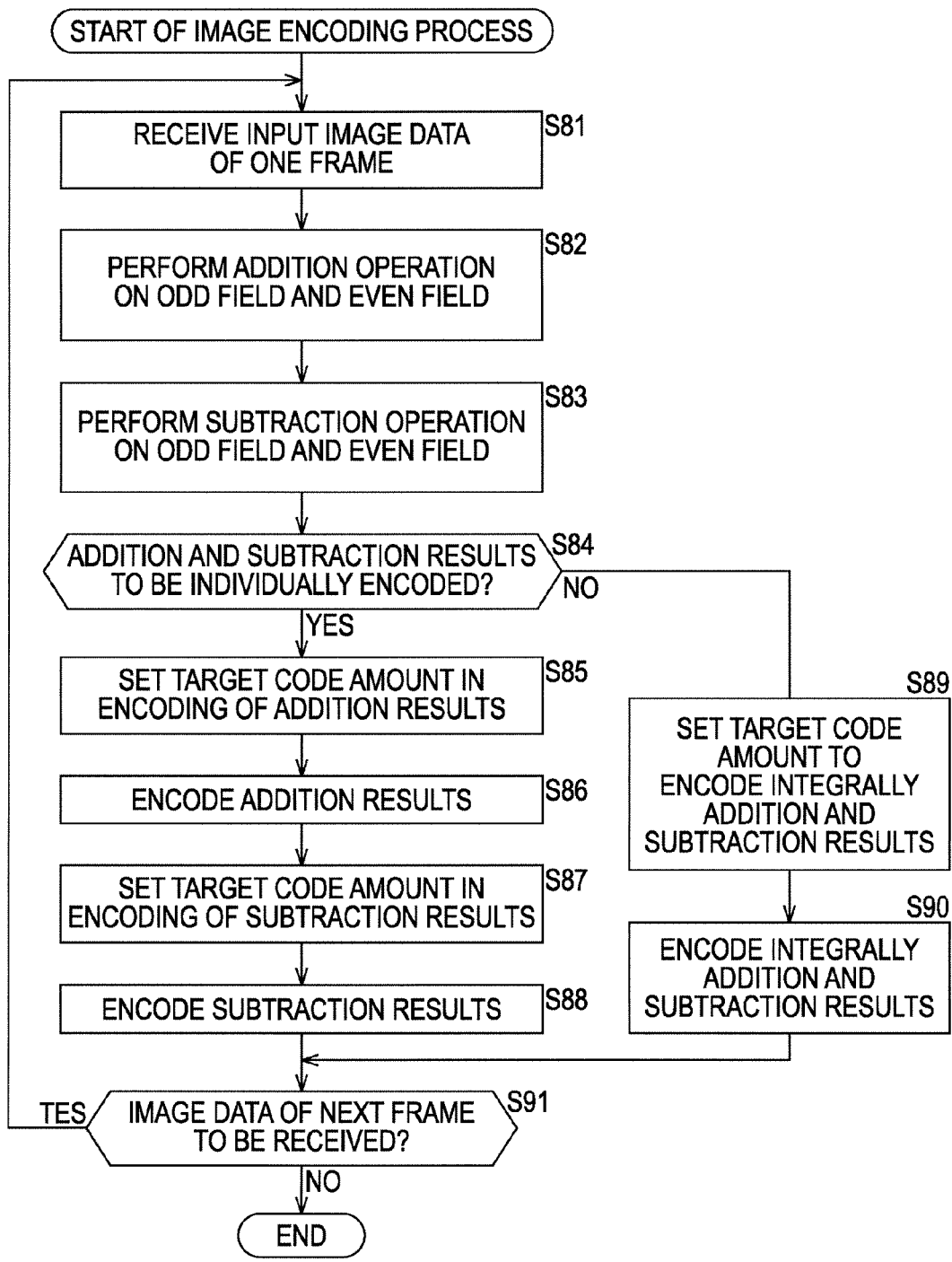
FIG. 26 is a flowchart illustrating a process flow of an image encoding process.

Such a process, namely, the image encoding process of the image encoding apparatus is described below with reference to a flowchart of FIG. 26. The image encoding process is here performed by the image encoding apparatus of FIG. 15.

When the image encoding process starts, the switch 10 receives the image data of one frame in step S81. Upon receiving the image data, the switch 10 demultiplexes the image data into an odd field and an even field.

In step S82, the adder 12 in the addition and subtraction unit 18 performs an addition operation on the odd field acquired via the field delay unit 11 and an even field acquired not via the field delay unit 11 but directly. In step S83, the subtractor 13 in the addition and subtraction unit 18 performs a subtraction operation between the odd field acquired via the field delay unit 11 and the even field acquired not via the field delay unit 11 but directly.

In step S84, the intra encoder 50 determines whether to encode separately the acquired addition results and subtraction results. This determination may be performed in response to an instruction input from the outside, for example, input by a user, or based on a feature of an image represented by image data to be encoded, load status of the whole image encoding apparatus, bandwidth of a transmission path of the encoded stream, and a decoding method of the image decoding apparatus, etc. It is also perfectly acceptable that the determination may be performed taking into other information.

If it is determined in step S84 that the addition results and the subtraction results are to be separately encoded, processing proceeds to step S85. In step S85, the rate controller 51 sets a target code amount in the encoding of the addition results. In step S86, the intra encoder 50 encodes the addition results according to the target code amount. In step S87, the rate controller 51 sets a target code amount in the encoding the subtraction results. In step S88, the intra encoder 50 encodes the subtraction results according to the target code amount.

The addition image encoded data and subtraction image encoded data thus encoded are multiplexed into one encoded stream and output to outside the image encoding apparatus. Subsequent to step S88, processing proceeds to step S91.

If it is determined in step S84 that the addition results and the subtraction results are to be integrally encoded, processing proceeds to step S89. In step S89, the rate controller 51 sets a target code amount in the integral encoding of the addition results and the subtraction results. In step S90, the intra encoder 50 integrally encodes the addition results and the subtraction results according to the target code amount.

The stream thus encoded is output externally outside the image encoding apparatus. Subsequent to step S90, processing proceeds to step S91.

In step S91, the switch 10 determines whether to receive image data of a next frame. If the image data is continuously supplied and further image data is to be received, processing returns to step S81 to repeat step S81 and subsequent steps. If it is determined in step S91 that the switch 10 receives no further image data, the image encoding process ends.

Through the above-described process, the image encoding apparatus appropriately selects between encoding separately the addition results and the subtraction results and encoding integrally the addition results and the subtraction results.

In response, the image decoding apparatus may decode the encoded stream in a decoding method corresponding to the encoding method in which the image encoding apparatus has selected between the separate encoding of the addition results and the subtraction results and the integral encoding of the addition results and the subtraction results. More specifically, as the image decoding apparatus of FIG. 4, the image decoding apparatus may decode separately the addition image encoded data and the subtraction image encoded data separately encoded by the image encoding apparatus. Alternatively, as the image decoding apparatus of FIG. 16, the image data of the even field may decodes the encoded stream into which the image encoding apparatus has encoded integrally the addition results and the subtraction results.

Such a process, namely, the image decoding process of the image decoding apparatus is described below with reference to a flowchart of FIG. 27. The image decoding process is herein performed by the image decoding apparatus of FIG. 16.

When the image decoding process starts, the intra decoder 60 receives the encoded stream in step S111. Upon receiving the encoded stream, the intra decoder 60 analyzes the received encoded stream in step S112, thereby determining whether the acquired encoded stream is composed of two parts of the addition image encoded data and the subtraction image encoded data.

The intra decoder 60 determines whether the encoded stream is composed of two parts of the one into which the image encoding apparatus has synthesized the addition results and the subtraction results, by referencing metadata of the encoded stream, or header information of a packet, or by analyzing the feature of a data size of the encoded stream.

If it is determined in step S112 that the encoded stream is separated into the addition image encoded data and the subtraction image encoded data, processing proceeds to step S113. In step S113, the intra decoder 60 decodes the addition image encoded data as the encoded stream of the addition results. In step S114, the intra decoder 60 decodes the subtraction image encoded data as the encoded stream of the subtraction results. When the decoding process is completed, processing proceeds to step S116.

If it is determined in step S112 that the encoded stream is not separated in the addition image encoded data and the subtraction image encoded data, processing proceeds to step S115. In step S115, the intra decoder 60 decodes the encoded stream in which the addition results and the subtraction results have been integrally encoded. When the decoding process is completed, processing proceeds to step S116.

In step S116, the addition and subtraction unit 28, and the divider 25A and divider 25B performs the addition and subtraction operations and the division operation on the decode results of the intra decoder 60, thereby generating the image data of the odd field of the baseband and the image data of the even field of the baseband. These pieces of image data are alternately multiplexed by the switch 27, and output as the decoded image data of the baseband.

In step S117, the intra decoder 60 determines whether to receive a next encoded stream. If the encoded stream is continuously supplied, and the next encoded stream is to be received, processing returns to step S111 to repeat step S111 and subsequent steps. If the intra decoder 60 determines in step S117 that no further encoded stream is to be received, the image decoding process ends.

Through the above-described decoding process, the image decoding apparatus can decode the encoded stream in which the addition results and the subtraction results have been separately encoded. The image decoding apparatus can also decode the encoded stream in which the addition results and the subtraction results have been integrally encoded.

The determination in step S112 may be performed in response to information relating to the encoding method, transmitted separately from the encoded stream by the image encoding apparatus.

In the above discussion, the image encoding apparatus of FIG. 15 performs the image encoding process discussed with reference to the flowchart of FIG. 26, and the image encoding apparatus of FIG. 16 performs the image decoding process discussed with reference to the flowchart of FIG. 27. The structure of each of the image encoding apparatus and the image encoding apparatus is optional, and may be different from the structure shown in FIGS. 15 and 16.

An optimum encoding method and decoding method may be selected and executed in response to a variety conditions by using the image encoding apparatus performing the image encoding process and the image decoding apparatus performing the image decoding process. A highly adaptable image processing system can thus be provided.

The intra encoder and the intra decoder are specifically described below.

Figure 28:
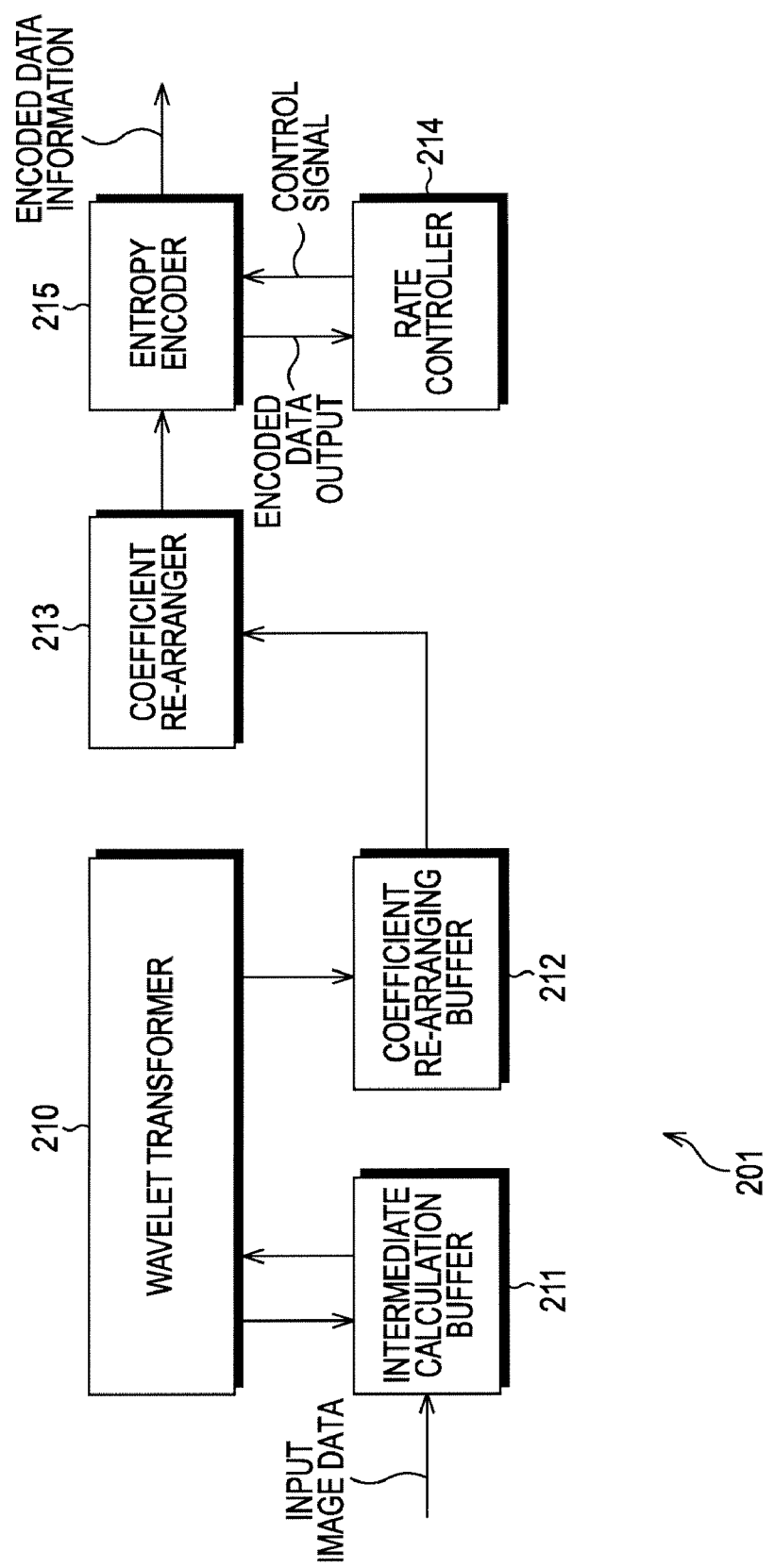
FIG. 28 is a block diagram illustrating the structure of an intra encoder of the present invention.

FIG. 28 is a block diagram illustrating the structure of the intra encoder. An intra encoder 201 includes a wavelet transformer 210, an intermediate calculation buffer 211, a coefficient re-arranging buffer 212, a coefficient re-arranger 213, a rate controller 214, and an entropy encoder 215. The intra encoder 201 corresponds to one of the intra encoder 14 and the intra encoder 15 shown in FIG. 1, and the intra encoder 50 of FIG. 15. The intra encoder 201 encodes the image data.

The input image data is temporarily stored on the intermediate calculation buffer 211. If the intra encoder 201 is used as the intra encoder 14 in the image encoding apparatus of FIG. 1, the input image data is the addition results of the image data of the odd field and the image data of the even field supplied by the adder 12 in the addition and subtraction unit 18. If the intra encoder 201 is used as the intra encoder 15 in the image encoding apparatus of FIG. 1, the input image data is the subtraction results of the image data of the odd field and the image data of the even field supplied by the subtractor 13 in the addition and subtraction unit 18. If the intra encoder 201 is used as the intra encoder 50 in the image encoding apparatus of FIG. 15, the input image data is both the addition results of the image data of the odd field and the image data of the even field supplied by the adder 12 in the addition and subtraction unit 18 and the subtraction results of the image data of the odd field and the image data of the even field supplied by the subtractor 13.

The wavelet transformer 210 wavelet transforms the image data stored on the intermediate calculation buffer 211. More specifically, the wavelet transformer 210 reads the image data from the intermediate calculation buffer 211, filters the read image data through analyzing filters to generate coefficient data of a high frequency region and a low frequency region, and then stores the generated coefficient data on the intermediate calculation buffer 211. The intra encoder 201, including a horizontal analyzing filter and a vertical analyzing filter, filter analyzes image data groups in both an image horizontal direction and an image vertical direction. The wavelet transformer 210 reads again the coefficient data of the low frequency region from the intermediate calculation buffer 211, and performs a filtering process on the read coefficient data using the analyzing filters, thereby generating further data of coefficients in a high frequency region and a low frequency region. The generated coefficient data is stored on the intermediate calculation buffer 211.

Upon reaching a predetermined segmentation level through repeating the above process, the wavelet transformer 210 reads the coefficient data and writes the read coefficient data on the coefficient re-arranging buffer 212.

The coefficient re-arranger 213 reads the coefficient data written on the coefficient re-arranging buffer 212 in a predetermined order, and then supplies the read coefficient data to the entropy encoder 215. The entropy encoder 215 entropy encodes the supplied coefficient data through a predetermined entropy encoding method such as the Huffman coding or arithmetic coding.

The entropy encoder 215, operating in cooperation with the rate controller 214, is controlled so that the bit rate of output compression encoded data is kept to a substantially constant value. More specifically, in response to encoded data information from the entropy encoder 215, the rate controller 214 supplies a control signal to the entropy encoder 215. The control signal is used to control the entropy encoder 215 to stop the encoding process at or immediately prior to the moment the bit rate of the data compression encoded by the entropy encoder 215 reaches a target value. The entropy encoder 215 outputs the encoded data when the encoding process ends in response to the control signal supplied by the rate controller 214.

The process performed by the wavelet transformer 210 is described more in detail. The summary of the wavelet transform process of the wavelet transformer 210 is identical to the one described with reference to FIGS. 6 and 7.

The wavelet transformer 210 performs the process discussed with reference to FIGS. 6 and 7 using a filter bank including a high frequency filter and a low frequency filter. The intra encoder 201 needs to buffer the input image data or coefficient data enough to perform the filtering process. The wavelet transform coefficients generated at preceding stages of the number enough to perform the filtering process need to be buffered.

A specific wavelet transform method using a 5×3 filter in accordance with one embodiment is described below. The method of using the filter 5×3 filter, adopted in JPEG 2000 standard previously discussed with reference to the known art, is an excellent method enabling to wavelet transform image data with a small number of filter taps.

The impulse response (Z transform expression) of the 5×3 filter is composed of a low frequency filter $H_0(z)$ and a high frequency filter $H_1(Z)$ as represented in the following equations (7) and (8). From equations (7) and (8), the low frequency filter $H_0(z)$ has five taps and the high frequency filter $H_1(z)$ has three taps.

$$H_0(z)=(-1+2z^{-1}+6z^{-2}+2z^{-3}-z^{-4})/8 \quad (7)$$

$$H_1(z)=(-1+2z^{-1}-z^2)/2 \quad (8)$$

The coefficients of the low frequency region and the high frequency region are directly calculated using equations (7) and (8). Using the lifting technique, an amount of calculation for filtering process is reduced. The process of the analyzing filter for wavelet transform with lifting technique applied to the 5×3 filter is diagrammatically described.

Figure 29:
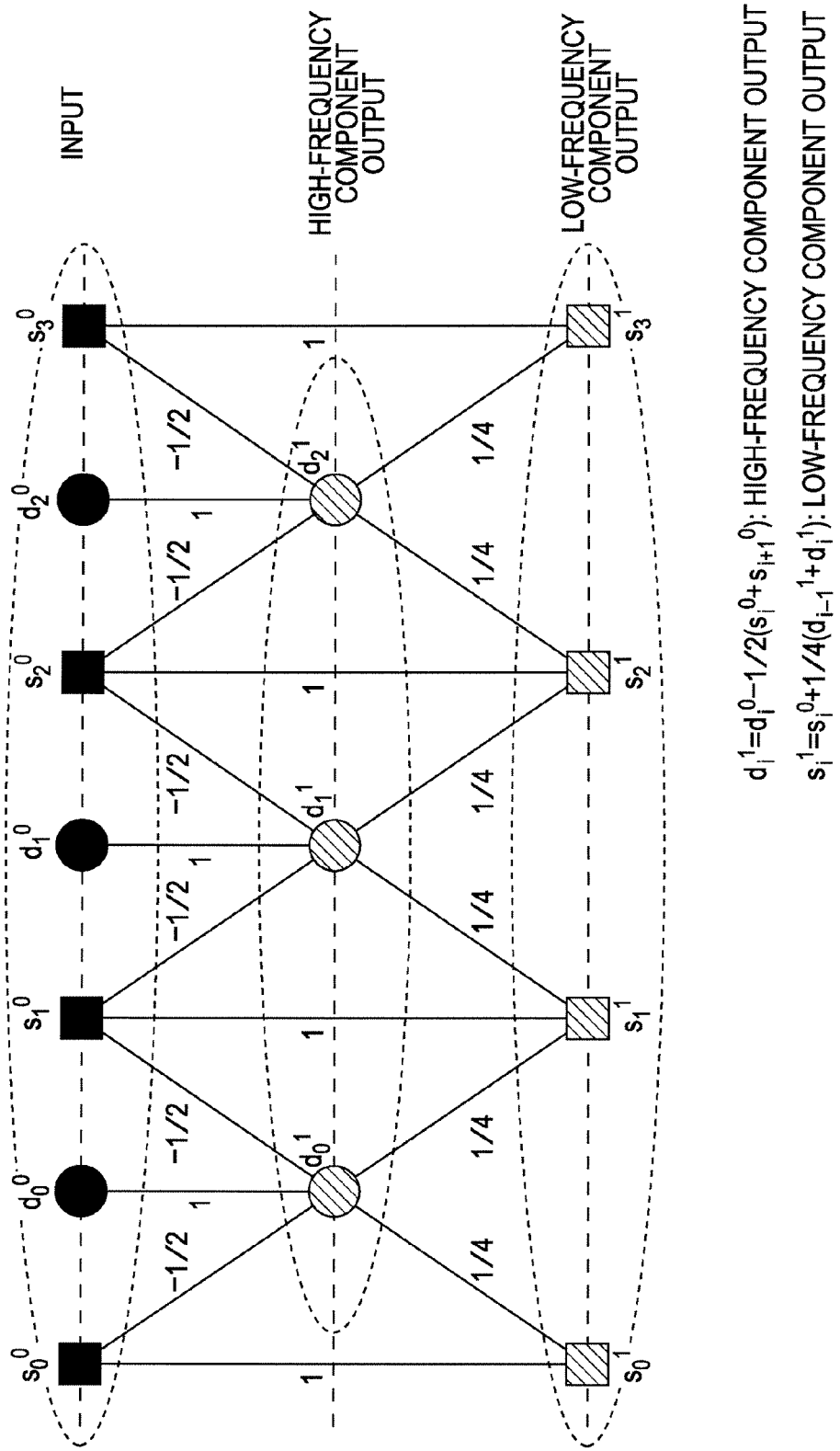
FIG. 29 diagrammatically illustrates a wavelet transform in which lifting technique is applied to a 5×3 filter.

As shown in FIG. 29, a top row, an intermediate row and a bottom row represent a pixel train of the input image, a high frequency component output, and a low frequency component output, respectively. The top row is not limited to the pixel train of the input image. The top row may be coefficients obtained as a result of the filtering process. The top row here is the pixel train of the input image, and each solid square represents an even pixel or line (first one being zero), and each solid circuit represents an odd pixel or line.

In a first phase, a coefficient $d_i^1$ of the high frequency component is generated from the input pixel train in accordance with equation (9).

$$d_i^1=d_i^0-\tfrac{1}{2}(s_i^0+s_{i+1}^0) \quad (9)$$

In a second phase, a coefficient $s_i^1$ of the low frequency component is generated from the generated coefficient of the high frequency component and an odd pixel of the input image using the following equation (10).

$$s_i^1=s_i^0+\tfrac{1}{4}(d_{i-1}^1+d_i^1) \quad (10)$$

The analyzing filter decomposes the image data of the input image into the low frequency component and the high frequency component through the filtering process.

Figure 30:
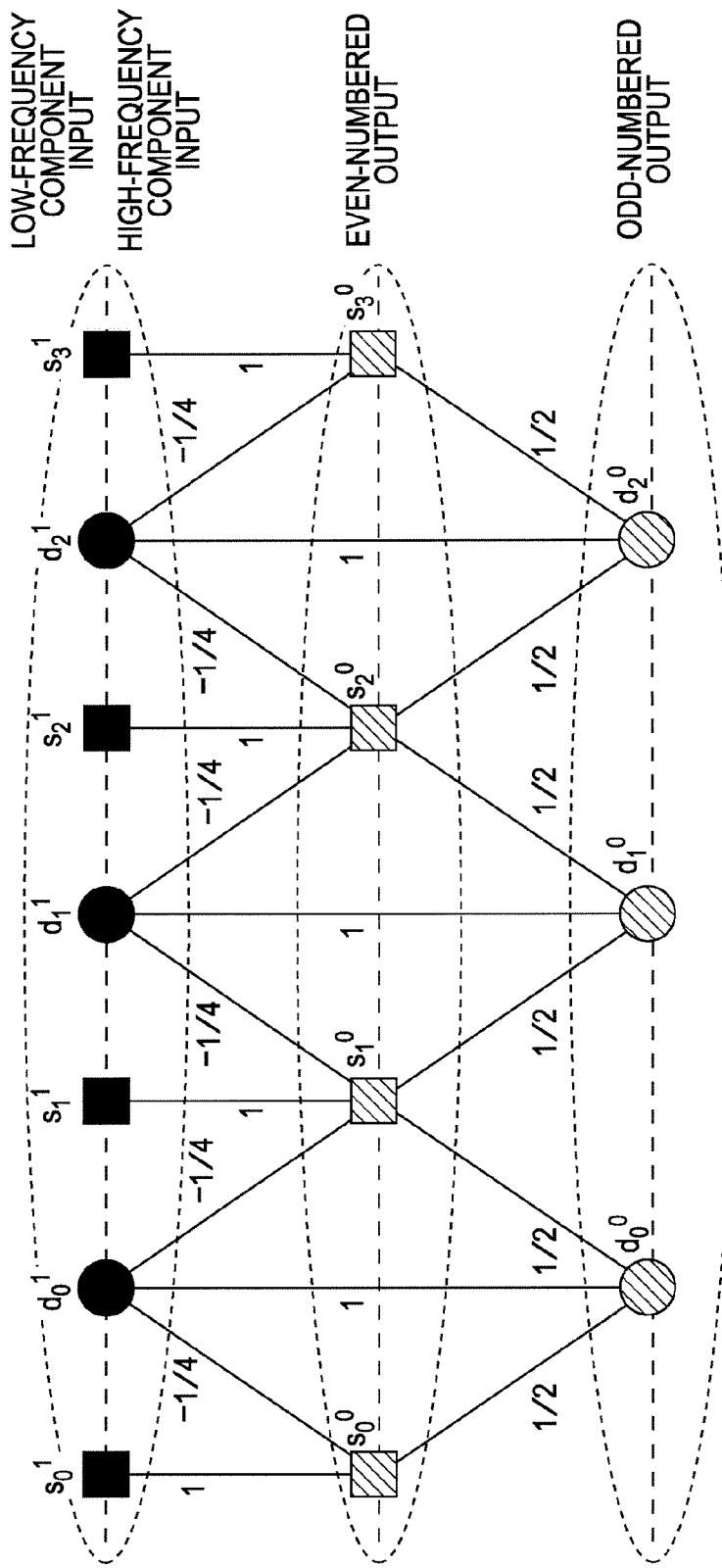
FIG. 30 diagrammatically illustrates an inverse wavelet transform in which the lifting technique is applied to the 5×3 filter.

The process of a synthesis filter performing inverse wavelet transform is diagrammatically described with reference to FIG. 30. The synthesis filter restores the coefficient generated through the wavelet transform. FIG. 30, corresponding to FIG. 29, illustrates the lifting technique using the 5×3 filter. As shown in FIG. 30, a top row represents input coefficients generated through the wavelet transform, each solid circle represents a coefficient of the high frequency component, and each solid square represents a coefficient of the low frequency component.

In a first phase, an even coefficient $s_i^0$ (first coefficient being zero) is generated from the input low frequency component and the coefficient of the high frequency component in accordance with equation (11).

$$s_i^0=s_i^1-\tfrac{1}{4}(d_{i-1}^1+d_i^1) \quad (11)$$

In a second phase, an even coefficient $d_i^0$ is generated from the even coefficient $s_i^0$ generated in the first phase and the coefficient $d_i^1$ of the input high frequency component in accordance with equation (12).

$$d_i^0=d_i^1+\tfrac{1}{2}(s_i^0+s_{i+1}^0) \quad (12)$$

The synthesis filter synthesizes the coefficients of the low frequency component and the high frequency component through the filtering process, thereby performing the inverse wavelet transform.

Figure 31:
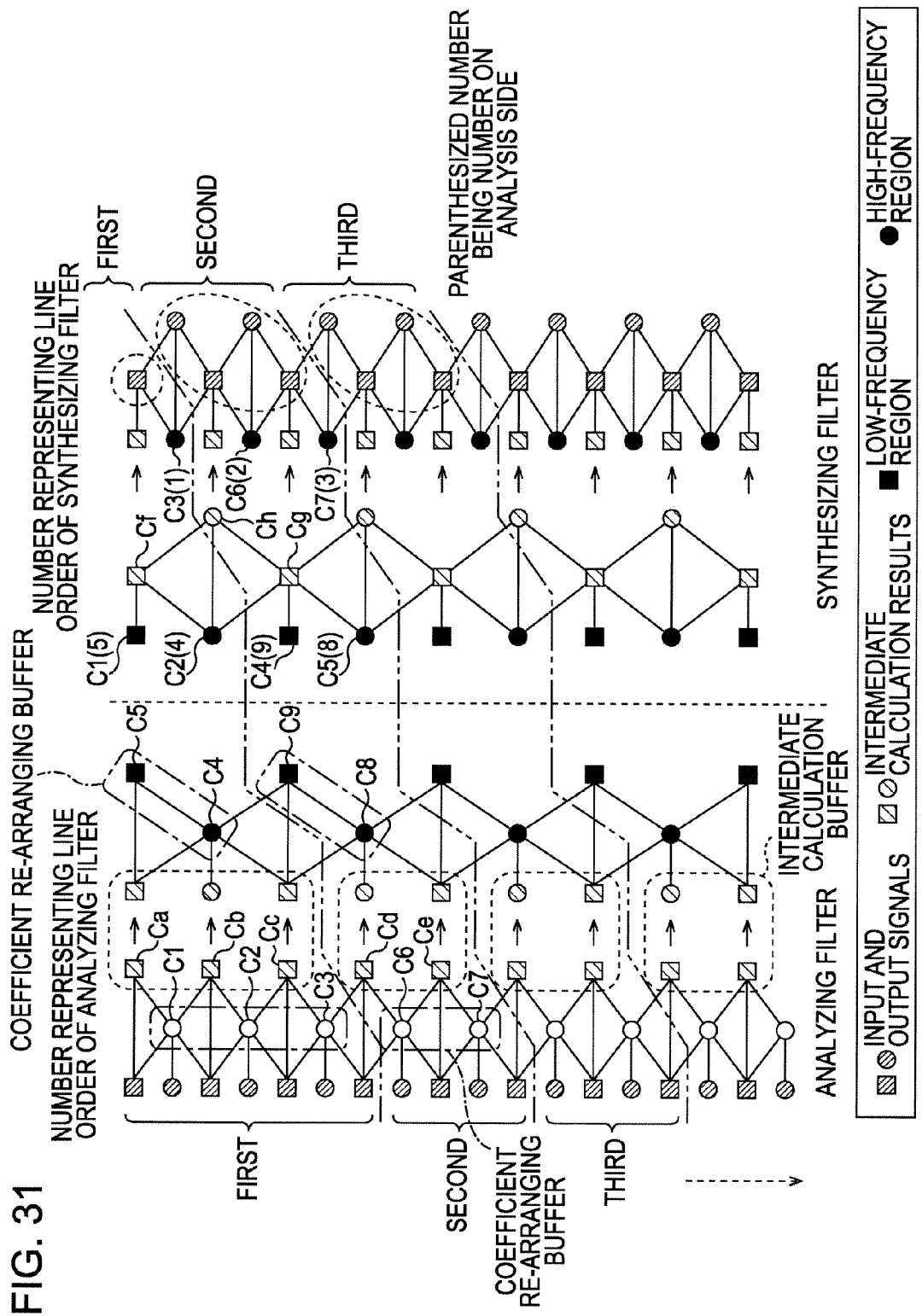
FIG. 31 diagrammatically illustrates a filtering process of the 5×3 filter performed with segmentation level=2 in the lifting technique thereof.

The wavelet transform process of the present embodiment is described below. FIG. 31 illustrates a filtering process performed to segmentation level=3 using the lifting of the 5×3 filter discussed with reference to FIG. 29. As shown in FIG. 31, an analyzing filter illustrated on the left portion of FIG. 31 is a filter of the wavelet transformer 210 in the intra encoder 201. A synthesis filter illustrated on the right portion of FIG. 31 is a filter of the inverse wavelet transformer in an intra decoder to be discussed later.

In the discussion that follows, a pixel on the top left corner of a screen of a display device is a leading pixel, one line is composed of pixels arranged from the left end to the right end of the screen, and line by line scanning is performed from the top side to the bottom side of the screen to form one display screen.

As shown in FIG. 31, a left-end column is composed of vertically arranged pixel data at positions on each line of original image data. More specifically, in the filtering process of the wavelet transformer 210, the vertical filter is used to scan the pixels vertically on the screen. First column through third column represent a filtering process of segmentation level=1, and fourth column through sixth column represent a filtering process of segmentation level=2. The second column from the left represents a high frequency output based on the pixels of the left end original image data. The third column from the left represents a low frequency output based on the original image data and the high frequency component output. As shown in the fourth through sixth columns, the filtering process of segmentation level=2 is performed on the output of the filtering process of segmentation level=1.

In a first phase in the filtering process of segmentation level=1, coefficient data of the high frequency component is calculated based on the image of the original image data. In a second phase, coefficient data of the low frequency component is calculated based on the coefficient data of the high frequency component calculated in the first phase, and the pixel of the original image data. The filtering process of segmentation level=1 is illustrated in the first column through third column on the left side (analyzing filter side) in FIG. 31. The calculated coefficient data of the high frequency component is stored on the coefficient re-arranging buffer 212 discussed with reference to FIG. 28. The coefficient data of the low frequency component is stored on the intermediate calculation buffer 211.

As shown in FIG. 31, the coefficient re-arranging buffer 212 is represented as a box defined by dot-and-dash chain line, and the intermediate calculation buffer 211 is represented as a box defined by broken line.

The filtering process of segmentation level=2 is performed based on the result of the filtering process of segmentation level=1 stored on the intermediate calculation buffer 211. In the filtering process of segmentation level=2, the coefficient data calculated as the coefficient of the low frequency component in the filtering process of segmentation level=1 is regarded as the coefficient data containing the low frequency component and the high frequency component, and then a filtering process similar to the filtering process of segmentation level=1 is performed. The coefficient data of the high frequency component and the coefficient data of the low frequency component, calculated in the filtering process of segmentation level=2, are stored on the coefficient re-arranging buffer 212 discussed with reference to FIG. 28.

The wavelet transformer 210 performs the above-described filtering process in both the horizontal direction and the vertical direction on the screen. For example, the filtering process of segmentation level=1 is first performed in the horizontal direction, and the generated coefficient data of the high frequency component and the low frequency component is stored on the intermediate calculation buffer 211. The filtering process of segmentation level=1 is then performed in the vertical direction on the coefficient data stored on the intermediate calculation buffer 211. The filtering process of segmentation level=1 in both the horizontal direction and the vertical direction results in four regions, namely, regions HH and HL, and regions LH and LL. The regions HH and HL are coefficient data that is obtained by further decomposing the high frequency component into a high frequency component and a low frequency component and the regions LH and LL are coefficient data that is obtained by further decomposing the low frequency component into a high frequency component and a low frequency component.

In segmentation level=2, the filtering process is performed in each of the horizontal direction and the vertical direction on the coefficient data of the low frequency component generated in segmentation level=1. More specifically, in segmentation level=2, the region LL decomposed at segmentation level=1 is further segmented into four regions. The region LL thus contains a region HH, a region HL, a region LH, and a region LL.

In accordance with the present embodiment, the filtering process using the wavelet transform is performed on the screen in a vertical direction in a stepwise manner by several times, each time with several lines processed. As shown in FIG. 31, seven lines are processed at a first time starting with a first line on the screen, and four lines are processed at a second time starting with an eighth line on the screen. The number of lines is the number of lines required to generate the low frequency component of one line after each region is divided into a high frequency component and a low frequency component.

In the discussion that follows, a set of lines, containing other sub bands, required to generate one line of the lowest frequency component (coefficient data of one line of sub bands containing the lowest frequency component) is referred to as a line block (precinct). The line herein refers to one row of pixel data or coefficient data formed in a picture, a field, or a sub band corresponding to the image data prior to wavelet transform. More specifically, the line block (precinct) is several lines of a pixel data group, in the original image data prior to the wavelet transform, required to generate one line of sub band of coefficient data in the lowest frequency component subsequent to wavelet transform, or the line block (precinct) is a coefficient data group of each sub band obtained by wavelet transforming the pixel data group.

As shown in FIG. 31, a coefficient C5 obtained as a result of the filtering process of segmentation level=5 is calculated from a coefficient $C_a$ stored on the intermediate calculation buffer 211 and a coefficient C4. The coefficient C4 is calculated from the coefficient $C_a$, a coefficient $C_b$, and a coefficient $C_c$ all stored on the intermediate calculation buffer 211. The coefficient $C_c$ is calculated from coefficients C2 and C3 stored on the coefficient re-arranging buffer 212, and image data on a fifth line. The coefficient C3 is calculated from image data on the fifth line through the seventh line. To obtain the coefficient C5 at segmentation level=2, the image data on the first line through the seventh line is required.

In contrast, the filtering process at the second time thereafter may use the coefficient data previously calculated in the preceding filtering process and stored on the coefficient re-arranging buffer 212. A smaller number of lines thus works.

More specifically, as shown in FIG. 31, from among the coefficients of the low frequency component obtained as a result of filtering process of segmentation level=2, a coefficient C9 subsequent to the coefficient C5 is calculated from the coefficients C4 and C8 and the coefficient $C_c$ stored on the intermediate calculation buffer 211. The coefficient C4 is previously calculated in the first filtering process, and already stored on the coefficient re-arranging buffer 212. Similarly, the coefficient $C_c$ is previously calculated in the first filtering process and already stored on the intermediate calculation buffer 211. In the second filtering process, only a filtering process for calculating the coefficient C8 is performed. This new filtering process further uses the eight through eleventh lines.

The second and subsequent filtering processes can use data calculated in the preceding filtering process and stored on the intermediate calculation buffer 211 and the coefficient re-arranging buffer 212, and simply calculate four lines per process.

If the number of lines on the screen fails to match the number of lines in encoding, the filtering process is performed by copying a line of the original image data to equalize the number of lines to the number of lines in encoding.

In accordance with the present invention, the filtering process to obtain the coefficient data of one of the lowest frequency component is performed several times in a stepwise manner (by line block) to cover the lines of the entire screen as will be described in detail later. This arrangement allows the image to be decoded with short delay time involved when the encoded data is transmitted.

To perform the wavelet transform, a first buffer and a second buffer are used. The first buffer performs the wavelet transform and the second buffer stores the coefficient generated when the filtering process is performed to a predetermined segmentation level. The first buffer corresponds to the intermediate calculation buffer 211 and is enclosed by broken line in FIG. 31. The second buffer corresponds to the coefficient re-arranging buffer 212 and is enclosed by dot-and-dash chain line in FIG. 31. The coefficient stored on the second buffer is to be entropy encoded in a later entropy encoding process.

The process of the coefficient re-arranger 213 is described below. As previously discussed, the encoded data calculated by the wavelet transformer 210 is stored on the coefficient re-arranging buffer 212, re-arranged in order by the coefficient re-arranger 213, and transferred to the entropy encoder 215.

As previously discussed, the coefficients are generated from the high frequency component to the low frequency component in the wavelet transform. As shown in FIG. 31, the filtering process of segmentation level=1 generates successively the coefficient C1, the coefficient C2, and the coefficient C2 from the image data of the original image in the first process. The filtering process of segmentation level=2 is performed on the coefficient data of the low frequency component obtained in the filtering process of segmentation level=1 and the coefficient C4 and the coefficient C5 of the low frequency component are successively generated. More specifically, in the first process, the coefficient data is generated in the order of the coefficient C1, the coefficient C2, the coefficient C3, the coefficient C4 and the coefficient C5. This generation order of the coefficient data is natural (from high frequency component to low frequency component) due to the principle of the wavelet transform.

In contrast, on the decoder side, the image needs to be generated and output from the low frequency component to the high frequency component in order to decode immediately with a small amount of delay. The coefficient data generated on the encoder side is preferably re-arranged in a direction from the low frequency component to the high frequency component and then supplied to the decoder side.

This arrangement is described more specifically with reference to FIG. 31. The synthesis filter for performing the inverse wavelet transform is illustrated on the right side of FIG. 31. A first synthesizing process for the first line and other lines of the output image data (inverse wavelet transform) is performed using the coefficient C4 and the coefficient C5 of the low frequency component generated in the first filtering process on the encoder side and the coefficient C1.

More specifically, in the first synthesis process, the encoder side supplies the decoder side with the coefficient data in the order of the coefficient C5, the coefficient C4 and the coefficient C1. The decoder side performs the synthesis process on the coefficient C5 and the coefficient C4 in a synthesize level=2 corresponding to segmentation level=2, thereby generating and storing a coefficient $C_f$. In a synthesis level=1 corresponding to the segmentation level=1, the synthesis process is performed on the coefficient $C_f$ and the coefficient C1 and the synthesis result is output as a first line.

In the first synthesis process, the coefficient data, generated and stored on the coefficient re-arranging buffer 212 in the order of the coefficient C1, the coefficient C2, the coefficient C3, the coefficient C4 and the coefficient C5, is re-arranged in the order of the coefficient C5, the coefficient C4, the coefficient C1, . . . , and then supplied to the decoder side.

As for synthesis filter illustrated on the right side of FIG. 31, the coefficient supplied from the encoder side has a parenthesized number on the encoder side, and an unparenthesized number indicating a line number in the synthesis filter. For example, the coefficient C1(5) means the coefficient C5 on the analyzing filter on the left side in FIG. 31 and the first line in the synthesis filter side.

The synthesis process of the decoder side is performed on the coefficient data processed in the second and subsequent filtering process on the encoder side using the coefficient data synthesized in the preceding synthesis process or supplied from the encoder side. As shown in FIG. 31, the second synthesis process of the decoder side to be performed using the coefficient C8 and the coefficient C9 of the low frequency component generated in the second filtering process on the encoder side further needs the coefficient C2 and the coefficient C3 generated in the first filtering process on the encoder side. The second line through the fifth line are thus decoded.

In the second synthesis process, the encoder side supplies to the decoder side the coefficient data in the order of the coefficient C9, the coefficient C8, the coefficient C2, and the coefficient C3. The decoder side generates a coefficient $C_g$ in the process of synthesis level=2 using the coefficient C8 and the coefficient C9 and the coefficient C4 supplied from the encoder side at the first synthesis process, and stores the coefficient $C_g$ on the buffer. The decoder side generates a coefficient $C_h$ using the coefficient $C_g$, the coefficient C4, and the coefficient $C_f$ generated in the first synthesis process and stored on the buffer, and then stores the coefficient $C_h$ on the buffer.

The decoder side performs the synthesis process of synthesis level=1 using the coefficient $C_g$ and the coefficient $C_h$ generated in the synthesis process of synthesis level=2 and stored on the buffer, the coefficient C2 (referred to as a coefficient C6(2) in the synthesis filter) and the coefficient C3 (referred to as a coefficient C7(3) in the synthesis filter) supplied from the encoder side. The decoder side thereby decodes the second line through the fifth line.

In the second synthesis process, the coefficient data generated on the encoder side in the order of the coefficient C2, the coefficient C3, (coefficient C4 and coefficient C5), the coefficient C6, the coefficient C7, the coefficient C8, and the coefficient C9 is re-arranged in the order of the coefficient C9, the coefficient C8, the coefficient C2, the coefficient C3, . . . before being transferred to the decoder side.

In the third and subsequent synthesis analysis processes, the coefficient data stored on the coefficient re-arranging buffer 212 is also re-arranged and then transferred to the decoder side. The decoder side decodes the lines with four lines at a time.

In a synthesis process on the decoder side responsive to the filtering process for the other lines including the bottom line on the screen on the encoder side (hereinafter referred to as final filtering process), the coefficient data generated and stored heretofore on the buffer in the preceding processes is all output. The number of output lines becomes large. As shown in FIG. 31, eight lines are output at the final process.

The coefficient re-arranger 213 may re-arrange the coefficient data by setting, in a predetermined order, reading addresses in the reading of the coefficient data stored on the coefficient re-arranging buffer 212.

Figure 32:
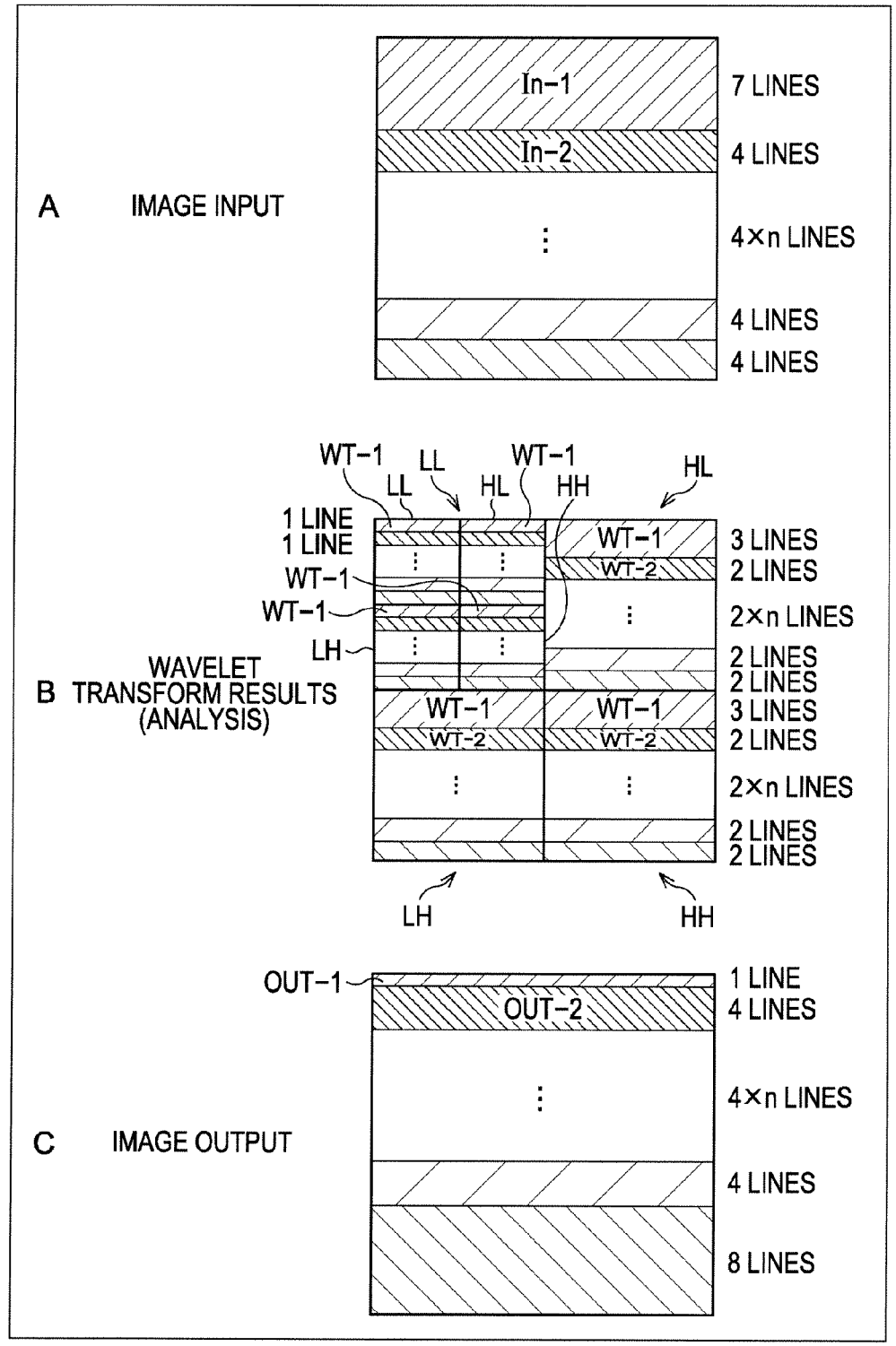
FIG. 32 diagrammatically illustrates a wavelet transform and an inverse wavelet transform in accordance with the present invention.

The above-referenced process is specifically described with reference to FIG. 32. FIG. 32 illustrates a wavelet transform filtering process to segmentation level=2 using the 5×3 filter. As shown in portion A of FIG. 32, the wavelet transformer 210 performs the first filtering process on the input image data of the first line to the seventh line in the horizontal direction and the vertical direction in the portion A of FIG. 32).

In the first filtering process of segmentation level=1, the coefficient data of three lines including the coefficient C1, the coefficient C2 and the coefficient C3 is generated, and arranged in the region HH, the region HL, and the region LH formed at segmentation level=1 as shown in portion B of FIG. 32 (WT-1 in the portion B of FIG. 32).

The region LL formed at segmentation level=1 is further divided into four regions in the filtering process of segmentation level=2 in the horizontal direction and the vertical direction. As for the coefficient C5 and the coefficient C4 generated at segmentation level=2 and arranged in the region LL of segmentation level=1, one line of the coefficient C5 is arranged in the region LL, and one line of the coefficient C4 is arranged in each of the region HH, the region HL, and the region LH.

In the second and subsequent filtering processes by the wavelet transformer 210, each filtering process is performed on four lines at a time (In-2 in the portion A of FIG. 32), two lines of coefficient data are generated at a time at segmentation level=1 (WT-2 of FIG. 32), and one line of coefficient data is generated at segmentation level=2.

In the second process of FIG. 31, two lines of coefficient data of the coefficient C6 and the coefficient C7 are generated at the filtering process of segmentation level=1, and arranged subsequent to the coefficient data generated at the first filtering process in the region HH, the region HL, and the region LH formed at segmentation level=1. Similarly, in the region LL of segmentation level=1, one line of coefficient C9 generated in the filtering process of segmentation level=2 is arranged in the region LL, one line of coefficient C8 is arranged in each of the region HH, the region HL and the region LH.

When the wavelet transformed data is decoded as shown in the portion B of FIG. 32, the decoder side performs the first synthesis process in response to the first filtering process of the encoder side on the first line through the seventh line, thereby outputting the first line (Out-1 in portion C of FIG. 32). The decoder side outputs four lines at a time in response to the filtering process of the encoder side from the second to the final filtering process in the portion C of FIG. 32). In response to the final round of filtering process on the encoder side, the decoder side output eight lines.

The coefficient data generated by the wavelet transformer 210 from the high frequency component to the low frequency component is successively stored on the coefficient re-arranging buffer 212. When the coefficient data is stored on the coefficient re-arranging buffer 212 to the extent that allows the coefficient data to be re-arranged, the coefficient re-arranger 213 reads the coefficient data in the re-arranged order for the synthesis process. The coefficient data read is successively supplied to the entropy encoder 215.

In response to a control signal from the rate controller 214, the entropy encoder 215 entropy encodes the supplied coefficient data so that the bit rate of the output data becomes a target bit rate. The entropy encoded data is supplied to the decoder side. The encoding method may be one of Huffman coding and arithmetic coding. The present invention is not limited to these encoding methods. Any encoding method may be used as long as the encoding method is lossless.

The entropy encoder 215 quantizes the coefficient data read from the coefficient re-arranger 213. If source coding such as Huffman coding or arithmetic coding is performed on the obtained quantization coefficient, more compression effectiveness is expected. Any quantization method may be employed. For example, typical means such as the one represented by equation (13) where coefficient data W is divided by quantization step size $\Delta$ may be employed.

$$\text{Quantization coefficient} = W/\Delta \quad (13)$$

In accordance with the present embodiment, the wavelet transformer 210 performs the wavelet transform process on a plurality of lines (line block) of the image data at a time as described with reference to FIGS. 31 and 32. The entropy encoder 215 output the encoded data on a per line block. When the filtering process advances using the 5×3 filter to segmentation level=2, one line is output at the first round in the output data of one screen, four lines are output at a time at the second round through the round immediately prior to the final round, and eight lines are output at the final round.

When the coefficient data re-arranged by the coefficient re-arranger 213 is entropy encoded, for example, in the first round of filtering process of FIG. 31, there is no past line of coefficient data, namely, no line of coefficient data in the entropy encoding of the first coefficient C5. In this case, only one line is entropy encoded. In contrast, when the coefficient C1 is entropy encoded, the lines of the coefficient C5 and the coefficient C4 are past lines. Since a plurality of lines adjacent to those lines are likely to be formed of similar data, it is advantageous to entropy encode the lines at a time.

In the above discussion, the wavelet transformer 210 performs the wavelet transform filtering process using the 5×3 filter. The wavelet transformer 210 may employ a filter having a higher tap number, such as a 9×7 filter. The higher the tap number, the more the number of lines stored in the filter becomes, and a delay time from inputting of the image data to outputting of the encoded data becomes long.

In the above discussion, the segmentation level of the wavelet transform is set to be 2. The present invention is not limited to the segmentation level=2. The segmentation level may be increased. The higher the segmentation level, the higher the compression rate becomes. Typically, the filtering process is repeated in the wavelet transform up to segmentation level=4. The higher the segmentation level, the longer the delay time becomes.

When the present embodiment of the invention is applied to an actual system, the number of taps of the filter and the segmentation level are preferably determined taking into consideration the delay time and the image quality of the decoded image required of the system. The number of taps of the filter and the segmentation level may be adaptively selected rather than being fixed to constant values.

Figure 33:
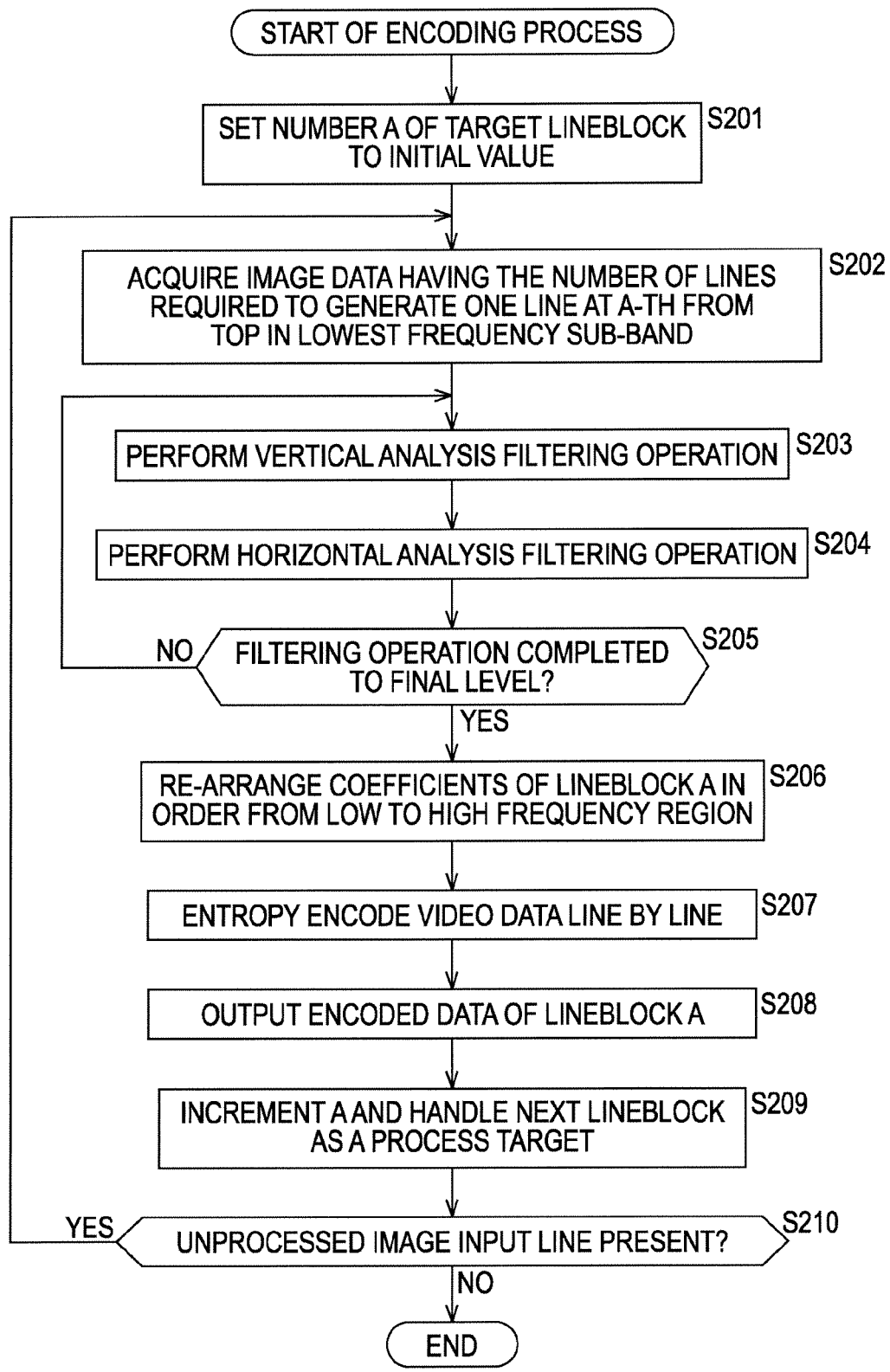
FIG. 33 is a flowchart illustrating a process flow of an encoding process.

The process flow of the entire image encoding process of the intra encoder 201 thus discussed is described below with reference to a flowchart of FIG. 33.

When the encoding process starts, the wavelet transformer 210 sets a number A of a target line block to an initial value in step S201. The number A is typically set to "1." Upon completing the setting, the wavelet transformer 210 acquires image data of lines of the number required to generate one line at A-th line from the top in the lowest frequency sub band (i.e., one line block) in step S202. In step S203, the wavelet transformer 210 performs a vertical analysis filtering operation to the image data arranged in a vertical direction on the screen. In step S204, the wavelet transformer 210 performs a horizontal analysis filtering operation to the image data arranged in a horizontal direction on the screen.

In step S205, the wavelet transformer 210 determines whether the analysis filtering operation has reached the final level. If it is determined in step S205 that the final level has not been reached, processing returns to step S203. The wavelet transformer 210 performs the analysis filtering operation at the current segmentation level in steps S203 and S204.

If it is determined in step S205 that the analysis filtering operation has reached the final level, the wavelet transformer 210 proceeds to step S206.

In step S206, the coefficient re-arranger 213 re-arranges the coefficients of the line block A (A-th line block from the top of a picture (field in the case of interlace)) from the low frequency to high frequency order. In step S207, the entropy encoder 215 entropy encodes the coefficient line by line. Upon completing the entropy encoding, the entropy encoder 215 transmits the encoded data of the line block A to outside in step S208.

In step S209, the wavelet transformer 210 increments the value of the number A by one to set the next line block as a target. In step S210, the wavelet transformer 210 determines whether an unprocessed image input line is present in the target picture (field in the case of interlace system). If it is determined in step S210 that an unprocessed image input line is present, processing returns to step S202 to process a new target line block.

Steps S202 through S210 are cycled through to encode each line block. If it is determined in step S210 that no unprocessed image input line is present, the wavelet transformer 210 ends the encoding process on that picture. A new encoding process starts on a next picture.

In the known wavelet transform, the horizontal analysis filtering operation is performed on the entire picture (field in the case of the interlace system), and then the vertical analysis filtering operation is performed on the entire picture. The horizontal analysis filtering operation and the vertical analysis filtering operation are performed on the resulting entire low frequency component. The analysis filtering operation is recursively repeated until the segmentation level has reached the final level. The results of each analysis filtering operation needs to be stored on a buffer. The buffer is forced to store the entire picture (field in the case of interlace system) or filtering results of the entire low frequency component at the segmentation level at that point of time. The buffer requires a large memory capacity (to store a large amount of data).

The coefficient re-arrangement and entropy encoding cannot be performed until all wavelet transform has been completed in the picture (field in the case of interlace system). A long delay time results.

In contrast, the wavelet transformer 210 in the intra encoder 201 performs consecutively the vertical analysis filtering operation and the horizontal analysis filtering operation to the final level as described above. In comparison with the known method, the amount of data to be stored (buffered) at a time (at the same time) is small. The required buffer having a substantially small memory capacity sufficiently works. Since the analysis filtering operation is performed to the final level, the coefficient re-arrangement, entropy encoding, etc. to be performed subsequently are also performed (i.e., the coefficient re-arrangement and entropy encoding are performed by line block). The delay time involved is substantially short in comparison with the known art.

The image encoding apparatus of FIG. 1, including the intra encoder 201 as the intra encoder 14 and the intra encoder 15, results in a substantially short delay time, increases encoding efficiency, and improves subjective image quality of the decoded image in comparison with the known art. The bit rate of the output data is easily controlled. In this way, the image encoding apparatus finds more applications, and becomes applicable to a diversity of systems. For example, the image encoding apparatus is applicable to a system that successively encodes the image data acquired on a real-time basis, such as moving image data captured by a camera, and transmits the encoded image data. The above-described advantages are thus enjoyed.

The image encoding apparatus of FIG. 15, including the intra encoder 201 as the intra encoder 50, reduces circuit scale, and costs, and easily controls code amount to an appropriate level.

Figure 34:
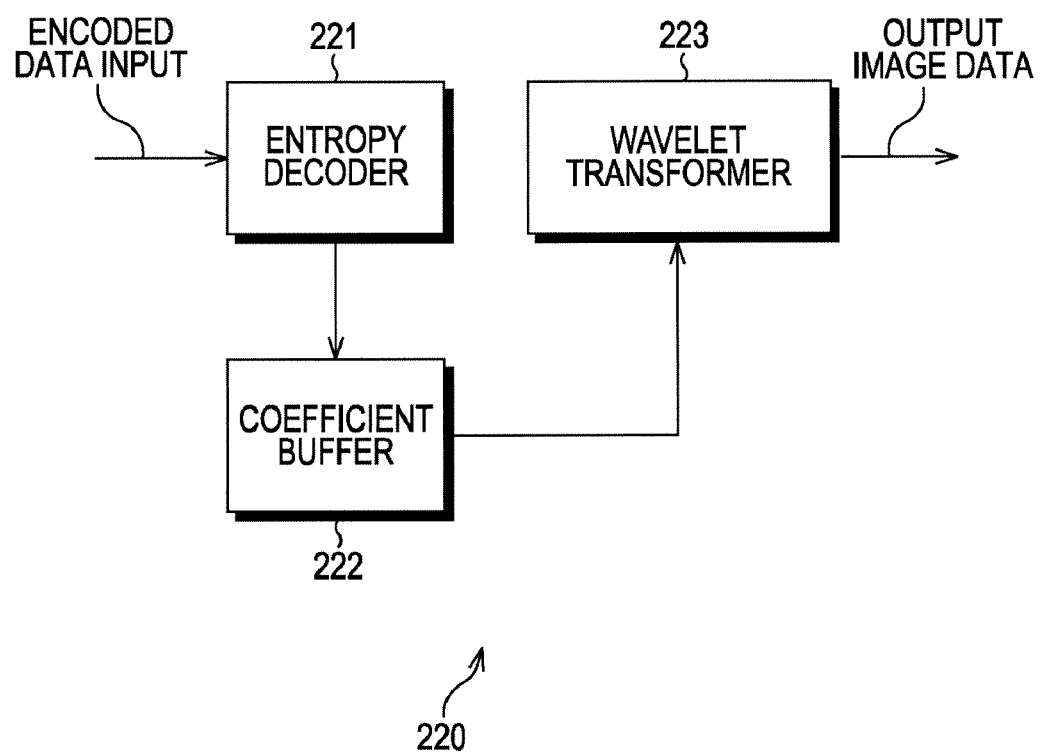
FIG. 34 is a block diagram illustrating an image decoding apparatus of the present invention.

FIG. 34 illustrates the structure of an intra decoder corresponding to the intra encoder 201 of FIG. 28. The data output from the entropy encoder 215 in the intra encoder 201 of FIG. 28 (the encoded data output of FIG. 28) is supplied to an entropy decoder 221 in an intra decoder 220 of FIG. 34 (as input encoded data of FIG. 34). The input encoded data is then entropy decoded into the coefficient data. The coefficient data is stored on a coefficient buffer 222. As previously discussed with reference to FIGS. 30 and 31, an inverse wavelet transformer 223 performs a synthesis filtering process on the coefficient data stored on the coefficient buffer 222 using a synthesis filter, and stores the results of the synthesis filtering process on the coefficient buffer 222. The inverse wavelet transformer 223 repeats that process in response to the segmentation level, thereby resulting in the decoded image data (output image data).

Figure 35:
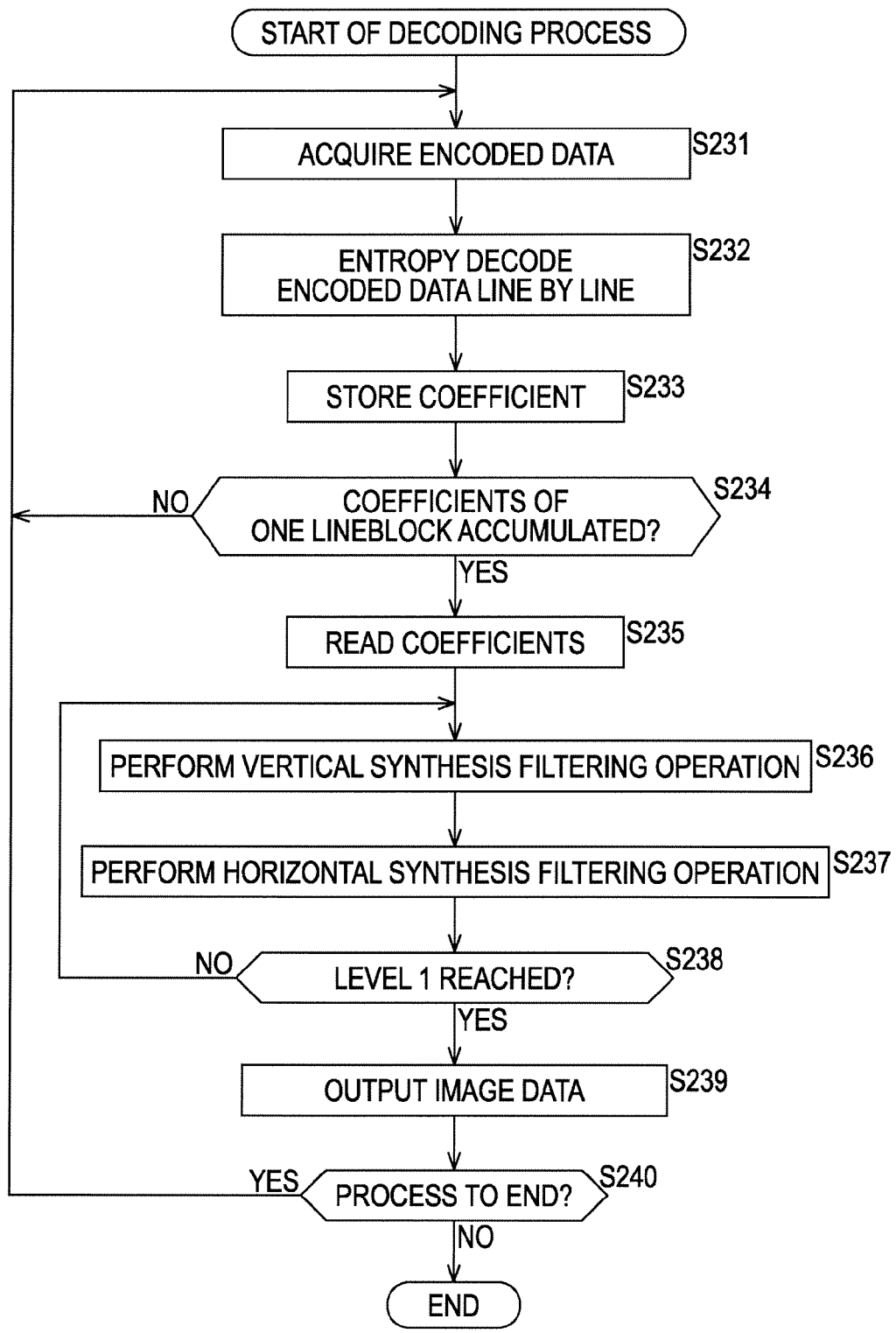
FIG. 35 is a flowchart illustrating a process flow of a decoding process.

A specific process flow of the entire encoding process of the intra decoder 220 is described below with reference to a flowchart of FIG. 35.

When the decoding process starts, the entropy decoder 221 acquires the encoded data in step S231. In step S232, the entropy decoder 221 entropy decodes the encoded data line by line. In step S233, the coefficient buffer 222 stores the coefficient obtained as a result of decoding. In step S234, the inverse wavelet transformer 223 determines whether the coefficient buffer 222 has stored one line block of coefficients. If it is determined in step S234 that one line block of coefficients is not stored, processing returns to step S231 to perform step S231 and subsequent steps. The inverse wavelet transformer 223 thus waits on standby until the coefficient buffer 222 has stored one line block of coefficients.

If it is determined in step S234 that the coefficient buffer 222 has stored one line block of coefficients, the inverse wavelet transformer 223 proceeds to step S235 to read the one line block of coefficients stored on the coefficient buffer 222.

In step S236, the inverse wavelet transformer 223 performs a vertical synthesis filtering operation on the coefficients arranged in a vertical line on the screen. In step S237, the inverse wavelet transformer 223 performs a horizontal synthesis filtering operation on the coefficients arranged in a horizontal line on the screen. In step S238, the inverse wavelet transformer 223 determines whether the synthesis filtering operation has reached level=1 (with segmentation level being "1"), namely, whether inverse transform has been performed to the state prior to wavelet transform. If it is determined in step S238 that the synthesis filtering level has not reached level=1, processing returns to step S236 to repeat steps S236 and S237.

If it is determined in step S238 that the synthesis filtering operation has reached level=1, the inverse wavelet transformer 223 proceeds to step S239 to output the image data obtained as a result of inverse transform.

In step S240, the entropy decoder 221 determines whether the decoding process has been completed. If it is determined in step S240 that the decoding process has not been completed with the encoded data continuously input, processing returns to step S231 to repeat step S231 and subsequent steps. If it is determined in step S240 that the decoding process is to be completed with the inputting of the encoded data stopped, the entropy decoder 221 ends the decoding process.

In the known inverse wavelet transform, the horizontal synthesis filtering operation is performed on all coefficients at a target segmentation level in a screen horizontal direction and then the vertical synthesis filtering operation is performed in a screen vertical direction. At each synthesis filtering process, the results thereof need to be stored on a buffer. The buffer is forced to store the synthesis filtering results at the segmentation level at that point of time and all coefficients at a next segmentation level. The buffer requires a large memory capacity (to store a large amount of data).

The image data is not output until all inverse wavelet transform has been completed in the picture (field in the case of interlace system). A long delay time from input to output results.

In contrast, the inverse wavelet transformer 223 in the intra decoder 220 consecutively performs the vertical synthesis filtering operation and the horizontal synthesis filtering operation by line block to level 1 as described above. In comparison with the known method, the amount of data to be stored (buffered) at a time (at the same time) is small. The required buffer having a substantially small memory capacity sufficiently works. The image data is successively output (by line block) with the synthesis filtering operation performed to level 1 (inverse wavelet transform) before all image data of a picture is obtained. The delay time involved is substantially short in comparison with the known art.

The image decoding apparatus of FIG. 4, including the intra decoder 220 as the intra decoder 21 and the intra decoder 22, results in a substantially short delay time, increases encoding efficiency, and improves subjective image quality of the decoded image in comparison with the known art. The bit rate of the output data is easily controlled.

The image decoding apparatus of FIG. 16, including the intra decoder 220 as the intra decoder 60, reduces circuit scale, and manufacturing costs, and easily controls code amount to an appropriate level.

Operations of elements in the intra encoder 201 of FIG. 28 and in the intra decoder 220 of FIG. 34 (the encoding process of FIG. 33 and the decoding process of FIG. 35) are controlled by an unshown CPU (Central Processing Unit) operating under the control of a predetermined program. The program may be pre-stored on an unshown ROM (Read Only Memory). The present invention is not limited to this arrangement. Alternatively, the elements constituting the image encoding apparatus and the image decoding apparatus may exchange timing signals and control signals to operate in cooperation. Alternatively, the intra encoder and the intra decoder may be implemented by software running on a computer.

Another embodiment of the present invention is described below. In accordance with this embodiment, elements in the intra encoder 201 and the intra decoder 220 are operated in parallel in the system of the preceding embodiments in order to perform the image compression encoding process and the image decoding process with less delay time involved.

In accordance with this embodiment, the intra encoder 201 and the intra decoder 220 and the encoding method and the decoding method discussed with reference to FIGS. 28 through 35 also apply and for convenience of explanation, the discussion thereof is omitted herein.

Figure 36:
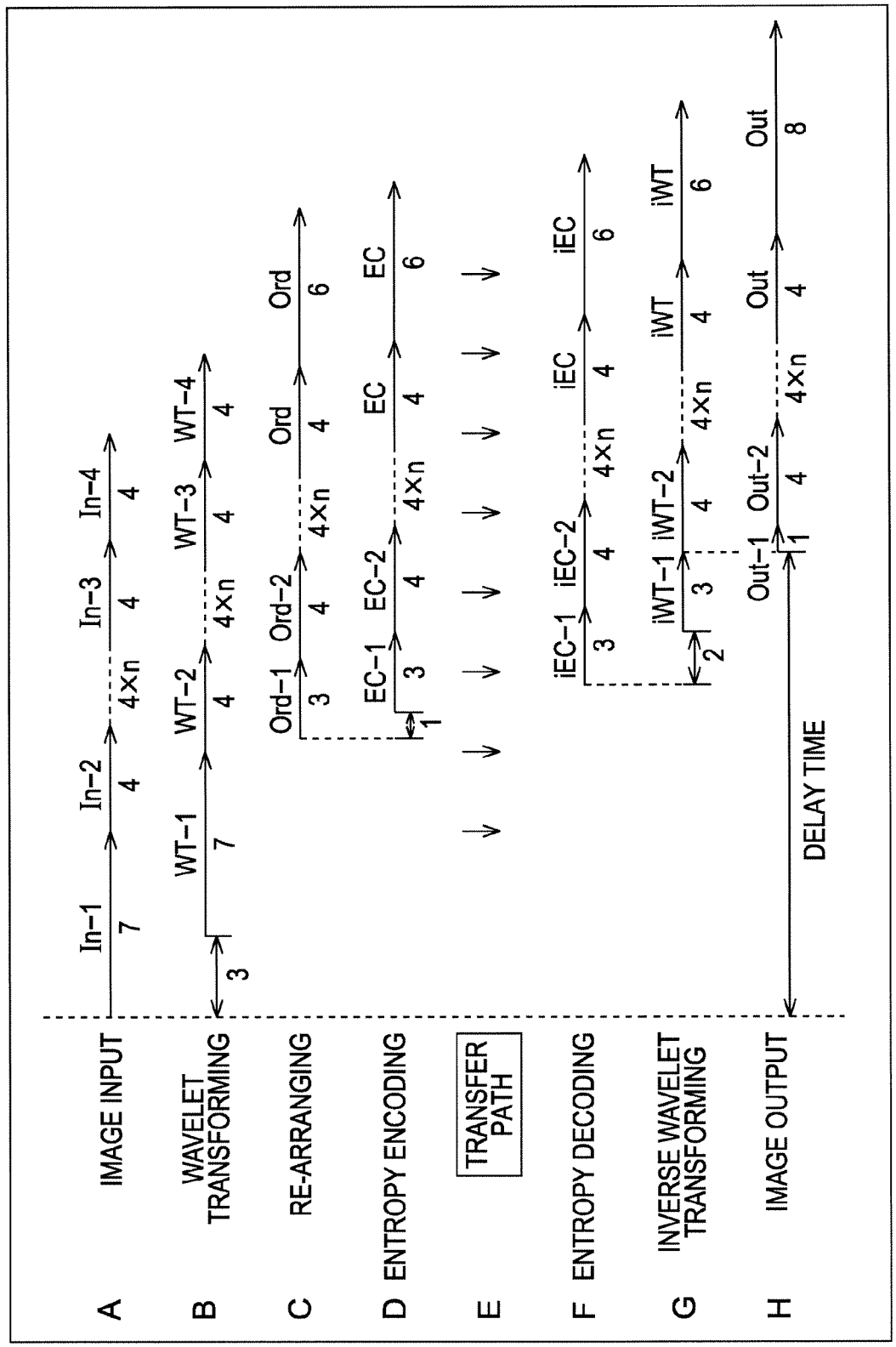
FIG. 36 diagrammatically illustrates a parallel operation of elements in each of the image encoding apparatus and the image decoding apparatus in accordance with the present invention.

FIG. 36 illustrates a concept of the parallel operation of the elements of the intra encoder 201 and the intra decoder 220. FIG. 36 corresponds to FIG. 32. The entropy encoder 215 performs a first wavelet transform WT-1 on input (B of FIG. 36) of the image data (A of FIG. 36). With reference to FIG. 31, the first wavelet transform WT-1 starts in response to the inputting of three lines and a coefficient C1 is generated. A delay time of three lines is caused from the input of the image data In-1 to the start of the wavelet transform WT-1.

The generated coefficient data is stored on the coefficient re-arranging buffer 212. The wavelet transform is performed on the image data. When the first wavelet transform is completed, a second wavelet transform WT-2 starts.

The coefficient re-arranger 213 performs a re-arrangement order Ord-1 on the coefficient C1, the coefficient C4 and the coefficient C5 in parallel with the input of the image data In-2 to be used in the second wavelet transform WT-2 and the process of the second wavelet transform WT-2 (C of FIG. 36).

The delay time between the end of the wavelet transform WT-1 and the start of the re-arrangement Ord-1 includes delays of apparatuses and system structure, such as a delay caused in the transfer of a control signal to instruct the coefficient re-arranger 213 to perform a re-arrangement process, a delay involved in the start of the re-arrangement process by the coefficient re-arranger 213, and a delay in program processing. These delay times are not essential in the encoding process.

The coefficient data is read by the coefficient re-arranging buffer 212 in the order of end of the re-arrangement process, and supplied to the entropy encoder 215. An entropy encoding operation EC-1 is then performed (D of FIG. 36). The entropy encoding process EC-1 can be started without waiting for the end of the re-arrangement of the three coefficients, namely, the coefficient C1, the coefficient C4 and the coefficient C5. For example, when the re-arrangement of one line of the first output coefficient C5 is completed, the entropy encoding can be started on the coefficient C5. The delay from the start of the re-arrangement Ord-1 to the start of the entropy encoding EC-1 is one line.

The encoded data, on which the entropy encoder 215 has completed the entropy encoding EC-1, is transmitted to the intra decoder 220 via a transmission line (E of FIG. 36). The transmission line for transmitting the encoded data may be a communication network such as the Internet. In this case, the encoded data may be transmitted in accordance with IP (Internet Protocol). The present invention is not limited to the Internet. The transmission line may include a communication interface, such as USB (Universal Serial Bus), or IEEE 1394 (Institute Electrical and Electronics Engineers 1394), or a wireless communication such as the one defined by IEEE 802.11 standard.

The intra encoder 201 receives successively the image data to the bottom line of the screen in succession to the seven lines of the image data input for the first process. In response to the input In-n (n is 2 or greater) of the image data, the intra encoder 201 performs the wavelet transform WT-n, the re-arrangement Ord-n, and entropy encoding EC-n for four lines at a time as described above. The re-arrangement Ord and the entropy encoding performed by the intra encoder 201 at the final process are performed on six lines. These processes are performed in parallel as shown in A of FIG. 36 through D of FIG. 36.

The data entropy encoded in EC-1 by the intra encoder 201 is transmitted to the intra decoder 220 via the transmission line, and then supplied to the entropy decoder 221. The entropy decoder 221 performs successively entropy decoding iEC-1 on the data encoded in the entropy encoding EC-1, thereby restoring the coefficient data (F of FIG. 36). The restored coefficient data is successively stored on the coefficient buffer 222. When the coefficient data sufficient to perform the inverse wavelet transform is stored on the coefficient buffer 222, the inverse wavelet transformer 223 reads the coefficient data from the coefficient buffer 222, and performs the inverse wavelet transform iTW-1 on the read coefficient data (G of FIG. 36).

As described with reference to FIG. 31, the inverse wavelet transformer 223 can start the inverse wavelet transform iWT-1 when the coefficient C4 and the coefficient C5 are stored on the coefficient buffer 222. The delay time from the start of the decoding iEC-1 by the entropy decoder 221 to the start of the inverse wavelet transform iWT-1 by the inverse wavelet transformer 223 is 2 lines.

When the inverse wavelet transformer 223 completes the inverse wavelet transform iWT-1 on the three lines processed in the first wavelet transform, the image data generated in the inverse wavelet transform iWT-1 is output OUt-1 (H of FIG. 36). The output Out-1 is the first line of image data as described with reference to FIGS. 31 and 32.

The intra decoder 220 receives successively the coefficient data encoded in the entropy encoding EC-1 (n is 2 or greater) in succession to the three lines of coefficient data encoded in the first process by the intra encoder 201. As described above, the intra decoder 220 performs the entropy decoding iEC-n and the inverse wavelet transform iWT-n on four lines of input coefficient data at a time and outputs the image data Out-n decoded in the inverse wavelet transform iWT-n. The intra encoder 201 performs the entropy decoding iEC and the inverse wavelet transform iWT as the final process on six lines. The intra encoder 201 outputs Out on eight lines. These processes are also performed in parallel by the intra decoder 220 as shown in F of FIG. 36 and H of FIG. 36.

As described above, the intra encoder 201 and the intra decoder 220 perform the processes thereof from top to bottom on the screen in order, and the image compression process and the image decoding process are thus performed with short delay.

The delay time from image input to image output in the wavelet transform performed to segmentation level=2 using the 5×3 filter is calculated with reference to FIG. 36. The delay time from the input of the first line of image data to the intra encoder 201 to the output of the first line of image data from the intra decoder 220 is a sum of factors described below. Delays different from system structure to system structure, such as a delay in the transmission line and a delay in actual process timing of elements in the apparatus, are excluded from the factors.

(1) Delay D_WT from the input of the first line to the end of the wavelet transform WT-1 performed on the seven lines, (2) Time D_Ord involved in the counting and the re-arrangement of the three lines, (3) Time D_EC for the entropy encoding EC-1 on the three lines, (4) Time D_iEC for the entropy decoding iEC-1 on the three lines, (5) Time D_iWT for the inverse wavelet transform iWT-1 on the three lines.

The delays in the factors listed above are calculated with reference to FIG. 36. (1) Delay D_WT is for 10 lines. (2) time D_Ord, (3) time D_EC, (4) time D_iEC, and (5) time D_iWT are those for the three lines. One line after the start of the re-arrangement Ord-1, the intra encoder 201 starts the entropy encoding EC-1. Similarly, two lines after the start of the entropy decoding iEC-1, the intra decoder 220 starts the inverse wavelet transform iWT-1. The entropy decoding iEC-1 can be started at the moment the encoding of the one line ends in the entropy encoding EC-1.

As shown in FIG. 36, the delay time from the input of the first line of coefficient data to the intra encoder 201 to the output of the first line of image data from the intra decoder 220 is 17 lines=10+1+1+2+3.

The delay time is further specifically described. If the input image data is an HDTV (High Definition Television) interlace video signal, one frame has a resolution of 1920 pixels×1080 lines, and one field has a resolution of 1920×540 lines. With a frame frequency of 30 Hz, the intra encoder 201 receives one field of 540 lines for 16.67 ms (1 s/60 fields).

The delay time involved in the input of seven lines of data is 0.216 ms (=16.67 ms×7/540 lines), and extremely short with respect to update time of one field. The sum of (1) delay D_WT, (2) time D_Ord, (3) time D_EC, (4) time D_iEC, and (5) time D_iWT is short because the number of lines to be processed is small. If the elements performing each process are implemented using hardware, the process time is further shortened.

Another embodiment of the present invention is described. In the above-referenced embodiments, the intra encoder 201 re-arranges the coefficient data subsequent to the wavelet transform. In the present embodiment, the re-arrangement process of the coefficient data is performed subsequent to the entropy encoding. More specifically, the intra encoder performs entropy encoding on the coefficient that is generated as a result of wavelet transform on the input image data, and then performs the re-arrangement process on the entropy encoded data. By performing the re-arrangement process on the coefficient data subsequent to entropy encoding, a memory capacity required of the re-arranging buffer is reduced.

For example, the number of bits of the input image data is 8 bits, and the number of generated coefficient data with the wavelet transform performed to a plurality of segmentation levels becomes 12 bits or so. If the coefficient re-arrangement process is performed prior to the entropy encoding process, the coefficient re-arranging buffer needs to store a predetermined number of lines of 12 bit coefficient data. If the wavelet transformed coefficient data is re-arranged subsequent to the entropy encoding process, the coefficient re-arranging buffer simply stores data compressed through the entropy encoding process. The buffer with a smaller memory capacity works.

Figure 37:
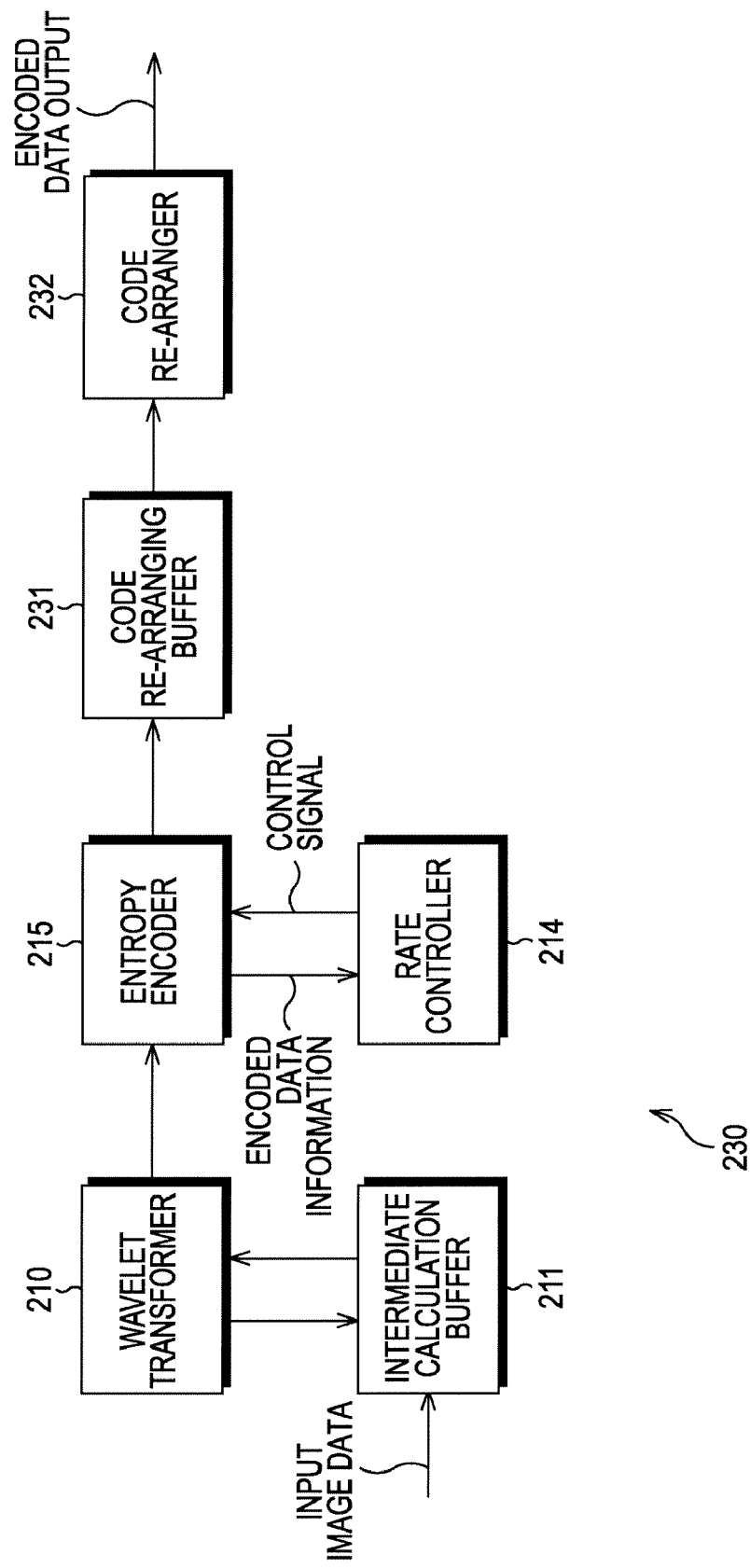
FIG. 37 is a block diagram illustrating the structure of the image encoding apparatus of the present invention.

FIG. 37 is a block diagram illustrating the structure of an intra encoder in accordance with the present embodiment. In FIG. 37, elements identical to those illustrated with reference to FIG. 28 are designated with the same reference numerals and the detailed discussion thereof is omitted herein.

An intra encoder 230 corresponds to the intra encoder 201 of FIG. 28. Like the intra encoder 201, the intra encoder 230 of FIG. 37 stores the input image data on an intermediate calculation buffer 211. As in the intra encoder 201, a wavelet transformer 210 wavelet transforms the image data stored on the intermediate calculation buffer 211. The coefficient data generated in the wavelet transform process is supplied to an entropy encoder 215. The entropy encoder 215, operating in cooperation with the rate controller 214, entropy encodes the supplied coefficient data so that the bit rate of the output encoded data remains at a substantially constant value. The entropy encoder 215 encodes the acquired coefficients in the order of acquisition regardless of the order of coefficients.

The encoded data, into which the entropy encoder 215 has entropy encoded the coefficient data generated as a result of wavelet transform, is stored temporarily on a code re-arranging buffer 231. When the encoded data is stored on the code re-arranging buffer 231, the code re-arranger 232 re-arranges the encoded data from the code re-arranging buffer 231. As previously discussed, the coefficient data generated by the wavelet transformer 210 is generated from the top of the screen to the bottom of the screen in the order from the high frequency component to the low frequency component. To output the image data with a short delay on the decoder side, the encoded data stored on the code re-arranging buffer 231 is read with the coefficient data of the wavelet transform re-arranged in the low frequency component to the high frequency component.

The encoded data read from the code re-arranging buffer 231 is transmitted as output encoded data over a transmission line.

In the same manner as the intra encoder 201 decodes the encoded data, the intra decoder 220 described with reference to FIG. 34 decodes the data encoded and output by the intra encoder 230 of the present embodiment. More specifically, the entropy decoder 221 decodes the encoded data input to the intra decoder 220 via the transmission line, thereby restoring the coefficient data. The restored coefficient data is successively stored on the coefficient buffer 222. The inverse wavelet transformer 223 inverse wavelet transforms the coefficient data stored on the coefficient buffer 222, thereby outputting the image data.

Figure 38:
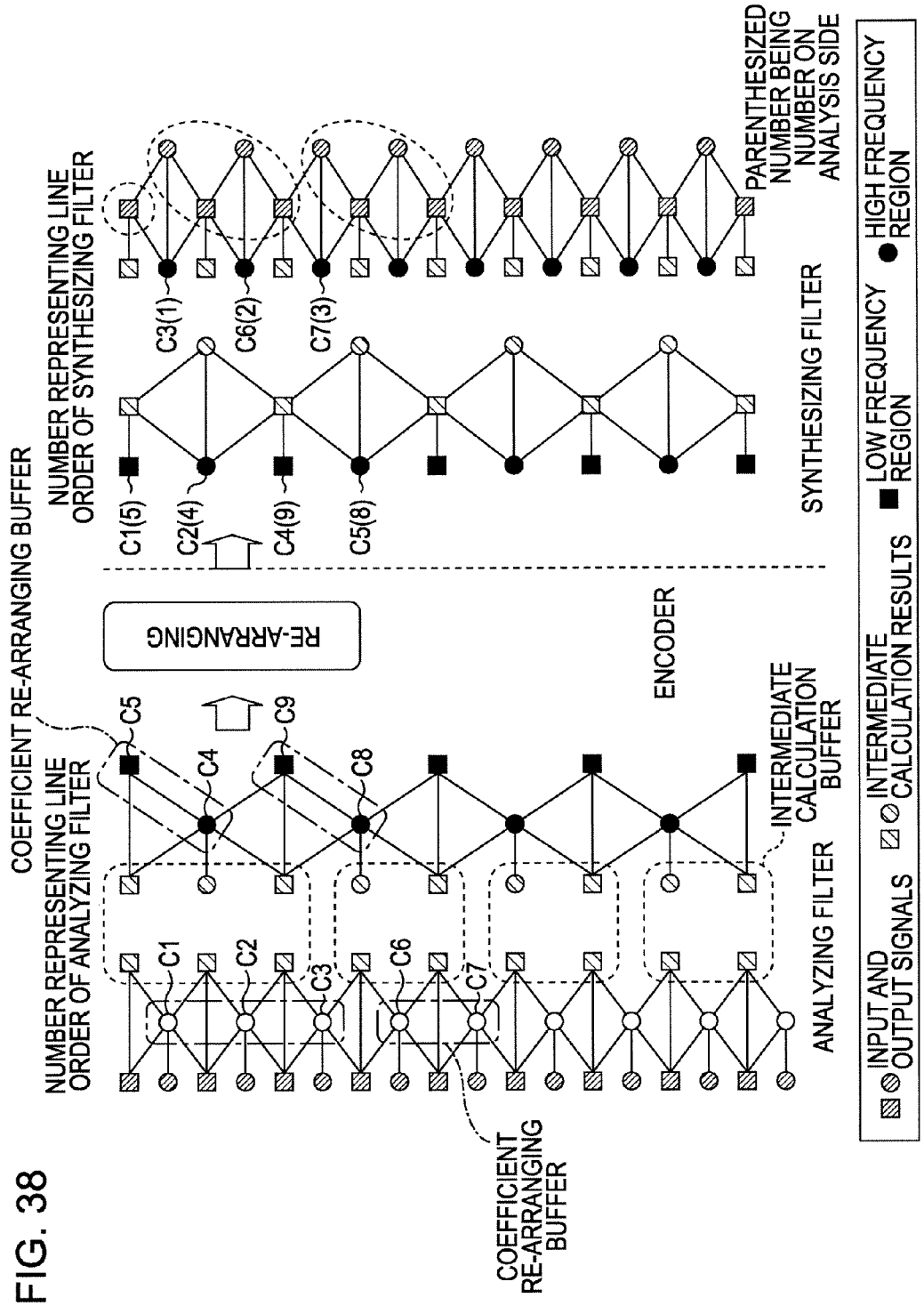
FIG. 38 diagrammatically illustrates a process flow of a re-arrangement of wavelet coefficients performed by the image encoding apparatus.
Figure 39:
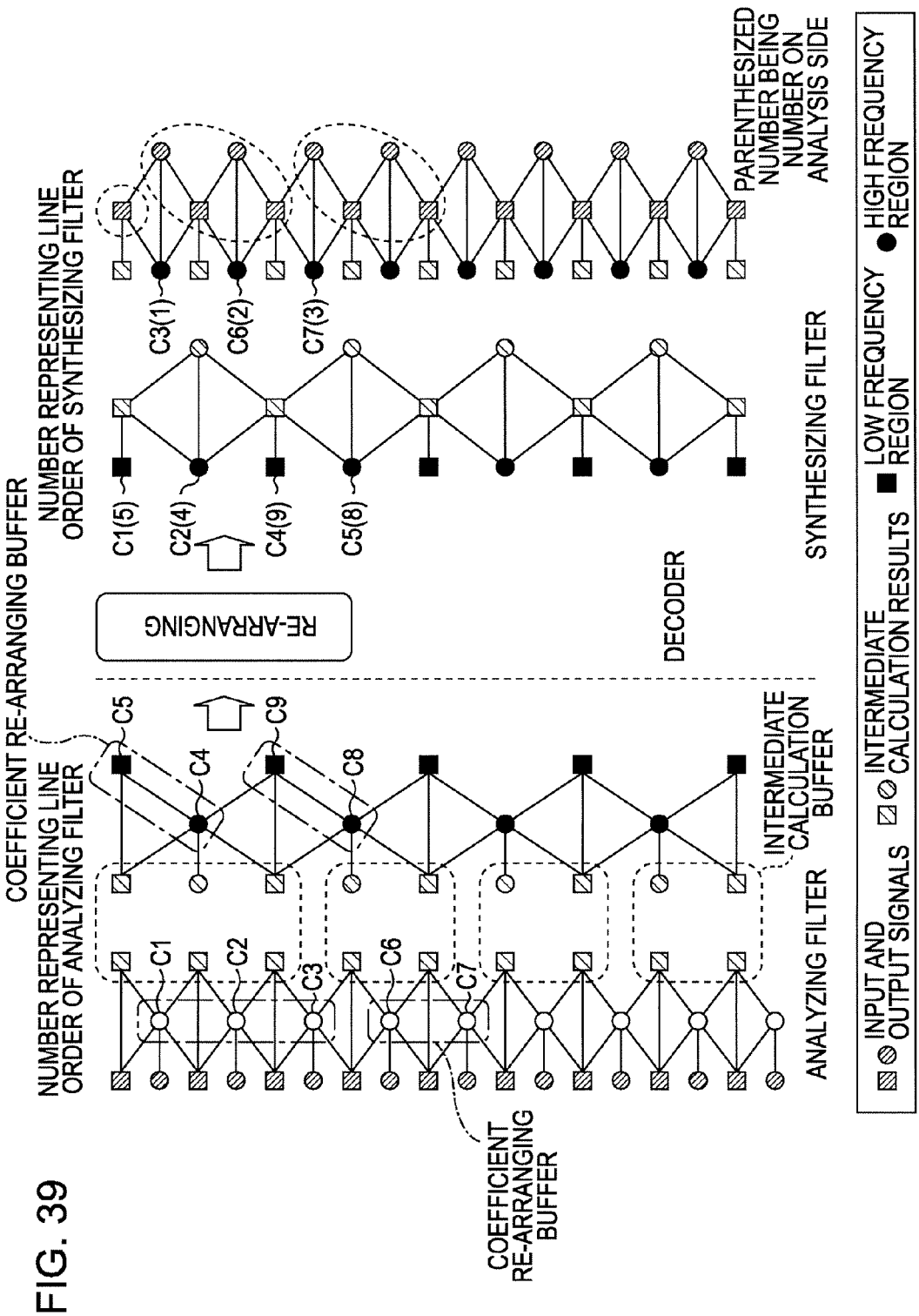
FIG. 39 diagrammatically illustrates the re-arrangement process of the wavelet coefficients preformed by the image decoding apparatus.

Another embodiment of the present invention is further described. In each of the preceding embodiments, the re-arrangement process of the wavelet transformed coefficient data is performed by the intra encoder side as shown in FIG. 38. In accordance with the present embodiment, the re-arrangement process of the wavelet transformed coefficient data is performed on the intra decoder side as shown in FIG. 39.

As previously discussed, the re-arrangement process of the wavelet transformed coefficient data requires that the coefficient re-arranging buffer have a relatively large memory capacity. The re-arrangement process itself requires high throughput. The intra encoder side with a relatively high throughput thereof can perform the coefficient re-arrangement process without any problem.

The intra encoder might be mounted on a relatively low throughput device, such as a mobile device, including a cellular phone or PDA (Personal Digital Assistant). Cellular phones having photographing functions are currently in widespread use (cellular phone-cum-camera). The image data picked up by the cellular phone with camera function is compression encoded through wavelet transform and entropy encoding, and then transmitted via a wired communication or a wireless communication.

The throughput of a CPU in such a mobile terminal is limited, and the memory capacity of the terminal is also subject to a limitation. The workload of the coefficient re-arrangement process is not negligible on the terminal.

As shown in FIG. 39, the re-arrangement process may be transferred to the intra decoder side. The intra encoder side with the workload thereof reduced can thus be mounted on a relatively low-throughput device such as a mobile terminal.

FIG. 40 is a block diagram illustrating the structure of such a intra encoder. As shown in FIG. 40, elements identical to those illustrated in FIG. 28 are designated with the same reference numerals and the detailed discussion thereof is omitted herein.

An intra encoder 241 of FIG. 40 is identical in structure to the intra encoder 201 of FIG. 28 except that the coefficient re-arranger 213 and the coefficient re-arranging buffer 212 are eliminated. More specifically, the present embodiment includes the wavelet transformer 210, the intermediate calculation buffer 211, the entropy encoder 215 and the rate controller 214 in combination.

The input image data is temporarily stored on the intermediate calculation buffer 211. The wavelet transformer 210 wavelet transforms the image data stored on the intermediate calculation buffer 211, thus generating the coefficient data. The wavelet transformer 210 supplies successively the generated coefficient data to the entropy encoder 215 in the order of generation. In other words, the generated coefficient data is supplied to the entropy encoder 215 in the order of wavelet transform from the high frequency component to low frequency component. The entropy encoder 215 entropy encodes the supplied coefficient with the bit rate of the output data thereof controlled by the rate controller 214. The entropy encoder 215 outputs as the encoded data the coefficient data that has been generated through the wavelet transform and then entropy encoded.

FIG. 41 is a block diagram illustrating the structure of the intra decoder of the present embodiment. In FIG. 41, elements identical to those illustrated in FIG. 34 are designated with the same reference numerals and the discussion thereof is omitted herein.

The entropy encoded data output from the entropy encoder 215 in the intra encoder 241 discussed with reference to FIG. 40 is supplied to the entropy decoder 221 in the intra decoder 242 of FIG. 41, where the entropy code is decoded into the coefficient data. The coefficient data is stored onto the coefficient re-arranging buffer 243 via the coefficient buffer 222. When the coefficient re-arranging buffer 243 stores the coefficient data to the extent sufficient to be re-arranged, the inverse wavelet transformer 223 reads the coefficient data from the coefficient re-arranging buffer 243 in the re-arranged order from the low frequency component to the high frequency component, and inverse wavelet transforms the coefficient data in the order of reading. If the 5×3 filter is used, the wavelet transform is performed as illustrated in FIG. 39.

When the leading portion of one frame is processed, for example, the inverse wavelet transformer 223 reads the coefficient data from the coefficient re-arranging buffer 243 at the moment the entropy decoded coefficient C1, coefficient C4 and coefficient C5 have been stored on the coefficient re-arranging buffer 243. The inverse wavelet transformer 223 performs inverse wavelet transform. The data inverse wavelet transformed by the inverse wavelet transformer 223 is successively output as the output image data.

As previously discussed with reference to FIG. 36, the process of each element in the intra encoder 241, the transmission of the encoded data over the transmission line, and the process of each element in the intra decoder 242 are performed in parallel in the present embodiment.

Another embodiment of the present invention is further described below. In this embodiment, the encoded data exchanged between the intra encoder and the intra decoder in each of the preceding embodiments is packetized.

FIG. 42 diagrammatically illustrates how the encoded data is exchanged. As shown in FIG. 42, the image data is wavelet transformed by line block with a predetermined number of lines input (sub band 251) in the same manner as described in connection with each of the preceding embodiments. When a predetermined wavelet transform segmentation level is reached, the coefficient lines from the lowest frequency sub band to the highest frequency sub band are re-arranged in reverse order, namely, in the order from the low frequency region to the high frequency region.

In the sub band 251 of FIG. 42, portions of different patterns, namely, portions hatched, vertical line patterned, and wavy line patterned are different line blocks (as represented by arrow-headed lines, blank portions of the sub band 251 are also segmented by line block). The coefficients of the line block re-arranged are entropy encoded, and the encoded data results.

If the intra encoder outputs the encoded data as is, the intra decoder may have difficulty identifying the border between the line blocks (or may have to perform a complex process). In accordance with the present embodiment, the intra encoder attaches a header to each line block, thereby transmitting a packet composed of the header and the encoded data.

Upon generating the encoded data of a first line block (Lineblock-1) as shown in FIG. 42, the intra encoder packetizes the encoded data and transmits the packet as a transmission packet 261 to the intra decoder. Upon receiving the packet 261 (reception packet 271), the intra decoder decode the encoded data.

Similarly, the intra encoder generates the encoded data of a second line block (Lineblock-2), packetizes the encoded data into a packet, and then transmits to the intra decoder the packet as a transmission packet 262. Upon receiving the packet (reception packet 272), the intra decoder decodes the encoded data. Similarly, the intra encoder generates the encoded data of a third line block (Lineblock-3), packetizes the encoded data into a packet, and transmits to the intra decoder the packet as a transmission packet 263. Upon receiving the packet (reception packet 273), the intra decoder decodes the encoded data.

The intra encoder and the intra decoder repeat the above-described process to the final line, namely, X line (Lineblock-X) (transmission packet 264 and reception packet 274). The intra decoder generates a decoded image 281.

FIG. 43 illustrates the structure of a header. As described above, the packet is composed of a header 291 and encoded data. The header 291 contains a description of a line block number (NUM) 293 and an encoded data length (LEN) 294.

By reading the information attached to the received encoded data and contained in the header, the intra decoder can identify easily the border of each line block. The load and process time of the decoding process are thus reduced.

As shown in FIG. 43, the description of a quantization step size ($\Delta 1$ through $\Delta N$) 292 at each sub band forming the line block may be attached. The intra decoder dequantizes the data by sub band. The intra decoder can thus perform a finer-tuned image quality control in addition to the bit rate control of the bit plane performed by the intra encoder.

The intra encoder and the intra decoder may perform the above-referenced encoding, packetization, transmission and reception of the packet, and decoding by line block in concurrent and parallel fashion (using a pipeline technique).

In this way, the intra decoder can substantially reduce the delay time until the intra decoder obtains the image output. FIG. 42 illustrates an operation example of an interlace moving image (60 fields/s). As shown, the time period of one field is 1 s/60=approximately 16.7 ms. The image output is obtained with a delay time of about 5 ms by performing the processes in concurrent and parallel fashion.

Another embodiment of the present invention is further described. In this embodiment, the entropy encoding process of the intra encoder and the entropy decoding process of the intra decoder are specifically described in each of the above-referenced preceding embodiments. In each of the above-referenced embodiments, any entropy encoding method may be used. However, using the method described in this embodiment, the intra encoder can perform the encoding process with easier calculation. The present embodiment thus reduces the delay time, power consumption, and the memory capacity of the buffer.

As will be described more in detail, the encoding method of the present embodiment, allowing the image data to be segmented into bit planes before encoding, is easily applied to the previously discussed method. In the previously discussed method, the image data is segmented into bit planes, and the data segmented in the bit planes is successively output from a top bit plane in the bit position to a bit plane in a predetermined bit position in the order from upper bit position to lower bit position. The workload in the encoding process is reduced with the advantage of easy control of the bit rate of the output data maintained. The present embodiment thus reduces the delay time, power consumption, and the memory capacity of the buffer.

In each of the preceding embodiments, the coefficient data is quantized and then encoded. The same is true of the present embodiment. In accordance with the present embodiment, the entropy encoding may be performed subsequent to the quantization of the coefficient data or with the quantization of the coefficient data skipped. As will be described later, if the coefficient data is quantized, image quality is improved more. The following discussion covers only the case of performing the entropy encoding with the coefficient data quantized. The case of performing the entropy encoding with the quantization of the coefficient data skipped is not discussed herein, but even if the quantization process skipped, the following discussion of the case of performing the entropy encoding with coefficient data quantized still applies.

The description of the coefficient re-arrangement process is omitted herein. In the above-referenced embodiments, the order re-arranged coefficient data is entropy encoded, the entropy encoded data is order re-arranged, or the coefficient data is order re-arranged. The order re-arrangement process is basically intended to expedite the inverse wavelet transform process, and unrelated to the entropy encoding process (and the entropy decoding process). The coefficient re-arrangement process, if performed, is limited to within the line block, and does not affect the entropy encoding process in each of the embodiments as will be described in detail later. More specifically, the entropy encoding process is equally applied regardless of whether the coefficient data is encoded after or before being order re-arranged. For simplicity of explanation, the description of the coefficient order re-arrangement is omitted.

In the entropy encoding process of the present invention described below, the entropy encoder 215 in the intra encoder 241 of FIG. 40 performs the quantization process. For the same reason as described above, only the intra decoder corresponding to the entropy encoding is described. The operation of the intra decoder performing the coefficient order re-arrangement process or not performing the dequantization process is omitted herein.

Figure 44:
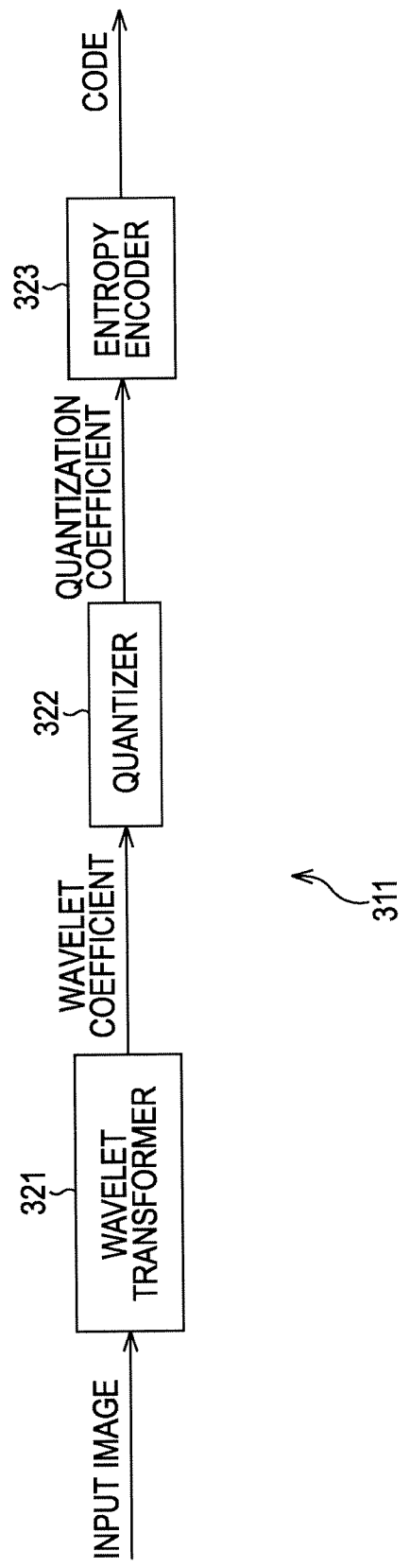
FIG. 44 is a block diagram illustrating the structure of an image encoding apparatus of the present invention.

FIG. 44 is a block diagram illustrating the structure of the intra encoder of the present invention.

The intra encoder 311 includes a wavelet transformer 321, a quantizer 322, and an entropy encoder 323.

The wavelet transformer 321, corresponding to the wavelet transformer 210 of FIG. 40, performs the wavelet transform process. More specifically, the wavelet transformer 321 receives an image (data) as a component signal that is DC level shifted as necessary. The wavelet transformer 321 wavelet transforms the input image, thereby decomposing the input image into a plurality of sub bands. The wavelet transformer 321 supplies the wavelet coefficient obtained through the wavelet transform to the quantizer 322.

The quantizer 322 quantizes the wavelet coefficient supplied from the wavelet transformer 321 and supplies a quantization coefficient obtained as a result of quantization to the entropy encoder 323.

The entropy encoder 323 entropy encodes the quantization coefficient supplied from the quantizer 322, thereby outputting the resulting code as an image (data). The image output from the entropy encoder 323 is rate control processed, and then packetized. The resulting packet is then recorded or supplied to another apparatus (not shown) connected to the intra encoder 311.

The quantizer 322 and the entropy encoder 323 correspond to the entropy encoder 215 and the rate controller 214 of FIG. 40.

The entropy encoding process performed by the entropy encoder 323 of FIG. 44 is described with reference to FIGS. 45 and 46.

Figure 45:
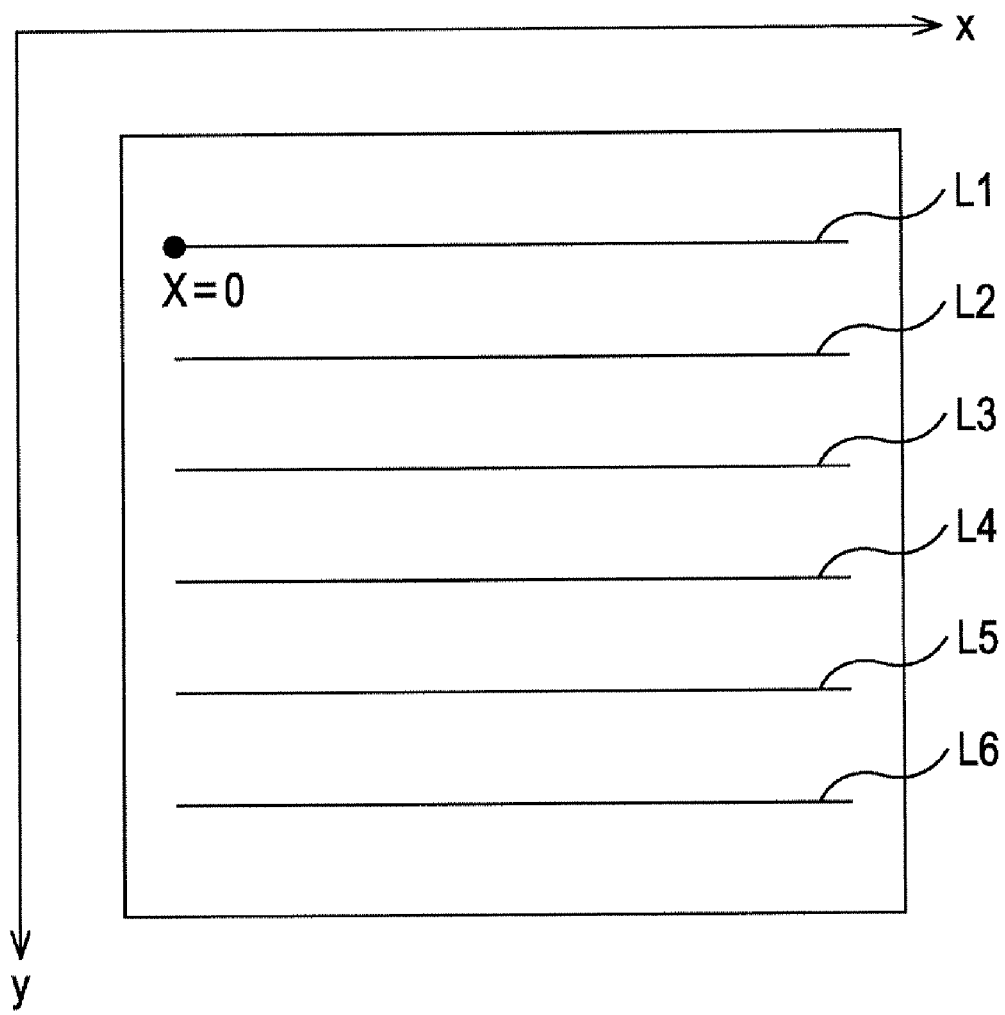
FIG. 45 illustrates a sub band.

As shown in FIG. 45, one sub band is composed of six lines, namely, line L1 through line L6. Let (x,y) represent a position of a pixel on a line in xy coordinates. The x coordinate of the left end of each line is zero, and the y coordinate of the line L1 is zero.

The entropy encoder 323 receives from the quantizer 322 the quantization coefficient of each sub band at each position (x,y) in a raster scan order from the line L1 to the line L6.

In other words, the entropy encoder 323 receives first the quantization coefficient at the leftmost position of the line L1 (0,0). The entropy encoder 323 then receives then the quantization coefficient at the position (1,0) to the right of the position leftmost position (0,0). The entropy encoder 323 receives successively the quantization coefficients all the way to the rightmost position of the line L1. Upon receiving all quantization coefficients on the line L1, the entropy encoder 323 receives the quantization coefficients from the leftmost position (0,1) on the line L2 to the rightmost position. This process is further repeated to receive the quantization coefficients on the lines L3 through L6.

Upon receiving the 12 quantization coefficients from the leftmost position of the line L1 of FIG. 45 as shown in the upper left portion of FIG. 46, the entropy encoder 323 encodes quantization coefficients by a predetermined number w (w=4 in FIG. 46) at a time.

An absolute value of each quantization coefficient shown on the upper portion of FIG. 46 is represented in decimal figure (bit plane representation). As shown in FIG. 46, the entropy encoder 323 receives one line of quantization coefficients (line L1 of FIG. 45) "−0101," "+0011," "−0110,"

"+0010," "+0011," "0110," "0000," "−0011," "+1101," "−0100," "+0111" and "−1010."

One quantization coefficient is composed of a sign of the quantization coefficient represented by "+" (positive) or "−" (negative), and an absolute value of the quantization coefficient represented in binary number. As shown in FIG. 46, from among bits representing the absolute value of the quantization coefficient, the uppermost bit represents the most significant bit. For example, the quantization coefficient "−0101" having the "−" sign and the binary absolute value of "0101" represents a decimal number "−5."

The entropy encoder 323 determines whether the input one line of quantization coefficients (absolute value) is all zeroes, and outputs a code representing whether the quantization coefficients to be encoded are all zeroes in response to the determination result. If the quantization coefficients are determined to be all zeroes, the entropy encoder 323 outputs 0 as the code representing that the quantization coefficients to be encoded are all zeroes. If it is determined that not all quantization coefficients to be encoded are zeroes (not only zero), the entropy encoder outputs 1 as a code that all quantization coefficients are not zero.

When 12 quantization coefficients shown on the upper left portion of FIG. 46 are input, the input quantization coefficients are not only zero, the entropy encoder 323 outputs 1 as shown in the upper right portion of FIG. 46.

When the code 1 indicating that not all quantization coefficient of the line are zeroes is output, the code re-arranger 232 encodes the first four (w) input quantization coefficients "−0101," "+0011," "−0110" and "+0010."

The entropy encoder 323 compares the maximum number of significant figures of the four consecutive quantization coefficients input this time (the value of a variable B in FIG. 46) with the maximum number of significant figures of the four (w) quantization coefficients previously encoded (input), thereby determining whether the maximum number of significant figures has changed. The entropy encoder 323 outputs a code indicating the maximum number of significant figures of the quantization coefficients.

The maximum number of significant figures represents the number of significant figures of a quantization coefficient having the largest absolute value from among the four (w) quantization coefficients collectively encoded. In other words, from among the four quantization coefficients, the maximum number of significant figures represents the place of 1 at the highest position in the quantization coefficient having the largest absolute value. For example, the quantization coefficient "−0110" has the largest absolute number from among the four quantization coefficients "−0101," "+0011," "−0110" and "+0010" encoded collectively, and the highest place of 1 in the quantization coefficient "−0110" is "3."

The codes indicating the maximum number of significant figures of the quantization coefficient include a code indicating whether the maximum number of significant figures has changed or not, a code indicating whether the maximum number of significant figures has increased or decreased, and a code indicating a variation in the maximum number of significant figures. If the maximum number of significant figures has not changed, neither the code indicating whether the maximum number of significant figures has increased or decreased nor the code indicating the variation in the maximum number of significant figures is not input.

If the comparison results of the maximum numbers of significant figures show a change in the maximum number of significant figures, the entropy encoder 323 outputs the code 1 indicating the change in the maximum number of significant figures. If there is no change in the maximum number of significant figures, the entropy encoder 323 outputs the code 0 indicating that the maximum number of significant figures.

When the entropy encoder 323 determines a change in the maximum number of significant figures in response to the first input of four quantization coefficients, i.e., in response to the first input of the quantization coefficients of the sub band to be encoded (for example, in response to the input of four quantization coefficients from the leftmost end of the line L1 in FIG. 45), there are no previous quantization coefficients of that sub band. The maximum number of significant figures of the four (w) quantization coefficients previously encoded is set to be zero.

The entropy encoder 323 compares the maximum number of significant figures, namely, "3" of the four currently input quantization coefficients "−0101," "+0011," "−0110" and "0010" with the maximum number of significant figures 0 of the quantization coefficients previously encoded. The entropy encoder 323 detects the change, thereby outputting the code 1.

In succession to the code 1 indicating the change in the maximum number of significant figures, the entropy encoder 323 outputs the code indicating whether the maximum number of significant figures has increased or decreased. If the maximum number of significant figures has increased, the entropy encoder 323 output the code 0. If the maximum number of significant figures has decreased, the entropy encoder 323 outputs the code 1.

The preceding maximum number of significant figures is 0, and the current maximum number of significant figures is 3. The entropy encoder 323 outputs the code 0 indicating that the maximum number of significant figures has increased.

Upon outputting the code indicating whether maximum number of significant figures has increased or decreased, the entropy encoder 323 outputs the code how much the maximum number of significant figures has increased or decreased, namely, the code indicating the magnitude of variation of the maximum number of significant figures. More specifically, the entropy encoder 323 outputs (n−1) codes 0's and the code 1 in succession to these 0's when the magnitude of variation of the maximum number of significant figures (an amount of increase or decrease) is n.

When the first four quantization coefficients of FIG. 3 are encoded, the magnitude of variation in the maximum number of significant figures is 3 (=3−0). The entropy encoder 323 outputs 2 (=3-1) 0's, and then 1.

In succession, the entropy encoder 323 outputs the codes of the maximum number of significant figures indicating the absolute value of each of the four (w) quantization coefficients currently encoded. More specifically, the entropy encoder 323 outputs the value of each figure of the absolute value of the quantization coefficient from the highest figure to the lowest figure represented by the maximum number of significant figures.

The quantization coefficients to be currently encoded are "−0101," "+0011," "−0110" and "+0010." The entropy encoder 323 outputs the codes corresponding to the maximum number of significant figures indicating the absolute value of the first input quantization coefficient "−0101". Since the maximum number of significant figures is 3, the entropy encoder 323 outputs the value of the highest figure of the maximum number of significant figures of the quantization coefficient "−0101," namely, "1" (three-bit place), the value "0" one bit lower than the highest bit (two-bit place), and the value "1" the lowest bit. In this way, the code "101" of the number of significant figures representing the absolute value of the quantization coefficient "−0101" is output.

Similarly, the entropy encoder 323 outputs the codes "011," "110" and "010" for the maximum number of significant figures representing the absolute values of the quantization coefficients "+0011," "−0110" and "+0010" in that order. As a result, the entropy encoder 323 outputs "101011110010" as the code of the maximum number of significant figures representing each of the quantization coefficients "−0101," "+0011," "−0110" and "+0010." In this way, the entropy encoder 323 outputs, as the code indicating the absolute value of the quantization coefficients, the code responsive to the maximum number of significant figures of the four quantization coefficients to be encoded.

Finally, the entropy encoder 323 outputs a code indicating a sign of each of the quantization coefficients having non-zero absolute value from among the four (w) quantization coefficients. If the sign of the quantization coefficient is "+" (positive), the entropy encoder 323 outputs the code 0, and if the sign of the quantization coefficient is "−" (negative), the entropy encoder 323 outputs the code 1.

The quantization coefficients to be currently encoded are "−0101," "+0011," "−0110" and "+0010" and the signs of the quantization coefficients are negative, positive, negative, and positive in that order. As shown in the upper right portion of in FIG. 46, the entropy encoder 323 outputs as a code indicating the signs of the quantization coefficients.

When the four quantization coefficient first input are encoded, the entropy encoder 323 encodes next consecutive quantization coefficients "+0011," "+0110," "0000" and "−0011."

As in the encoding of the first (previously) input quantization coefficients, the entropy encoder 323 compares the maximum number of significant figures of the four (w) quantization coefficients currently input with the maximum number of significant figures of the four quantization coefficients previously input.

The maximum number of significant figures of the currently input four (w) quantization coefficients "+0011," "0110," "0000" and "−0011" is the figure of 1 at the highest bit of the quantization coefficient "+0110" having the largest absolute value, namely, "3." The entropy encoder 323 outputs the code 0 indicating that the maximum number of significant figures has not changed.

In succession, the entropy encoder 323 outputs a code "011110000011", which is obtained by arranging the codes "011," "110," "000" and "011" of the maximum numbers of significant figures respectively indicating the absolute values of the four (w) quantization coefficients "+0011," "+0110," "0000" and "−0011" to be currently encoded.

When the code indicating the absolute values of the quantization coefficients is output, the entropy encoder 323 outputs the code indicating a sign of the quantization coefficient having non-zero absolute value, of the four quantization coefficients.

The quantization coefficients to be currently encoded are "+0011," "+0110," "0000" and "−0011" and the third quantization coefficient "0000", has 0 as the absolute value thereof. The entropy encoder 323 outputs the code "001" indicating the signs (positive, positive, and negative) of the non-zero quantization coefficients "+0011," "+0110" and "−0011."

When the four quantization coefficients "+0011," "+0110," "0000" and "−0011" are encoded, the entropy encoder 323 encodes four quantization coefficients "+1101," "−0100," "+0111" and "−1010."

The entropy encoder 323 compares the maximum number of significant figures of the currently input four (w) quantization coefficients with the maximum number of significant figures of the previously encoded four quantization coefficients.

The maximum number of significant figures of the currently input four (w) quantization coefficients "+1101," "−0100," "+0111" and "−1010" is the position of "1" at the highest bit position of the quantization coefficient "+1101" having the maximum absolute value, namely, "4." Since the current maximum number of significant figures "4" is different from the maximum number "3" of significant figures of the quantization coefficients previously encoded, the entropy encoder 323 outputs the code 1 indicating that the maximum number of significant figures has changed.

The preceding maximum number of significant figures is 3 and the current maximum number of significant figures is 4. The entropy encoder 323 outputs the code 0 as shown in the right portion of FIG. 46 indicating that the maximum number of significant figures has changed.

The entropy encoder 323 outputs the code indicating how much the maximum number of significant figures has increased or decreased. In this case, the magnitude of variation of the maximum number of significant figures is 1 (=4−3), the entropy encoder 323 outputs 0 (=1−1), and then 1 (i.e., the code 1).

The entropy encoder 323 then outputs a code "1101010001111010", which is obtained by arranging codes "1101," "0100," "0111," and "1010" of the maximum numbers of significant figures indicating the absolute values of the respective currently encoded four (w) quantization coefficients "+1101," "−0100," "+0111" and "−1010."

When the code indicating the absolute values of the quantization coefficients, the entropy encoder 323 outputs codes indicating signs of the non-zero quantization coefficients.

The quantization coefficients to be currently encoded are "+1101," "−0100," "+0111" and "−1010" and the signs of the quantization coefficients are positive, negative, and positive in that order. As shown in the lower right portion of FIG. 46, the entropy encoder 323 outputs a code "0101" indicating the signs of the quantization coefficients.

The entropy encoder 323 outputs the input quantization coefficients in by the predetermined consecutive number (w) at a time. The entropy encoder 323 outputs the code indicating whether all quantization coefficients of a line are zero or not. When the code indicating that not all quantization coefficients are zeroes, the entropy encoder 323 then outputs the code indicating the maximum number of significant figures of the w quantization coefficients, the code indicating the absolute value (in bit plane representation) of the w quantization coefficients, and the code indicating the signs of the quantization coefficients.

The code indicating the maximum number of significant figures of the next w quantization coefficients, the code indicating the absolute value of the next w quantization coefficients, and the code indicating the signs of the next quantization coefficients are then output. These codes of the next quantization coefficients are output until all quantization coefficients of that line are encoded.

The quantization coefficients are encoded in the raster scan order in the above discussion. However, the order of encoding of the quantization coefficients is not limited to the raster scan order. For example, when the quantization coefficients of the sub band of FIG. 45 are encoded, quantization coefficients at positions (0,0), (0,1), (0,2) and (0,3) (leftmost positions of the lines L1 through L4) are first encoded, and then quantization coefficients at positions (1,0), (1,1), (1,2), and (1,3) are encoded. In other words, quantization coefficients vertically aligned positions may be encoded by w quantization coefficients at a time.

Figure 47:
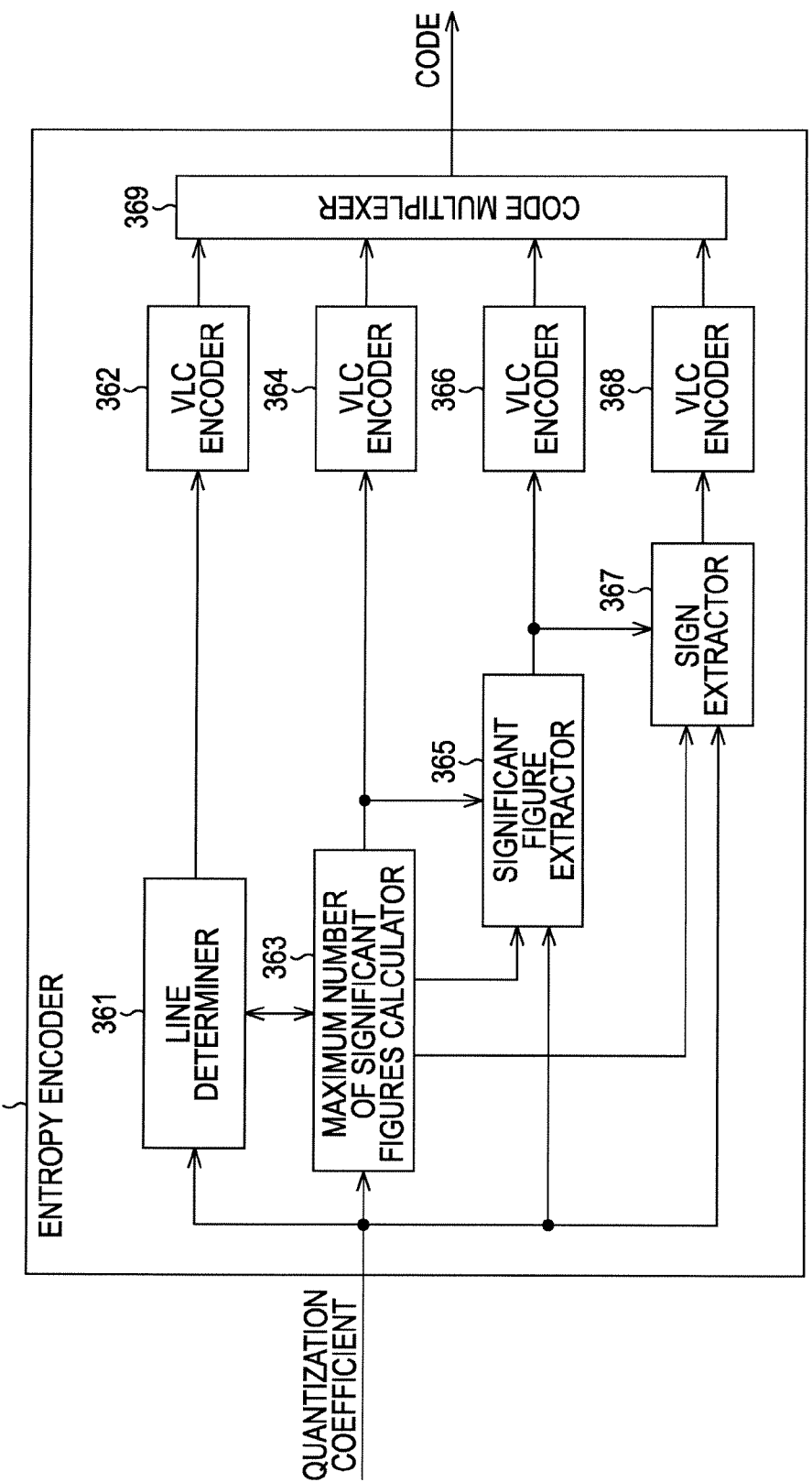
FIG. 47 is a block diagram illustrating the structure of an entropy encoder.

The entropy encoder 323 of FIG. 28 performing the above-referenced process has a detailed structure shown in FIG. 47.

The entropy encoder 323 includes a line determiner 361, a VLC (Variable Length Coding) encoder 362, a maximum number of significant figures calculator 363, a VLC encoder 364, a significant figure extractor 365, a VLC encoder 366, a sign extractor 367, a VLC encoder 368, and a code multiplexer 369.

The quantization coefficient output from the quantizer 322 (FIG. 44) is supplied (input) to each of the line determiner 361, the maximum number of significant figures calculator 363, the significant figure extractor 365, and the sign extractor 367.

The line determiner 361 determines whether not all quantization coefficients of one line input from the quantizer 322 are zeroes, and supplies information relating the determination results to the VLC encoder 362.

In response to the information indicating the determination results from the line determiner 361, the VLC encoder 362 outputs to the code multiplexer 369 a code indicating whether the quantization coefficients of the line to be encoded are all zeroes.

The maximum number of significant figures calculator 363 calculates the maximum number of significant figures of the consecutive w quantization coefficients, and supplies information indicating the calculation results to each of the VLC encoder 364 and the significant figure extractor 365.

In response to the information indicating the calculation results from the maximum number of significant figures calculator 363, the VLC encoder 364 supplies to the code multiplexer 369 a code indicating the maximum number of significant figures of the w quantization coefficients.

In response to the information indicating the calculation results from the maximum number of significant figures calculator 363, the significant figure extractor 365 extracts the significant figure of the w quantization coefficients supplied from the quantizer 322 and supplies the significant figure (data) of the extracted quantization coefficient to each of the VLC encoder 366 and the sign extractor 367.

In response to the significant figure of the quantization coefficient from the significant figure extractor 365, the VLC encoder 366 encode the absolute values of these quantization coefficients, and then supplies to the code multiplexer 369 a code indicating the absolute values of the acquired quantization coefficients.

In response to the significant figure of the quantization coefficient from the significant figure extractor 365, the sign extractor 367 extracts the signs of the quantization coefficients supplied from the quantizer 322 and supplies the extracted sign (data) to the VLC encoder 368.

The VLC encoder 368 encodes the sign (data) from the sign extractor 367 and supplies the code indicating the thus obtained signs of the quantization coefficients to the code multiplexer 369.

The code multiplexer 369 multiplexes the code indicating whether not all quantization coefficients of the line are zeroes, the code indicating the maximum number of significant figures, the code indicating the absolute values of the quantization coefficients, and the code indicating the signs of the quantization coefficients, respectively supplied from the VLC encoder 362, the VLC encoder 364, the VLC encoder 366 and the VLC encoder 368, and outputs the multiplexed data as an encoded image (data).

The encoding process of the intra encoder 311 (FIG. 44) is described below with reference to a flowchart of FIG. 48. The encoding process starts when the wavelet transformer 321 receives the encoded image (data).

In step S311, the wavelet transformer 321 wavelet transforms the input image, thereby decomposing the input image into sub bands. The wavelet transformer 321 supplies the wavelet coefficients of each sub band to the quantizer 322.

In step S312, the quantizer 322 quantizes the wavelet coefficients supplied from the wavelet transformer 321, and supplies the resulting quantization coefficients to the entropy encoder 323. The entropy encoder 323 thus receives the quantization coefficient at each position of the sub band represented in the bit plane discussed with reference to FIG. 46.

In step S313, the entropy encoder 323 performs the entropy encoding process. The encoding process thus ends. The entropy encoding process will be described in detail later. In the entropy encoding process as described with reference to FIG. 46, the entropy encoder 323 encodes the quantization coefficients supplied from the quantizer 322 by the predetermined number (w) at a time, and outputs, as the encoded image (data), the code indicating whether all quantization coefficients of the line to be encoded are zeroes, the code indicating the maximum number of significant figures of the quantization coefficients, the code indicating the absolute values of the quantization coefficients, and the code indicating the signs of the quantization coefficients.

The intra encoder 311 encodes the input image and outputs the encoded image.

Figure 48:
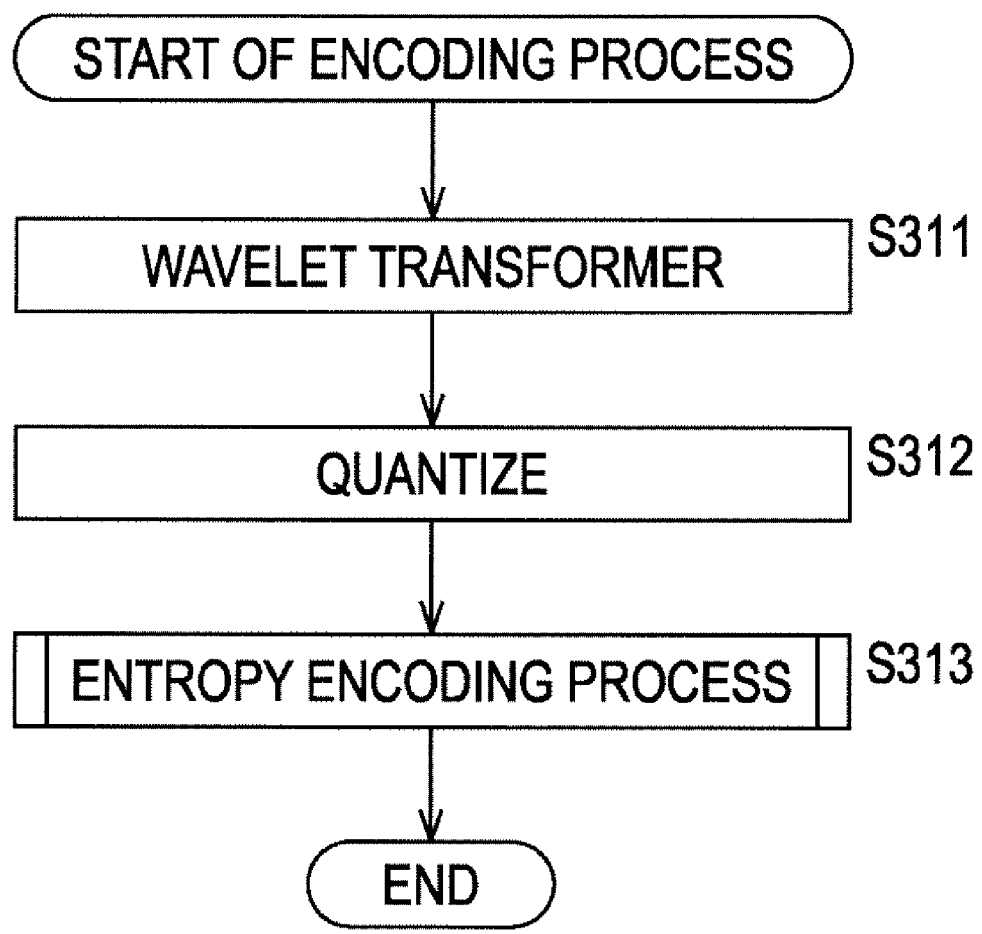
FIG. 48 is a flowchart illustrating an encoding process.

The entropy encoding process corresponding to step S313 of FIG. 48 is described below with reference to a flowchart of FIG. 49.

The quantization coefficients output from the quantizer 322 in step S312 of FIG. 48 are supplied (input) to each of the line determiner 361, the maximum number of significant figures calculator 363, the significant figure extractor 365, and the sign extractor 367 in the entropy encoder 323 (FIG. 47).

In step S341, the line determiner 361 sets a variable y indicating a line of a sub band to be encoded, as y=0, and stores y=0.

When the quantization coefficients of the sub band of FIG. 45 are encoded, the line determiner 361 sets the variable y indicating each of the lines (lines L1 through L6) of the sub band as y=0. The line y indicated by the variable y indicates a line having y as the y coordinate of each position (x,y) on the line in the sub band. For example, if the variable y stored on the line determiner 361 is y=0, the line indicated by the variable is the line L1 where the y coordinate at each position on the line is zero.

In step S342, the maximum number of significant figures calculator 363 sets a variable Binit to be Binit=0, and stores this setting. The variable Binit indicates the maximum number of significant figures of the w quantization coefficients first input on a line (y−1) preceding by one line the line indicated by the variable y stored on the line determiner 361.

For example, if the line (y−1) is the line L1 of FIG. 45, the variable Binit indicating the maximum number of significant figures of the w quantization coefficients first input on the line (y−1) is the maximum number of significant figures of the w quantization coefficients from the leftmost position on the line L1, namely, the w quantization coefficients at positions (0,0), (1,0), . . . , (w−1,0). If the variable y stored on the line determiner 361 is y=0, the line (y−1) does not exist, and the value of the variable Binit is Binit=0.

In step S343, the line determiner 361 determines whether (the absolute values of) the quantization coefficients on the line y indicated by the stored variable y are all zeroes. If the line indicated by the variable y is L1 of FIG. 45, the line determiner 361 determines that the quantization coefficients are all zeroes if the quantization coefficients at the position (x,y) on the line L1 are all zeroes.

If it is determined in step S343 that the quantization coefficients are all zeroes, the line determiner 361 generates information indicating that the quantization coefficients are all zeroes, supplies the generated information to each of the VLC encoder 362 and the maximum number of significant figures calculator 363, and then proceeds to step S344.

In response to the information from the line determiner 361 indicating that the quantization coefficients are all zeroes, the VLC encoder 362 outputs (supplies) in step S344 to the code multiplexer 369 the code 0 indicating that the quantization coefficients on the line to be encoded are all zeroes. The code multiplexer 369 outputs the code 0 supplied from the VLC encoder 362 as a code obtained as a result of encoding the quantization coefficients on the line y.

In response to the information indicating that the quantization coefficients supplied from the line determiner 361 are all zeroes, the maximum number of significant figures calculator 363 updates the value of the stored variable Binit to Binit=0 in step S345.

In step S346, the line determiner 361 determines whether an unprocessed line is contained in the lines of the sub band to be encoded. More specifically, the line determiner 361 determines whether the quantization coefficients on all lines of the sub band to be encoded have been encoded. For example, the quantization coefficients of the sub band of FIG. 45 are now encoded. When the quantization coefficients on all position on the lines L1 through L6 are encoded, the line determiner 361 determines that no unprocessed lines are present.

If it is determined in step S346 that there is an unprocessed line, the line determiner 361 proceeds to step S347 in order to encodes the quantization coefficients on each position on the line (y+1).

In step S347, the line determiner 361 increments the variable y indicating the stored line by one to have y=y+1, and returns to step S343 to perform step S343 and subsequent steps.

If it is determined in step S346 that there is no unprocessed line, the quantization coefficients on all lines forming the sub band are encoded. The line determiner 361 ends the entropy encoding process. Processing returns to step S313 of FIG. 48 to end the encoding process.

Figure 49:
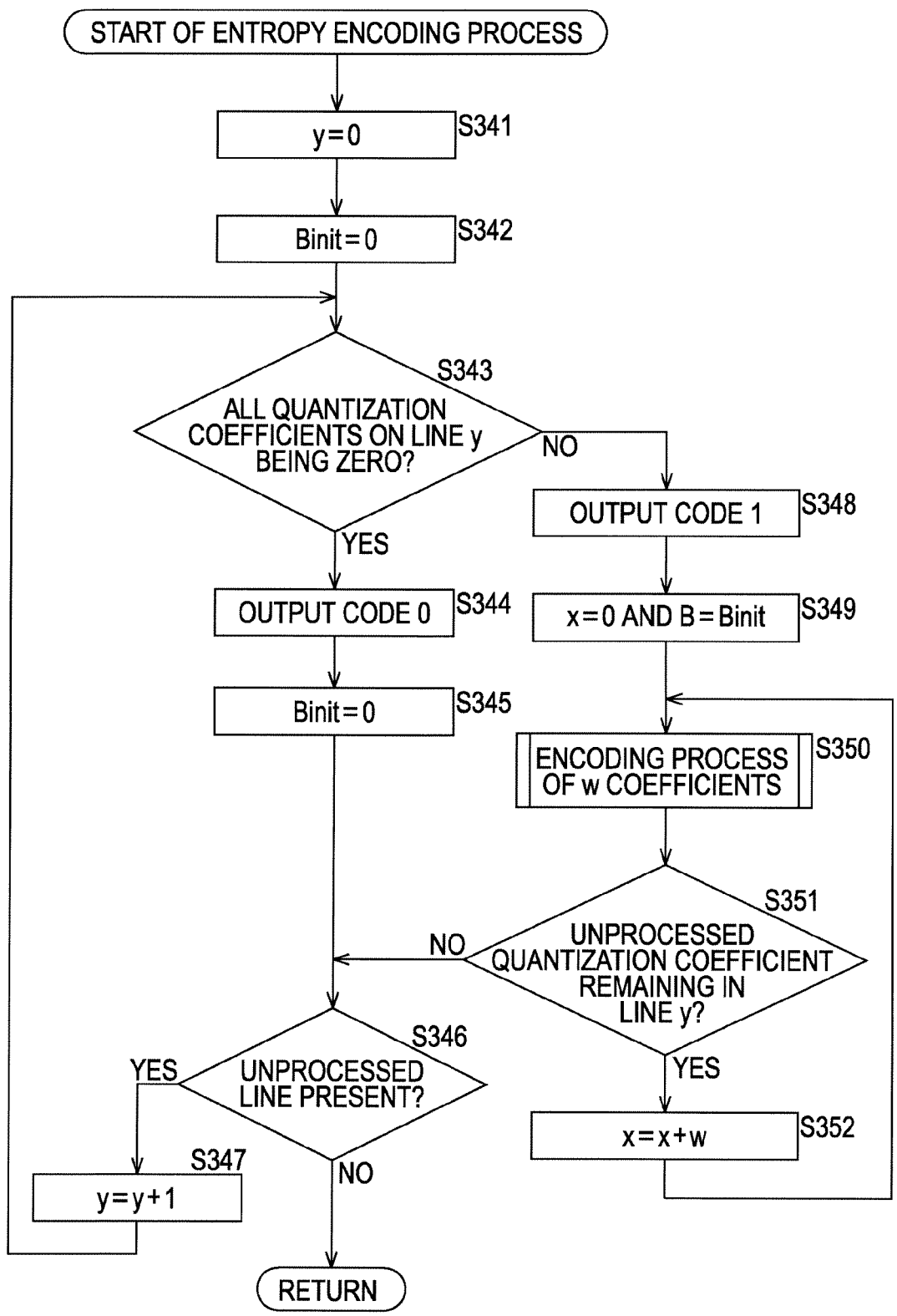
FIG. 49 is a flowchart illustrating an entropy encoding process.

If it is determined in step S343 of FIG. 49 that not all quantization coefficients on the line y are zeroes (non-zero quantization coefficient is present), the line determiner 361 generates information indicating that not all quantization coefficients are zeroes (non-zero quantization coefficient is present), supplies the generated information to each of the VLC encoder 362 and the maximum number of significant figures calculator 363 and proceeds to step S348.

In response to the information from the line determiner 361 indicating that not all quantization coefficients are zeroes, the VLC encoder 362 outputs (supplies) to the code multiplexer 369 in step S348 the code 1 indicating that not all quantization coefficients on the line to be encoded are zeros.

In response to the information from the line determiner 361 indicating that not all quantization coefficients are zeroes, the maximum number of significant figures calculator 363 sets a variable x to x=0 and stores the variable x=0 in step S349. The variable x represents an x coordinate on the line y corresponding to the quantization coefficients first input, from the w quantization coefficients to be encoded.

If the line y is the line L1 of FIG. 45, the variable x stored on the maximum number of significant figures calculator 363 indicates the x coordinate of the leftmost position (x,0) from among w positions (x,0), (x+1,0), . . . , (x+w−1,0) consecutively arranged on the line L1 to be encoded.

In step S349, the maximum number of significant figures calculator 363 sets a variable B to B=Binit and stores the variable B=Binit. The variable B indicates the maximum number of significant figures of the w quantization coefficients previously encoded. More specifically, the maximum number of significant figures calculator 363 updates the variable B to Binit, and stores the updated variable B=Binit.

Upon updating the variable B, the maximum number of significant figures calculator 363 supplies information indicating the updated variable B (maximum number of significant figures) to each of the VLC encoder 364 and the significant figure extractor 365. Each of the VLC encoder 364 and the significant figure extractor 365 stores the value of the variable B supplied from the maximum number of significant figures calculator 363.

In step S350, the entropy encoder 323 encodes a set of w quantization coefficients. The entropy encoding process of the set of w quantization coefficients will be described in detail later. In the entropy encoding process of the set of w quantization coefficients, the entropy encoder 323 encodes the w quantization coefficients consecutively arranged on the line y indicated by the variable y stored on the line determiner 361.

Let (x,y) represent the position on the line y identified by the variable y stored on the line determiner 361 and the variable x stored on the maximum number of significant figures calculator 363. The w consecutive positions on the line y are (x,y), (x+1,y), . . . , (x+w−1,y). More specifically, in the entropy encoding process of the set of w quantization coefficients, the entropy encoder 323 encodes the quantization coefficient at positions (x,y), (x+1,y), . . . , (x+w−1,y).

In step S351, the maximum number of significant figures calculator 363 determines whether there is an unprocessed quantization coefficient on the line y. More specifically, the maximum number of significant figures calculator 363 determines whether all quantization coefficients on the line y indicated by the variable y stored on the line determiner 361 are encoded.

If it is determined in step S351 that there is an unprocessed quantization coefficient on the line y, the maximum number of significant figures calculator 363 proceeds to step S352 to encode next w quantization coefficients.

In step S352, the maximum number of significant figures calculator 363 set the stored variable x to x=x+w, and returns to step S350. In step S350, the quantization coefficients at positions (x+w,y), (x+w+1,y), . . . , (x+2w−1,y) on the line y are encoded.

If it is determined in step S351 that there is no unprocessed quantization coefficient on the line y, all quantization coefficients on the positions on the line y are encoded. The maximum number of significant figures calculator 363 returns to step S346 to repeat step S346 and subsequent steps.

The entropy encoder 323 encodes the quantization coefficients at the predetermined positions of the sub band by the predetermined number at a time in the raster scan order.

The quantization coefficients at the positions in the sub band are encoded by the predetermined number at a time in the raster scan order. The quantization coefficients are thus processed in the order of input, and the delay involved in the encoding of the quantization coefficients is reduced.

Figure 50:
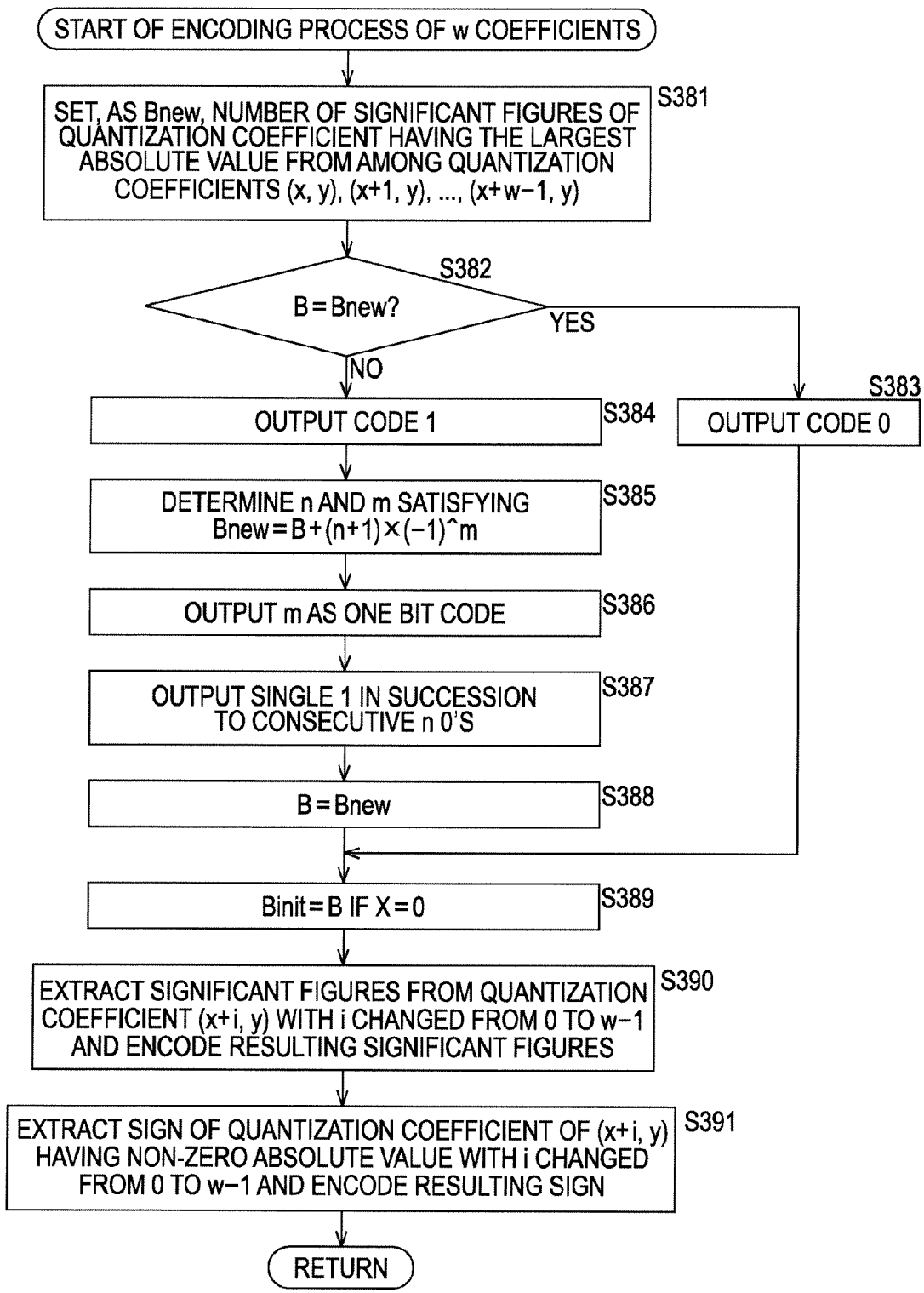
FIG. 50 is a flowchart illustrating an encoding process of a set of w coefficients.

The entropy encoding process of the set of w quantization coefficients corresponding to step S350 of FIG. 49 is described below with reference to a flowchart of FIG. 50.

In step S381, the maximum number of significant figures calculator 363 sets as a variable Bnew the maximum number of significant figures of w quantization coefficients to be encoded and stores the variable Bnew. The maximum number of significant figures is that of the quantization coefficient having the largest absolute value from among the quantization coefficients at the consecutive w positions $(x,y)$, $(x+1,y), \ldots, (x+w-1,y)$.

The maximum number of significant figures calculator 363 supplies the determined maximum number of significant figures of the w quantization coefficients, namely, the value of the variable Bnew to each of the VLC encoder 364 and the significant figure extractor 365.

If the quantization coefficients at the w consecutive positions are respectively the quantization coefficients "−0101," "+0011," "−0110" and "+0010" of FIG. 46, the quantization coefficient having the largest absolute value is "−0110" and "1" at the highest bit position of the quantization coefficient "−0110" is "3". The variable Bnew is thus 3.

In step S382, the VLC encoder 364 determines whether B is Bnew. More specifically, the VLC encoder 364 determines whether the value of the variable B indicating the maximum number of significant figures of the w quantization coefficients previously encoded and stored is equal to the variable Bnew indicating the maximum number of significant figures of the w quantization coefficients supplied from the maximum number of significant figures calculator 363 and to be encoded.

If it is determined in step S382 that B is Bnew, the VLC encoder 364 proceeds to step S383. The VLC encoder 364 outputs to the code multiplexer 369 the code 0 indicating that the maximum number of significant figures has not changed, as a code indicating the maximum number of significant figures of the w quantization coefficients to be encoded. Upon outputting the code 0 indicating the maximum number of significant figures, the VLC encoder 364 proceeds to step S389 with steps S384 through S388 skipped.

In contrast, if it is determined in step S382 that B is not Bnew, the VLC encoder 364 proceeds to step S384 (because the maximum number of significant figures has changed), and outputs to the code multiplexer 369 the code 1 indicating that the maximum number of significant figures has changed.

In step S385, the VLC encoder 364 determines integers n and m satisfying the following equation (14).

$$Bnew = B + (n+1) \times (-1)^m \qquad (14)$$

The symbol "^" represents power and $(-1)^m$ means $(-1)$ to the m-th power.

If Bnew=3 and B=0, n and m satisfying equation (14) are n=2 and m=3. In the comparison of the variable Bnew and the variable B, the larger the difference between the absolute value of the variable Bnew and the absolute value of the variable B, the larger the value of n becomes in equation (14). The value of n is thus considered to represent a variation in the maximum number of significant figures. When the value of the variable Bnew is greater than the value of the variable B, the value of m becomes zero. Conversely, if the value of the variable Bnew is smaller than the value of the variable B, the value of m becomes 1. The value of m in equation (14) indicates whether the maximum number of significant figures has increased or decreased.

In step S384, the VLC encoder 364 outputs to the code multiplexer 369 a one-bit code of m satisfying equation (14) as the code indicating whether the maximum number of significant figures has increased or decreased. If the value of m satisfying equation (14) is zero, the VLC encoder 364 outputs the code 0 indicating that the maximum number of significant figures has increased.

In step S387, the VLC encoder 364 outputs to the code multiplexer 369 a single piece of 1 in succession to n pieces of 0's, n satisfying equation (14), as the code indicating the magnitude of variation in the maximum number of significant figures. More specifically, the VLC encoder 364 outputs the n pieces of 0's and the single piece of 1 as the code indicating the magnitude of variation.

If the value of n satisfying equation (14) is 2, the VLC encoder 364 outputs to the code multiplexer 369 "001" as the code indicating the magnitude of variation in the maximum number of significant figures.

As the codes indicating the maximum number of significant figures of the w quantization coefficients to be encoded, the VLC encoder 364 outputs, to the code multiplexer 369, the code indicating that the maximum number of significant figures has changed, the code whether the maximum number of significant figures has increased or decreased, and the code indicating the magnitude of the maximum number of significant figures.

In step S388, the maximum number of significant figures calculator 363 sets the stored value of the variable B to be Bnew, and processing proceeds to step S389. More specifically, the maximum number of significant figures calculator 363 updates the stored variable B to the variable Bnew. The VLC encoder 364 and the significant figure extractor 365 also update the variable B to B=Bnew.

If the variable B is set to be B=Bnew in step S388, or if the code indicating the maximum number of significant figures of the quantization coefficients is output in step S383, the maximum number of significant figures calculator 363 sets in step S389 the stored variable Binit to be Binit=B with the stored variable x being zero.

More specifically, if the stored variable x is zero, the maximum number of significant figures calculator 363 updates the value of the variable Binit indicating the maximum number of significant figures of the w quantization coefficients on the line $(y-1)$ input first to the value of the variable B indicating the maximum number of significant figures of the w quantization coefficients previously encoded.

If the variable x=0, the variable Binit is set to be Binit=B in this way. The entropy encoding of the quantization coefficients is performed using the correlation between the w quantization coefficients of the next line (for example, line $(y+1)$) starting with x=0 and the maximum number of significant figures of the w quantization coefficients on the preceding line (for example, line y) starting with x=0.

In step S390, the significant figure extractor 365 varies a predetermined variable i from 0 to $(w-1)$, and extracts significant figures of the quantization coefficients from the quantization coefficients at position $(x+i,y)$ on the line y supplied from the quantizer 322. The significant figure extractor 365 supplies the extracted significant figure (data) of the quantization coefficients to each of the VLC encoder 366 and the sign extractor 367. In response to the significant figure supplied from the significant figure extractor 365 (and by encoding the significant figure), the VLC encoder 366 outputs to the code multiplexer 369 the code indicating the absolute values of the w quantization coefficients.

The value of x in the position $(x+i,y)$ is the value of the variable x stored on the maximum number of significant figures calculator 363. If the variable x stored on the maximum number of significant figures calculator 363 is zero, if the value of the variable B stored on the significant figure extractor 365 is 3, and if the significant figure extractor 365 receives from the quantizer 322 the four w (four) quantization coefficients "−0101," "+0011," "−0110" and "+0010" of FIG. 46 at the positions (x+i,y) (0≦i≦3), namely, positions (0,y), (1,y), (2,y) and (3,y), the significant figure extractor 365 extracts the significant figure from these quantization coefficients.

In this case, the variable B stored on the significant figure extractor 365 is 3, and the number of significant figures is 3. The three significant figures "101" from the least significant bit is extracted from the quantization coefficient "−0101" corresponding to the position (x,y).

Similarly, the significant figure extractor 365 successively extracts three-significant-figure values from the least significant bit, namely, "011," "110" and "010" from the quantization coefficients "+0011," "−0110," "+0010" at the positions (x+1,y), (x+2,y) and (x+3,y). The significant figure extractor 365 outputs to each of the VLC encoder 366 and the sign extractor 367 (the codes of) the significant figures "101," "011," "110" and "010" of the quantization coefficients "−0101," "+0011," "−0110," "+0010." The VLC encoder 366 encodes the codes "101," "011," "110" and "010" supplied from the significant figure extractor 365 and then outputs to the code multiplexer 369 a code "101011110010" indicating the absolute values of the w (four) quantization coefficients.

In step S391, with a predetermined variable i changed from 0 to (w−1), the sign extractor 367 extracts the signs of the quantization coefficients at the positions (x+i,y) on the line y having non-zero absolute value supplied from the quantizer 322. The sign extractor 367 supplies (data of) the extracted signs to the VLC encoder 368. The VLC encoder 368 encodes the signs from the sign extractor 367 and outputs to the code multiplexer 369 a resulting code indicating the signs of the quantization coefficients.

Upon receiving the code indicating the signs of the quantization coefficients from the VLC encoder 368, the code multiplexer 369 multiplexes the code indicating whether all quantization coefficients of the line are zeroes, the code indicating the maximum number of significant figures of the quantization coefficients, the code indicating the absolute values of the quantization coefficients, and the code indicating the signs of the quantization coefficients, respectively supplied from the VLC encoder 362, the VLC encoder 364, the VLC encoder 366 and the VLC encoder 368, and outputs the multiplexed codes as an encoded image. The code multiplexer 369 ends the encoding process of the w quantization coefficients, and returns to step S350 of FIG. 49 to perform step S351 and subsequent steps.

The value of x in the position (x+i,y) is the value of the variable x stored on the maximum number of significant figures calculator 363. If the variable x stored on the maximum number of significant figures calculator 363 is zero, and if the sign extractor 367 receives from the quantizer 322 the four w (four) quantization coefficients "−0101," "+0011," "−0110" and "+0010" of FIG. 46 at the positions (x+i,y) (0≦i≦3), namely, positions (0,y), (1,y), (2,y) and (3,y), the sign extractor 367 extracts the signs from these quantization coefficients.

The sign extractor 367 extracts a sign "−" from the quantization coefficient "−0101" at the position (x,y).

Similarly, the sign extractor 367 extracts signs "+," "−" and "+" from the quantization coefficients "+0011," "−0110" and "+0010" at the positions (x+1,y), (x+2,y) and (x+3,6), respectively. The sign extractor 367 outputs to the VLC encoder 368 the signs "−," "+," "−" and "+" of the quantization coefficients "−0101," "+0011," "−0110" and "+0010." The VLC encoder 368 encodes the signs "−," "+," "−" and "+" of the quantization coefficients supplied from the sign extractor 367.

For example, the VLC encoder 368 outputs the code 1 in response to the input of the sign "−," and outputs the code 0 in response to the input of the sign "+," thereby encoding the input signs. Upon receiving the signs "−," "+," "−" and "+" of the quantization coefficients, the VLC encoder 368 outputs to the code multiplexer 369 a code "1010" indicating the signs of the quantization coefficients. The code 1010 contains codes "1," "0," "1" and "0."

The entropy encoder 323 encodes the quantization coefficients of the sub band by the predetermined number at a time, and outputs the code indicating the maximum number of significant figures of the quantization coefficients, the code indicating the absolute values of the quantization coefficients, and the code indicating the signs of the quantization coefficients.

Unlike the encoding of the image in accordance with JPEG2000 standard, the encoding of the quantization coefficients of the sub band by the predetermined number at a time is free from the necessity that a plurality of processes is performed on each bit plane based on a plurality of coding paths. Since variable length coding is performed, an amount of encoding process is substantially reduced. This arrangement allows the image to be encoded at a high speed. A low-cost encoding apparatus encoding a high-definition image on a real-time basis is thus provided.

Since the intra encoder 311 is free from encoding the length of codes in a distinct way during encoding of images, an amount of codes is reduced, and management of information relating to the length of the codes is not necessary.

In the above discussion, the number of significant figures of the quantization coefficient having the largest absolute value from among the w quantization coefficients is the variable Bnew representing the maximum number of significant figures. The value of the variable Bnew may be simply greater than the number of significant figures of the quantization coefficient having the largest absolute value from among the w quantization coefficients. If the variable Bnew is large, an amount of code representing the absolute value of the quantization coefficient increases. By setting the variable Bnew to be a value equal to or greater than the number of significant figures of the quantization coefficient having the largest absolute value, the amount of code indicating the maximum number of significant figures of the quantization coefficient is decreased.

The intra decoding process for decoding the image encoded by the intra encoder 311 is described below.

Figure 51:
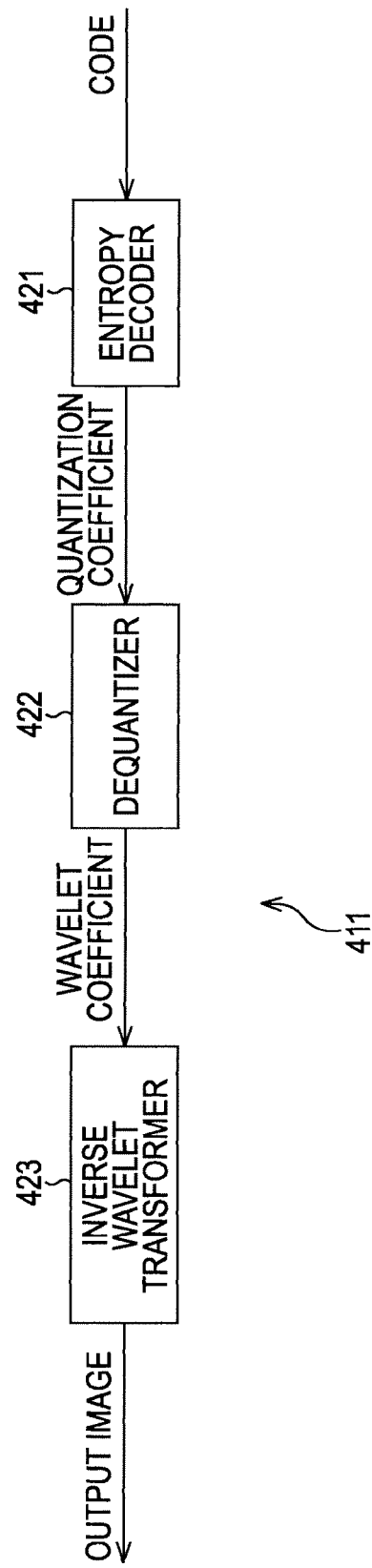
FIG. 51 is a block diagram illustrating the structure of an image decoding apparatus.

FIG. 51 is a block diagram illustrating the structure of the intra decoder.

The intra decoder 411 includes an entropy decoder 421, a dequantizer 422, and an inverse wavelet transformer 423. The entropy decoder 421 receives the encoded image (data).

The entropy decoder 421 entropy decodes the code as an input encoded image, and supplies to the dequantizer 422 the inverse quantization coefficient obtained as a result of decoding.

The dequantizer 422 dequantizes the dequantization coefficient supplied from the entropy decoder 421, and supplies to the inverse wavelet transformer 423 a wavelet coefficient of each sub band obtained as result of dequantization.

The inverse wavelet transformer 423 inverse wavelet transforms the wavelet coefficients of each sub band supplied from the dequantizer 422, and outputs the resulting image as a decoded image.

Figure 52:
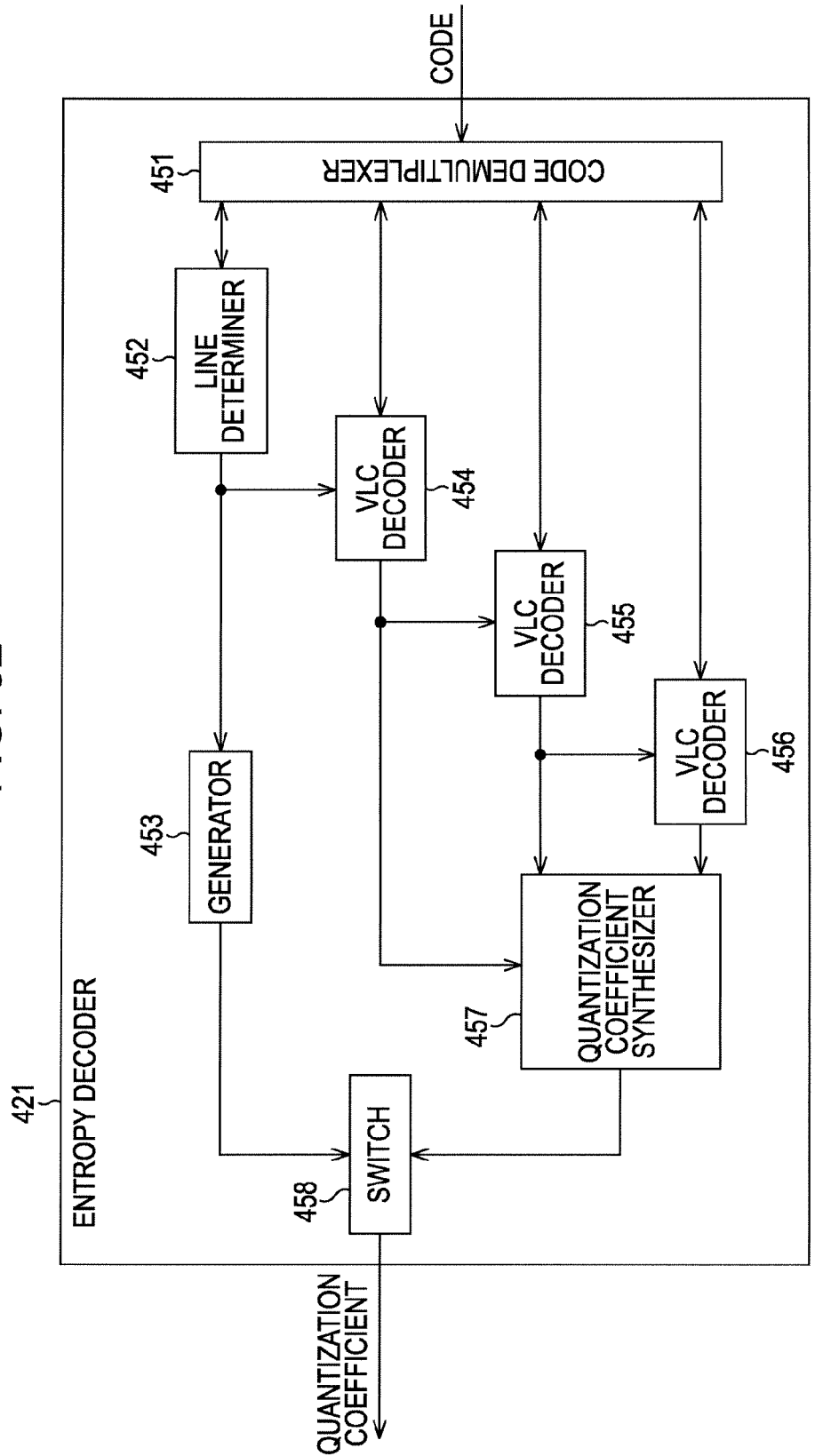
FIG. 52 is a block diagram illustrating the structure an entropy decoder.

FIG. 52 illustrates a detailed structure of the entropy decoder 421 in the intra decoder 411 performing the above-described process.

The entropy decoder 421 includes a code demultiplexer 451, a line determiner 452, a generator 453, a VLC decoder 454, a VLC decoder 455, a VLC decoder 456, a quantizing coefficient synthesizer 457 and a switch 458.

In response to information supplied from the line determiner 452, the VLC decoder 454, the VLC decoder 455, and the VLC decoder 456, the code demultiplexer 451 demultiplexes the code input as the encoded image, and then supplies codes demultiplexed and having predetermined lengths to the line determiner 452, the VLC decoder 454, the VLC decoder 455 and the VLC decoder 456.

More specifically, the code demultiplexer 451 demultiplexes the input code into the code indicating whether all quantization coefficients of the encoded one line are zeroes, the code indicating the maximum number of significant figures of the w quantization coefficients encoded, the code indicating the absolute values of the w quantization coefficients encoded, and the code indicating the signs of the quantization coefficients encoded, and then supplies the codes to the line determiner 452, the VLC decoder 454, the VLC decoder 455 and the VLC decoder 456.

In response to the code supplied from the code demultiplexer 451, the line determiner 452 determines whether all quantization coefficients of the one line of the encoded sub band are zeroes, and supplies information indicating the determination results to each of the code demultiplexer 451, the generator 453 and the VLC decoder 454.

In response to the information indicating the determination results from the line determiner 452, the generator 453 generates a code indicating the quantization coefficients, namely, one of 0's, and supplies the code to the switch 458.

The VLC decoder 454 decodes the code indicating the maximum number of significant figures of the w quantization coefficients encoded and supplied from the code demultiplexer 451, thereby determining the maximum number of significant figures of the w encoded quantization coefficients. The VLC decoder 454 supplies information indicating the determined maximum number of significant figures to each of the code demultiplexer 451, the VLC decoder 455 and the quantizing coefficient synthesizer 457.

In response to the information indicating the maximum number of significant figures from the VLC decoder 454, the VLC decoder 455 decodes the code indicating the absolute values of the quantization coefficients supplied from the code demultiplexer 451, and supplies (data of) the resulting number of significant figures of the w quantization coefficients to each of the VLC decoder 456 and the quantizing coefficient synthesizer 457. The VLC decoder 455 supplies, to the code demultiplexer 451, information indicating the decoding results of the code of the absolute values of the quantization coefficients.

In response to the number of significant figures of the quantization coefficients supplied from the VLC decoder 455, the VLC decoder 456 decodes the code indicating the signs of the quantization coefficients supplied from the code demultiplexer 451, and supplies (data of) the signs of the quantization coefficients to the quantizing coefficient synthesizer 457. The VLC decoder 456 supplies information regarding the decoding results indicating the signs of the quantization coefficients to the code demultiplexer 451.

In response to the information indicating the maximum number of significant figures from the VLC decoder 454, the quantizing coefficient synthesizer 457 synthesizes the number of significant figures supplied from the VLC decoder 455 and the signs of the quantization coefficients supplied from the VLC decoder 456, and supplies the resulting w quantization coefficients to the switch 458.

The switch 458 outputs the quantization coefficients from one of the generator 453 and the quantizing coefficient synthesizer 457.

Figure 53:
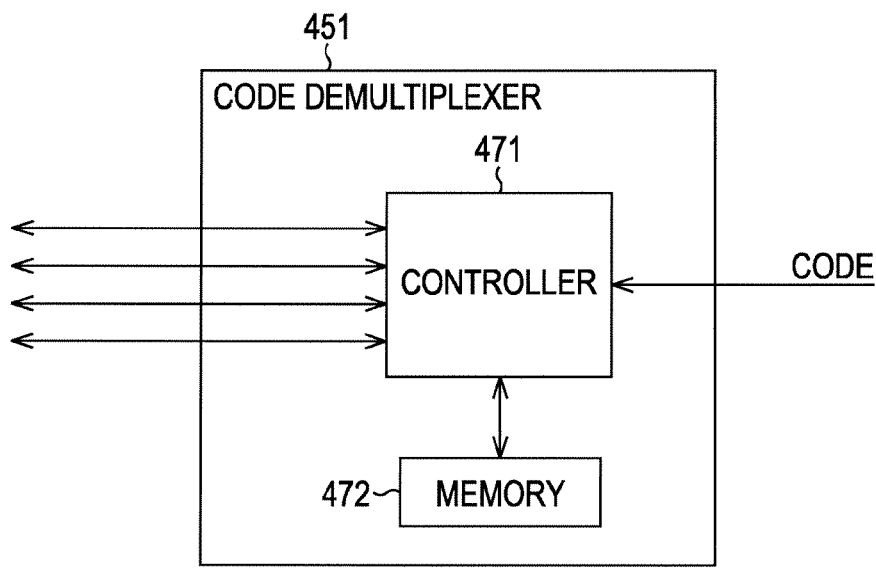
FIG. 53 is a block diagram illustrating the structure of a code demultiplexer.

FIG. 53 is a block diagram illustrating the structure of the code demultiplexer 451.

The code demultiplexer 451 includes a controller 471 and a memory 472. Upon receiving the code as the encoded image, the controller 471 supplies the code to the memory 472 for temporary storage.

In response to the respective pieces of information supplied from the line determiner 452, the VLC decoder 454, the VLC decoder 455 and the VLC decoder 456 shown in FIG. 52, the controller 471 reads a code of a predetermined length out of the codes temporarily stored on the memory 472, and supplies the read code to each of the line determiner 452, the VLC decoder 454, the VLC decoder 455 and the VLC decoder 456.

Figure 54:
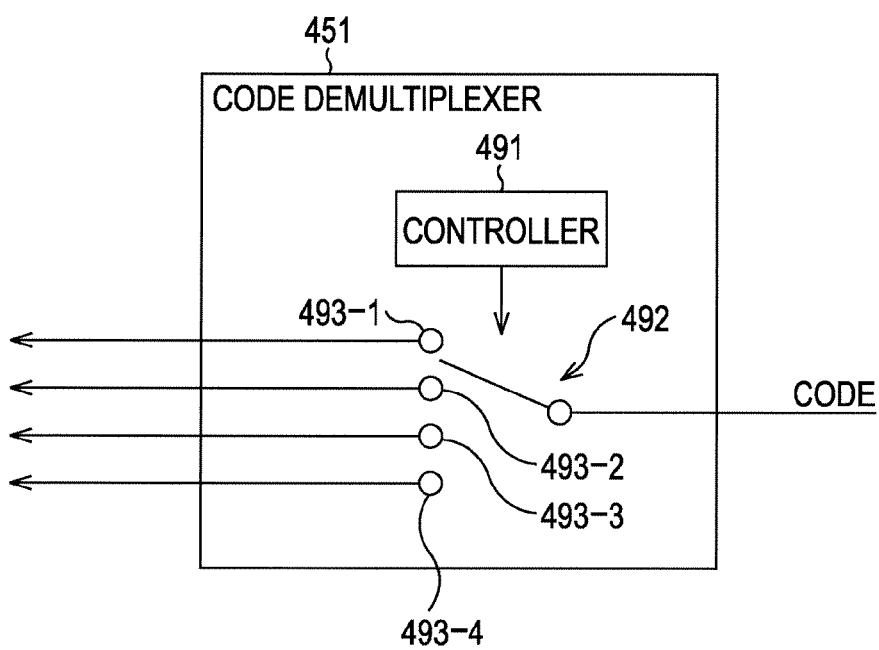
FIG. 54 is a block diagram illustrating the structure of another code demultiplexer.

The code demultiplexer 451 may have a structure of FIG. 54 instead of the structure of FIG. 53.

The code demultiplexer 451 of FIG. 54 includes a controller 491, a switch 492, and nodes 493-1 through 493-4.

Upon receiving the code as the encoded image, the controller 491 controls the switch 492 in response to the respective pieces of information supplied from the line determiner 452, the VLC decoder 454, the VLC decoder 455 and the VLC decoder 456 shown in FIG. 52. The code of a predetermined length, out of the input codes, is thus supplied to one of the line determiner 452, the VLC decoder 454, the VLC decoder 455 and the VLC decoder 456.

The nodes 493-1 through 493-4 are respectively connected to the line determiner 452, the VLC decoder 454, the VLC decoder 455 and the VLC decoder 456. The controller 491 selects one of the nodes 493-1 through 493-4, thereby connecting the switch 492 to the selected node.

Since the switch 492 connects the input thereof to the node selected under the control of the controller 491, the code input to the code demultiplexer 451 is supplied to one of the line determiner 452, the VLC decoder 454, the VLC decoder 455 and the VLC decoder 456 as a destination of the code via the switch 492 and the node connected to the switch 492.

The decoding process of the intra decoder 411 is described below with reference to a flowchart of FIG. 55. The decoding process starts when the code as the encoded image is input to the entropy decoder 421.

In step S431, the entropy decoder 421 performs the entropy decoding process, thereby decoding the code as the encoded image. The resulting quantization coefficient is supplied to the dequantizer 422. The entropy decoding process will be described in detail later. In the entropy decoding process, the entropy decoder 421 decodes the quantization coefficients consecutively arranged on a line of the encoded sub band by w coefficients at a time, and supplies the decoded quantization coefficients to the dequantizer 422.

In step S432, the dequantizer 422 dequantizes the quantization coefficients supplied from the entropy decoder 421, and supplies the wavelet coefficients of the sub band obtained as a result of dequantization to the inverse wavelet transformer 423.

In step S433, the inverse wavelet transformer 423 inverse wavelet transforms the wavelet coefficients of each sub band supplied from the dequantizer 422 and outputs a resulting image. The decoding process thus ends.

The intra decoder 411 thus decodes the encoded image and outputs the resulting image.

Figure 55:
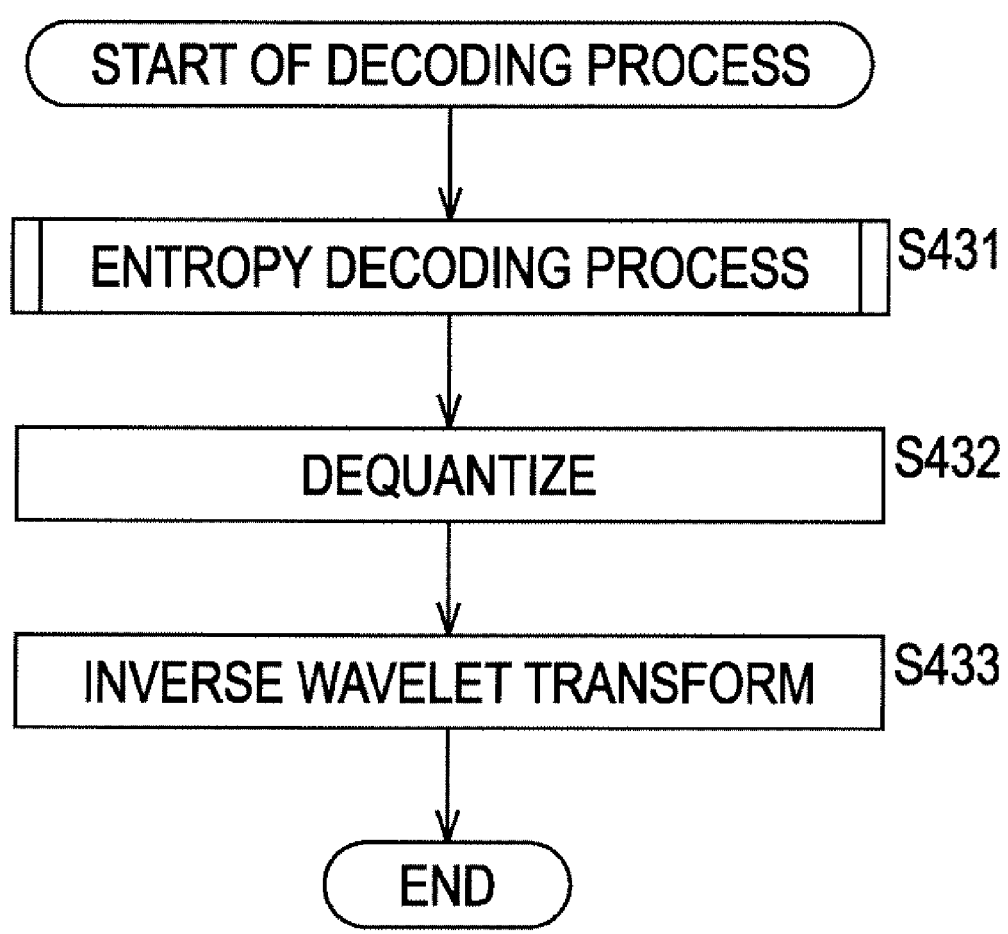
FIG. 55 is a flowchart illustrating a decoding process.

The entropy decoding process corresponding to step S431 of FIG. 55 is described below with reference to a flowchart of FIG. 56.

In step S461, the line determiner 452 sets the variable y indicating the line of the sub band to be decoded to be y=0, and stores the variable y=0.

In step S462, the VLC decoder 454 sets the variable Binit to be Binit=0 and stores the variable Binit=0. The variable Binit indicates the maximum number of significant figures of the w quantization coefficients first input on a line (y−1) preceding by one line the line y indicated by the variable y stored on the line determiner 452.

If the line (y−1) is the line L1 of FIG. 45, the variable Binit indicating the maximum number of significant figures of the w quantization coefficients first input on the line (y−1) is the maximum number of significant figures of the w quantization coefficients from the leftmost end of the line L1. If the variable y stored on the line determiner 452 is y=0, the line (y−1) doest no exist. The variable Binit is Binit=0.

In step S462, the code demultiplexer 451 supplies, to the line determiner 452, the code of a first one bit out of the input codes as a code indicating whether all quantization coefficients on the line to be decoded are zeroes.

In step S463, the line determiner 452 determines whether the code of the one bit read (supplied) from the code demultiplexer 451 is 0, generates information regarding the determination results and supplied the generated information to each of the generator 453, the VLC decoder 454 and the code demultiplexer 451.

If it is determined in step S463 that the code is 0, all quantization coefficients on the line y are 0's, the line determiner 452 processing proceeds to step S464. In step S464, the generator 453 sets all quantization coefficients to 0's based on the information regarding the determination results from the line determiner 452. The generator 453 generates the code indicating the quantization coefficients on the line y and supplies the generated code to the switch 458.

If a single quantization coefficient is expressed in a four bit number and the number of quantization coefficients on one line is five as shown in FIG. 46, the generator 453 generates twenty (=4×5) 0's as a code indicating the quantization coefficients on the line y, and supplies the generated code to the switch 458. The switch 458 outputs, to the dequantizer 422, consecutive twenty 0's supplied from the generator 453 as a code indicating the quantization coefficients on one line.

In step S465, the VLC decoder 454 updates the stored variable Binit to Binit=0 in response to the information regarding the determination results from the line determiner 452.

In step S466, the line determiner 452 determines whether there is an unprocessed line in the lines of the sub band to be decoded. More specifically, the line determiner 452 determines the quantization coefficients at the positions on all lines of the sub band to be decoded are decoded.

If it is determined in step S466 that an unprocessed line is contained, the line determiner 452 processing proceeds to step S467 in order decode the quantization coefficients at the positions on the line (y+1) subsequent to the line y indicated by the variable y stored on the line determiner 452.

In step S467, the line determiner 452 increments the variable y indicating the stored line to y=y+1, and returns to step S463 to repeat step S463 and subsequent steps.

If it is determined in step S466 that no unprocessed line is contained, the quantization coefficients on all lines forming the sub band have been decoded. The line determiner 452 ends the decoding process. Processing returns to step S431 of FIG. 55 to perform step S432 and subsequent step.

Figure 56:
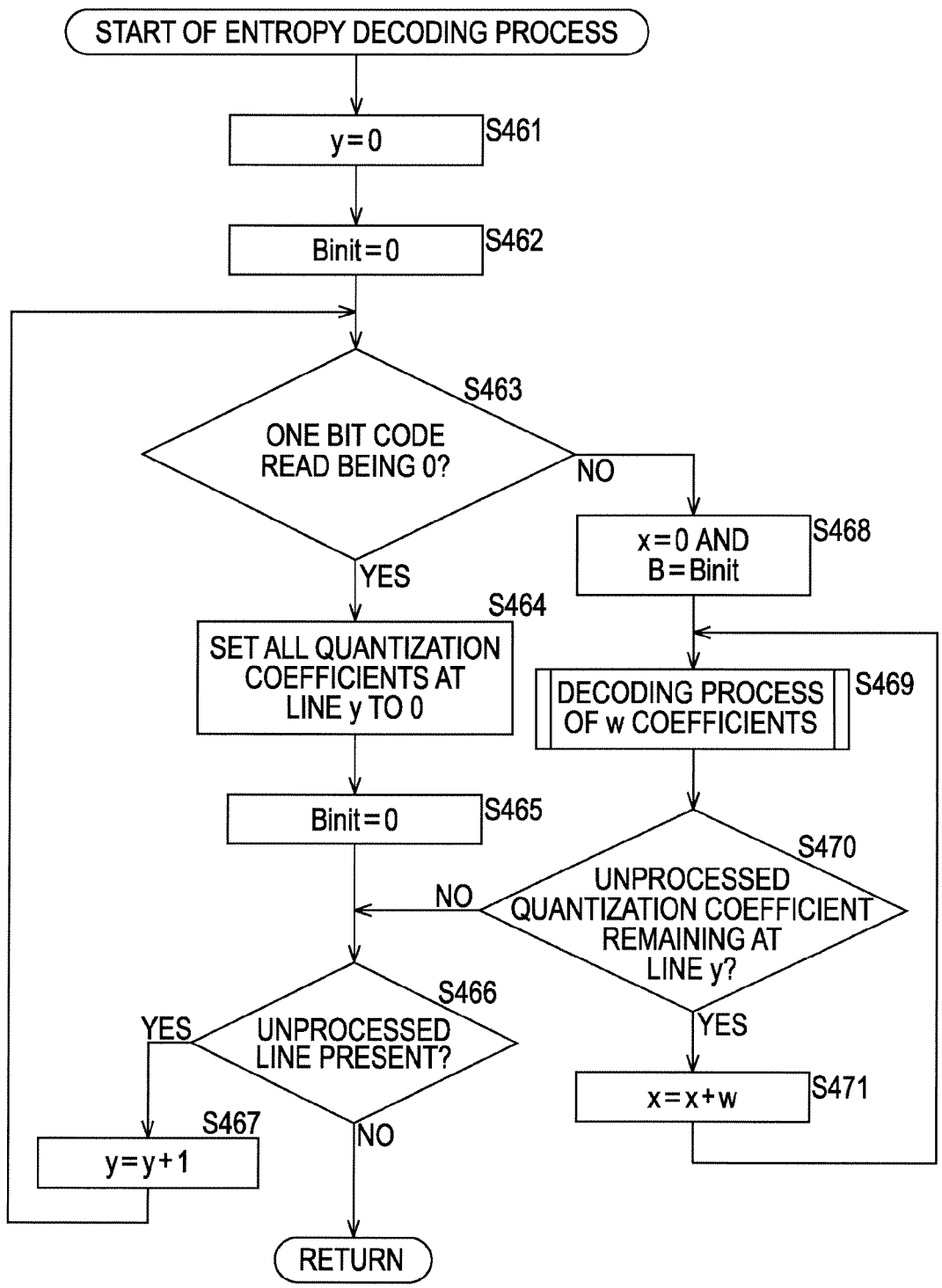
FIG. 56 is a flowchart illustrating an entropy decoding process.

If it is determined in step S463 of FIG. 56 that the code is non-zero, the line determiner 452 processing proceeds to step S468. In step S468, the VLC decoder 454 sets the variable x to x=0 based on the information indicating the determination results from the line determiner 452 and stores the variable x=0. The variable x indicates the x coordinate of each position on the line y corresponding to the quantization coefficients first input from among the w quantization coefficients to be decoded.

In step S468, the VLC decoder 454 sets the variable B indicating the maximum number of significant figures of the w quantization coefficients previously decoded to be B=Binit and then stores the variable B=Binit. More specifically, the VLC decoder 454 updates the value of the stored variable B to the variable Binit and stores the updated value of the variable B.

In step S468, the code demultiplexer 451 supplies to the VLC decoder 454 a one-bit code subsequent to the input code based on the information indicating the determination results from the line determiner 452 as a code indicating whether the maximum number of significant figures of the w quantization coefficients to be decoded.

In step S469, the entropy decoder 421 performs the decoding process of a set of w quantization coefficient. The decoding process of the set of w quantization coefficients will be described later more in detail. In the decoding process of the set of w quantization coefficients, the entropy decoder 421 decodes the quantization coefficients at consecutive w positions on the line y indicated by the variable y stored on the line determiner 452.

In step S470, the VLC decoder 454 determines whether there is an unprocessed quantization coefficient on the line y. More specifically, the VLC decoder 454 determines whether all quantization coefficients on the line y indicated by the variable y stored the line determiner 452.

If it is determined in step S470 that there is an unprocessed quantization coefficient on the line y, next w quantization coefficients are to be decoded. The VLC decoder 454 processing proceeds to step S471.

In step S471, the VLC decoder 454 returns to step S469 with the stored variable x set to be x=x+w. In step S469, the quantization coefficients at positions (x+w,y), (x+w+1,y), . . . , (x+2w−1,y) on the line y are decoded.

If it is determined in step S470 that there is no unprocessed quantization coefficient on the line y, the quantization coefficients at all positions on the line y are decoded. The VLC decoder 454 returns to step S466 to repeat step S466 and subsequent steps.

The entropy decoder 421 decodes the quantization coefficients at the positions of the sub band by the predetermined number at a time in the raster scan order.

By decoding the quantization coefficients at the positions of the sub band by the predetermined number at a time in the raster scan order, the encoded quantization coefficients are processed in the order of input. This arrangement reduces the delay involved in the decoding of the quantization coefficients.

The decoding process of the set of w quantization coefficients corresponding to step S469 of FIG. 56 is described below with reference to a flowchart of FIG. 57.

As previously discussed, the VLC decoder 454 receives from the code demultiplexer 451 in step S468 of FIG. 56 the one-bit code indicating whether the maximum number of significant figures of the w quantization coefficients to be decoded has changed.

Figure 57:
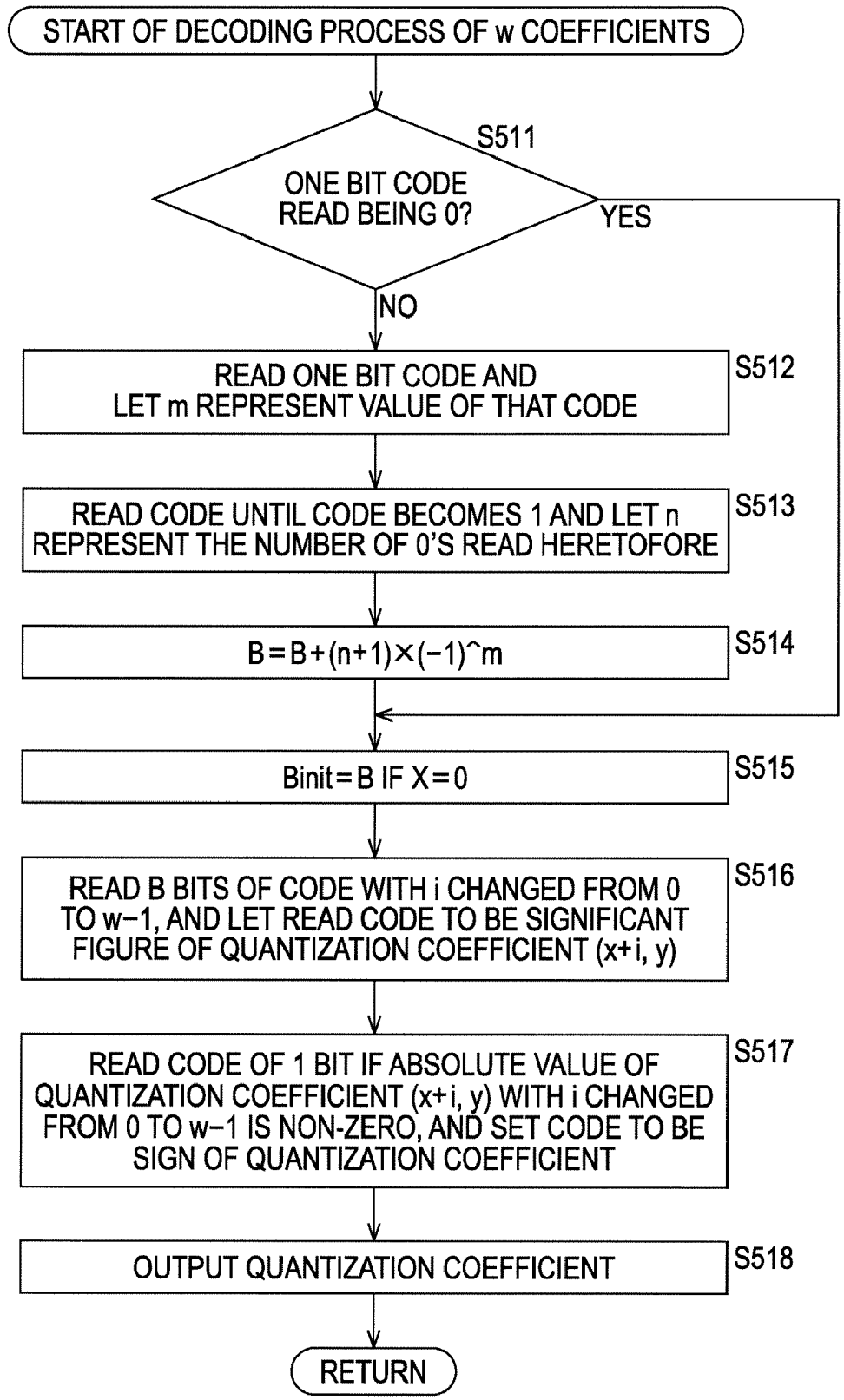
FIG. 57 is a flowchart illustrating a decoding process of a set of w coefficients.

In step S511 of FIG. 57, the VLC decoder 454 determines whether the read (supplied) one-bit code is 0.

If it is determined in step S511 that the read code is 0, the maximum number of significant figures has not changed. The VLC decoder 454 generates information indicating that the maximum number of significant figures has not changed, and supplies the generated information to each of the code demultiplexer 451, the VLC decoder 455 and the quantizing coefficient synthesizer 457. Processing proceeds to step S515 with steps S512 through S514 skipped.

If the code indicating whether the maximum number of significant figures has changed is 0, the one-bit code 0 indicating whether the maximum number of significant figures has changed is followed by the code indicating the absolute values of the quantization coefficients as described with reference to FIG. 46 rather than by the code indicating whether the maximum number of significant figures has increased or decreased, and the code indicating the magnitude of variation in the maximum number of significant figures. For this reason, steps S512 through S514 for decoding the code indicating whether the maximum number of significant figures has increased or decreased, and the code indicating the magnitude of variation in the maximum number of significant figures are skipped.

If it is determined in step S511 that the read one-bit code is not 0, the maximum number of significant figures has changed. The VLC decoder 454 proceeds to step S512 and reads a one-bit code from the code demultiplexer 451 and stores the value of that code as a predetermined variable m.

In step S513, the VLC decoder 454 reads the code until the code becomes 1 (until the code 1 has been read), and stores the number of 0's read heretofore as a predetermined variable n. For example, if the third code the VLC decoder 454 has read from the code demultiplexer 451 is 1, in other words, the VLC decoder 454 has read the code "001," the number of 0's read before the VLC decoder 454 reads the code 1 is 2. The VLC decoder 454 stores the number of read 0's, namely, 2 as the value of the variable n.

In step S514, the VLC decoder 454 determines the value of variable B indicating the maximum number of significant figures from the following equation (15), and stores the determined value of the variable B.

$$B = B + (n+1)x(-1)\hat{m} \qquad (15)$$

The left side of equation (15) represents the value of the variable B newly determined, and the right side of equation (15) represents the value of the stored variable B. The symbol "^", represents power, and thus $(-1)\hat{\ }m$ means $(-1)$ to the m-th power.

In accordance with the stored variable B, variable m and variable n, the VLC decoder 454 updates the variable B calculated in accordance with equation (15) and then stored. Upon updating the variable B indicating the maximum number of significant figures, the VLC decoder 454 generates information indicating the updated maximum number of significant figures. The VLC decoder 454 then supplies the generated information to each of the code demultiplexer 451, the VLC decoder 455 and the quantizing coefficient synthesizer 457.

If the new maximum number of significant figures is determined in step S514, or if it is determined in step S511 that the read one-bit code is 0, the VLC decoder 454 processing proceeds to step S515. If the value of the stored variable x is 0, the value of the stored variable Binit is set to be Binit=B.

If the value of the stored variable x is 0, the VLC decoder 454 updates the variable Binit to the value of the variable B. The variable Binit indicates the maximum number of significant figures of the w quantization coefficients first input on the stored line (y−1), and the variable B indicates the maximum number of significant figures of the w quantization coefficients to be decoded.

If the variable x=0, the variable Binit is set to be Binit=B in this way. The entropy decoding of the quantization coefficients is performed using the correlation between the w quantization coefficients of the next line (for example, line (y+1)) starting with x=0 and the maximum number of significant figures of the w quantization coefficients on the preceding line (for example, line y) starting with x=0.

In step S516, the VLC decoder 455 reads, from the code demultiplexer 451, the codes by B bits with a predetermined variable i changed from 0 to (w−1). The VLC decoder 455 supplies (outputs) to each of the VLC decoder 456 and the quantizing coefficient synthesizer 457 the read B bit code as a code indicating the significant figures of the quantization coefficients at the position (x+i,y) on the line y. The VLC decoder 455 generates information indicating the significant figures of the quantization coefficients and supplies the generated information to the code demultiplexer 451.

The value of x in the position (x+i,y) is the value of the variable x stored on the VLC decoder 454. If the variable x stored on the VLC decoder 454 is zero, and if the value of the variable B stored on the VLC decoder 455 is 3, the VLC decoder 455 reads the 3 bit code from the code demultiplexer 451 with the variable i=1, and then outputs the read 3-bit code as a significant figure of the quantization coefficient at the position (0,y).

The VLC decoder 455 reads from the code demultiplexer 451 another 3-bit code with the variable i=1, and outputs that code as the significant figure of the quantization coefficient at the position (1,y). The VLC decoder 455 reads from the code demultiplexer 451 another 3-bit code with the variable i=2, and outputs that code as the significant figure of the quantization coefficient at the position (2,y). Furthermore, the VLC decoder 455 reads from the code demultiplexer 451 yet another 3-bit code with the variable i=3, and outputs that code as the significant figure of the quantization coefficient at the position (3,y).

In step S517, the VLC decoder 456 reads 1-bit code from the code demultiplexer 451 if the significant figure (absolute value) of the quantization coefficient at the position (x+i,y) on the line y with the variable i changed from 0 to (w−1). The VLC decoder 456 decodes the read code, and then supplies (outputs) the resulting code as a sign of the quantization coefficient to the quantizing coefficient synthesizer 457. The VLC decoder 456 generates information indicating the sign of the quantization coefficient and supplies the generated information to the code demultiplexer 451.

The value of x in the position (x+i,y) is the value of the variable x stored on the VLC decoder 454. If the variable x stored on the VLC decoder 454 is zero, and if the VLC decoder 456 receives from the VLC decoder 455 (a code indicating) a non-zero significant figure, the VLC decoder 456 reads a 1-bit code from the code demultiplexer 451 with the variable i=0. If that code is 0, the VLC decoder 456 supplies to the quantizing coefficient synthesizer 457 a code indicating the sign "−" a of the quantization coefficient at the position (0,y). If the read code is 1, the VLC decoder 456 supplies to the quantizing coefficient synthesizer 457 a code indicating the sign "+" of the quantization coefficient at the position (0,y).

If the absolute value of (the code indicating) the significant figure supplied from the VLC decoder 455 is 0, there is no sign of the quantization coefficient at the position (0,y). The VLC decoder 456 does not read the code from the code demultiplexer 451.

Similarly, if the absolute value of (the code indicating) the significant figure supplied next from the VLC decoder 455 is non-zero, the VLC decoder 456 reads a 1-bit code from the code demultiplexer 451 with the variable i=1. If that read code is 0, the VLC decoder 456 supplies to the quantizing coefficient synthesizer 457 a code indicating the sign "−." If that code is 1, the VLC decoder 456 supplies to the quantizing coefficient synthesizer 457 a code indicating the sign "+."

If the significant figure supplied next from the VLC decoder 455 is non-zero, the VLC decoder 456 reads a 1-bit code from the code demultiplexer 451 with the variable i=2. If that code is 0, the VLC decoder 456 supplies to the quantizing coefficient synthesizer 457 a code indicating the sign "−." If that code is 1, the VLC decoder 456 supplies to the quantizing coefficient synthesizer 457 a code indicating the sign "+." If the significant figure supplied next from the VLC decoder 455 is non-zero, the VLC decoder 456 reads a 1-bit code from the code demultiplexer 451 with the variable i=3. If that code is 0, the VLC decoder 456 supplies to the quantizing coefficient synthesizer 457 a code indicating the sign "−." If that code is 1, the VLC decoder 456 supplies to the quantizing coefficient synthesizer 457 a code indicating the sign "+."

In step S518, the quantizing coefficient synthesizer 457 synthesizes the significant figure supplied from the VLC decoder 455 and the sign supplied from the VLC decoder 455, and supplies the resulting quantization coefficient to the dequantizer 422 via the switch 458. The decoding process of the set of w quantization coefficients is thus completed. Processing returns to step S469 of FIG. 56 to perform step S470 and subsequent steps.

The number of significant figures of the absolute value of the quantization coefficient to be output is preset. If the number of significant figures of the absolute value of the quantization coefficient to be output is 4, and if the maximum number of significant figures indicated by the information from the VLC decoder 454 is 3, the VLC decoder 455 may supply the significant figure "101" and the code indicating the sign "−.". The quantizing coefficient synthesizer 457 outputs "−0101."

The number of figures of the absolute value of the quantization coefficient is 4, and the significant figure is "101" (3 bits). The quantizing coefficient synthesizer 457 adds an upper bit of 0 on the highest bit of the significant figure "101" to make the four bits of absolute value of the quantization coefficient, namely "0101." The quantizing coefficient synthesizer 457 outputs "−0101" as the quantization coefficient by synthesizing the sign "−" of the quantization coefficient and the absolute value of the quantization coefficient "0101."

If the significant figure supplied from the VLC decoder 455 is 0, the quantizing coefficient synthesizer 457 outputs a quantization coefficient without sign. For example, the number of figures of the quantization coefficient to be output might be 4, and the maximum number of significant figures indicated by the information from the VLC decoder 454 might be 3. When the significant figure "000" is supplied from the VLC decoder 455, the quantizing coefficient synthesizer 457 outputs a quantization coefficient "0000."

The entropy decoder 421 decodes the quantization coefficients of the encoded sub band by the predetermined number at a time.

Unlike the decoding of the image in accordance with JPEG2000 standard, the decoding of the quantization coefficients of the sub band by the predetermined number at a time is free from the necessity that a plurality of processes is performed on each bit plane based on a plurality of coding paths. Since variable length coding is performed, an amount of decoding process is substantially reduced. This arrangement allows the image to be decoded at a high speed. A low-cost decoding apparatus decoding a high-definition image on a real-time basis is thus provided.

The above-referenced intra encoder 311 (or intra decoder 411) encodes the absolute values of the predetermined w quantization coefficients when the absolute values of the quantization coefficients are encoded (decoded). The w quantization coefficients can be encoded (decoded) in parallel (concurrently) using SIMD (Single Instruction Multiple Data) instructions typically used in a general-purpose DSP (Digital Signal Processor) or a general-purpose CPU. Images can thus be encoded (decoded) at high speed.

As examples of SIMD instructions, MMX (Multimedia extension), SSE (Streaming SIMD Extension), SSE2, and SSE3 are available from Intel Corporation.

Figure 58:
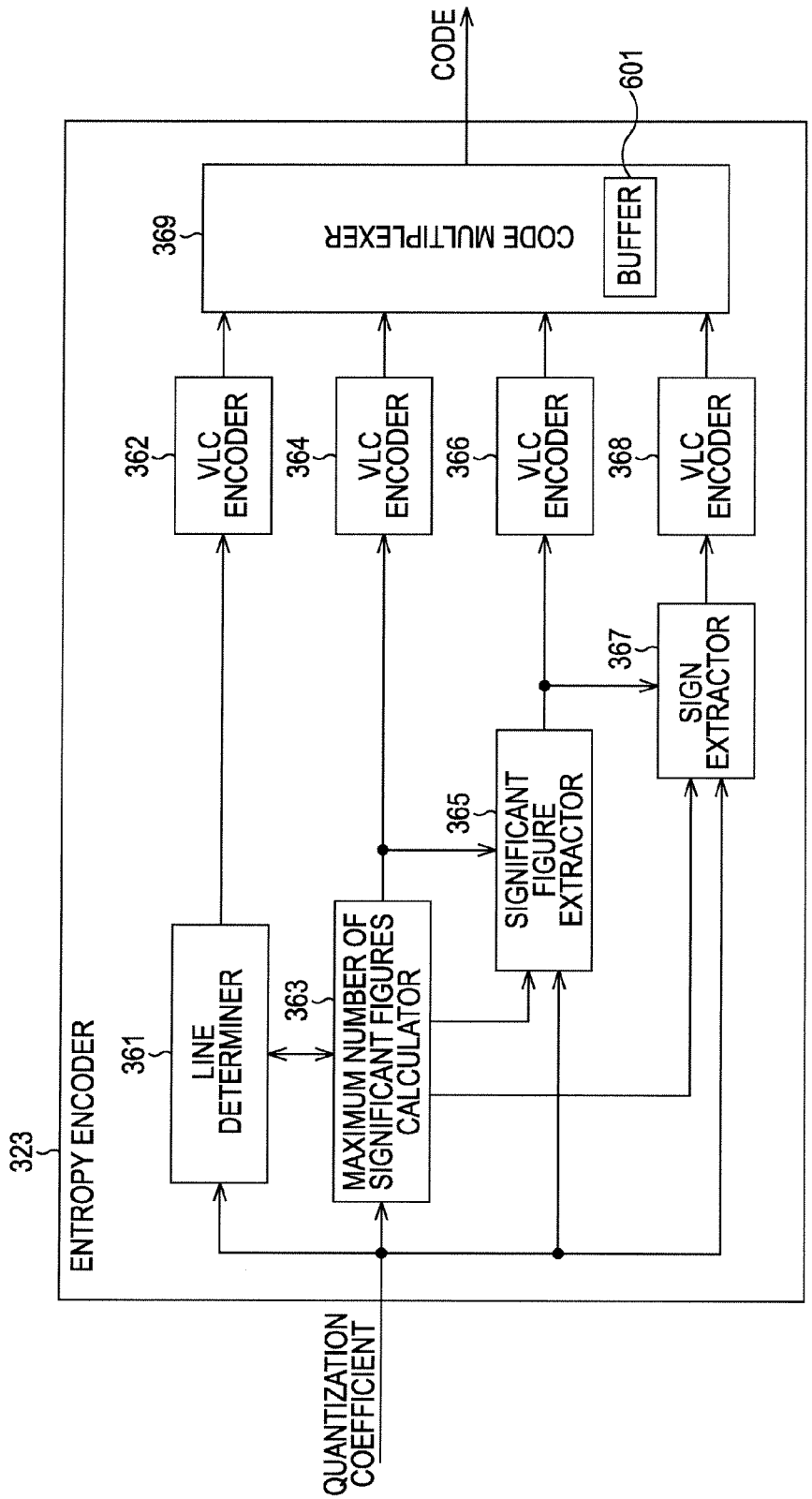
FIG. 58 is a block diagram illustrating the structure of another entropy encoder.

When the absolute value of the quantization coefficient is encoded using an SIMD instruction, the entropy encoder 323 in the intra encoder 311 may be configured as shown in FIG. 58, for example.

As the entropy encoder 323 of FIG. 47, the entropy encoder 323 of FIG. 58 includes the line determiner 361, the VLC encoder 362, the maximum number of significant figures calculator 363, the VLC encoder 364, the significant figure extractor 365, the VLC encoder 366, the sign extractor 367 and the VLC encoder 368. The entropy encoder 323 of FIG. 58 is different from the entropy encoder 323 of FIG. 47 in that the code multiplexer 369 includes a buffer 601. In FIG. 58, elements identical to those discussed with reference to FIG. 47 are designated with the same reference numerals, and the discussion thereof is omitted as appropriate.

The buffer 601 in the code multiplexer 369 stores temporarily the code indicating whether all quantization coefficients on the line are 0's, the code indicating the maximum number of significant figures, the code indicating the absolute values of the quantization coefficients, and the code indicating the signs of the quantization coefficients, respectively supplied from the VLC encoder 362, the VLC encoder 364, the VLC encoder 366 and the VLC encoder 368.

The storage area of the buffer 601 is managed by 32 bits, and the codes (data) input to the buffer 601 are divided into codes for use a scalar calculation process and codes for use a vector calculation process. More specifically, one memory area of 32 bits stores the code for use in the scalar calculation process or the code for use in the vector calculation process as temporarily stored data.

The entropy encoder 323 of FIG. 58 encodes the absolute values of the quantization coefficients in parallel using a SIMD instruction. The codes indicating the absolute values of the quantization coefficients are used in the vector calculation process and the other codes are used in the scalar calculation process.

In the discussion that follows, the storage area used to store the code for the scalar calculation process, of the storage areas of 32 bits in the buffer 601, is referred to as a scalar region and the storage area used to store the code for the vector calculation process is referred to as a vector region.

The entropy encoding process performed by the entropy encoder 323 of FIG. 58 is described below with reference to FIG. 59.

Figure 59:
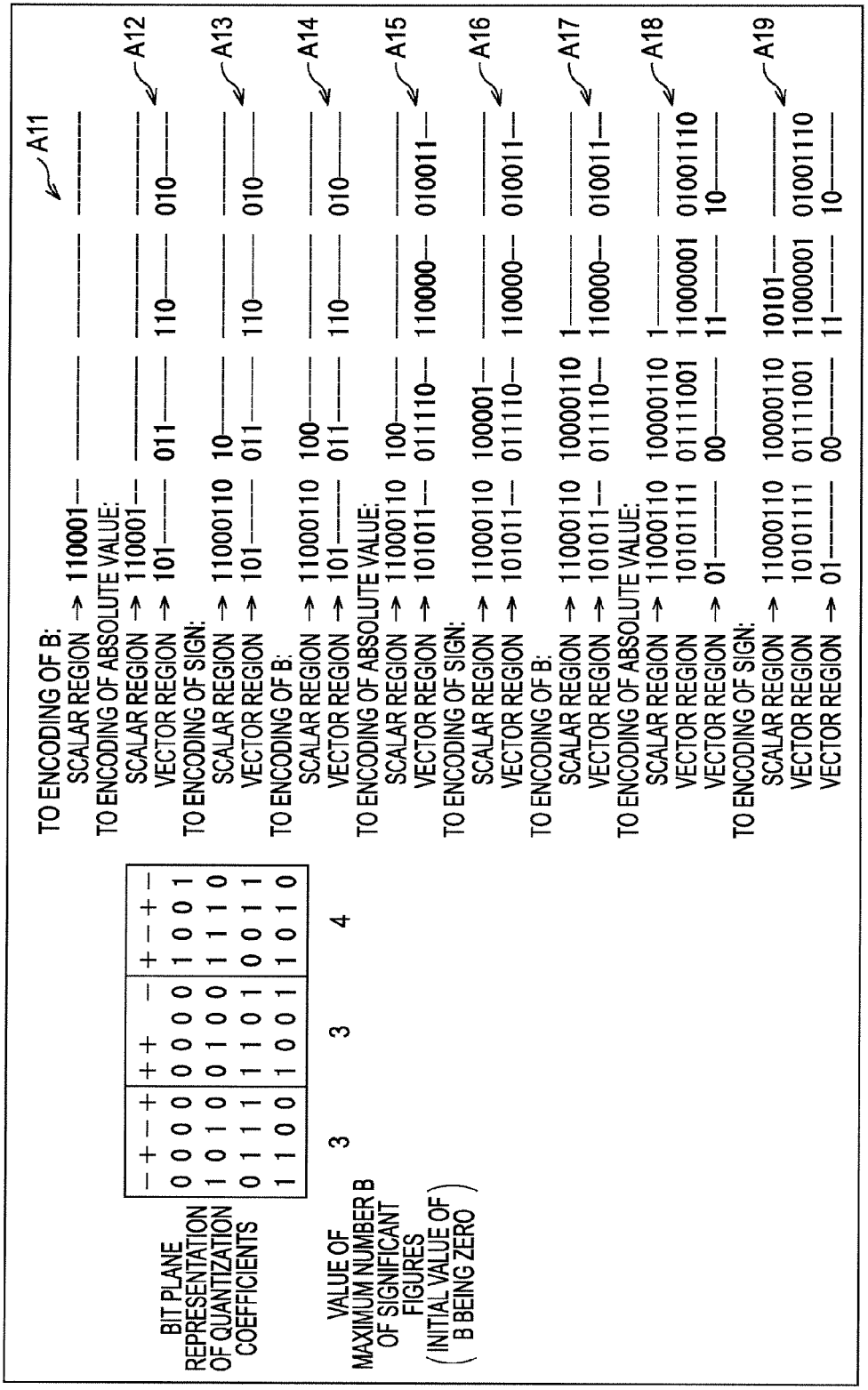
FIG. 59 illustrates an example of quantization coefficients to be encoded.

As shown in the upper portion of FIG. 59, the entropy encoder 323 now receives twelve quantization coefficients of FIG. 46, i.e., "0101," "+0011," "−0110," "+0010," "+0011," "+0110," "−0011," "+1101," "−0100," "+0111" and "−1010."

In the same manner as discussed with reference to FIG. 46, the code multiplexer 369 in the code re-arranger 232 receives the code "1" indicating whether all quantization coefficients of the line to be encoded are 0's and the code "10001" indicating the maximum number of significant figures of the first input four quantization coefficients "−0101," "+0011," "−0110" and "0010."

As shown by an arrow A11, the 32-bit scalar region of the buffer 601 in the code multiplexer 369 stores a code "110001" composed of the code "1" indicating whether all quantization coefficients of the line to be encoded are 0's and the code "10001" indicating the maximum number of significant figures of the quantization coefficients.

As shown in FIG. 59, the scalar region is divided into four 8-bit areas. The scalar region stores the codes from left to right in the order from the most significant bit. When the code is stored in one entire scalar region, i.e., when a 32-bit code is stored in one scalar region, a new scalar region is created in the buffer 601. Codes used in the scalar calculation process are thus successively stored on the newly created scalar regions.

When the scalar region stores the code "110001" composed of the code "1" indicating whether all quantization coefficients of the line to be encoded are 0's and the code "10001" indicating the maximum number of significant figures of the quantization coefficients, the entropy encoder 323 stores the codes of the maximum numbers of significant figures indicating the absolute values of the first input w (four) quantization coefficients "−0101," "+0011," "−0110" and "+0010" concurrently (in parallel arrangement) on the vector region.

As previously discussed with reference to FIG. 46, the maximum number of significant figures of the quantization coefficients "−0101," "+0011," "−0110" and "+0010" is "3." The codes indicating the absolute values of the four quantization coefficients are respectively "101," "011," "110" and "010." As shown by an arrow A12, the codes "101," "011," "110" and "010" indicating the absolute values of the quantization coefficients are arranged in parallel and stored on one vector region in the buffer 601.

The vector region is divided into four 8-bit areas, and the four regions store respectively the codes indicating the absolute values of the four quantization coefficients of the same (bit) length from left to right in the order from the most significant bit.

In the vector region indicated by the arrow A12, the leftmost 8-bit area stores the code "101" from left to right indicating the absolute value of the quantization coefficient, the second 8-bit area from the leftmost 8-bit area stores the code "011" from left to right, the second 8-bit area from the right 8-bit area stores the code "110" from left to right, and the rightmost 8-bit area stores "010" from left to right.

As in the scalar region, if a code is stored in one entire vector region, i.e., if a 32-bit code is stored on one vector region, a new one vector region is created in the buffer 601. Codes used in the vector calculation process are successively stored on the newly vector regions.

When the codes indicating the absolute values of the four quantization coefficients "−0101," "+0011," "−0110" and "+0010" are stored on the vector region, the entropy encoder 323 stores the code indicating the signs of the four quantization coefficients on the scalar region as shown by an arrow A13.

As shown by the arrow A11, the scalar region has already stored the code "110001" composed of the code "1" indicating whether all quantization coefficients of the line to be encoded are 0's and the code "10001" indicating the maximum number of significant figures of the quantization coefficients, the entropy encoder 323 stores the code "1010" indicating the signs of the quantization coefficients "−0101," "+0011," "−0110" and "+0010" to the right of the code "110001" already stored on the scalar region (in succession to the code "110001").

Upon encoding the first four quantization coefficients, the entropy encoder 323 encodes the next four quantization coefficients "+0011," "+0110," "0000" and "−0011."

The entropy encoder 323 compares the maximum number of significant figures "3" of the four quantization coefficients previously encoded with the maximum number of significant figures "3" of the quantization coefficients "+0011," "+0110," "0000" and "−0011" to be currently encoded. Since the maximum number of significant figures has not changed, the entropy encoder 323 stores, as the code indicating the maximum number of significant figures, the code "0" indicating that the maximum number of significant figures has not changed, in succession to the previously stored code "1100011010" on the scalar region.

The entropy encoder 323 also stores concurrently the codes "011," "110," "000" and "011" corresponding to the maximum numbers of significant figures indicating the absolute values of the currently input w (four) quantization coefficients "+0011," "+0110," "0000" and "−0011" on the vector region as represented by an arrow A115.

As shown by the arrow A12, the leftmost 8-bit area, the second 8-bit area from the leftmost 8-bit area, the second 8-bit area from the rightmost 8-bit area, and the rightmost 8-bit area region on the vector region already store the codes "101," "011," "110" and "010," respectively. The entropy encoder 323 stores the codes "011," "110," "000" and "011" indicating the absolute values of the currently input quantization coefficients to the right of the already stored codes "101," "011," "110" and "010," respectively, as shown by an arrow A15.

As shown by an arrow A16, the entropy encoder 323 stores the code "001" indicating the signs of the quantization coefficients having non-zero absolute value, from among the currently input four quantization coefficients "+0011," "+0110," "0000" and "−0011," to the right of the code "11000110100" already stored on the scalar region.

When the encoding of the four quantization coefficients "+0011," "+0110," "0000" and "−0011" has been completed, the entropy encoder 323 is going to encode the next four quantization coefficients "+1101," "−0100," "+0111" and "−1010."

The entropy encoder 323 compares the maximum number of significant figures "4" of the currently input four quantization coefficients "+1101," "−0100," "+0111" and "−1010" with the maximum number of significant figures "3" of the previously encoded four quantization coefficients. As represented by an arrow A17, the entropy encoder 323 stores in the scalar region a code "101" indicating the maximum number of significant figures, composed of the code "1" indicating that the maximum number of significant figures has changed, the code "0" indicating the maximum number of significant figures has increased, and the code "1" indicating the magnitude of variation in the maximum number of significant figures.

Since the scalar region has already stored the code "11000110100001" as represented by the arrow A16, the entropy encoder 323 stores the code "101 indicating the maximum number of significant figures to the right of the code "11000110100001" as shown by the arrow A17.

When the code indicating the maximum numbers of significant figures of the four quantization coefficients "+1101," "−0100," "+0111" and "−1010" is stored, the entropy encoder 323 stores concurrently codes "1101," "0100," "0111" and "1010" indicating the absolute values of these quantization coefficients on the vector region as represented by and arrow A18.

As represented by the arrow A15, the leftmost 8-bit area, the second 8-bit area from the leftmost 8-bit area, the second 8-bit area from the rightmost 8-bit area, and the rightmost 8-bit area on the vector region already store the codes "101011," "011110," "110000" and "010011," respectively. The leftmost 8-bit area, the second 8-bit area from the leftmost 8-bit area, the second 8-bit area from the rightmost 8-bit area, and the rightmost 8-bit area can respectively two bit information.

As represented by the arrow A18, the entropy encoder 323 maintains (creates) a new vector region in the buffer 601 and stores the upper 2-bit codes "11," "01," "01" and "10" of the codes "1101," "0100," "0111" and "1010" indicating the absolute values of the currently input quantization coefficients, respectively to the right of the codes "101011," "011110," "110000" and "010011" already stored on the vector region. The entropy encoder 323 stores the lower 2-bit codes "01," "00," "11" and "10" of the codes "1101," "0100," "0111" and "1010" indicating the absolute values of the currently input quantization coefficients, on the left portion of each of the leftmost 8-bit area, the second 8-bit area from the leftmost 8-bit area, the second 8-bit area from the rightmost 8-bit area, and the rightmost 8-bit area in the newly created vector region (the lower vector region of the two vector regions indicated by the arrow A18).

When the code indicating the absolute values of the four quantization coefficients "+1101," "−0100," "+0111" and "−1010" is stored, the entropy encoder 323 stores the code indicating the signs of the quantization coefficients having non-zero absolute value from among the four quantization coefficients, to the right of the code "11000110100001101" already stored on the scalar region.

Upon encoding the input quantization coefficients, the entropy encoder 323 sequentially outputs, as an encoded image, the code stored on the scalar region as indicated by an arrow A19, the code stored on the upper vector region of the two vector regions indicated by the arrow A19, and the code stored on the lower vector region.

The right 11 bits in the scalar region indicated by the arrow A19 store no code thereon. The right 6 bits of each of the leftmost 8-bit area, the second 8-bit area from the leftmost 8-bit area, the second 8-bit area from the rightmost 8-bit area, and the rightmost 8-bit area in the lower vector region of the two vector regions indicated by the arrow A19 store no codes thereon.

The scalar region and the vector region may store no code in any area thereof at the end of the encoding the input quantization coefficients. The code stored on the scalar region and the vector region is output as an encoded image with any code such as the code "0" stored on an empty area.

As represented by the arrow A19, the code "11000110100001101010100000000000" stored on the scalar region, the code "10101110111100111000000101001110" stored on the upper vector region, and the code "01000000000000001100000010000000" stored on the lower vector region are successively output. Any code that is not stored in an area that is empty at the end of the encoding of the quantization coefficients is not read during the decoding process and can be any value.

When an image is input, the intra encoder 311 encodes the absolute values of the quantization coefficients using the SIMD instruction. The intra encoder 311 also performs the encoding process discussed with reference to FIG. 48. In the entropy encoding process of FIG. 49 corresponding to step S313 of FIG. 48, the intra encoder 311 performs the same process as the process without using the SIMD instruction (i.e., performs the process of FIG. 49) in steps S341 through S349, step S351, and step S352 of FIG. 49. The intra encoder 311 performs a process, different from the process without using the SIMD instruction, in step S350.

Figure 60:
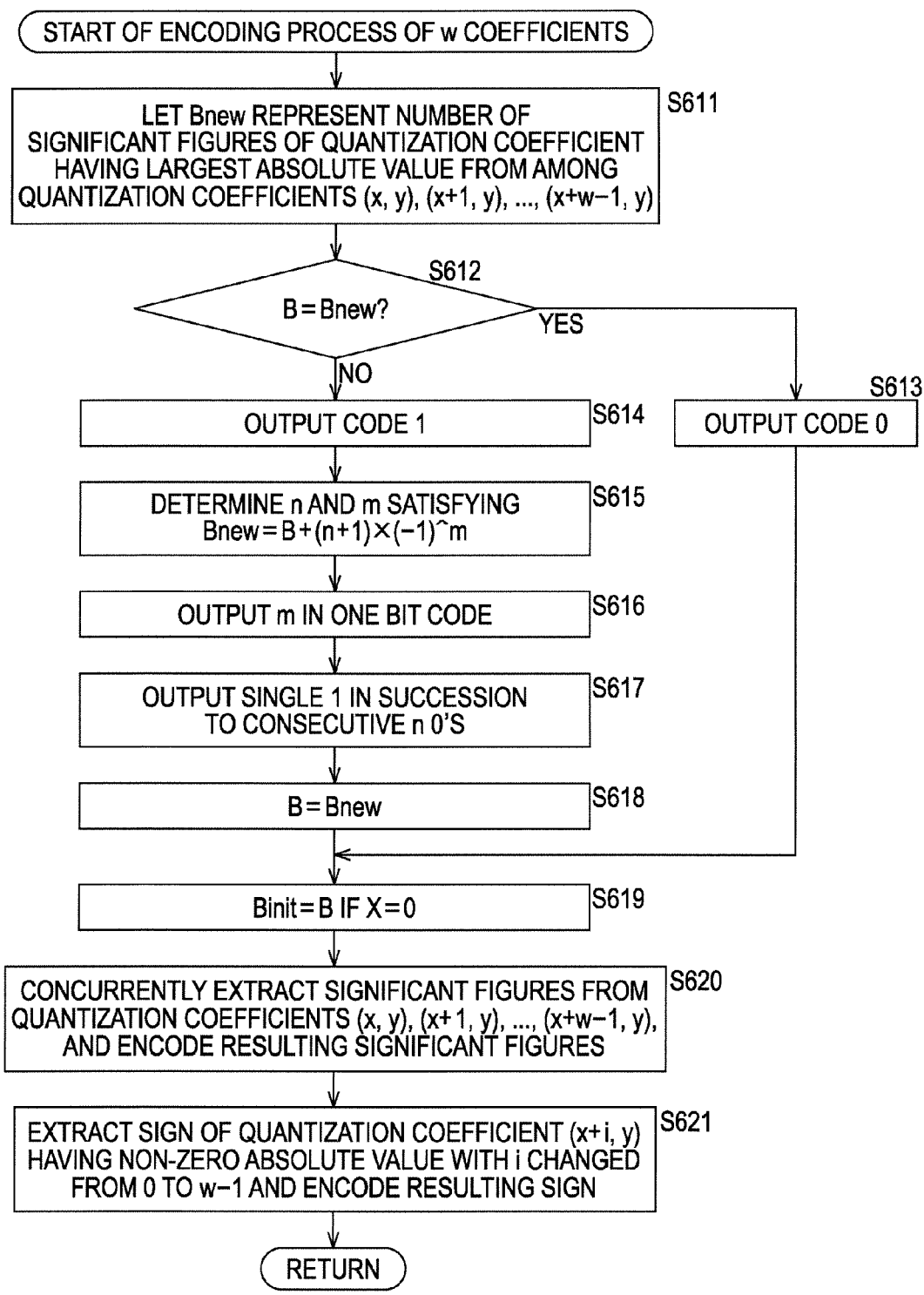
FIG. 60 is a flowchart illustrating an encoding process of a set of w coefficients.

The encoding process of the set of w quantization coefficients is described below with reference to a flowchart of FIG. 60. In this encoding process, the intra encoder 311 encodes the absolute values of the quantization coefficients using the SIMD instruction. Steps S611 through S619 are respectively identical to steps S381 through S389 of FIG. 50, and the discussion thereof is not repeated herein.

When the absolute values of the quantization coefficients are encoded using the SIMD instruction, codes are supplied from the VLC encoder 362 to the code multiplexer 369 as previously discussed with reference to FIG. 49 or FIG. 60, and then stored on the scalar region in the buffer 601 in the code multiplexer 369 as described with reference to FIG. 59. The codes stored on the scalar region in the buffer 601 include the code of indicating whether all absolute values of the quantization coefficients on the line to be encoded are 0's, the code indicating the maximum number of significant figures of the quantization coefficients supplied from the VLC encoder 364 to the code multiplexer 369, and the code indicating the sings of the quantization coefficients supplied from the VLC encoder 368 to the code multiplexer 369.

In step S620, the significant figure extractor 365 concurrently extracts the significant figures of the quantization coefficients from the quantization coefficients at the w consecutive positions $(x,y), (x+1,y), \ldots, (x+w-1,y)$ on the line y supplied from the quantizer 322. The significant figure extractor 365 supplies the extracted significant figures of the quantization coefficients to each of the VLC encoder 366 and the sign extractor 367. In response to the significant figures supplied from the significant figure extractor 365 (by encoding the significant figures), the VLC encoder 366 concurrently outputs to the code multiplexer 369 a code indicating the absolute values of the w quantization coefficients.

The value of x at the position $(x,y)$ is the value of the variable x stored on the maximum number of significant figures calculator 363 and the value of y is the value of the variable y stored on the line determiner 361. For example, when the significant figure extractor 365 extracts the significant figures "101," "011," "110" and "010" as the significant figures of the quantization coefficients, the VLC encoder 366 supplies to the code multiplexer 369 the code "101," "011," "110" and "101" indicating the absolute values of the four quantization coefficients. The code multiplexer 369 encodes the code indicating the absolute values of the supplied quantization coefficients and stores the encoded code as shown by the arrow A12 of FIG. 59.

In step S621, the sign extractor 367 extracts the sign of the non-zero quantization coefficient at the position $(x+i,y)$ on the line y supplied from the quantizer 322 with a predetermined variable i changed from 0 to $(w-1)$, and supplies (data of) the extracted sign to the VLC encoder 368. The value of x at the position $(x,y)$ is the value of the variable x stored on the maximum number of significant figures calculator 363 and the value of y is the value of the variable y stored on the line determiner 361.

The VLC encoder 368 encodes the sign from the sign extractor 367, and outputs to the code multiplexer 369 a code indicating the resulting sign of the quantization coefficient. As previously described with reference to FIG. 59, the code multiplexer 369 stores on the scalar region in the buffer 601 the code indicating the sign of the quantization coefficient supplied from the VLC encoder 368.

Upon storing the code indicating the sign of the quantization coefficient on the scalar region in the buffer 601, the code multiplexer 369 multiplexes the code stored on the scalar region and the code stored on the vector region in the buffer 601 as described with reference to FIG. 59. The code multiplexer 369 outputs the multiplexed code as an encoded signal. The encoding process of the set of w quantization coefficient thus ends. Processing returns to step S350 of FIG. 49 to perform step S351 and subsequent steps.

The entropy encoder 323 concurrently encodes the absolute values of the quantization coefficients of the predetermined number.

In the known encoding of the image in accordance with JPEG2000 standard, the quantization coefficients are arithmetically encoded on a per bit plane based on a plurality of coding paths, and it is difficult to perform predetermined processes in parallel in the entropy encoding. Since the entropy encoder 323 is freed from performing complex processes on a per bit plane, absolute values of a plurality of quantization coefficients are concurrently encoded.

Since a plurality of processes is performed concurrently (in parallel) by encoding concurrently the absolute values of the quantization coefficients of the predetermined number, high-speed image encoding is achieved.

In step S621, the signs of the w quantization coefficients are encoded in order. As in the encoding of the absolute values of the quantization coefficients, the signs of the w quantization coefficients may be concurrently encoded using the SIMD instruction. In this case, each of the codes indicating the signs of the w quantization coefficients obtained as a result of encoding are stored in w separate areas on the vector region in the buffer 601.

The buffer 601 includes 32 a scalar region and a vector region, each having a 32 bit size, and each 32 bit region is further divided into four areas, each having a 8-bit size. Each of the scalar region and the vector region may be set to any size. For example, each of the scalar region and the vector region may have a 128 bit size, and the 128 bit region may be divided into 8 areas, each area having a 16 bit size.

The image encoded using the SIMD instruction may be decoded. The code demultiplexer 451 (FIG. 52) in the intra decoder 411 decoding the image has the structure of FIG. 53, and the memory 472 stores the code as an encoded image by 35 bits as described with reference to FIG. 59.

To read and output the code from the memory 472, the controller 471 reads the code from the scalar region starting with the leading portion of the scalar region storing the first 32 bit code. The codes to be read and output include the code indicating whether all absolute values of the quantization coefficients on the line to be decoded, the code indicating the maximum number of significant figures of the quantization coefficients, and the code indicating the signs of the quantization coefficients.

The controller 471 reads the signs of the absolute values of the quantization coefficients from the memory 472. In this case, the controller 471 reads the signs of the absolute values of the quantization coefficients from the vector region as a next 32 bit storage area (no code is yet to be read) in succession to the scalar region. The controller 471 then outputs the read signs.

In the encoding of the image, the code (for use in the vector calculation) indicating the absolute value of the quantization coefficient is stored on the 32 bit storage area subsequent to the scalar region of the memory 472, from which the absolute values of the quantization coefficients are first read during the decoding process.

The bit size of the memory area storing the code as the encoded image on the memory 472 changes depending on the bit size of one scalar region and one vector region in the encoding of the image by the intra encoder 311. More specifically, the bit size of each of a plurality of storage areas in the memory 472 storing the code as the image is set to be equal to the size of one scalar region and one vector region adopted in the encoding of the image.

When the absolute values of the quantization coefficients are decoded using the SIMD instruction, the intra decoder 411 performs the decoding process discussed with reference to the flowchart of FIG. 55. In the entropy decoding process of FIG. 56 corresponding to step S431 of FIG. 55, the intra decoder 411 performs the same process as the process without using the SIMD instruction (performs the process discussed with reference to FIG. 56) in each of steps S461 through S468, and steps S470 and S471 of FIG. 56. In the decoding process of the set of w quantization coefficients corresponding to step S469, the intra decoder 411 performs a process different from the process without using SIMD instruction.

Figure 61:
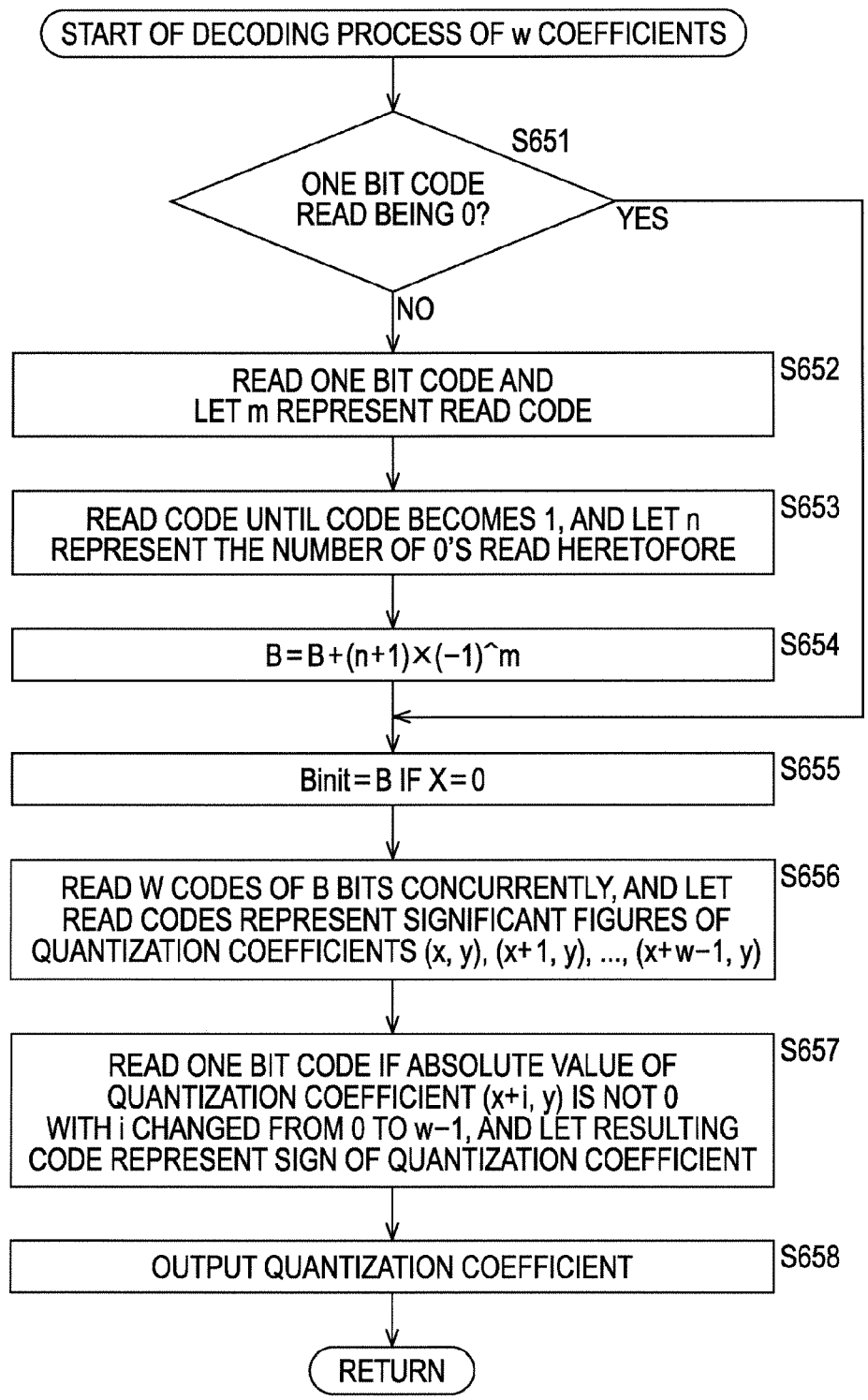
FIG. 61 is a flowchart illustrating a decoding process of a set of w coefficients.

The decoding process of the set of w quantization coefficients is described below with reference to a flowchart of FIG. 61. In this decoding process, the intra decoder 411 decodes the absolute values of the quantization coefficients using the SIMD instruction.

Steps S651 through S655 are respectively identical to steps S511 through S515 of FIG. 57, and the discussion thereof is omitted herein.

When the absolute values of the quantization coefficients are decoded using the SIMD instruction, the memory 472 in the code demultiplexer 451 stores the code of the image in the three 32 bit areas as represented by the arrow A19. Each of the line determiner 452, the VLC decoder 454 and the VLC decoder 456 reads and decodes the codes in order from the leading portion of the scalar region (shown on the left side of FIG. 59) on the top portion of FIG. 59 out of the three 32 bit areas. The codes to be read and decoded include the code indicating whether all quantization coefficients on the line are 0's, the code indicating the maximum number of significant figures of the quantization coefficients, and the code indicating the signs of the quantization coefficients.

In step S656, the VLC decoder 455 concurrently reads from the code demultiplexer 451 consecutive w pieces of B bit codes, and supplies (outputs) to each of the VLC decoder 456 and the VLC decoder 456 the read w pieces of B bit codes as the code indicating the significant figures of the quantization coefficients at positions (x,y), (x+1,y) . . . , (x+w−1,y) on the line y. The VLC decoder 455 generates information indicating the significant figures of the quantization coefficients and supplies the generated information to the code demultiplexer 451. The value of x at the position (x,y) is the value of the variable x stored on the VLC decoder 454 and the value of y is the value of the variable y stored on the line determiner 452.

For example, the predetermined number w is 4, the value of the variable B is 3, and the code as the image is stored in the three 32 bit storage areas on the memory 472 in the code demultiplexer 451 as represented by the arrow A19 in FIG. 59. As shown in FIG. 59, the uppermost 32 bit storage area is already set to be the scalar region, and the code indicating whether all quantization coefficients on the line are 0's and the code indicating the maximum number of significant figures of the quantization coefficients are read form the scalar region. From the next 35 bit storage area (second storage area from top), no codes are read. The VLC decoder 455 concurrently reads the code "101," "011," "110" and "010" indicating the significant figures of the quantization coefficients at the positions (x,y), (x+1,y), (x+2,y) and (x+3,y) from the vector region as the second storage area from top, namely, the leftmost 8 bit area, the second 8 bit area from the leftmost 8 bit area, the second 8 bit area from the rightmost 8 bit area, and the rightmost 8 bit area. The VLC decoder 455 then outputs the read code.

When the code indicating the significant figures of the w quantization coefficients is supplied to each of the VLC decoder 456 and the quantizing coefficient synthesizer 457, steps S657 and S658 are then performed. Steps S657 and S658 are respectively identical to step S517 and S518 of FIG. 57, and the discussion thereof is omitted here.

The entropy decoder 421 concurrently decodes the absolute values of the quantization coefficients of the predetermined number in this way.

Since a plurality of processes is performed concurrently (in parallel) by decoding concurrently the absolute values of the quantization coefficients of the predetermined number, high-speed image encoding is achieved.

In step S657, the codes indicating the signs of the w quantization coefficients are decoded in order. The codes indicating the signs of the quantization coefficients may be concurrently decoded using the SIMD instruction.

Unlike the encoding (decoding) of the image in accordance with JPEG2000 standard, the arithmetic coding of the quantization coefficients on a per bit plane based on a plurality of coding paths is not necessary. Simpler processing permits an image to be encoded (decoded) at high speed.

In accordance with the known JPEG2000 standard, the quantization coefficients are processed on a per bit plane basis in accordance with the plurality of coding paths. At each process, the quantization coefficients need to be accessed by the number of times equal to the product of the number of quantization coefficients and the number of bit planes, and a large amount of process results.

When an encoded image is packetized, a packetization process is started only after the completion of the encoding of the image. A delay accordingly results. In accordance with JPEG2000 standard, the (encoded) quantization coefficients corresponding to a position in a rectangular area defined by sides running in parallel along the x direction and the y direction on the sub band in FIG. 6 are stored in one packet, and a delay responsive to the length of the rectangular area along the y direction occurs. It is thus difficult to process the quantization coefficients on a real-time basis. By reducing the length of the rectangular area along the y direction on the sub band, the delay can be reduced but at the expense of encoding efficiency.

In contrast, the intra encoder 311 is free from the arithmetic coding performed the quantization coefficients on a per bit plane basis based on the plurality of coding paths. When an image is encoded, the intra encoder 311 accesses the quantization coefficients only when the code indicating the absolute values of the quantization coefficients, when the code indicating the signs of the quantization coefficients is output, and when the code indicating the signs of the quantization coefficients is output. The image is thus simply encoded.

The code indicating the maximum number of significant figures and the code indicating the signs of the quantization coefficients may be 1 bit or 0 bit. The image can be encoded by accessing the quantization coefficients about twice or so. To decode the image, a single access to the quantization coefficients is sufficient. The image is thus simply decoded at high speed.

The intra encoder 311 and the intra decoder 411 encode and decode the quantization coefficients of the sub band in the raster scan order, respectively. There is no need for buffering the quantization coefficients, and thus delay due to encoding or decoding is reduced.

A test of encoding and then decoding of a YUV 4:2:2 image of horizontal 1920 pixels by vertical 108 pixels using the SIMD instruction (w=4) shows the following results. In the encoding, the image was wavelet transformed to be segmented into five steps. The quantization coefficients that were obtained by quantizing the wavelet coefficients of each sub band were encoded. The function block required to perform encoding and decoding (for example, the entropy encoder 323 of FIG. 58 and the entropy decoder 421 of FIG. 52), and the function block for encoding and decoding the image in accordance with JPEG2000 are embodied by causing a CPU (having a clock frequency of 3.0 GHZ) called Pentium 4 (Registered Trademark of Intel Corporation) to perform a predetermined program.

When an image of one frame was encoded in accordance with known JPEG2000 standard, an amount of code was 291571 bytes, and time required to encode the image was 0.26157 second. Time required to decode the encoded image was 0.24718 second.

In contrast, when the entropy encoder 323 of FIG. 58 encoded an image of one frame, an amount of code was 343840 bytes, and time required to encode the image was 0.03453 second. Time required to decode the encoded image with the entropy decoder 421 of FIG. 52 was 0.02750 second.

The moving image is typically displayed at a rate of 30 frames per second. If one frame is encoded or decoded within 0.033 (1/30) second, the image can be processed on a real-time basis. In accordance with JPEG 2000, time required to encode the image is 0.26157 second and time required to decode the encoded image is 0.24718 second. It is difficult to process the image on a real-time basis. When the entropy encoder 323 of FIG. 58 is used to encodes the image, time required to encode the image is 0.03453 second, and real-time processing of the image is possible. When the entropy decoder 421 of FIG. 52 is used to decode the image, time required to decode the image is 0.02750 second, and real-time processing is possible.

In the above discussion, the image data is encoded, and the encoded image data is decoded. The present invention is not limited to the image data. The present invention is applicable when audio data is encoded, and when encoded audio data is decoded. When the audio data is encoded, codes to be output as encoded audio data include a code indicating the maximum number of significant figures of predetermined w numerals, a code indicating the absolute values of the numerals, and a code indicating the signs of the numerals.

The additional features of the embodiments are discussed further. In the encoding method of the embodiments of the present invention, the quantization coefficients are encoded in a lossless fashion. The higher the frequency of the quantization coefficients, the quantization coefficients are quantized at the larger quantization step size in view of vision characteristics of humans. Image quality per generated code is thus substantially increased. By reducing the quantization step size for use in a particular space, image quality in that space is increased.

The train of significant figures of the absolute values is encoded in the encoding method discussed with reference to the embodiments of the present invention. If the significant figure of the absolute value is VLC encoded and then output, a large VLC table having $2^{\wedge}(N*W)$ entries is required where let N represent the number of significant figures of the absolute value (No only process time and workload in calculation process increase, but also a memory size of a memory for storing the VLC table increases). In contrast, the encoding method of the embodiments requires no large table (reducing not only process time and workload in calculation process, but also a memory size of a memory for storing the VLC table).

The use of an arithmetic encoding having a higher compression rate than VLC is contemplated. An increase in compression rate provided by a compression method using the arithmetic encoding such as JPEG2000 is marginal in comparison with the encoding method discussed with reference to the embodiments of the present invention. More specifically, the embodiments of the present invention not only permits the encoding process to be easily performed but also provides high compression rate.

In accordance with the encoding method of the embodiments of the present invention, the maximum number of significant figures of the absolute values of the set of w quantization coefficients is encoded. The amount of code generated is reduced by taking advantage of the similarity between the significant figures of adjacent coefficients.

Difference encoding is used in the encoding of the maximum number of significant figures of the absolute values of the set of w quantization coefficients in the above-referenced encoding method of the embodiments. In this point as well, the amount of code generated is reduced by taking advantage of the similarity between the significant figures of adjacent coefficients.

The entropy encoding process of the entropy encoder 323 and the entropy decoding process of the entropy decoder 421 in accordance with the above-referenced embodiment are applicable to each of the preceding embodiments. The delay time in the entire image encoding process and image decoding process, power consumption, and a memory size of the buffer memory required for the processes are further reduced. For example, the entropy encoder 323 may be used as the entropy encoder 215 in the intra encoder 201 of FIG. 28 (in other words, the entropy encoder 215 performs the same entropy encoding process as the one performed by the entropy encoder 323). The entropy decoder 421 may be used as the entropy decoder 221 in the intra decoder 220 of FIG. 35 (in other words, the entropy decoder 221 performs the same entropy decoding process as the one performed by the entropy decoder 421).

By applying the entropy encoding process in each of the preceding embodiments, the amount of generated code is reduced by taking advantage of features of the output order of the coefficients from the wavelet transformer in each embodiment (taking advantage of the similarity between the significant figures of consecutive coefficients). Even when the coefficients are re-arranged in order, the wavelet transformer performs the wavelet transform by line block, and the feature that the consecutive coefficients are similar in significant figure is not destroyed. The amount of generated code in the entropy encoding process does not change largely.

The entropy encoding process is similar to the wavelet transform process discussed with reference to each of the preceding embodiments in the feature of the quantization coefficients to be processed and expected advantages. The two processes are highly compatible with each other. More advantage is expected in the entire image encoding process by applying the entropy encoding process to the wavelet transform than by applying another encoding process to the wavelet transform.

In the above discussion, the image encoding apparatus obtains one addition result and one subtraction result from one stage addition and subtraction unit 18 and encodes the addition and subtraction results. Alternatively, the addition and subtraction unit 18 may be arranged in a plurality of stages. In such a case, the number of addition results and subtraction results increase in response to the number of stages of the addition and subtraction unit 18.

Figure 62:
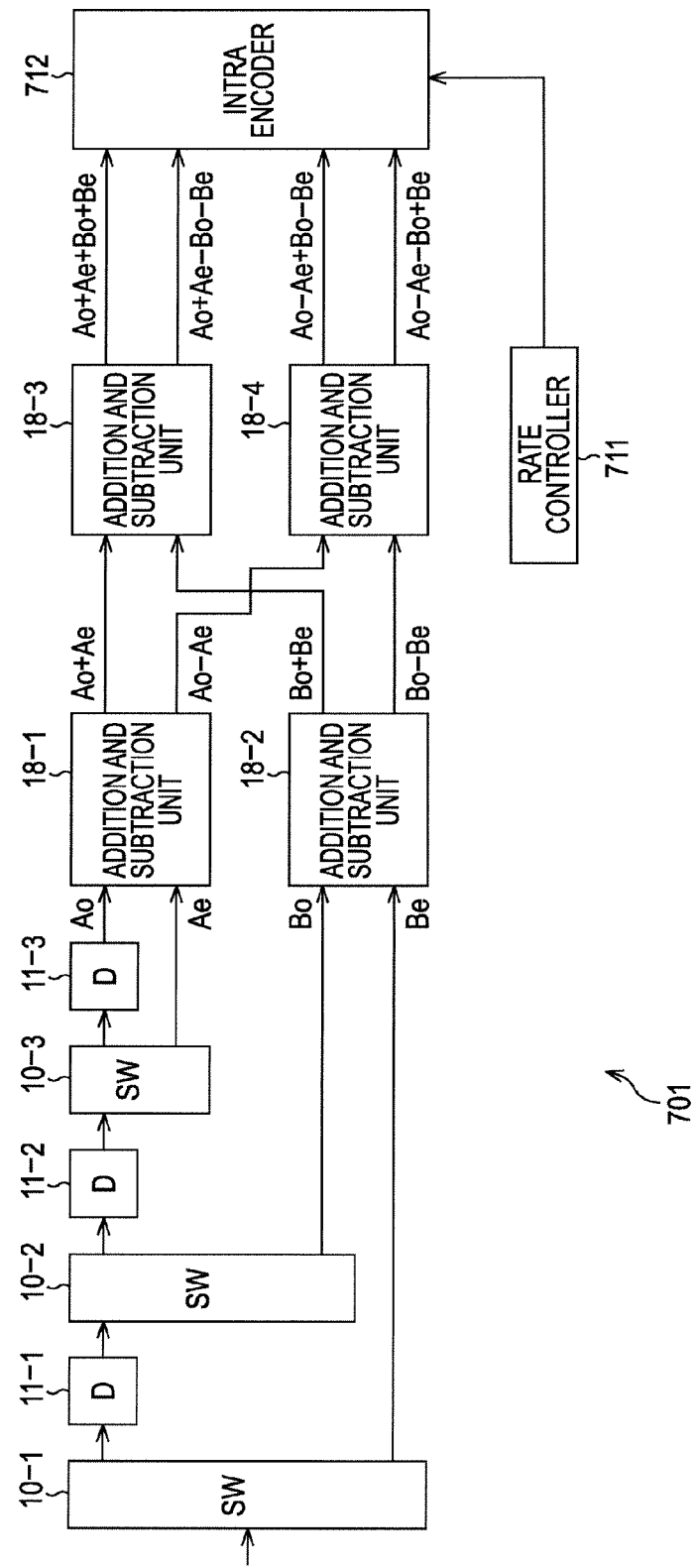
FIG. 62 is a block diagram illustrating the structure of an image encoding apparatus.
Figure 72:
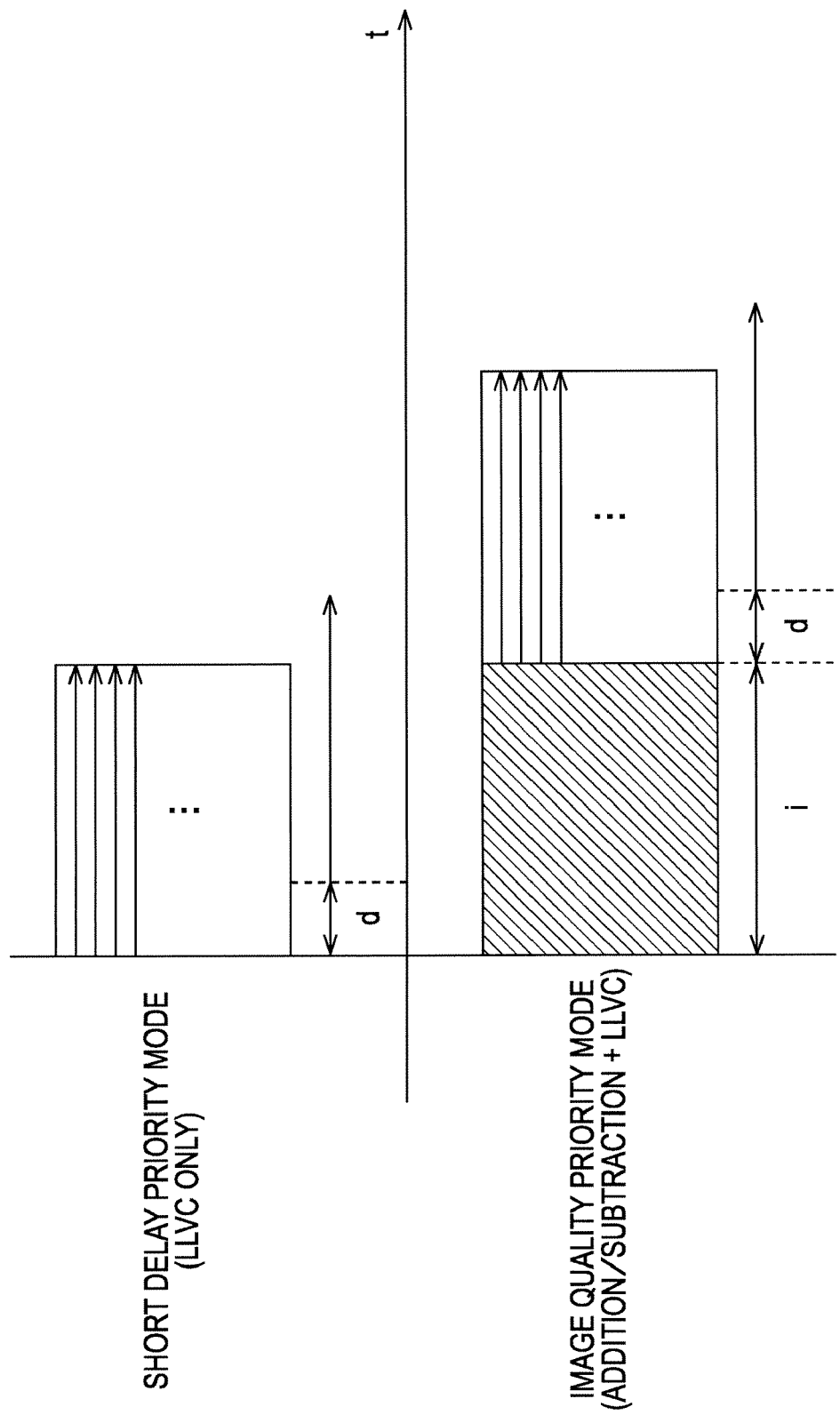
FIG. 72 illustrates delay time.

FIG. 62 is a block diagram illustrating the structure of an image encoding apparatus having the addition and subtraction unit 18 divided in two stages. The encoding method of the image encoding apparatus 701 of FIG. 72 is basically identical to the encoding method of the image encoding apparatus discussed with reference to FIG. 15. The addition and subtraction units 18 output the addition results and the subtraction results between fields to intra encode the results separately or integrally. The image encoding apparatus 701 includes the addition and subtraction units 18 in two cascaded stages, and provide four calculation results which are to be intra encoded separately or integrally.

The image encoding apparatus of FIG. 15 segmented the input image data into an odd field and an even field while the image encoding apparatus 701 segmented two frames of input image data into four fields of data. To this end, the image encoding apparatus 701 includes three switches 10 and three field delay units 11. As shown in FIG. 62, the switches 10-1 through 10-3, each represented by "SW," correspond to the switch 10 of FIG. 15, and the field delay units 11-1 through 11-3, each represented by "D," correspond to the field delay unit 11 of FIG. 15.

As shown in FIG. 62, the switches 10-1 through 10-3 and the field delay units 11-1 through 11-3 alternately arranged in a cascade fashion. The switch 10-1 extracts an even field Be of a frame B as a second frame every two frames (frame A and frame B) of the input moving image data, and supplies the remaining data (the frame A and the odd field of the frame B) to the field delay unit 11-1. The field delay unit 11-1 delays the supplied data by one field and then supplies the delayed data to the switch 10-2.

Similarly, the switch 10-2 extracts the odd field Bo of the frame B as the second frame every two frames (frame A and frame B) of the input moving image data, and then supplies the remaining data to the field delay unit 11-2. The field delay unit 11-2 delays the supplied data by one field and supplies the delayed data to the switch 10-3. The switch 10-3 also extracts the even field Ae of the frame A as the first frame every two frame (frame A and frame B) of the input moving image data, and then supplies the remaining data (odd field Ao of the frame A) to the field delay unit 11-3. The field delay unit 11-3 delays the supplied data by one field and then outputs the delayed data.

The image encoding apparatus 701 includes addition and subtraction units 18-1 through 18-4. Each of the addition and subtraction units 18-1 through 18-4 is identical in structure to the addition and subtraction unit 18 of FIG. 15 and includes the adder 12 and the subtractor 13. Each of the addition and subtraction units 18-1 through 18-4 adds and subtracts two inputs, and outputs the addition results and the subtraction results.

In order to process the thus separated four fields of data as shown in FIG. 62, the addition and subtraction units 18-1 and 18-2 are arranged at the first stage in parallel and the addition and subtraction units 18-3 and 18-4 are arranged at the second stage in parallel.

As shown in FIG. 62, the odd field Ao and the even field Ae of the frame A are supplied to the addition and subtraction unit 18-1 and the odd field Bo and the even field Be of the frame B are supplied to the addition and subtraction unit 18-2. These pieces of field data are appropriately delayed by the field delay units 11-1 through 11-3 as described above, and supplied to one of the addition and subtraction units 18-1 and 18-2 at the same timing.

The input moving image data is delayed by a maximum of three frames from when the input moving image data is input to the image encoding apparatus 701 to when the input moving image data is input to one of the addition and subtraction units 18-1 and 18-2. In other words, the addition and subtraction units 18-1 and 18-2 receives one field of data every two frames.

The addition and subtraction unit 18-1 performs an addition operation and a subtraction operation on the odd field Ao and the even field Ae of the input frame A, thereby outputting an addition result Ao+Ae and a subtraction result Ao−Ae. Similarly, the addition and subtraction unit 18-2 performs an addition operation and a subtraction operation on the odd field Bo and the even field Be of the input frame B, thereby outputting an addition result Bo+Be and a subtraction result Bo−Be. As shown in FIG. 62, the addition result Ao+Ae and the addition result Bo+Be are supplied to the addition and subtraction unit 18-3 at the second stage. The subtraction result Ao−Ae and the subtraction result Bo−Be are supplied to the addition and subtraction unit 18-4 at the second stage.

As the addition and subtraction units 18-1 and 18-2, the addition and subtraction unit 18-3 performs an addition operation and a subtraction operation on the input addition result Ao+Ae and addition result Bo+Be, thereby outputting an addition result Ao+Ae+Bo+Be and a subtraction result Ao+Ae−Bo−Be. Similarly, the addition and subtraction unit performs an addition operation and a subtraction operation on the input subtraction result Ao−Ae and subtraction result Bo−Be, thereby outputting an addition result Ao−Ae+Bo−Be and a subtraction result Ao−Ae−Bo+Be.

The addition result Ao+Ae+Bo+Be and subtraction result Ao+Ae−Bo−Be output by the addition and subtraction unit 18-3 and the addition result Ao−Ae+Bo−Be and subtraction result Ao−Ae−Bo+Be output by the addition and subtraction unit 18-4 are respectively supplied to the intra encoder 712.

If the intra encoder 712 encodes separately the operation results, the rate controller 711 sets a target code amount in each operation. If the intra encoder 712 encodes integrally the operation results, the rate controller 711 a target code amount to encode integrally the operation results. Upon acquiring the target code amount set by the rate controller 711, the intra encoder 712 encodes the four operation results, multiplexes the encoded data into a single encoded stream and outputs the encoded stream.

The repeated addition and subtraction operations on the field data and the encoding of the operation results achieve a higher encoding efficiency than the single addition and subtraction operation performed on the field data and then encoding of the operation results previously discussed with reference to FIGS. 1 and 15. Subjective image quality subsequent to decoding is thus even further increased.

Figure 63:
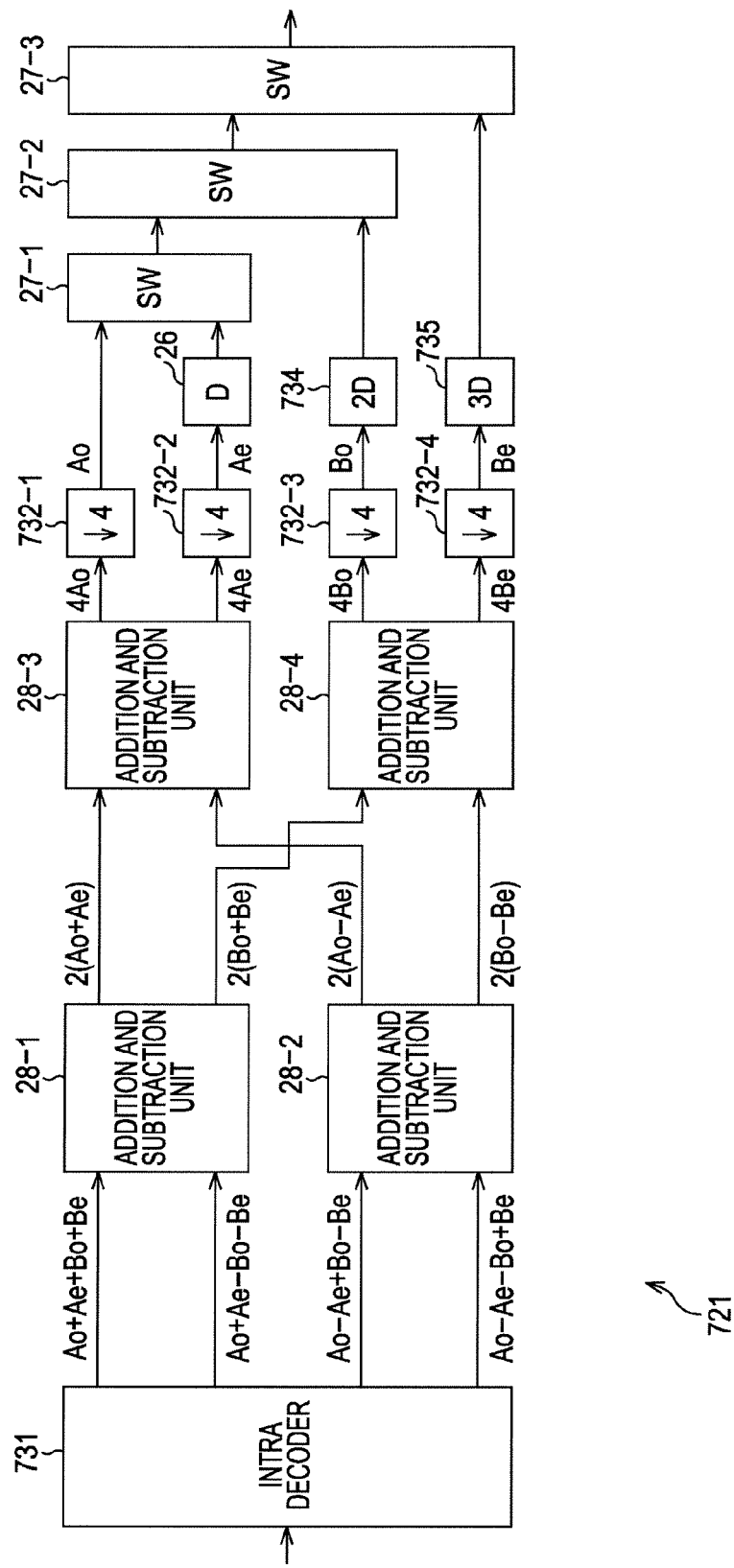
FIG. 63 is a block diagram illustrating the structure of an image decoding apparatus.

FIG. 63 illustrates the structure of an image decoding apparatus corresponding to the image encoding apparatus 701 of FIG. 62. As shown in FIG. 63, the image decoding apparatus 721 corresponding to the image encoding apparatus 701 includes addition and subtraction units 28-1 through 28-4 at two stages as the image encoding apparatus 701. The image decoding apparatus needs to perform addition and subtraction operations of the same number as the number of addition and subtraction operations in the image encoding apparatus.

Each of the addition and subtraction units 28-1 through 28-4 is identical in structure to the addition and subtraction unit 28 of FIGS. 4 and 16, and includes the adder 23 and the subtractor 24. Each of the addition and subtraction units 28-1 through 28-4 performs an addition operation and a subtraction operation on two inputs, and outputs an addition result and a subtraction result. The addition and subtraction units 28-1 through 28-4 are also identical in structure to the addition and subtraction units 18-1 through 18-4.

The intra decoder 731 corresponds to the intra decoder 60 of FIG. 16. However, the intra decoder 60 decodes the encoded stream, thereby outputting two pieces of decoded data as an addition result and a subtraction result while the intra decoder 731 decodes the encoded stream, thereby outputting four pieces of decoded data as two addition results and two subtraction results.

In response to the input of the encoded stream, the intra decoder 731 decodes the encoded stream in accordance with the encoded method, thereby restoring the addition result Ao+Ae+Bo+Be, the subtraction result Ao+Ae−Bo−Be, the addition result Ao−Ae+Bo−Be and the subtraction result Ao−Ae−Bo+Be discussed with reference to FIG. 62. The addition result Ao+Ae+Bo+Be and the subtraction result Ao+Ae−Bo−Be are supplied to the addition and subtraction unit 28-1 at the first stage, and the addition result Ao−Ae+Bo−Be and the subtraction result Ao−Ae−Bo+Be are supplied to the addition and subtraction unit 28-2 at the first stage.

The addition and subtraction units 28-1 through 28-4 are arranged at two stages. The addition and subtraction units 28-1 through 28-2 are arranged at the first stage. The addition and subtraction units 28-3 through 28-4 are arranged at the second stage.

The addition and subtraction unit 28-1 performs an addition operation and a subtraction operation on the input addition result Ao+Ae+Bo+Be and the subtraction result Ao+Ae−Bo−Be, thereby outputting an addition result 2(Ao+Ae) and a subtraction result 2(Bo+Be). The addition and subtraction unit 28-2 performs an addition operation and a subtraction operation on the input addition result Ao−Ae+Bo−Be and subtraction result Ao−Ae−Bo+Be, thereby outputting an addition result 2(Ao−Ae) and a subtraction result 2(Bo−Be).

The addition results 2(Ao+Ae) and the addition result 2(Ao−Ae) are supplied to the addition and subtraction unit 28-3 at the second stage, and the subtraction result 2(Bo+Be) and the subtraction result 2(Bo−Be) are supplied to the addition and subtraction unit 28-4.

The addition and subtraction unit 28-3 performs an addition operation and a subtraction operation to the input addition result 2(Ao+Ae) and the addition result 2(Ao−Ae), thereby outputting an addition result 4Ao and a subtraction result 4Ae. The addition and subtraction unit 28-4 performs an addition operation and a subtraction operation on the input subtraction result 2(Bo+Be) and subtraction result 2(Bo−Be), thereby outputting an addition result 4Bo and a subtraction result 4Be.

The addition result 4Ao is divided by 4 by a divider 732-1, and the odd filed Ao of the frame A is thus restored. The field Ao is supplied to a switch 27-1 represented by SW. The subtraction result 4Ae is divided by 4 by a divider 732-2, and the even field Ae of the frame A is thus restored. The field Ae is delayed by one filed by a field delay unit 26 and then supplied to the switch 27-1. The switch 27-1 receives the even field Ae of the frame A after receiving the odd field Ao of the frame A. By switching the input, the switch 27-1 outputs successively these pieces of field data to a switch 27-2 represented by SW.

The addition result 4Bo is divided by 4 by a divider 732-3, and the odd field Bo of the frame B is thus restored. The field Bo is delayed by two fields by a field delay unit represented by 2D, and then supplied to the switch 27-2. The switch 27-2 receives the three field data in the order of the odd field Ao, the even field Ae, and the odd field Bo. By switching the input, the switch 27-2 outputs successively these pieces of field data to a switch 27-3 represented by SW.

The addition result 4Be is divided by 4 by a divider 732-4 and the even field Be of the frame B is thus restored. The field Be is delayed by three fields by a field delay unit 735 represented by 3D, and then supplied to the switch 27-3. The switch 27-3 receives the field data of two fields, in the order of the odd field Ao, the even field Ae, the odd field Bo, and the even field Be. By switching the input, the code amount adder 37-3 outputs successively these pieces of field data outside the image decoding apparatus 721.

The image decoding apparatus 721 decodes the stream into which four operation results of the two frame image data are encoded. The input moving image data thus results. More specifically, the image decoding apparatus 721 decodes the stream encoded by the image encoding apparatus 701.

The process flow of the image encoding process of the image encoding apparatus 701 is basically identical to the process discussed with reference to the flowcharts of FIGS. 13, 20, and 26. The difference is that the image encoding apparatus 701 performs the addition and subtraction operation twice, and the operation of the image encoding apparatus 701 is omitted herein. In the image encoding apparatus 701, the image encoding process thereof for separately encoding the operation results corresponds to the flowchart of FIG. 13, the image encoding process thereof for integrally encoding the operation results corresponds to the flowchart of FIG. 20, and the image encoding process thereof for selecting between separately encoding the operation results and integrally encoding the operation results corresponds to the flowchart of FIG. 26.

As in the case of the image encoding apparatus 701, the image decoding process of the image decoding apparatus 721 is basically identical to the process described with reference to FIGS. 14, 21, and 27. The image decoding apparatus 721 performs the addition and subtraction operation twice, and the discussion of the image decoding apparatus 721 is omitted herein.

The number of stages of addition and subtraction units is optional. The number of stages of addition and subtraction units may be increased to 3 or more. The more the number of stages, the more the encoding efficiency becomes theoretically, and the higher the subjective image quality becomes subsequent to decoding. The more the number of stages of addition and subtraction units, the more the number of addition and subtraction pair results. Since the field data of the image data increases, the delay time increases.

Figure 64:
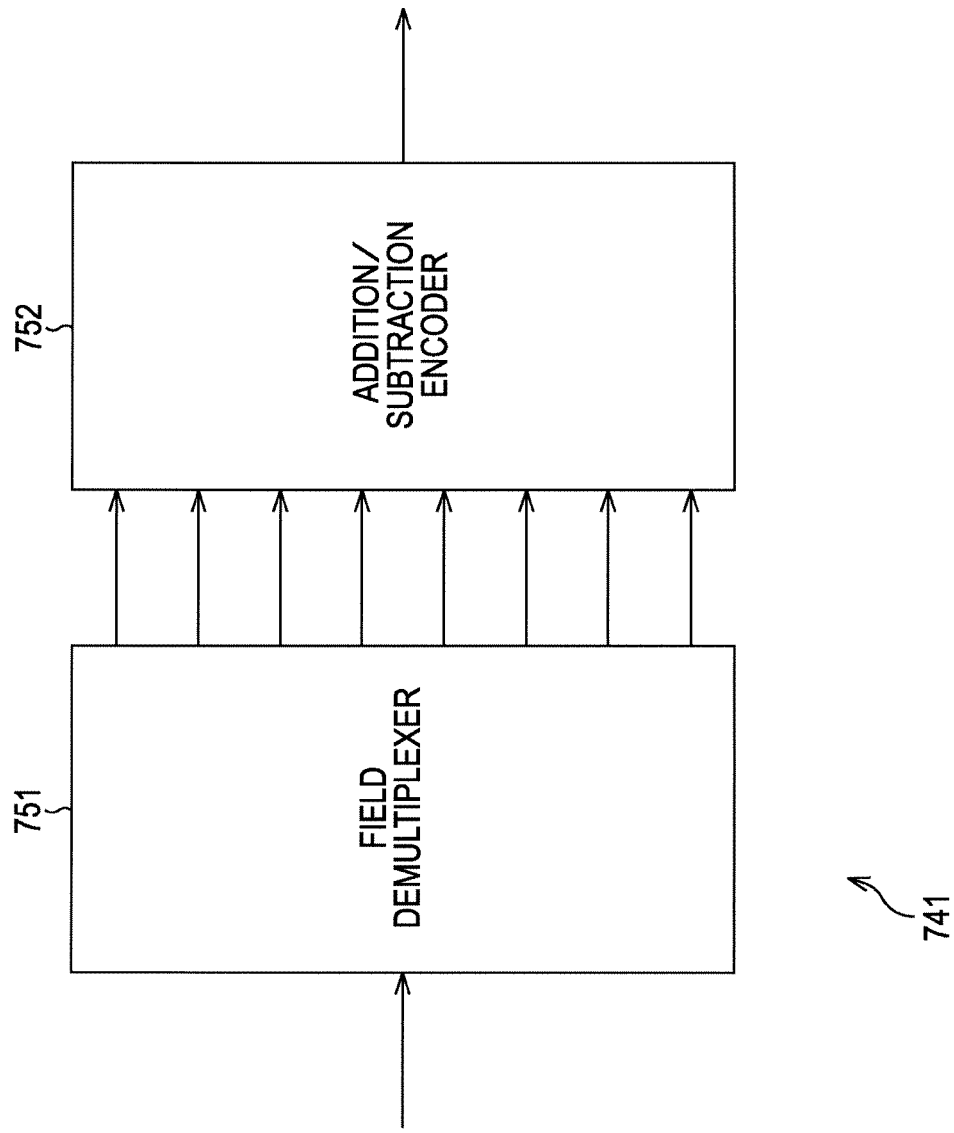
FIG. 64 is a block diagram illustrating the structure of an image encoding apparatus.

FIG. 64 is a block diagram illustrating the structure of an image encoding apparatus having three stages of addition and subtraction units.

The image encoding apparatus 741 is basically identical in structure to the image encoding apparatus 701 of FIG. 62 with the exception that the number of fields to be processed is increased. The image encoding apparatus 741 of FIG. 64 includes a field demultiplexer 751 for demultiplexing the input image data by field, and an addition/subtraction encoder 752 performing addition and subtraction operations and encoding the addition and subtraction results.

As represented arrow-headed lines connecting the field demultiplexer 751 and the addition/subtraction encoder 752 as shown in FIG. 64, the image encoding apparatus 741 requires the image data of four frames, namely, eight fields to repeat three times the addition and subtraction operation.

Figure 65:
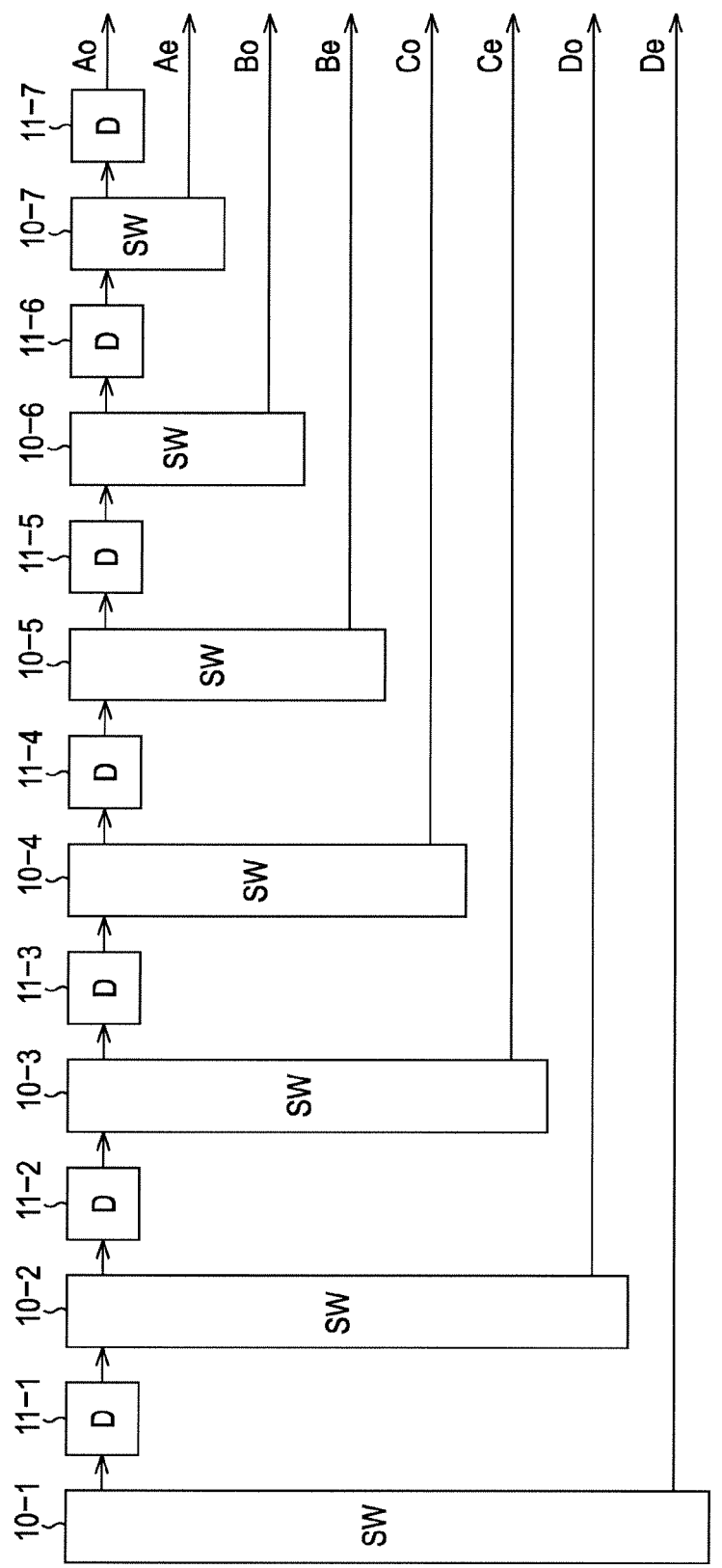
FIG. 65 is a block diagram illustrating a field demultiplexer.

FIG. 65 is a block diagram illustrating the detailed structure of the field demultiplexer 751 of FIG. 64. The field demultiplexer 751 includes switches 10-1 through 10-7, each represented by SW, and field delay units 11-1 through 11-7, each represented by D, alternately arranged in a cascade fashion.

The switches 10-1 through 10-7, corresponding to the switch 10 of FIG. 15, demultiplex the image data into fields. The field delay units 11-1 through 11-7, corresponding to the field delay unit 11 of FIG. 15, delays the image data by one field.

The structure of FIG. 65 is substantially identical in structure to the switches 10-1 through 10-3 and the field delay units 11-1 through 11-3 in the image encoding apparatus 701 discussed with reference to FIG. 62 and is different in only the number of stages of switches and field delay units.

As described with reference to FIG. 62, the field demultiplexer 751 delays the image data of four frames by one field, and demultiplexes one field by one field, and then supplies the data of each field to the addition/subtraction encoder 752 at the same timing using the switches 10-1 through 10-7 and the field delay units 11-1 through 11-7. The field demultiplexer 751 repeats this process on the input image data every four frames.

In the image data of four frames, a first frame is a frame A, an odd frame of the frame A is Ao, an even frame of the frame A is Ae. A second frame is a frame B, an odd frame of the frame B is Bo, and an even frame of the frame B is Be. A third frame is a frame C, an odd frame of the frame C is Co, and an even frame of the frame C is Ce. A fourth frame is a frame D, an odd frame of the frame D is Do, and an even frame of the frame D is De.

Figure 66:
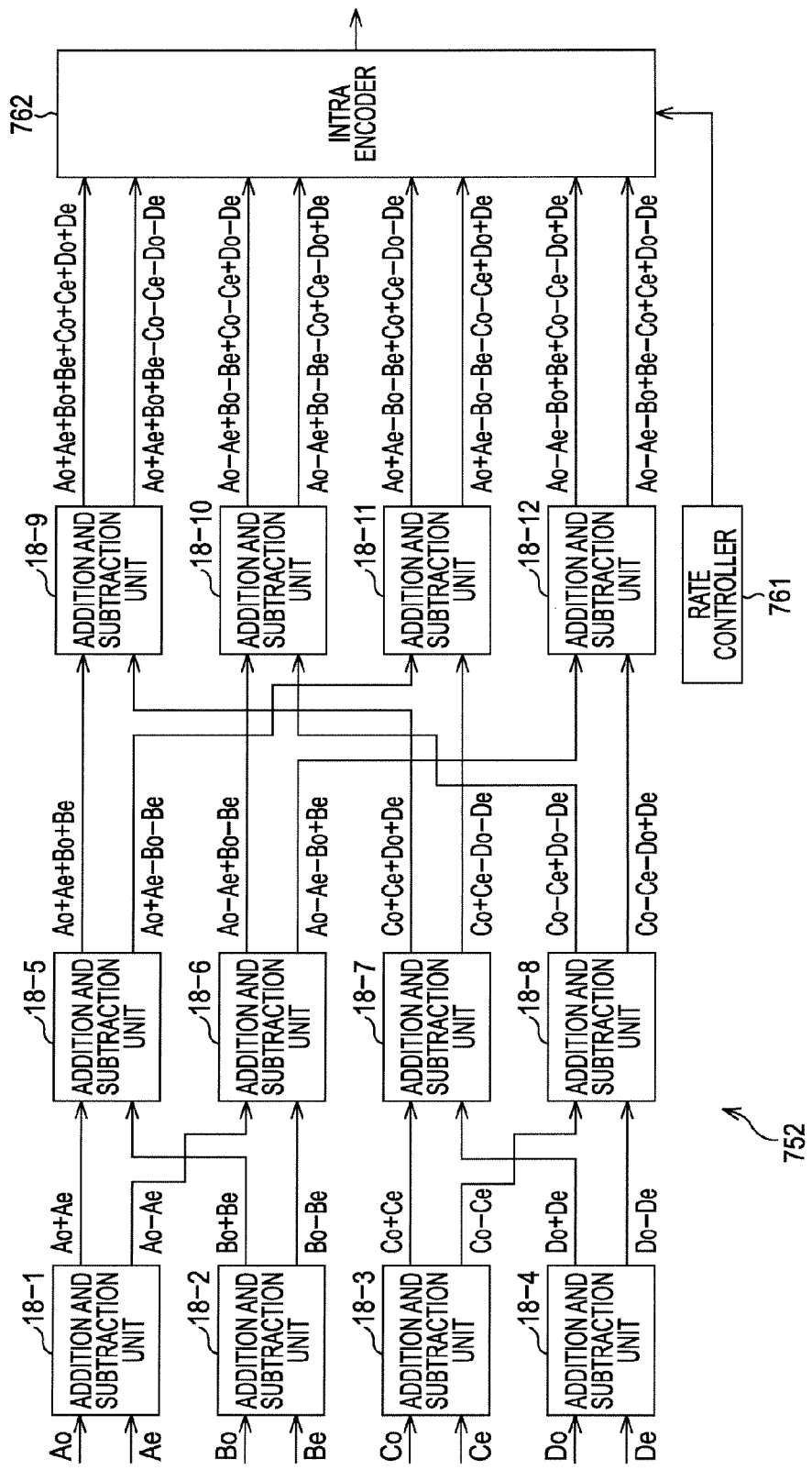
FIG. 66 is a block diagram illustrating the structure of an addition and subtraction encoder.

FIG. 66 is a block diagram illustrating in detail the structure of the addition/subtraction encoder 752 of FIG. 64. As shown in FIG. 66, the addition/subtraction encoder 752 includes twelve addition and subtraction units 18 (addition and subtraction units 18-1 through 18-12), namely, four parallel arranged units 18 being cascaded by three stages. Each of the addition and subtraction units 18-1 through 18-12 has the same function as the addition and subtraction unit 18.

The addition and subtraction unit 18-1 performs an addition operation and a subtraction operation on the odd field Ao and the even field Ae supplied from the field demultiplexer 751, thereby supplying an addition result Ao+Ae to the addition and subtraction unit 18-5 at the second stage and a subtraction result Ao−Ae to the addition and subtraction unit 18-6 at the second stage. The addition and subtraction unit 18-2 performs an addition operation and a subtraction operation on the odd field Be and an even field Be supplied from the field demultiplexer 751, thereby supplying an addition result Bo+Be to the addition and subtraction unit 18-5 at the second stage and a subtraction result Bo−Be to the addition and subtraction unit 18-6 at the second stage.

The addition and subtraction unit 18-3 performs an addition operation and a subtraction operation on the odd field Co and the even field Ce supplied from the field demultiplexer 751, thereby supplying an addition result Co+Ce to the addition and subtraction unit 18-7 at the second stage, and a subtraction result Co−Ce to the addition and subtraction unit 18-8 at the second stage. The addition and subtraction unit 18-4 performs an addition operation and a subtraction operation on the even field Do and the odd field De, thereby supplying an addition result Do+De to the addition and subtraction unit 18-7 at the second stage, and a subtraction result Do−De to the addition and subtraction unit 18-8 at the second stage.

The addition and subtraction unit 18-5 performs an addition operation and a subtraction operation on the addition result Ao+Ae and the subtraction result Bo+Be, thereby supplying an addition result Ao+Ae+Bo+Be to the addition and subtraction unit 18-9 at the third stage, and a subtraction result AO+Ae−Bo−Be to the addition and subtraction unit 18-11 at the third stage. The addition and subtraction unit 18-16 performs an addition operation and a subtraction operation on the subtraction result Ao−Ae and the subtraction result Bo−Be, thereby supplying an addition result Ao−Ae+Bo−Be to the addition and subtraction unit 18-10 at the third stage and a subtraction result Ao−Ae−Bo+Be to the addition and subtraction unit 18-12 at the third stage.

The addition and subtraction unit 18-7 at the second stage performs an addition operation and a subtraction operation on the addition result Co+Ce and addition result Do+De, thereby supplying an addition result Co+Ce+Do+De to the addition and subtraction unit 18-9 at the third stage and a subtraction result Co+Ce−Do−De to the addition and subtraction unit 18-11 at the third stage. The addition and subtraction unit 18-8 performs an addition operation and a subtraction operation on the subtraction result Co−Ce and the subtraction result Do−De, thereby supplying an addition result Co−Ce+Do−De to the addition and subtraction unit 18-10 at the third stage and a subtraction result Co−Ce−Do+De to the addition and subtraction unit 18-12 at the third stage.

The addition and subtraction unit 18-9 at the third stage performs an addition operation and a subtraction operation on the addition result Ao+Ae+Bo+Be and addition result Co+Ce+Do+De, thereby supplying an addition result Ao+Ae+Bo+Be+Co+Ce+Do+De and a subtraction result Ao+Ae+Bo+Be−Co−Ce−Do−De to the intra encoder 762. The addition and subtraction unit 18-10 performs an addition operation and a subtraction operation on the addition result Ao−Ae+Bo−Be and the addition result Co−Ce+Do−De, thereby supplying an addition result Ao−Ae+Bo−Be+Co−Ce+Do−De and a subtraction result Ao−Ae+Bo−Be−Co+Ce−Do+De to the intra encoder 762.

The addition and subtraction unit 18-11 performs an addition operation and a subtraction operation on the subtraction result Ao+Ae−Bo−Be and the subtraction result Co+Ce−Do−De, thereby supplying an addition result Ao+Ae−Bo−Be+Co+Ce−Do−De and a subtraction result Ao+Ae−Bo−Be−Co−Ce+Do+De to the intra encoder 762. The addition and subtraction unit 18-12 performs an addition operation and a subtraction operation on the subtraction result Ao−Ae−Bo+Be and the subtraction result Co−Ce−Do+De, thereby supplying an addition result Ao−Ae−Bo+Be+Co−Ce−Do+De and a subtraction result Ao−Ae−Bo+Be−Co+Ce+Do−De to the intra encoder 762.

If the intra encoder 762 separately encodes the operation results, the rate controller 761 sets a target code amount in each of the operation results. If the intra encoder 762 integrally encodes the operation results, the rate controller 761 sets a target code amount to encode integrally all operation results. Upon acquiring the target code amount set in the rate controller 761, the intra encoder 762 encodes the eight operation results in accordance with the target code amount, multiplexes the encoded data as necessary, and outputs a single encoded stream.

The rate controller 761 and the intra encoder 762 are different from the rate controller 711 and the intra encoder in terms of the number of operation results handled in parallel, but sets the target code amount and performs the encoding process on the operation results in the same way as the rate controller 711 and the intra encoder 712. The output encoded stream is then supplied to an image encoding apparatus corresponding to the image encoding apparatus 741.

Figure 67:
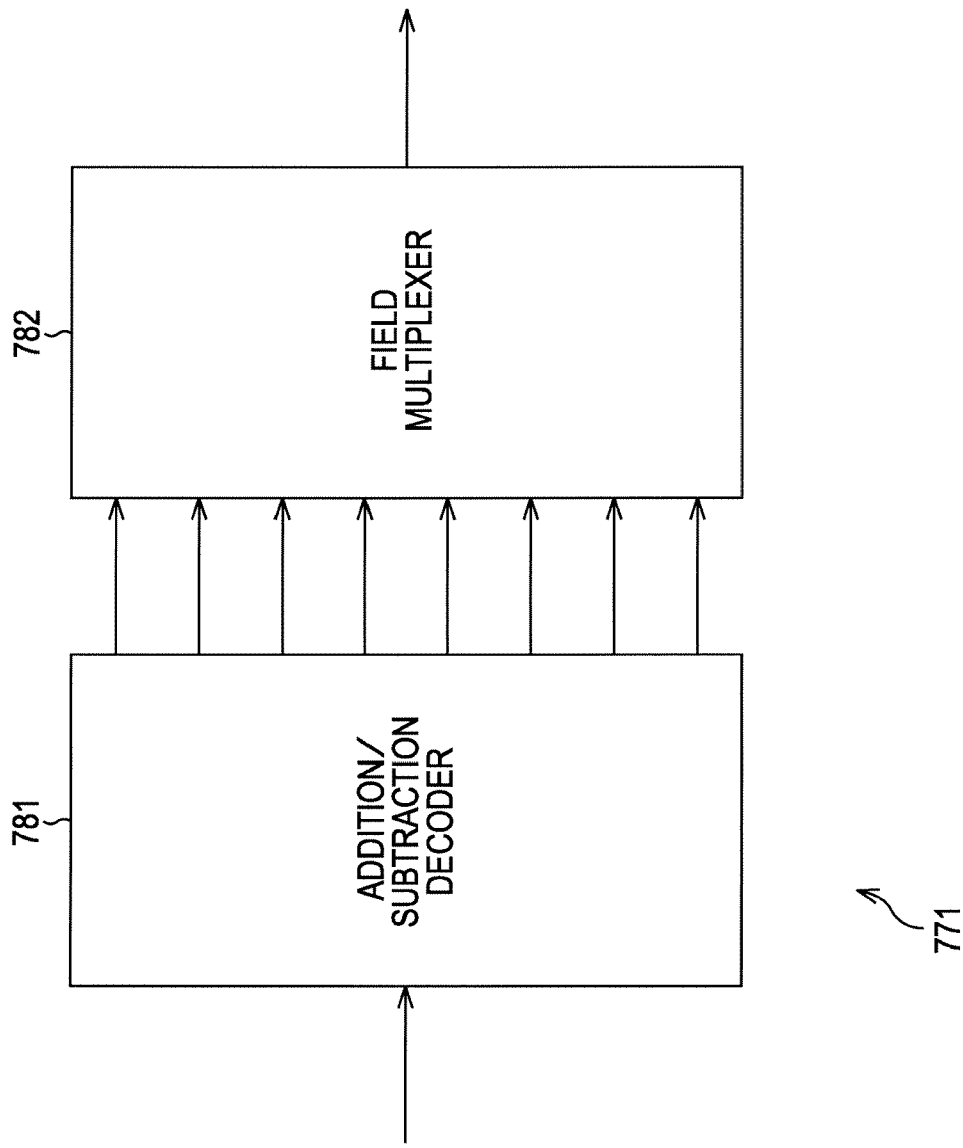
FIG. 67 is a block diagram illustrating the structure of an image decoding apparatus.

FIG. 67 is a block diagram illustrating the structure of the image decoding apparatus corresponding to the image encoding apparatus of FIG. 64 that performs the three-stage addition and subtraction operations.

The image decoding apparatus 771 of FIG. 67 includes an addition/subtraction decoder 781 and a field multiplexer 782. The addition/subtraction decoder 781 decodes the input encoded stream, and performs addition and subtraction operations on eight decoding results, thereby generating data relating to eight frames. The field multiplexer 782 restores data of each field from the data of the eight fields, and multiplexes the field data, thereby original moving image data.

The image decoding apparatus 771 is basically identical to the image decoding apparatus 721 of FIG. 63 except that the number of fields handled is increased.

Figure 68:
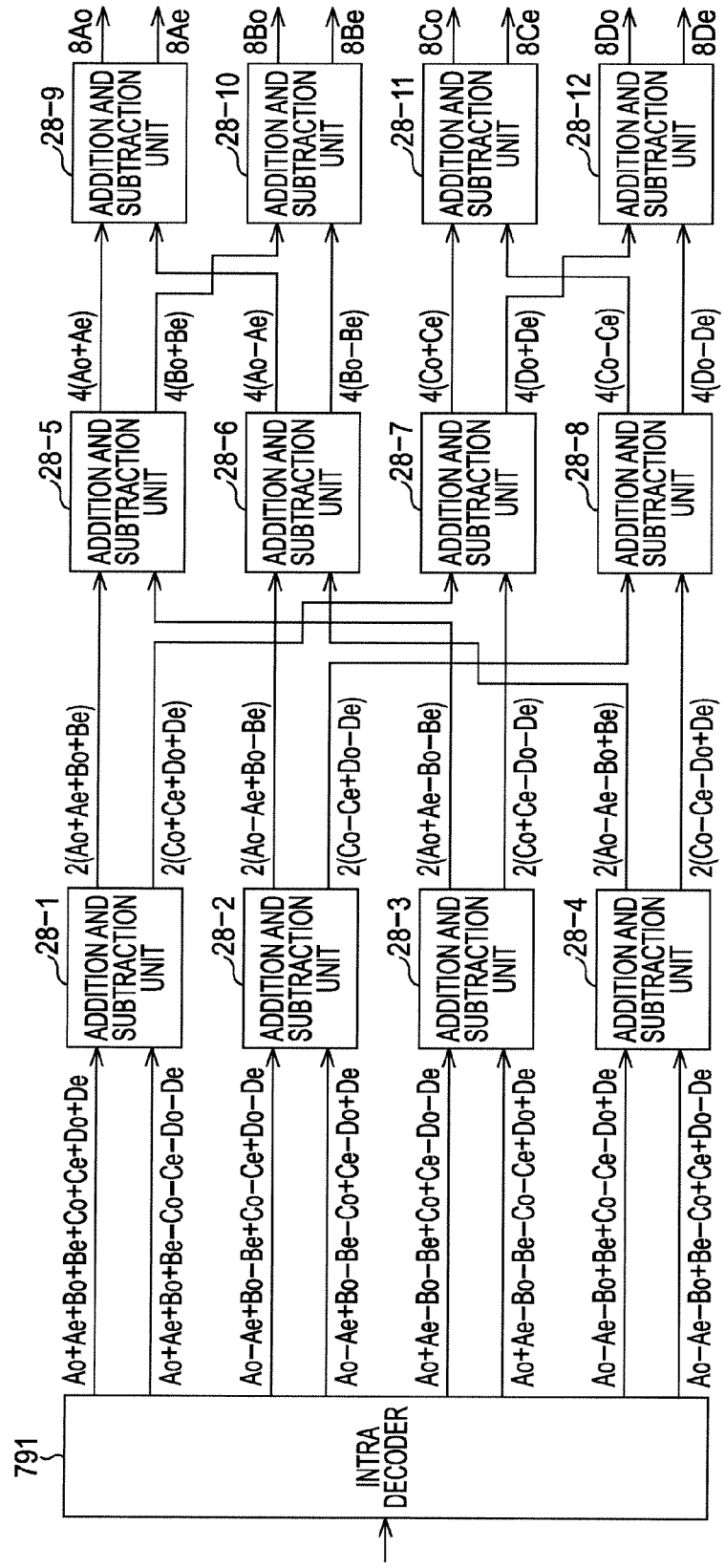
FIG. 68 is a block diagram illustrating an addition and subtraction decoder.

FIG. 68 is a block diagram illustrating in detail the structure of the addition/subtraction decoder 781 of FIG. 67.

As one of the intra decoder 60 and the intra decoder 731, an intra decoder 791 decodes an encoded stream supplied from the image encoding apparatus 741 in a method corresponding to the encoding method of the image encoding apparatus 741, thereby resulting in eight operation results.

As shown in FIG. 68, the addition/subtraction decoder 781 includes twelve addition and subtraction units 28 (addition and subtraction units 28-1 through 28-12), namely, four parallel arranged units 28 being cascaded by three stages. Each of the addition and subtraction units 28-1 through 28-12 has the same function as the addition and subtraction unit 28.

The intra decoder 791 supplies, out of the eight operation results, the addition result Ao+Ae+Bo+Be+Co+Ce+Do+De and the subtraction result Ao+Ae+Bo+Be−Co−Ce−Do−De to the addition and subtraction unit 28-1, the addition result Ao−Ae+Bo−Be+Co−Ce+Do−De and the subtraction result Ao−Ae+Bo−Be−Co+Ce−Do+De to the addition and subtraction unit 28-2, the addition result Ao+Ae−Bo−Be+Co+Ce−Do−De and the subtraction result Ao+Ae−Bo−Be−Co−Ce+Do+De to the addition and subtraction unit 28-3, and the addition result Ao−Ae−Bo+Be+Co−Ce−Do+De and the subtraction result Ao−Ae−Bo+Be−Co+Ce+Do−De to the addition and subtraction unit 28-4.

The addition and subtraction unit 28-1 performs an addition operation and a subtraction operation on the addition result Ao+Ae+Bo+Be+Co+Ce+Do+De and the subtraction result Ao+Ae+Bo+Be−Co−Ce−Do−De, thereby supplying an addition result 2(Ao+Ae+Bo+Be) to the addition and subtraction unit 28-5 at the second stage and a subtraction result 2(Co+Ce+Do+De) to the addition and subtraction unit 28-7 at the second stage. The addition and subtraction unit 28-2 performs an addition operation and a subtraction operation on the addition result Ao−Ae+Bo−Be+Co−Ce+Do−De and the subtraction result Ao−Ae+Bo−Be−Co+Ce−Do+De, thereby supplying an addition result 2(Ao−Ae+Bo−Be) to the addition and subtraction unit 28-6 at the second stage and a subtraction result 2(Co−Ce+Do−De) to the addition and subtraction unit 28-8.

The addition and subtraction unit 28-3 performs an addition operation and a subtraction operation on the addition result Ao+Ae−Bo−Be+Co+Ce−Do−De and the subtraction result Ao+Ae−Bo−Be−Co−Ce+Do+De, thereby supplying an addition result 2(Ao+Ae−Bo−Be) to the addition and subtraction unit 28-5 at the second stage and a subtraction result 2(Co+Ce−Do−De) to the addition and subtraction unit 28-7.

The addition and subtraction unit 28-4 performs an addition operation and a subtraction operation on the addition result Ao−Ae−Bo+Be+Co−Ce−Do+De and the subtraction result Ao−Ae−Bo+Be−Co+Ce+Do−De, thereby supplying an addition result 2(Ao−Ae−Bo+Be) to the addition and subtraction unit 28-6 at the second stage and a subtraction result 2(Co−Ce−Do+De) to the addition and subtraction unit 28-8.

The addition and subtraction unit 28-5 performs an addition operation and a subtraction operation on the addition result 2(Ao+Ae+Bo+Be) and the addition result 2(Ao+Ae−Bo−Be), thereby supplying an addition result 4(Ao+Ae) to the addition and subtraction unit 28-9 at the third stage and a subtraction result 4(Bo+Be) to the addition and subtraction unit 28-10 at the third stage. The addition and subtraction unit 28-6 performs an addition operation and a subtraction operation on the subtraction result 2(Ao−Ae+Bo−Be) and the subtraction result 2(Ao−Ae+Bo−Be), thereby supplying an addition result 4 (Ao−Ae) to the addition and subtraction unit 28-11 at the third stage and a subtraction result 4(Ao−Ae) to the addition and subtraction unit 28-12 at the third stage.

The addition and subtraction unit 28-7 performs an addition operation and a subtraction operation on the subtraction result 2(Co+Ce+Do+De) and the subtraction result 2(Co+Ce−Do−De), thereby supplying an addition result 4(Co+Ce) to the addition and subtraction unit 28-11 at the third stage and a subtraction result 4(Do+De) to the addition and subtraction unit 28-12 at the third stage. The addition and subtraction unit 28-8 performs an addition operation and a subtraction operation on the subtraction result 2(Co−Ce+Do−De) and the subtraction result 2(Co−Ce−Do+De), thereby supplying an addition result 4(Co−Ce) to the addition and subtraction unit 28-11 at the third stage and a subtraction result 4(Do−De) to the addition and subtraction unit 28-12 at the third stage.

The addition and subtraction unit 28-9 performs an addition operation and a subtraction operation on the addition result 4(Ao+Ae) and the addition result 4(Ao−Ae), thereby outputting an addition result 8Ao and a subtraction result 8Ae to the field multiplexer 782. The addition and subtraction unit 28-10 performs an addition operation and a subtraction operation on the subtraction result 4(Bo+Be) and the subtraction result 4(Bo−Be), thereby supplying an addition result 8Bo and a subtraction result 8Be to the field multiplexer 782.

The addition and subtraction unit 28-11 performs an addition operation and a subtraction operation on the addition result 4(Co+Ce) and the addition result 4(Co−Ce), thereby outputting an addition result 8Co and a subtraction result 8Ce to the field multiplexer 782. The addition and subtraction unit 28-12 performs an addition operation and a subtraction operation on the subtraction result 4(Do+De) and the subtraction result 4(Do−De), thereby outputting an addition result 8Do and a subtraction result 8De to the field multiplexer 782.

Figure 69:
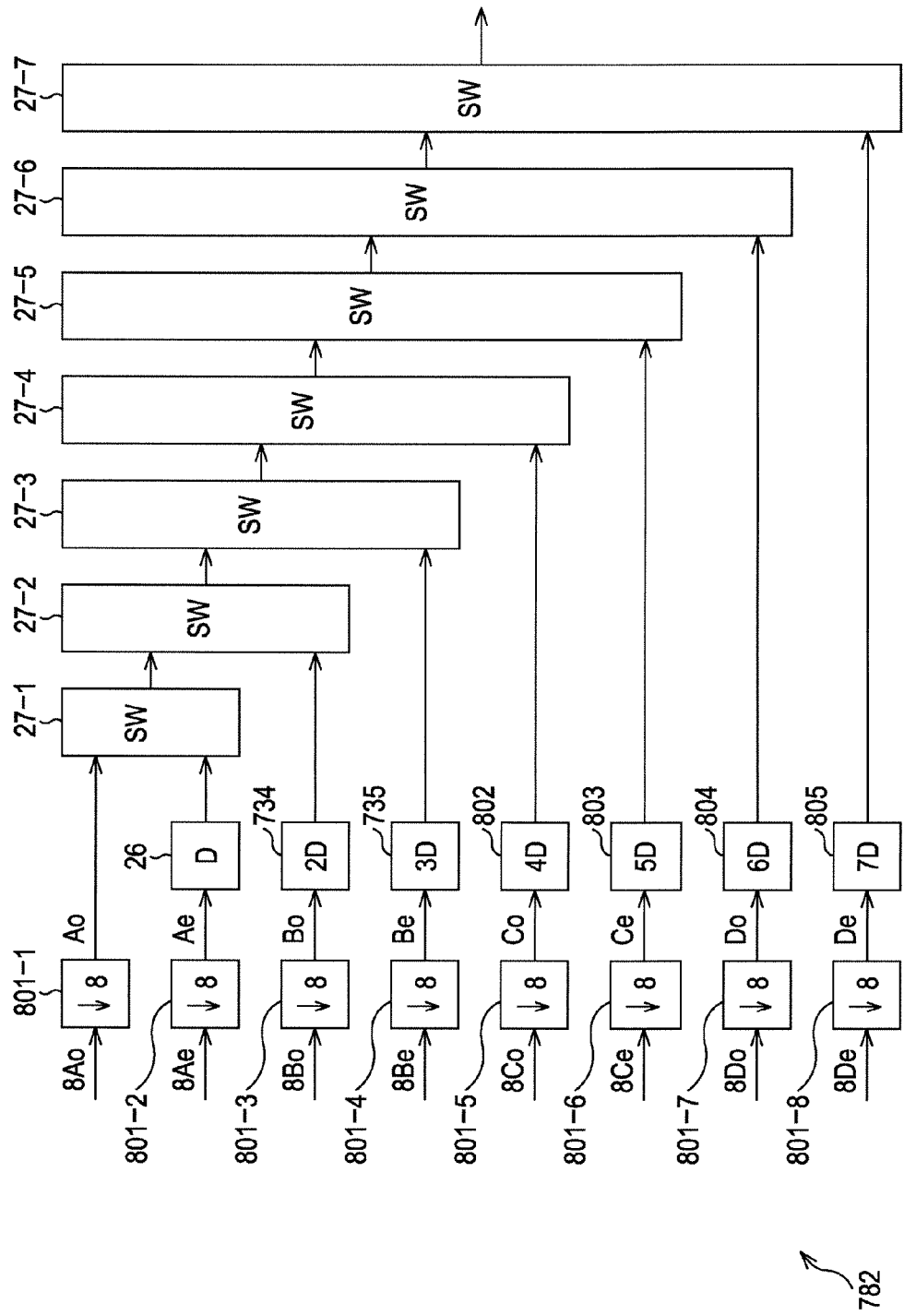
FIG. 69 is a block diagram illustrating the structure of a field multiplexer.

FIG. 69 is a block diagram illustrating in detail the structure of the field multiplexer 782 of FIG. 67.

As shown in FIG. 69, the field multiplexer 782 includes dividers 801-1 through 801-8 for dividing the input operation result by 8, a field delay unit 26(D) for delaying the input data by one field, a field delay unit 734(2D) for delaying the input data by two fields, a field delay unit 735(3D) for delaying the input data by three fields, a field delay unit 802(4D) for delaying the input data by four fields, a field delay unit 803 (5D) for delaying the input data by five fields, a field delay unit 804(6D) for delaying the input data by six fields, a field delay unit 805(7D) for delaying the input data by seven fields, and switches 27-1 through 27-7 identical in structure to the switch 27 of FIG. 4.

The addition result 8Ao input to the field multiplexer 782 is divided by 8 by the divider 801-1 and then supplied to the switch 27-1. The addition result 8Bo is divided by 8 by the divider 801-2, then delayed by one field by field delay unit 26, and supplied to the switch 27-1. The switch 27-1 thus receives the odd field Ao of the frame A and the even field Ae of the frame A in that order. By switching the input, the switch 27-1 successively the field data to the switch 27-2.

The addition result 8Bo input to the field multiplexer 782 is divided by 8 by the divider 801-3, delayed by two fields by the field delay unit 734, and then supplied to the switch 27-2. The switch 27-2 thus receives the odd field Ao of the frame A, the even field Ae of the frame A, and the odd field Bo of the frame B in that order. By switching the input, the switch 27-2 supplies the field data to the switch 27-3 in the order of reception.

The addition result 8Be input to the field multiplexer is divided by 8 by the divider 801-4, delayed by three fields by the field delay unit 735, and then supplied to the switch 27-3. The switch 27-3 thus receives the odd field Ao of the frame A, the even field Ae of the frame A, the odd field Bo of the frame B, and the even field Be of the frame B in that order. By switching the input, the switch 27-3 supplies the field data to the switch 27-4 in the order of reception.

The addition result 8Co input to the field multiplexer 782 is divided by 8 by the divider 801-5, delayed by four fields by the field delay unit 802, and then supplied to the switch 27-4. The switch 27-4 thus receives the odd field Ao of the frame A, the even field Ae of the frame A, the odd field Bo of the frame B, the even field Be of the frame B, and the odd field Co of the frame C in that order. By switching the input, the switch 27-4 supplies the field data to the switch 27-5 in the order of reception.

The addition result 8Ce input to the field multiplexer 782 is divided by 8 by the divider 801-6, delayed by five fields by the field delay unit 803, and then supplied to the switch 27-5. The switch 27-5 receives the odd field Ao of the frame A, the even field Ae of the frame A, the odd field Bo of the frame B, the even field Be of the frame B, the odd field Co of the frame C, and the even field Ce of the frame C in that order. By switching the input, the switch 27-5 supplies the field data to the switch 27-6 in the order of reception.

The addition result 8Do input to the field multiplexer 782 is divided by 8 by the divider 801-7, delayed by six fields by the field delay unit 804, and then supplied to the switch 27-6. The switch 27-6 thus receives the odd field Ao of the frame A, the even field Ae of the frame A, the odd field Bo of the frame B, the even field Be of the frame B, the odd field Co of the frame C, the even field Ce of the frame C, and the odd field Do of the frame D in that order. By switching the input, the switch 27-6 supplies the field data to the switch 27-7 in the order of reception.

The addition result 8De input to the field multiplexer 782 is divided by 8 by the divider 801-8, delayed by seven fields by the field delay unit 805, and then supplied to the switch 27-7. The switch 27-7 thus receives the odd field Ao of the frame A, the even field Ae of the frame A, the odd field Bo of the frame B, the even field Be of the frame B, the odd field Co of the frame C, the even field Ce of the frame C, the odd field Do of the frame D, and the even field De of the frame D in that order. By switching the input, the switch 27-7 outputs the field data in the order of reception as the decoded image data outside the image decoding apparatus 771.

As described above, the image decoding apparatus 771 decodes the stream into which the eight operation results of the image data of the four frames are encoded, and results in the decoded image data. The image decoding apparatus 771 decodes the stream that has been encoded by the image encoding apparatus 741.

The image encoding process of the image encoding apparatus 741 is substantially equal to the image encoding process of the image encoding apparatus 701 discussed with reference to the flowcharts of FIGS. 13, 20, and 26 except that the number of addition and subtraction operations increases. The discussion of the image encoding process of the image encoding apparatus 741 is thus omitted herein. In the image encoding apparatus 741, the process flow of the image encoding process for encoding separately the operation results corresponds to the flowchart of FIG. 13, the process flow of the image encoding process for encoding integrally the operation results corresponds to the flowchart of FIG. 20, and the process flow of the image encoding process for selecting between encoding separately the operation results and encoding integrally operation results corresponds to the flowchart of FIG. 26.

Figure 14:
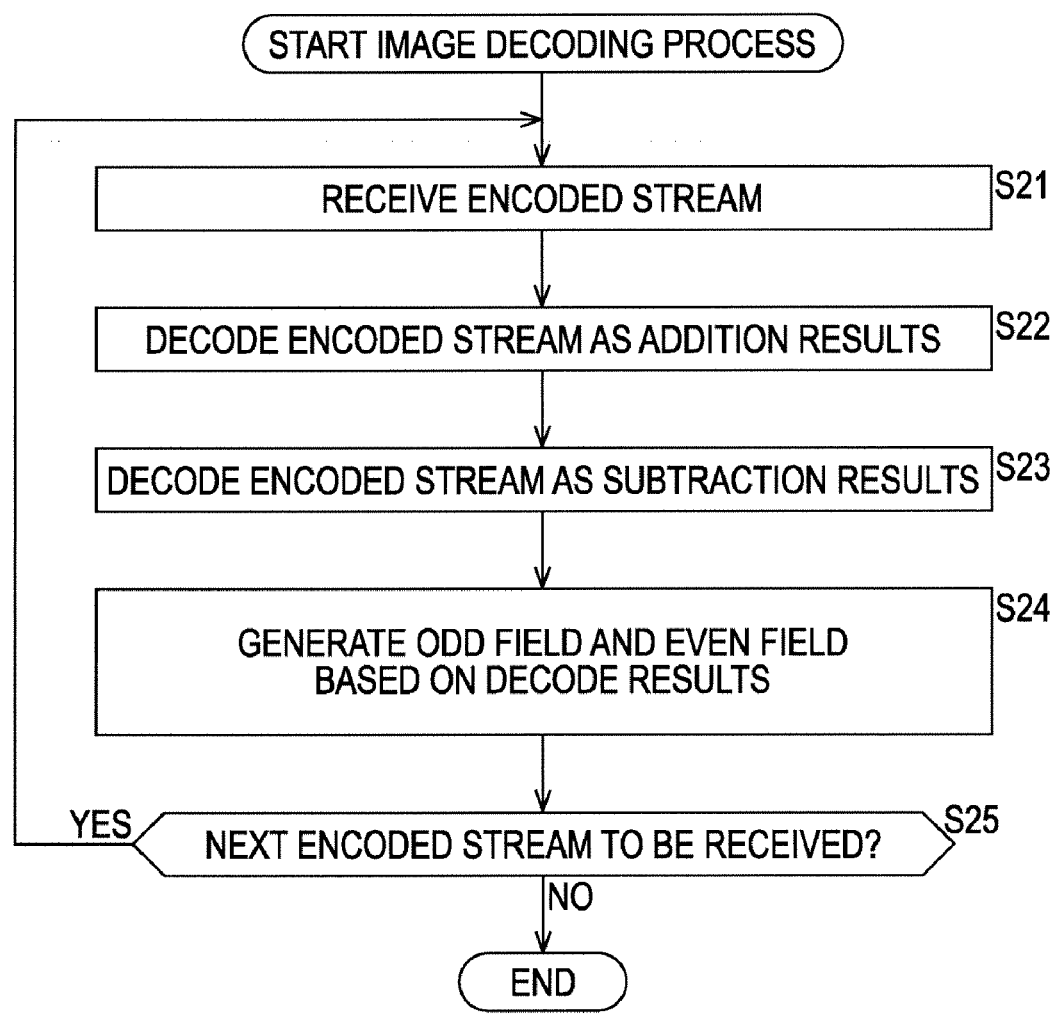
FIG. 14 is a flowchart illustrating a process flow of an image decoding process.
Figure 21:
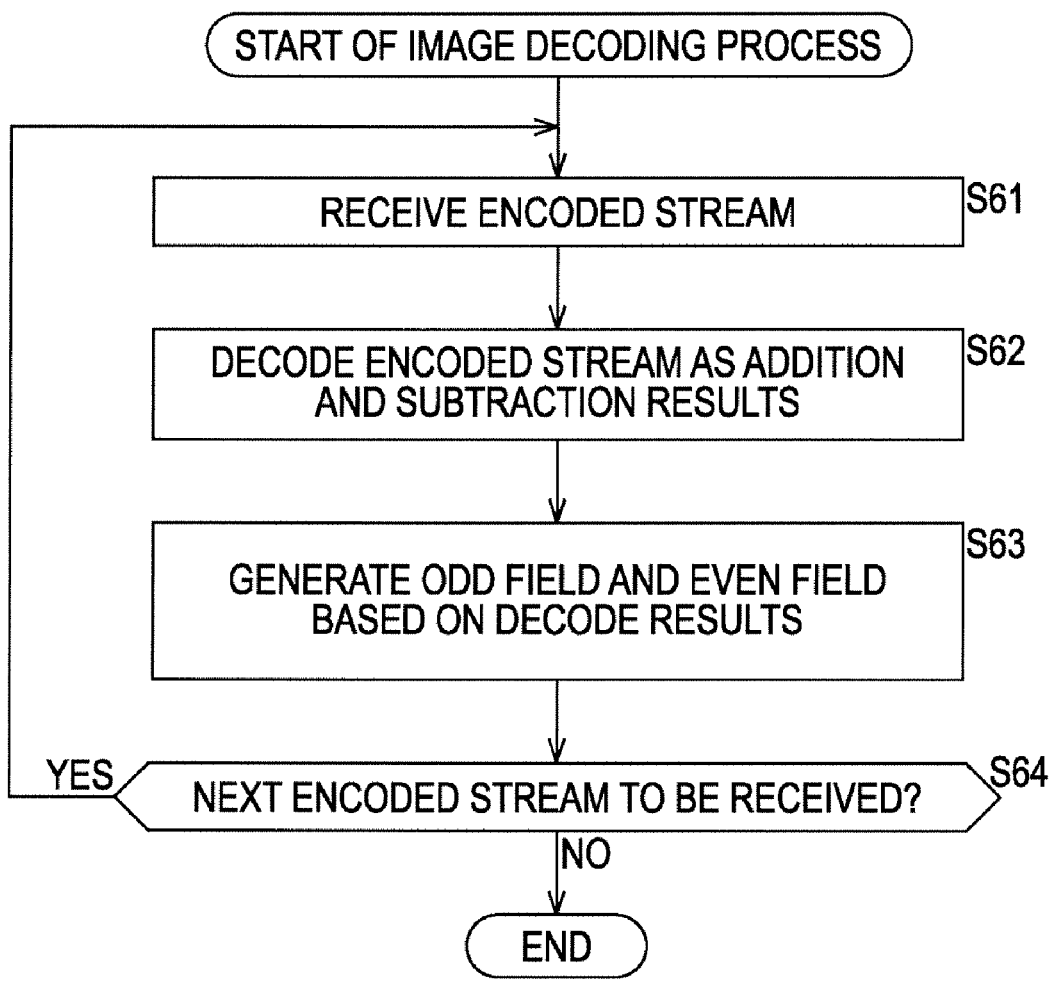
FIG. 21 is a flowchart illustrating a process flow of an image decoding process.
Figure 27:
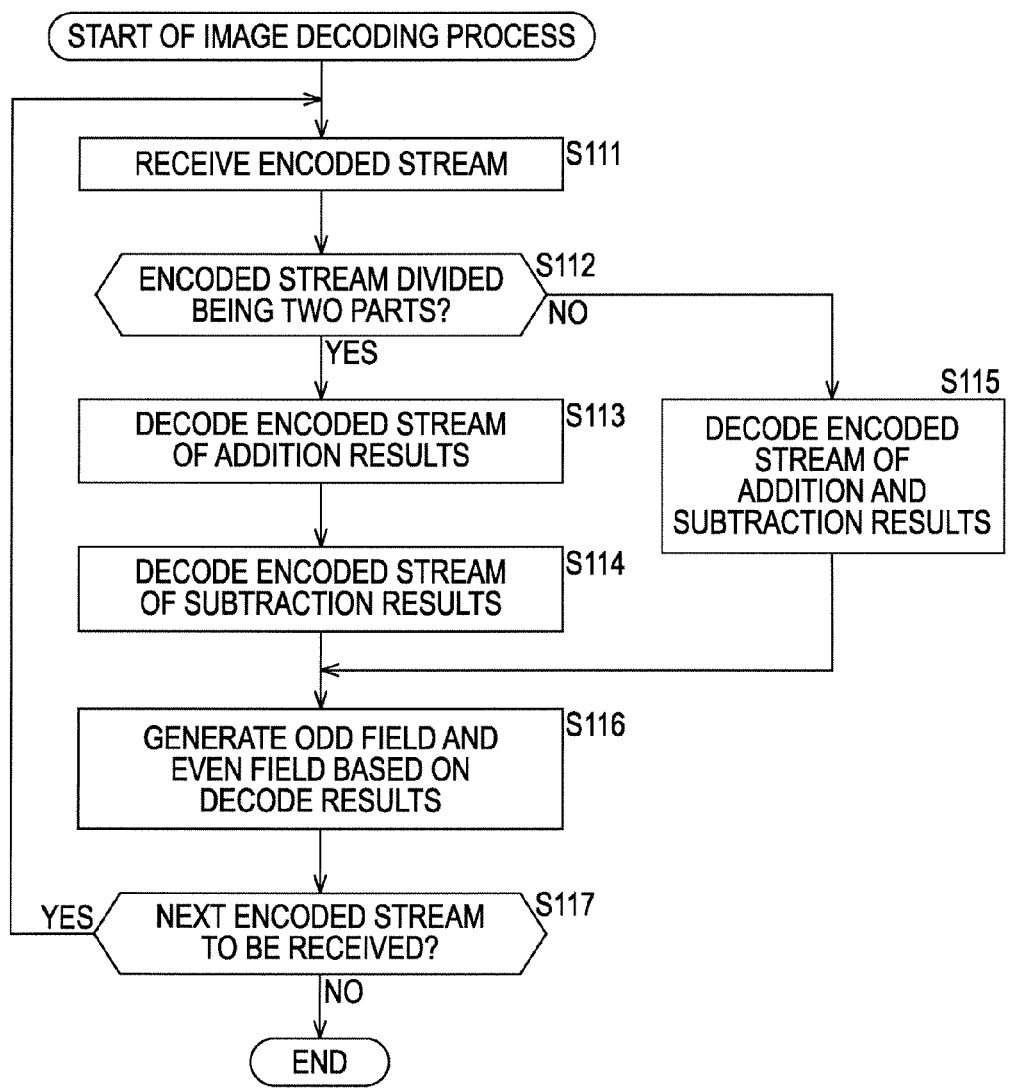
FIG. 27 is a flowchart illustrating a process flow of an image decoding process.

As the image encoding apparatus 741, the image decoding apparatus 771 also performs the image decoding process illustrated in the flowcharts of FIGS. 14, 21 and 27 except that the number of addition and subtraction operations is increased, and the discussion of the image decoding process of the image decoding apparatus 771 is omitted herein.

If the number of stages of additions and subtractions is increased, the delay time increases. As previously discussed with reference to FIGS. 28 through 61, an increase in the delay time is controlled to some degree by performing the encoding process by line block.

Figure 70:
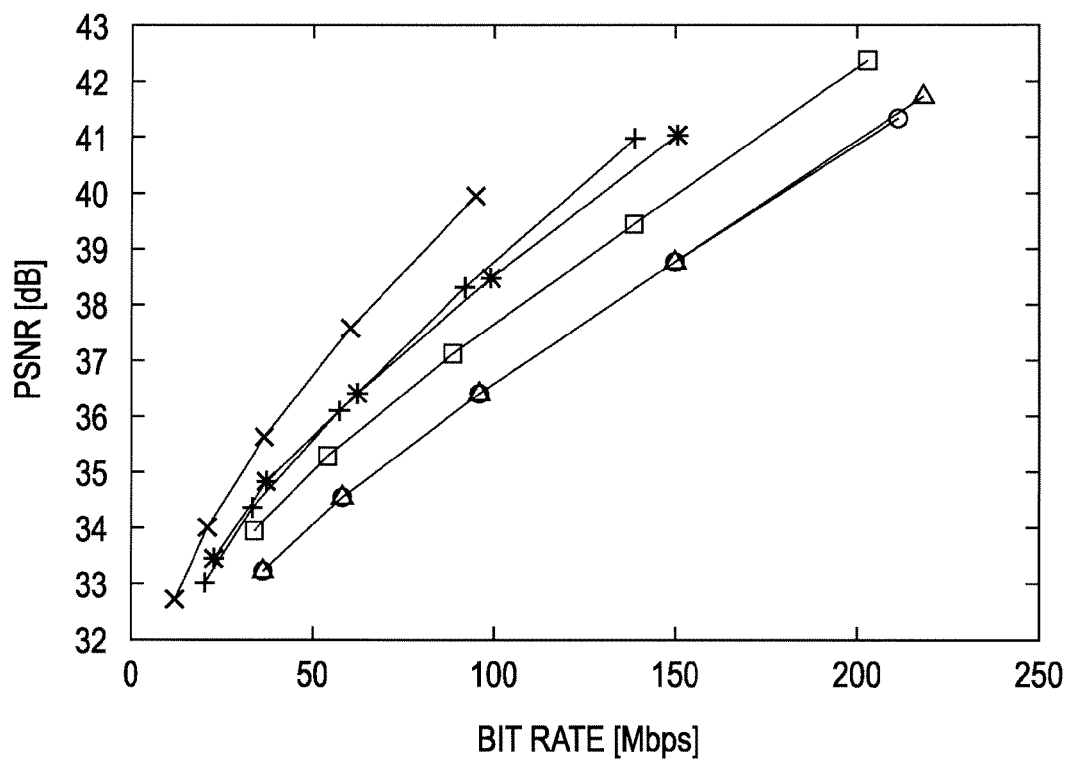
FIG. 70 is a plot of the relationship between a bit rate and a distortion factor.
Figure 71:
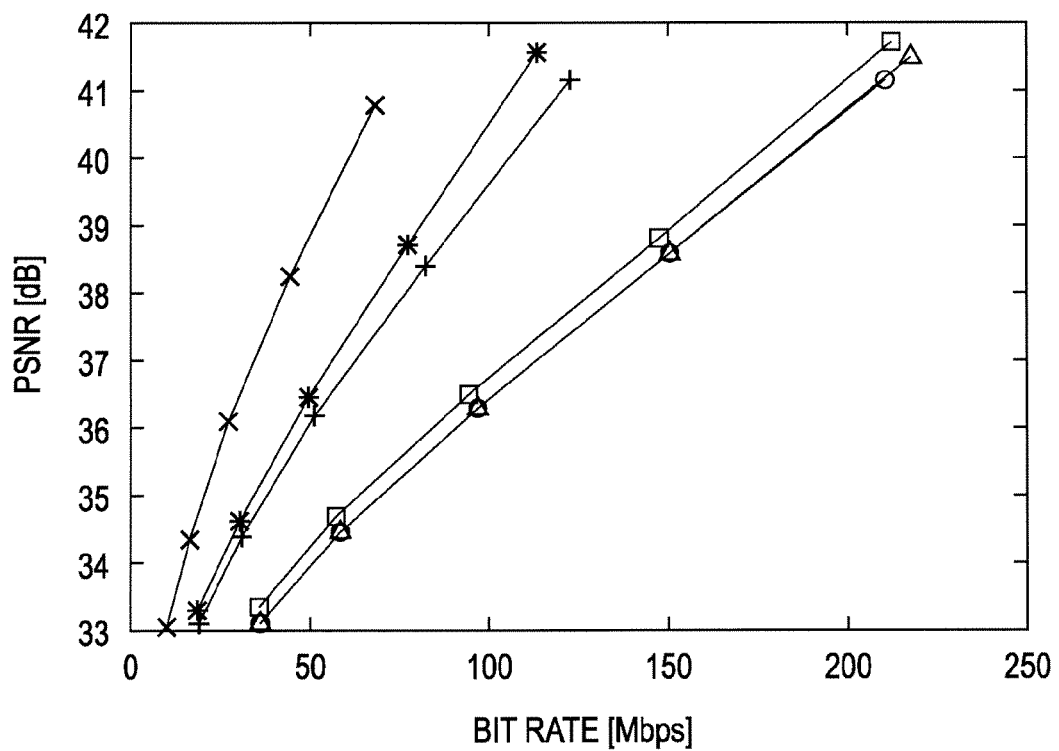
FIG. 71 is a plot of the relationship between a bit rate and a distortion factor.

FIGS. 70 and 71 are plots of the effect of the number of repetitions of addition and subtraction to the relationship between bit rate and distortion factor. As shown in FIGS. 70 and 71, the abscissa represents the bit rage (Mbps), and the ordinate represents the distortion factor (PSNR (Peak Signal-to-Noise Ratio) [dB]). Test data plotted in FIG. 70 and test data plotted in FIG. 71 result from images having different characteristics as image data to be encoded.

When original image data is encoded, then decoded, and the decoded image data and the original image data are compared with each other. The distortion factor (PSNR) serves as a measure in the evaluation of a difference between the decoded image data and the original image data. The larger the distortion factor, the more similar the two images are.

As shown in FIG. 70, triangle symbols represent the relationship between the bit rate and the distortion factor as in the known art where the encoding process is performed without performing addition operation and subtraction operation, and cross symbols represent the relationship between the bit rate and the distortion factor in the image encoding apparatus of FIG. 1 or FIG. 15, i.e., where the encoding process is performed after one addition and subtraction operation is performed. In comparison of the two cases in FIG. 70, the cross symbol test data shows a larger PSNR value, and provides a better image quality. More specifically, the process of the present invention, namely, the encoding performed after the single operation of addition and subtraction between fields results in better subjective image quality than the known art where the encoding is performed without performing addition and subtraction operation between fields.

As shown in FIG. 70, square symbols represent the relationship between the bit rate and the distortion factor in the encoding process where the image data to be encoded is segmented into bit planes but the encoding is performed without performing addition and subtraction operation, and asterisk symbols represent the relationship between the bit rate and the distortion factor in the encoding process where the image data to be encoded is segmented into bit planes and the encoding is performed after the addition and subtraction operation. In comparison of the bit rates in the two cases, the asterisk symbol data has a larger PSNR value and provides a better image quality. In this case, as well, the process of the present invention, namely, the encoding performed after the single operation of addition and subtraction between fields results in better subjective image quality than the known art where the encoding is performed without performing addition and subtraction operation between fields.

As shown in FIG. 70, blank circle symbols represent the relationship between the bit rate and the distortion factor as in the known art where the encoding process is performed without performing addition operation and subtraction operation, and letters x represent the relationship between the bit rate and the distortion factor in the image encoding apparatus 701 of FIG. 62, i.e., where the encoding process is performed after two addition and subtraction operations are performed. In comparison of the two cases in FIG. 70, the letter x test data shows a larger PSNR value, and provides a better image quality. More specifically, the process of the present invention, namely, the encoding performed after the two operations of addition and subtraction between fields results in better subjective image quality than the known art where the encoding is performed without performing addition and subtraction operation between fields.

In comparison of the cross symbol data and the letter x data, the letter x data shows a larger PSNR and a better quality image. More specifically, the more the number of the addition and subtraction operations among fields, the better the subjective image quality of the decoded image becomes.

As shown in FIG. 71, the triangular symbol, the cross symbol, the blank square symbol, the asterisk symbol, the blank circle symbol, and the letter x represent the same data type as the ones shown in FIG. 70. As shown in FIG. 71, the more the number of the addition and subtraction operations among fields, the better the subjective image quality of the decoded image becomes.

The image encoding apparatus and the image decoding apparatus may employ the encoding method and the decoding method, each performed on a per line block basis as described with reference to FIGS. 28 through 61, without performing field addition and subtraction process as described with reference to FIGS. 1 through 27. In such a case, any delay time resulting from the field addition and subtraction operation does not occur as illustrated in FIG. 72, and the encoding process and the decoding process are performed at high speed (with small delay time).

FIG. 72 diagrammatically illustrates the delay time. As shown in the upper portion of FIG. 72, the delay time is "d" shorter than one field if only the encoding method or only the decoding method is performed on a per line block as described with reference to FIGS. 28 through 61. In contrast, if the encoding process is performed on a per line block basis after the field addition and subtraction operation as shown in the lower portion of FIG. 72, the delay time is the sum of time "i" equal to one field required for the field addition and subtraction operation and the time "d." If the encoding process is performed but not on a per line basis, the delay time further increases.

As described above, the subject image quality of the decoded image is better when the field addition and subtraction operation is performed. As shown in the upper portion of FIG. 72, the encoding method of performing the encoding process on a per line block without performing the field addition and subtraction operation is the short delay priority mode that places higher priority on short delay than on image quality. As shown in the lower portion of FIG. 72, the encoding method of performing the encoding process on a per line block after performing the field addition and subtraction operation is an image quality priority mode that places higher priority on image quality than on delay time.

Any of the two modes may apply. The image encoding apparatus and the image decoding apparatus may support the two modes so that any of the two mode is selectively used.

Such image encoding apparatus and image decoding apparatus are described below.

Figure 73:
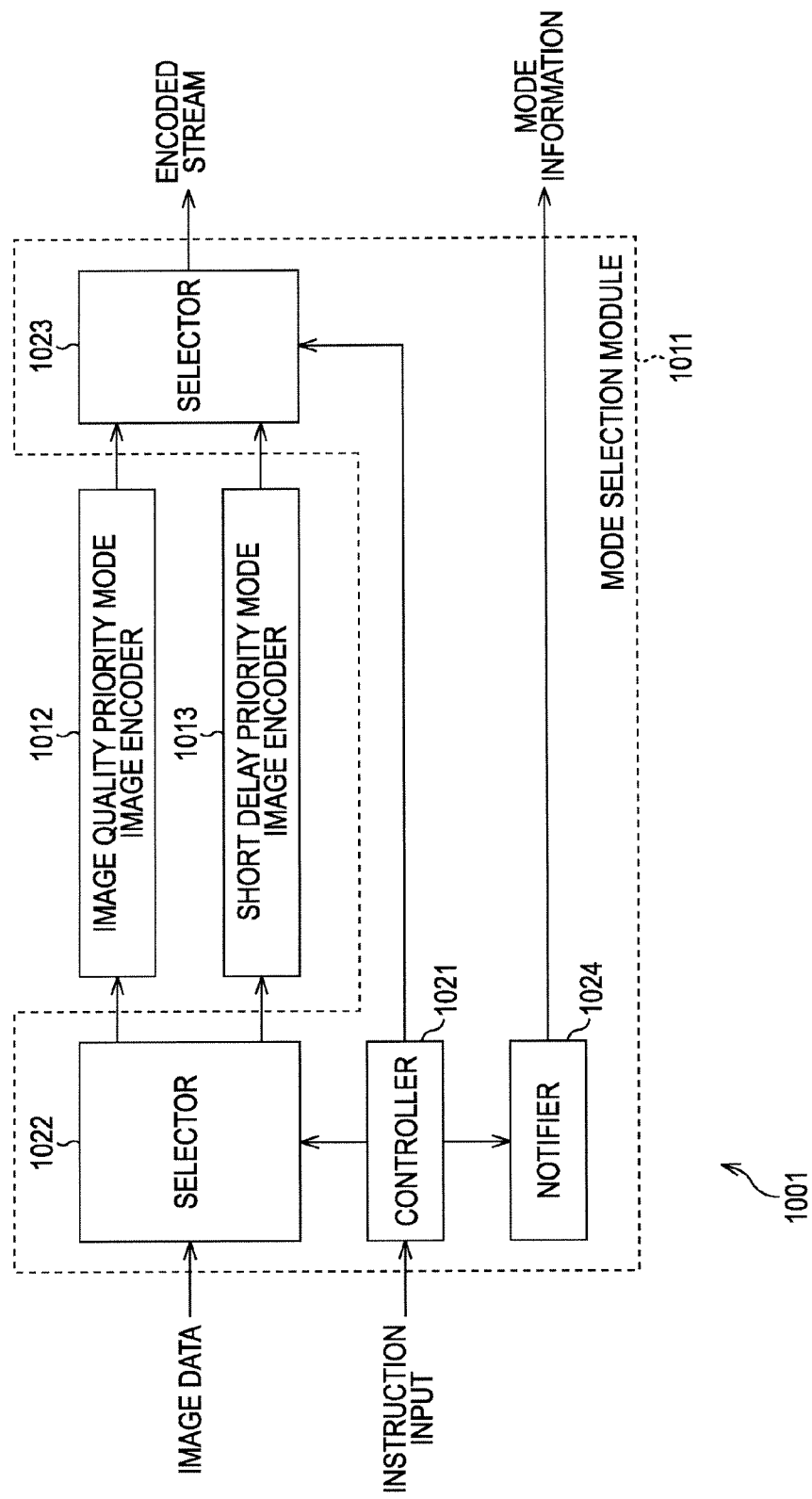
FIG. 73 is a block diagram illustrating the structure of an image encoding apparatus.

FIG. 73 is a block diagram illustrating the structure of the image encoding apparatus.

As shown in FIG. 73, the image encoding apparatus 1001 includes a mode selection module 1011, an image quality priority mode image encoder 1012, and a short delay priority mode image encoder 1013.

In response to the an instruction from a user or an external device, the mode selection module 1011 selects the mode of the encoding process between the image quality priority mode and the short delay priority mode. The mode selection module 1011 includes a controller 1021, a selector 1022, a selector 1023, and a notifier 1024.

The controller 1021 controls the operation of the selector 1022 and the selector 1023 in response to the instruction input from the outside. The controller 1021 also controls the notifier 1024, thereby causing the notifier 1024 to notify the image decoding apparatus of the selected mode.

The selector 1022 and the selector 1023, under the control of the controller 1021, switches the input and output of each of the image quality priority mode image encoder 1012 and the short delay priority mode image encoder 1013. More specifically, the controller 1021 controls the selector 1022 and the selector 1023, thereby switching between the image quality priority mode image encoder 1012 and the short delay priority mode image encoder 1013 to select one of the encoding modes.

The notifier 1024, under the control of the controller 1021, notifies the image decoding apparatus as a supply destination of the encoded stream of the encoding mode selected by the controller 1021 as mode information.

As described with reference to FIG. 72, the image quality priority mode image encoder 1012 performs the encoding process that places higher priority on the image quality than on the short delay time by encoding the image data on a per line block basis after performing the field addition and subtraction operation. More specifically, the image quality priority mode image encoder 1012 is the image encoding apparatus of FIG. 1 or FIG. 15 where the intra encoder discussed with reference to FIGS. 28 through 61 is applied. The discussion of the internal structure of the image quality priority mode image encoder 1012 is omitted. The subjective image quality of the decoded image is improved more in the encoding process performed by the image quality priority mode image encoder 1012 than the encoding process performed by the short delay priority mode image encoder 1013.

As described with reference to FIG. 72, the short delay priority mode image encoder 1013 performs the encoding process that places higher priority on the short delay time than on the image quality by encoding the image data on a per line block basis without performing the field addition and subtraction operation. More specifically, the short delay priority mode image encoder 1013 is the image encoding apparatus where only the intra encoder discussed with reference to FIGS. 28 through 61 applies. The discussion of the internal structure of the short delay priority mode image encoder 1013 is omitted herein. The delay time is shortened more in the encoding process performed by the short delay priority mode image encoder 1013 than the encoding process performed by the image quality priority mode image encoder 1012.

Figure 74:
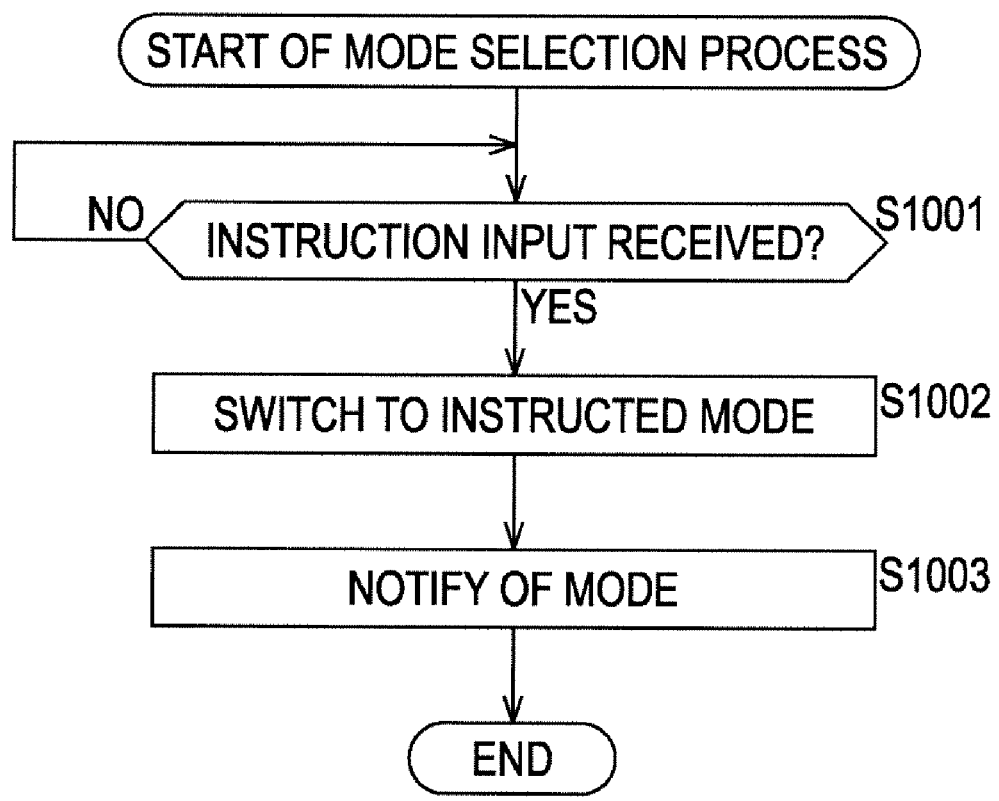
FIG. 74 is a flowchart illustrating a process flow of a mode selection process.

The mode selection process of the mode selection module 1011 in the image encoding apparatus 1001 is described below with reference to a flowchart of FIG. 74.

When the mode selection process starts, the controller 1021 starts receiving an instruction from the outside in step S1001, and waits on standby until the instruction has been received. Upon determining in step S1001 that the instruction has been received, the controller 1021 switches in step S1002 to the mode selected by the selector 1022 and the selector 1023. More specifically, the controller 1021 controls the selector 1022, thereby supplying the image data to be encoded to the image quality priority mode image encoder 1012 or the short delay priority mode image encoder 1013, whichever is selected. The controller 1021 further controls the selector 1023, thereby allowing the encoded stream to be output from the selected encoder.

The image quality priority mode image encoder 1012 or the short delay priority mode image encoder 1013, whichever is selected by the controller 1021, encodes the input image data, thereby outputting the encoded stream.

Upon switching the mode, the controller 1021 controls the notifier 1024 in step S1003, thereby notifying the image decoding apparatus as a supply destination of the encoded stream of the mode information identifying the selected mode.

As described above, the controller 1021 determines whether to perform the encoding process in one of the image quality priority mode and the short delay priority mode. The image encoding apparatus 1001 can thus perform the encoding process in various modes. In response to the applied apparatus or system, or the user's intension, the image encoding apparatus 1001 performs an optimum encoding method by placing higher priority on high quality image or short delay time. In other words, the application range of the image encoding apparatus 1001 is expanded. With the image encoding apparatus 1001 incorporated, development costs and manufacturing costs of the applied apparatus or system may be reduced.

The trigger of the mode selection operation is not limited to the instruction input. For example, the mode may be adaptively selected based on the content of the image data to be encoded without any instruction from the user.

Figure 75:
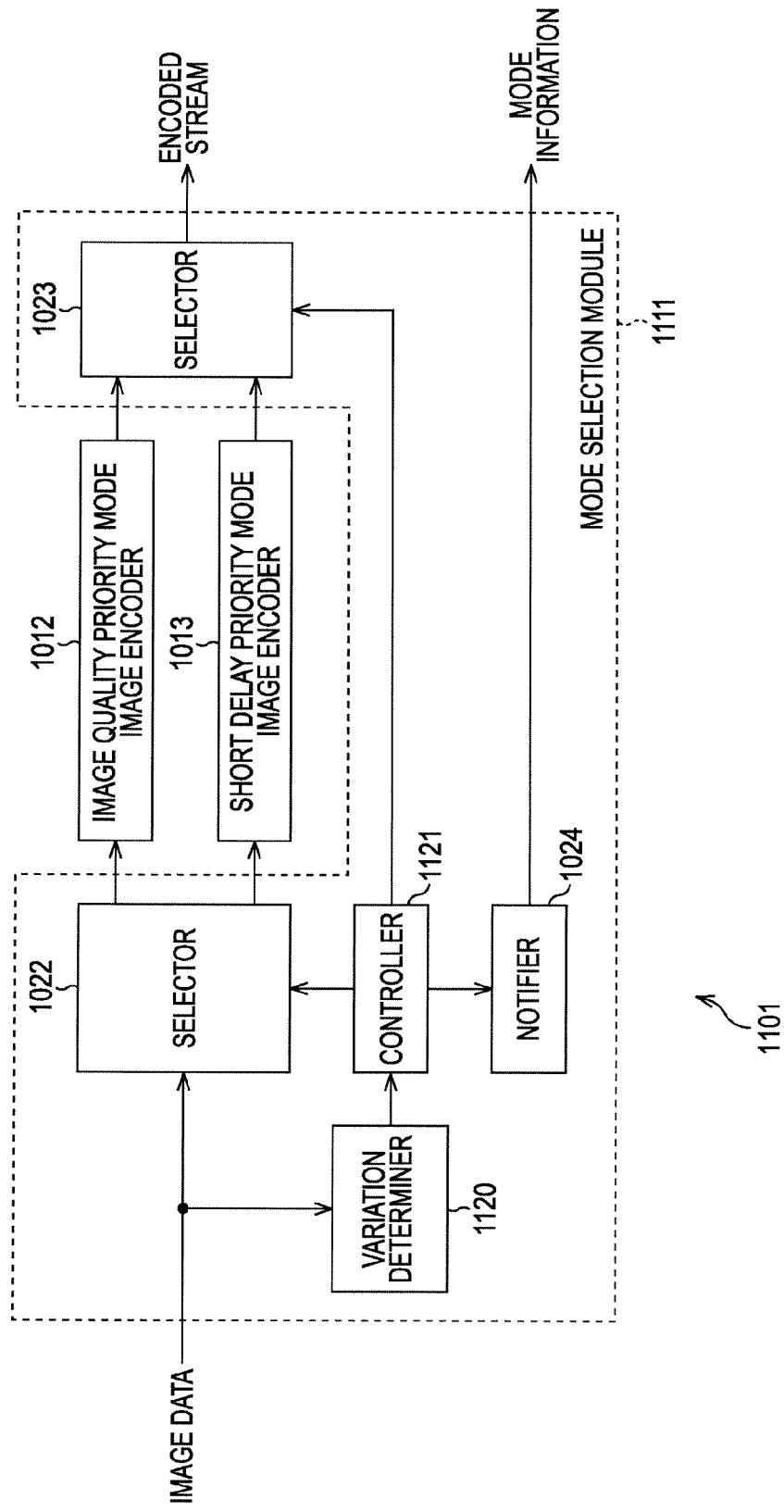
FIG. 75 is a block diagram illustrating the structure of an image encoding apparatus.

FIG. 75 is a block diagram illustrating the structure of an image encoding apparatus. As shown in FIG. 75, the image encoding apparatus 1101 is basically identical in structure to the image encoding apparatus 1001 except that the mode selection module 1011 is replaced with a mode selection module 1111. The mode selection module 1111 includes, in addition to the structure of the mode selection module 1011, a variation determiner 1120 for determining an amount of variation in the image data to be encoded. Unlike the controller 1021, a controller 1121 selects between the image quality priority mode and the short delay priority mode in response to determination results of the variation determiner 1120 rather than in response to the instruction from the outside. The operation of the mode selection and the mode information notification to the image decoding apparatus remain unchanged from those operations in the case of the controller 1021.

The variation determiner 1120 measures the amount of variation in the image, and notifies the controller 1121 of the measurement result. The amount of variation may be information regarding a difference between frames of the image data (variation with time).

Figure 76:
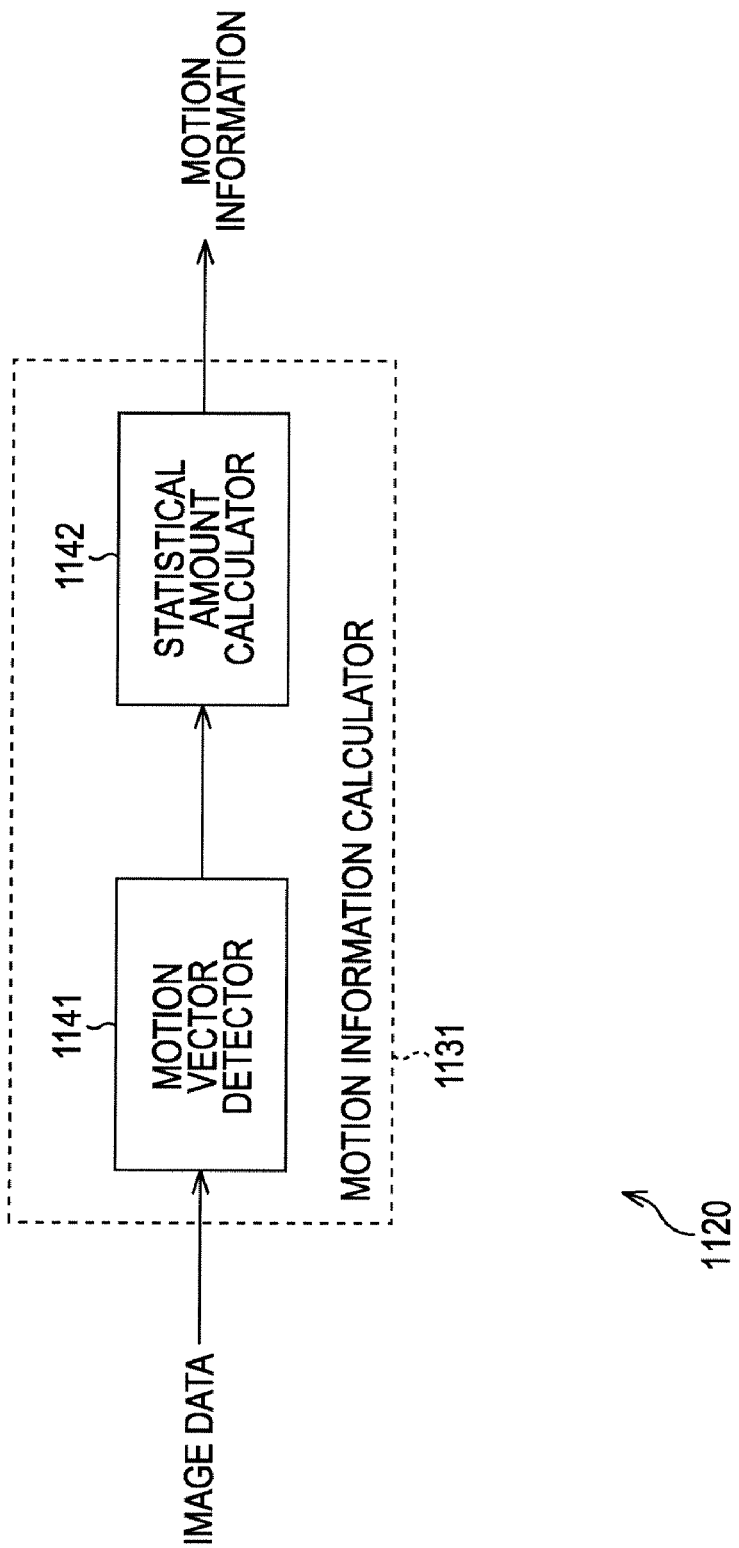
FIG. 76 is a block diagram illustrating the structure of a variation determiner.

FIG. 76 is a block diagram illustrating the internal structure of the variation determiner 1120.

As shown in FIG. 76, the variation determiner 1120 determines a statistical amount of a motion vector representing a motion from an immediately preceding frame to a target frame, and regards the statistical amount as motion information. The variation determiner 1120 includes a motion information calculator 1131 for calculating the motion information of the image to be encoded. The motion information calculator 1131 includes a motion vector detector 1141 and a statistical amount calculator 1142.

The motion vector detector 1141 sets successively as a target frame each frame of the image data, and segments a frame immediately preceding the target frame (referred to a preceding frame) into blocks of 16×16 pixels (macro block in MPEG). The motion vector detector 1141 detects a motion vector representing the motion from the preceding frame to the target frame in each macro block of the preceding frame, and then supplies the motion vector to the statistical amount calculator 1142.

The statistical amount calculator 1142 calculates the statistical amounts of the motion vector determined from the macro block in the preceding frame, the statistical amounts including the sum and average of absolute values of the motion vectors in each macro block. The statistical amount calculator 1142 outputs the statistical amounts to the controller 1121. The controller 1121 compares the value of the motion information with a predetermined threshold value, thereby determining the encoding mode depending whether the value of the motion information is greater than the predetermined threshold value.

Figure 77:
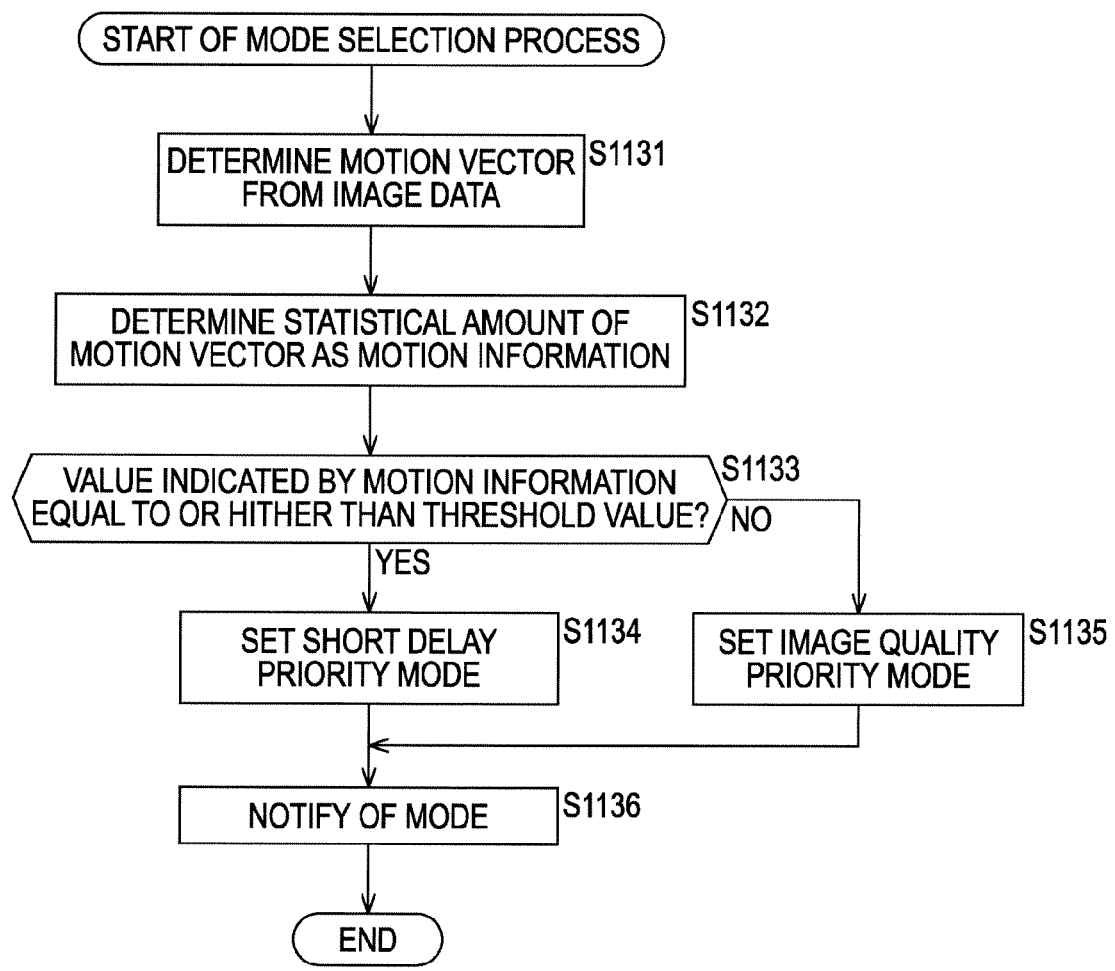
FIG. 77 is a flowchart illustrating a process flow of a mode selection process.

The mode selection process of the mode selection module 1111 is described below with reference to a flowchart of FIG. 77.

When the mode selection process starts, the motion vector detector 1141 determines the motion vector from the image data in step S1131. In step S1132, the statistical amount calculator 1142 calculates statistical information of the determined motion vector as the motion information.

In step S1133, the controller 1121 determines whether the value of the motion information is equal to or greater than the threshold value. A large value of the motion information means that an amount of variation with time in the image data to be encoded is large, i.e., a change between frames of the image of the image data to be encoded is large. In such a case, image degradation is less pronounced even in a low-quality image, in other words, the subjective image quality of the decoded image is not greatly reduced. On the other hand, even if image quality is improved, the subjective image quality of the decoded image is not improved accordingly. In such a case, the controller 1121 places higher priority on the short delay time than on the improvement in image quality.

If it is determined in step S1133 that the value of the motion information is equal to or greater than the threshold value, the controller 1121 proceeds to step S1134. The controller 1121 controls the selector 1022 and the selector 1023, thereby selecting the short delay priority mode. Processing proceeds to step S1136.

If it is determined in step S1134 that the value of the motion information is smaller than the threshold value, the motion of the image in the image data to be encoded is small. The controller 1121 proceeds to step S1135, and controls the selector 1022 and the selector 1023, thereby selecting the image quality priority mode. Processing proceeds to step S1136.

In step S1136, the notifier 1024 notifies the image decoding apparatus of the mode set by the controller 1121. The mode selection process thus ends.

Without the user's instruction in this way, the image encoding apparatus 1101 adaptively selects the mode of the encoding process in response to the amount of variation with time in the image of the image data to be encoded, thereby placing higher priority on the short delay setting or the high image quality setting.

Figure 78:
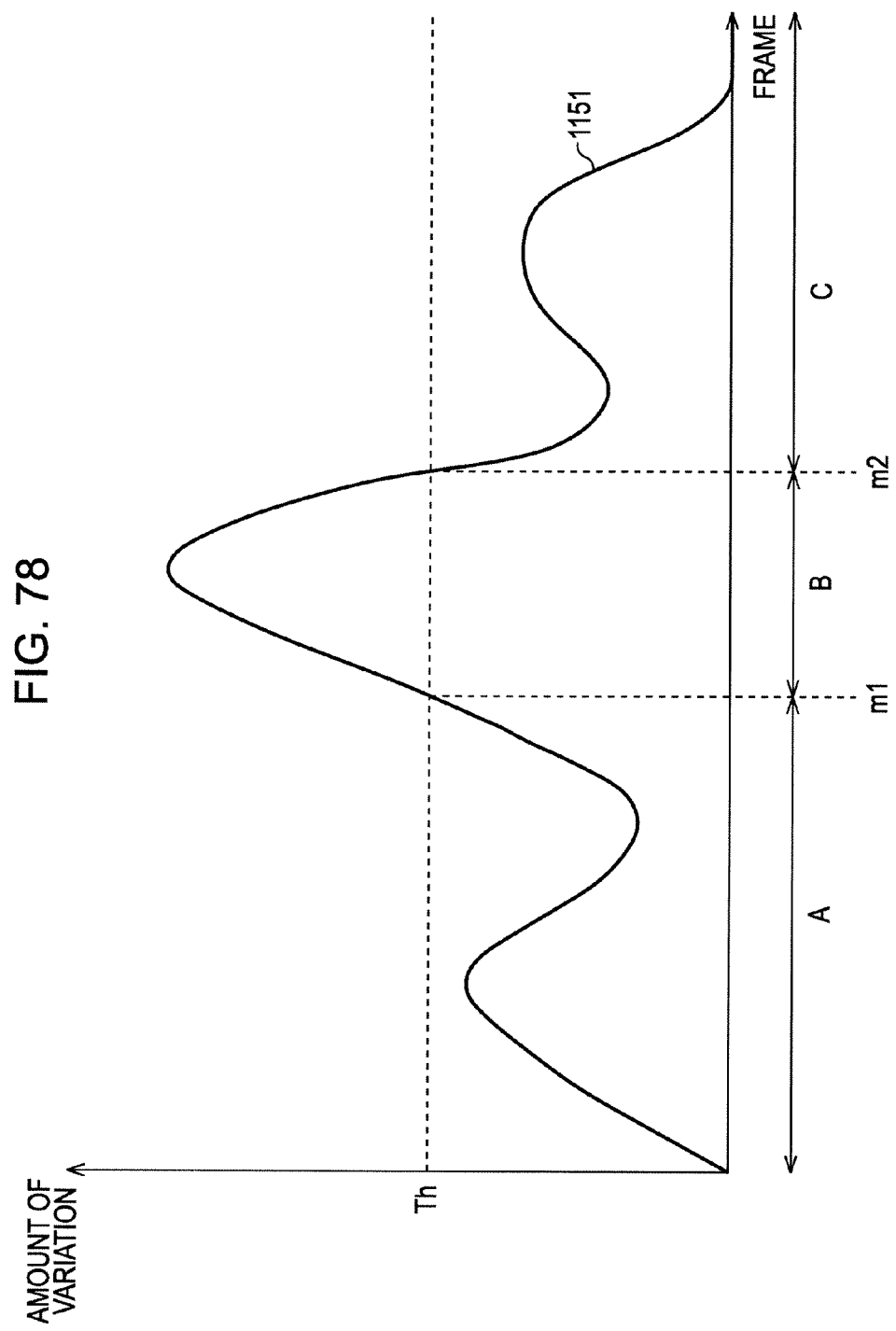
FIG. 78 illustrates an example of variations.

As shown in FIG. 78, the size of the motion information as the statistic amount of the motion vector (the amount of variation) varies from frame to frame. The controller 1121 compares the amount of variation (motion information) with the predetermined threshold value Th. The controller 1121 performs the encoding process in the short delay mode during a period throughout which the amount of variation is equal to or higher than the threshold value (period B from frame m1 to frame m2 as shown in FIG. 78), and performs the encoding process in the high image quality mode during the remaining period (period A and period C in FIG. 78). The image encoding apparatus 1101 can change the encoding mode even in the middle of encoding data of one image, thereby performing appropriate encoding process.

Any method may be used to determine the motion information. Instead of using the statistical amount of the motion vector, a histogram of each frame may be determined, and an amount of variation in the histogram may be calculated as the motion information.

Figure 79:
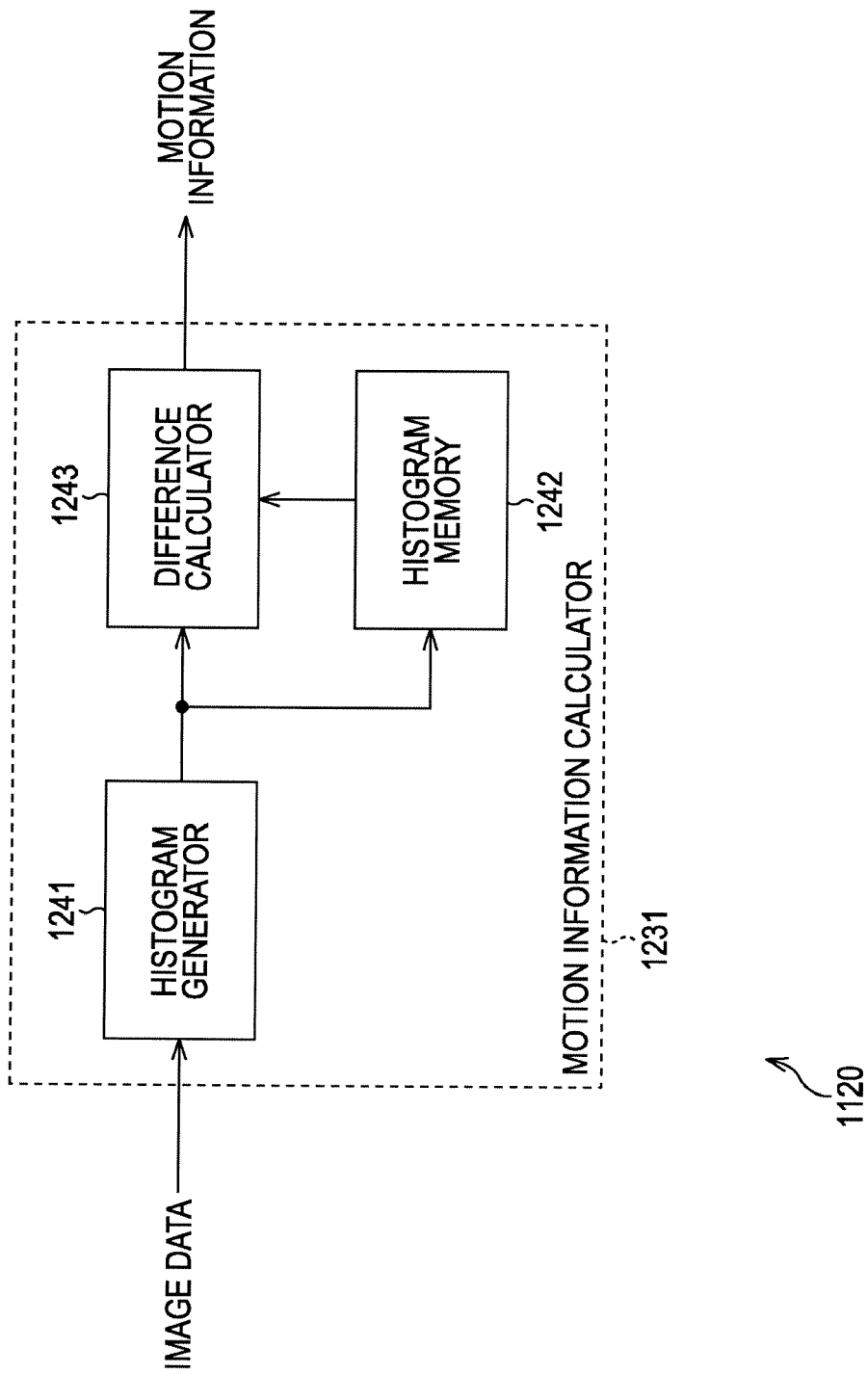
FIG. 79 is a block diagram illustrating the structure of a variation determiner.

FIG. 79 is a block diagram illustrating the structure of the variation determiner 1120.

As shown in FIG. 79, the variation determiner 1120 includes a motion information calculator 1231. The motion information calculator 1231 includes a histogram generator 1241, a histogram memory 1242 and a difference calculator 1243. The histogram generator 1241 generates a histogram of each frame of the image data to be encoded, and supplies the histogram to the histogram memory 1242, while supplying the histogram of the target frame to the difference calculator 1243. The difference calculator 1243 calculates a difference between the target frame supplied from the histogram generator 1241 and the histogram of the preceding frame supplied from the histogram memory 1242, and then supplies the difference as the motion information to the controller 1121.

Figure 80:
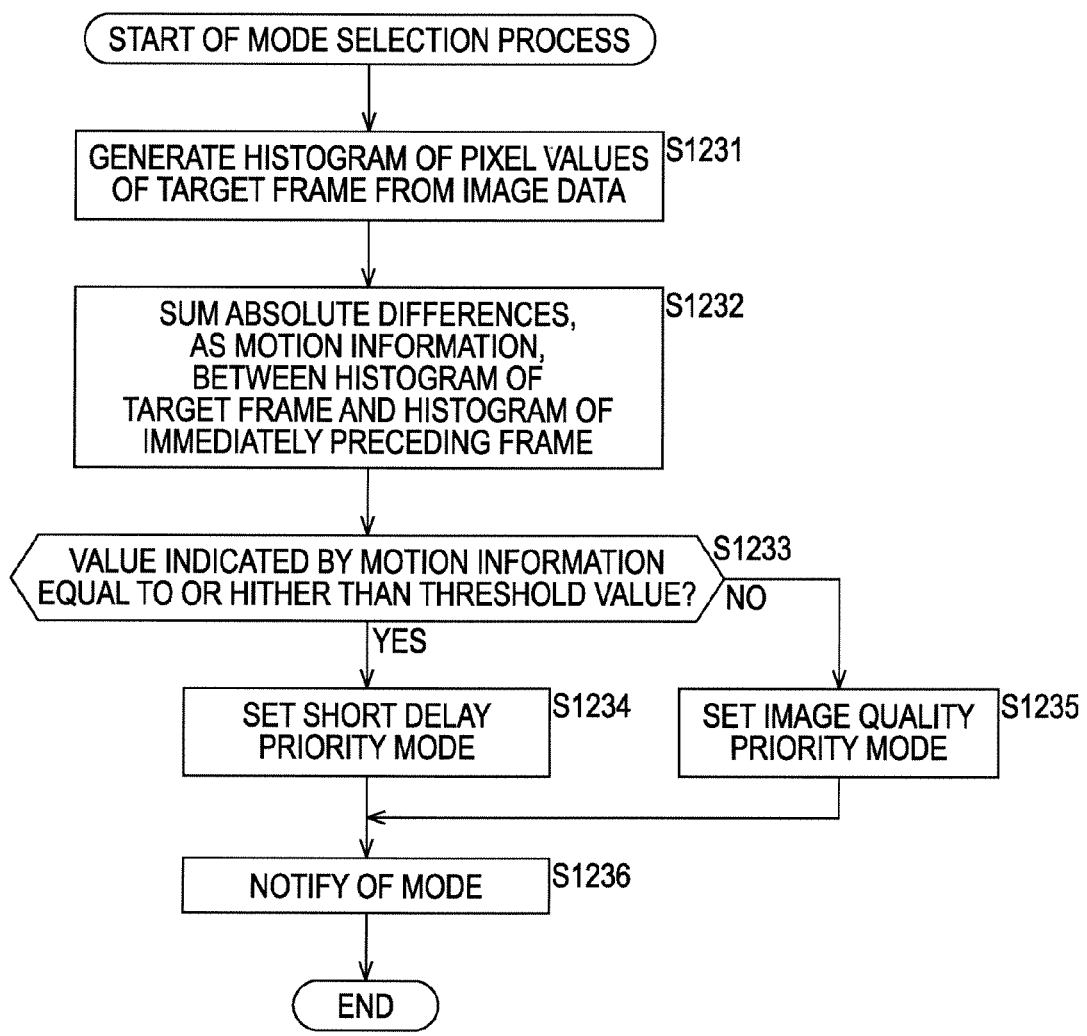
FIG. 80 is a flowchart illustrating a process flow of a mode selection process.

The process flow of the mode selection process is described below with reference to a flowchart of FIG. 80.

When the mode selection process starts, the histogram generator 1241 generates a histogram of pixel values of the target frame from the image data in step S1231. In step S1232, the difference calculator 1243 determines, as the motion information, the sum of absolute values of differences between the histogram of the frame immediately proceeding the target frame and the histogram of the target frame.

In step S1233, the controller 1121 determines whether the value of the motion image is equal to or higher than a threshold value. As in the case of the motion vector, the magnitude of the value of the motion image indicates the degree of change with time in the image. If it is determined in step S1233 that the value of the motion information is equal to or higher than the threshold value, the controller 1121 processing proceeds to step S1234. The controller 1121 controls the selector 1022 and the selector 1023, thereby setting the short delay priority mode. Processing proceeds to step S1236.

If it is determined in step S1234 that the value of the motion information is smaller than the threshold value, the motion of the image of the image data to be encodes is small. The controller 1121 processing proceeds to step S1235. The controller 1121 controls the selector 1022 and the selector 1023, thereby setting the image quality priority mode. Processing proceeds to step S1236.

In step S1236, the notifier 1024 notifies the image decoding apparatus of the mode set by the controller 1121. The mode selection process thus ends.

The motion information may be any of parameters other than those described above.

The variation determiner 1120 may determine fineness information indicating spatial variation, for example, in addition to the motion information indicating the variation with time. For example, the controller 1121 selects the encoding mode based on a spatial variation amount determined by the variation determiner 1120 and indicating how much each image of the image data varies in frames.

For example, the smaller the difference in the pixel values of pixels within a frame, the smaller the spatial variation, and the lower the frequency component of the image. A variation in the frame image is small. Even if the encoding process is performed in the short delay priority mode resulting in a relatively large image quality degradation, the image degradation is less noticeable to the user who views the image, i.e., the subjective image quality of the decoded image is not greatly degraded. In other words, even if the encoding process is performed in the high image quality priority mode resulting a relatively small image degradation, the subjective image quality of the decoded image is not improved. In such a case, the controller 1121 places higher priority on the short delay time than on image quality.

An image containing a large amount of an edge component or an image of small patterns provides a large difference in pixel values of adjacent pixels. Such an image has a high frequency component and a large spatial variation. With the image degraded, an edge becomes blurred, and a pattern is deformed. The degradation in image quality is more pronounced. In such a case, the controller 1121 places higher priority on image quality than on short delay time.

Figure 81:
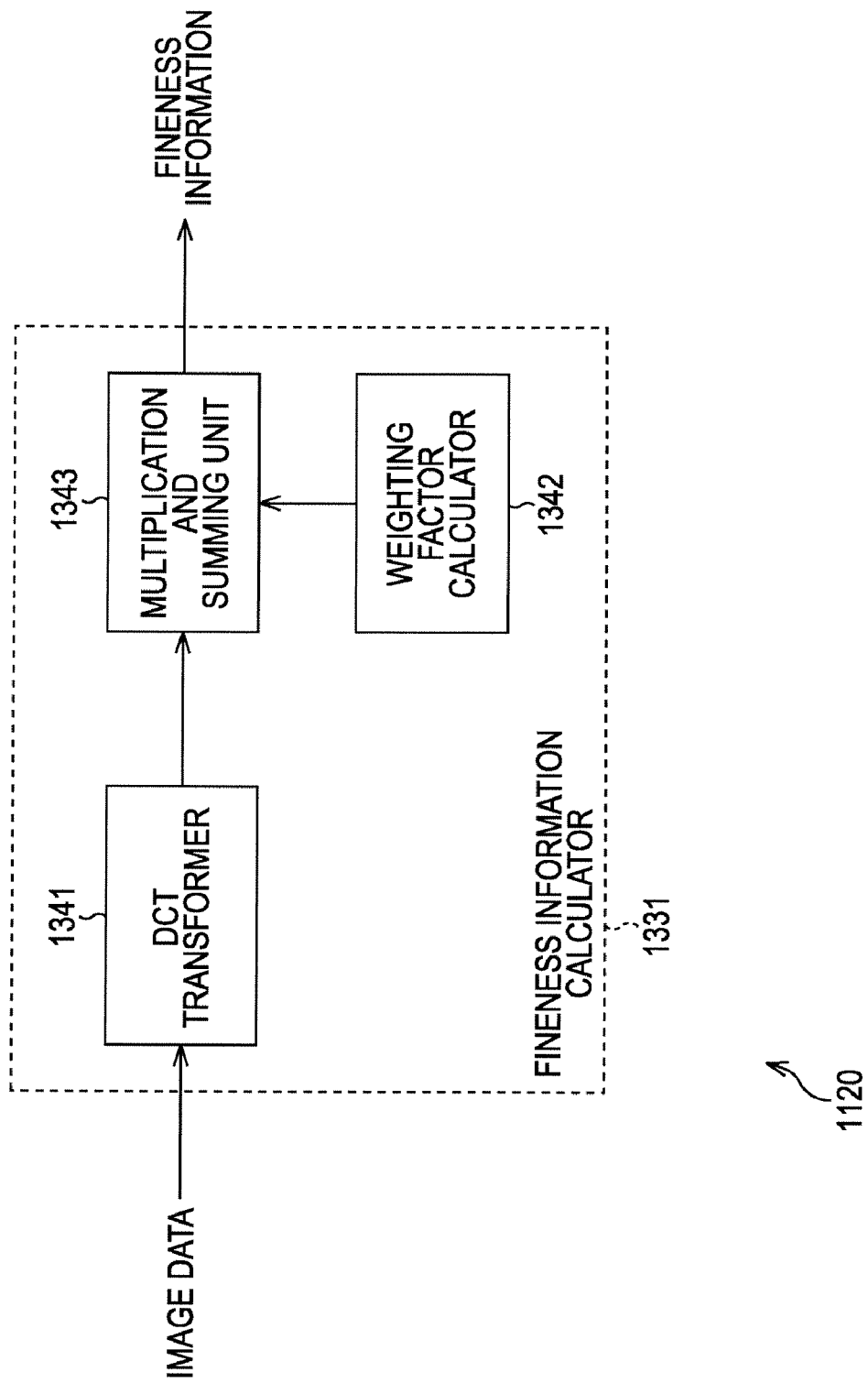
FIG. 81 is a block diagram illustrating the structure of a mode determiner.

FIG. 81 is a block diagram illustrating the structure of the variation determiner 1120.

As shown in FIG. 81, the variation determiner 1120 includes a fineness information calculator 1331 for determining the fineness information as an amount of variation. The fineness information calculator 1331 includes a DCT (Discrete Cosine Transform) transformer 1341, a weighting factor calculator 1342, and a multiplication and summing unit 1343.

The DCT transformer 1341 acquires the image data by frame, treat the acquired frame as a target frame, and segments the target frame into 8×8 pixel blocks. The DCT transformer 1341 further DCT transforms each block in the target frame, and supplies 8×8 DCT coefficients obtained from each block to the multiplication and summing unit 1343.

The weighting factor calculator 1342 determines a weighting factor to be attached to each of the 8×8 DCT coefficients of the block, and then supplies the weighting factors to the multiplication and summing unit 1343.

The multiplication and summing unit 1343 multiplies the weighting factors supplied from the weighting factor calculator 1342 by the 8×8 DCT coefficients of the block supplied from the DCT transformer 1341, and sums the products. The multiplication and summing unit 1343 sums the products of the blocks in the target frame, and outputs as the fineness information of the target frame.

Figure 82:
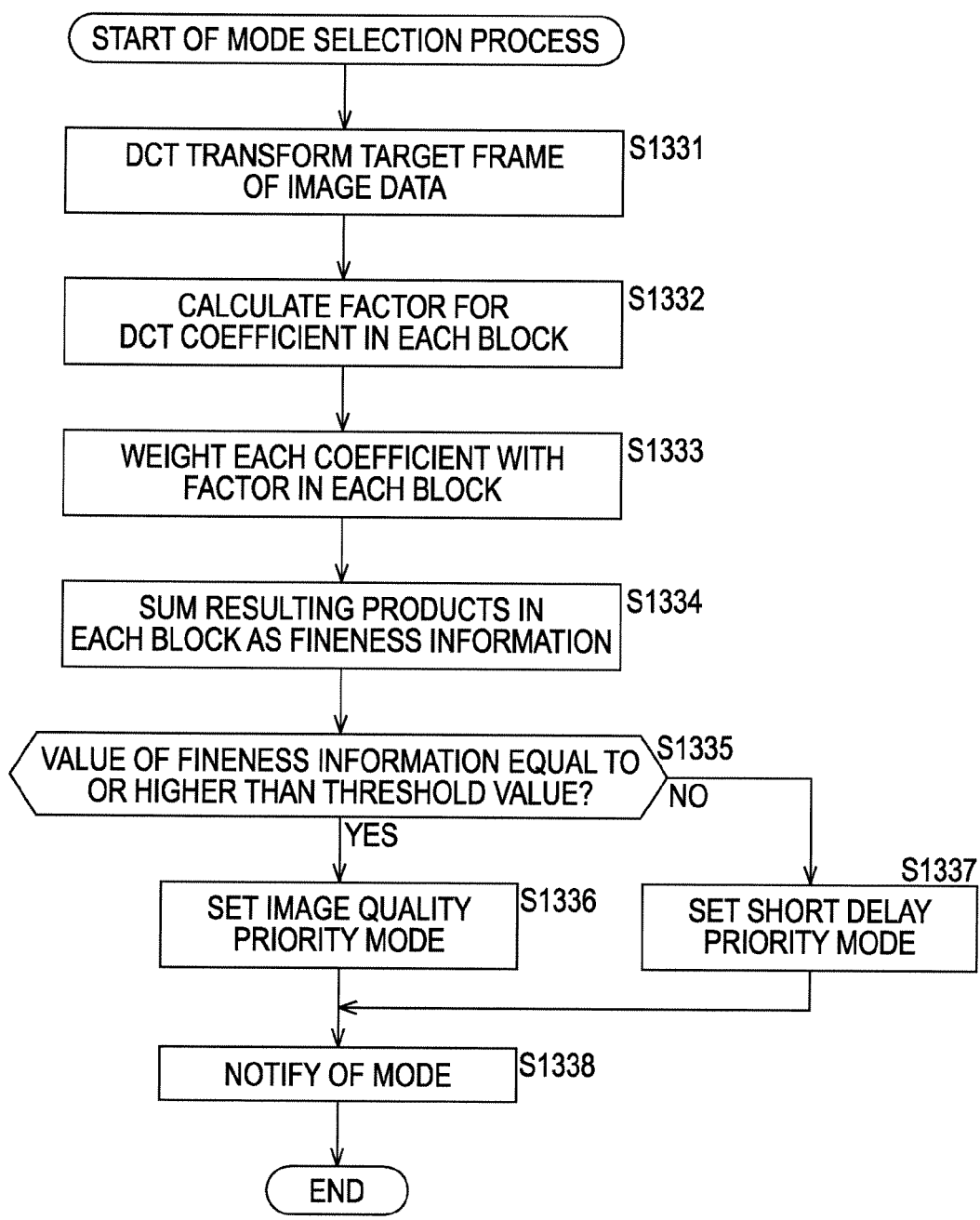
FIG. 82 is a flowchart illustrating a process flow of a mode selection process.

The process flow of the mode selection process is described below with reference to a flowchart of FIG. 82.

When the mode selection process starts, the DCT transformer 1341 DCT transforms the target frame of the image data in step S1331. In step S1332, the weighting factor calculator 1342 calculates the weighting factors to be attached to the DCT coefficients in each block. The multiplication and summing unit 1343 multiplies the weighting factors to the coefficients on a per block basis in step S1333 and sums the produces on a per block basis as the fineness information in step S1334.

In step S1335, the controller 1121 determines whether the value of the fineness information is equal to or higher than a threshold value. If it is determined in step S1335 that the value of the fineness information is equal to or higher than the threshold value, processing proceeds to step S1336. The controller 1121 controls the selector 1022 and the selector 1023, thereby setting the image quality priority mode. Processing proceeds to step S1338.

If it is determined in step S1335 that the value of the fineness information is smaller than the threshold value, the controller 1121 proceeds to step S1337. The controller 1121 controls the selector 1022 and the selector 1023, thereby setting the short delay priority mode. Processing proceeds to step S1338.

In step S1338, the notifier 1024 notifies the image decoding apparatus of the mode set by the controller 1121. The mode selection process thus ends.

As described above, the encoding mode is appropriately switched in response to the fineness of the image of the image data to be encoded. As the motion information, the fineness information also varies in size (the magnitude of the fineness information) from frame to frame as shown in FIG. 78. The controller 1121 selects the mode as described above, thereby switching the mode even in the middle of encoding in response to the size of the fineness information of the image data. The image encoding apparatus 1101 thus appropriately performs the encoding process.

The parameter for determining the mode is not limited to one type. A plurality of types of parameters may be used.

Figure 83:
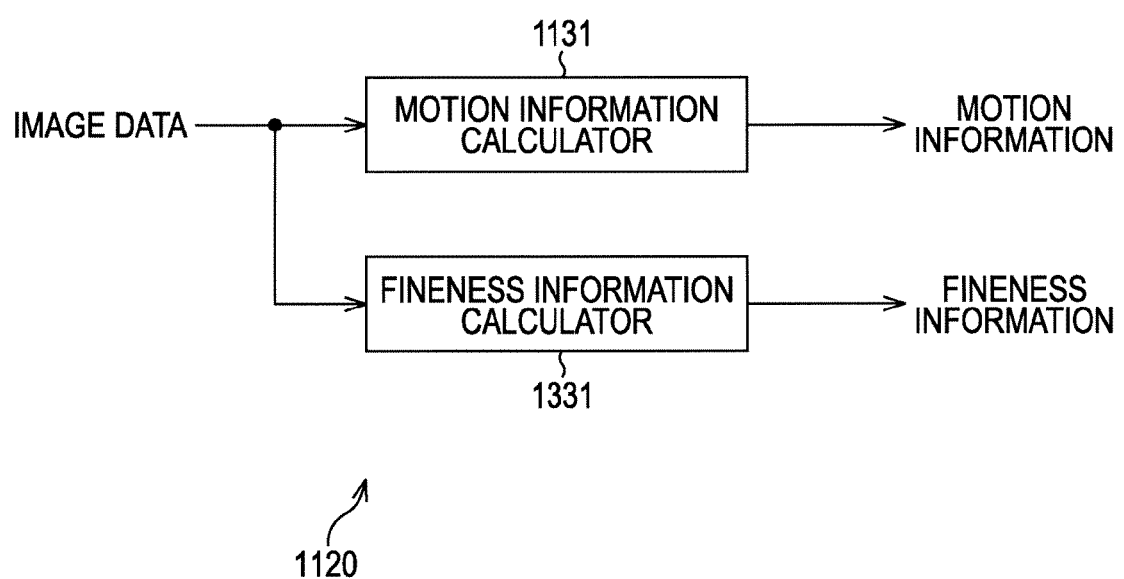
FIG. 83 is a block diagram illustrating the structure of a variation determiner.

FIG. 83 is a block diagram illustrating the structure of the variation determiner 1120 in such a case. As shown in FIG. 83, the variation determiner 1120, including the above-described motion information calculator 1131 and the fineness information calculator 1331, determines the motion information and the fineness information from the image data to be encoded.

As shown in FIG. 83, the motion information calculator may be substituted for the motion information calculator 1131.

Figure 84:
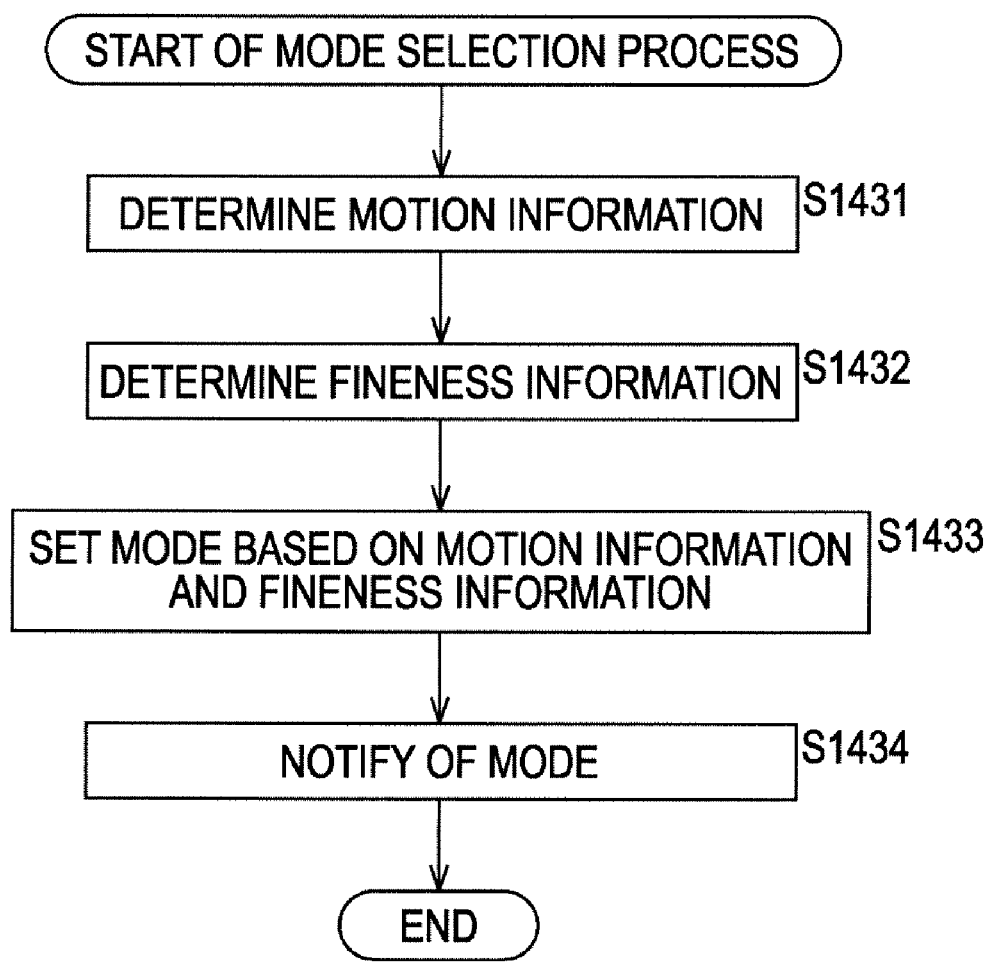
FIG. 84 is a flowchart illustrating a process flow of a mode selection process.

The mode selection process is described below with reference to a flowchart of FIG. 84.

When the mode selection process starts, the motion information calculator 1131 determines in step S1431 motion information from the image data to be encoded. In step S1432, the fineness information calculator 1331 determines fineness information from the image data to be encoded. In step S1433, the controller 1121 sets the encoding mode based on the motion information and the fineness information. Alternatively, the controller 1121 may determine the encoding mode based on one of the motion information and the fineness information with priority, and only if no desired result is obtained, the controller 1121 may set the encoding mode based on the other of the motion information and the fineness information.

For example, the controller 1121 may compare the motion information with a threshold value and if the value of the motion information is equal to or higher than the threshold value, the controller 1121 sets the encoding mode. If the value of the motion information is lower than the threshold value, the controller 1121 then compares the fineness information with a threshold value. Alternatively, the controller 1121 may determine the mode from a predetermined table or according to an equation based on the comparison result of the motion information and the comparison result of the fineness information.

Upon completing the mode setting, the notifier 1024 notifies the image decoding apparatus in step S1434 of the mode set by the controller 1121. The mode selection process thus ends.

Using the mode based on a plurality of parameters in this way, the controller 1121 can encode appropriately a variety of image data. The type of parameters and the number of parameters are optional. A mode selection method other than those described above may also be used.

The encoding mode may be set based on a bandwidth of a network that is used to transmits encoded stream to the image decoding apparatus instead of based on the image data to be encoded.

Figure 85:
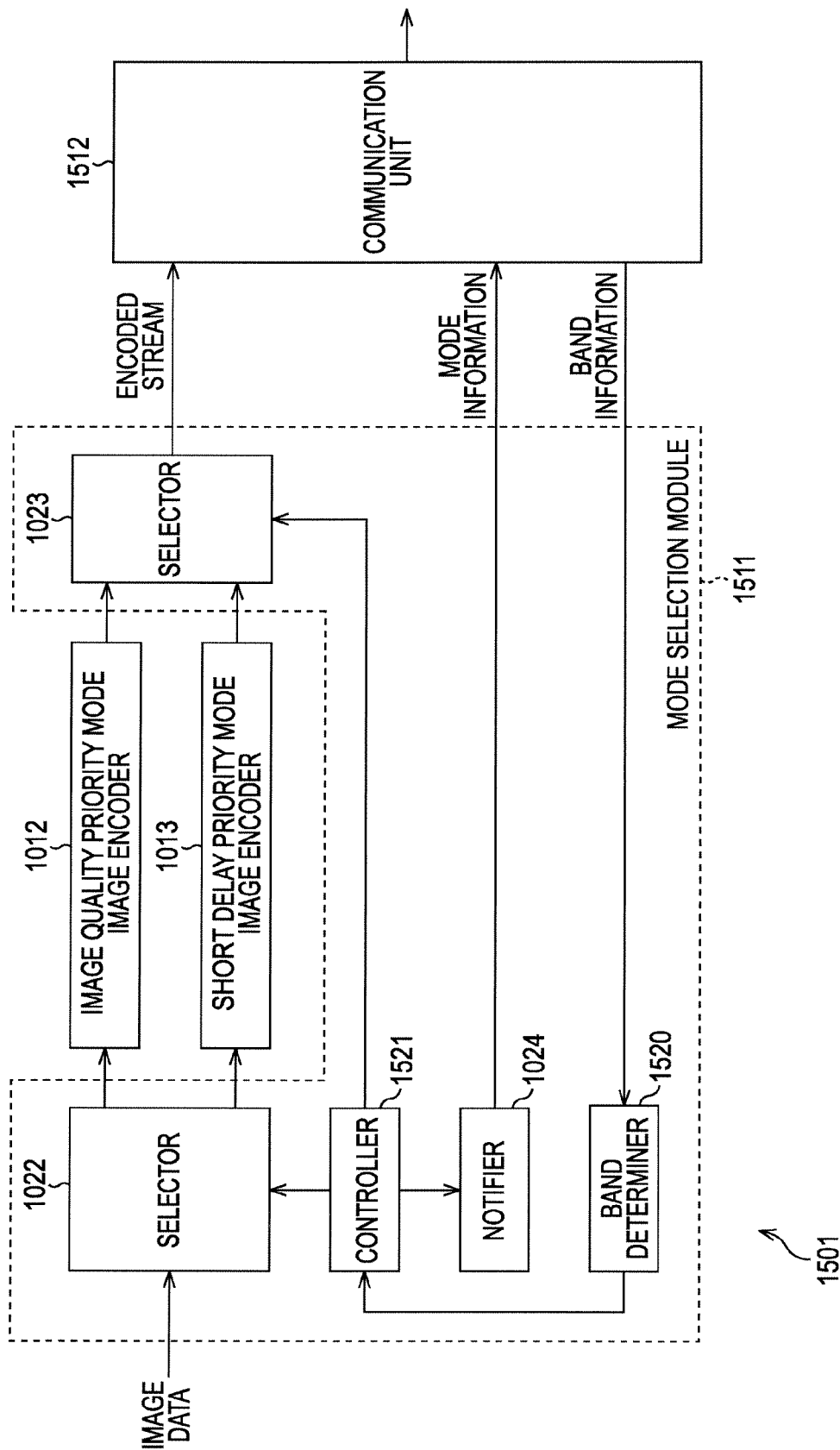
FIG. 85 is a block diagram illustrating the structure of an image encoding apparatus.

FIG. 85 is a block diagram illustrating the structure of such a image encoding apparatus. The image encoding apparatus 1501 is basically identical in structure to the image encoding apparatus 1101 of FIG. 75 except that the mode selection module 1111 is replaced with a mode selection module 1511. The image encoding apparatus 1501 further includes a communication unit 1512. The mode selection module 1511 includes a band determiner 1520 instead of the variation determiner 1120 in the mode selection module 1111. In response to band information to be supplied to the communication unit 1512, the band determiner 1520 determines a bandwidth available in a network that is used to transmit the encoded stream to the image decoding apparatus.

The communication unit 1512 not only transmits to the image decoding apparatus the encoded stream supplied via the selector 1023 and the mode information supplied from the notifier 1024, but also monitors the bandwidth available in the network that is used in transmission and supplies bandwidth information relating to the bandwidth to the band determiner 1520.

The band determiner 1520 determines the bandwidth based on the bandwidth information, and notifies the controller 1521 of the determination result. Based on the determination result, the controller 1521 selects the encoding mode.

Figure 86:
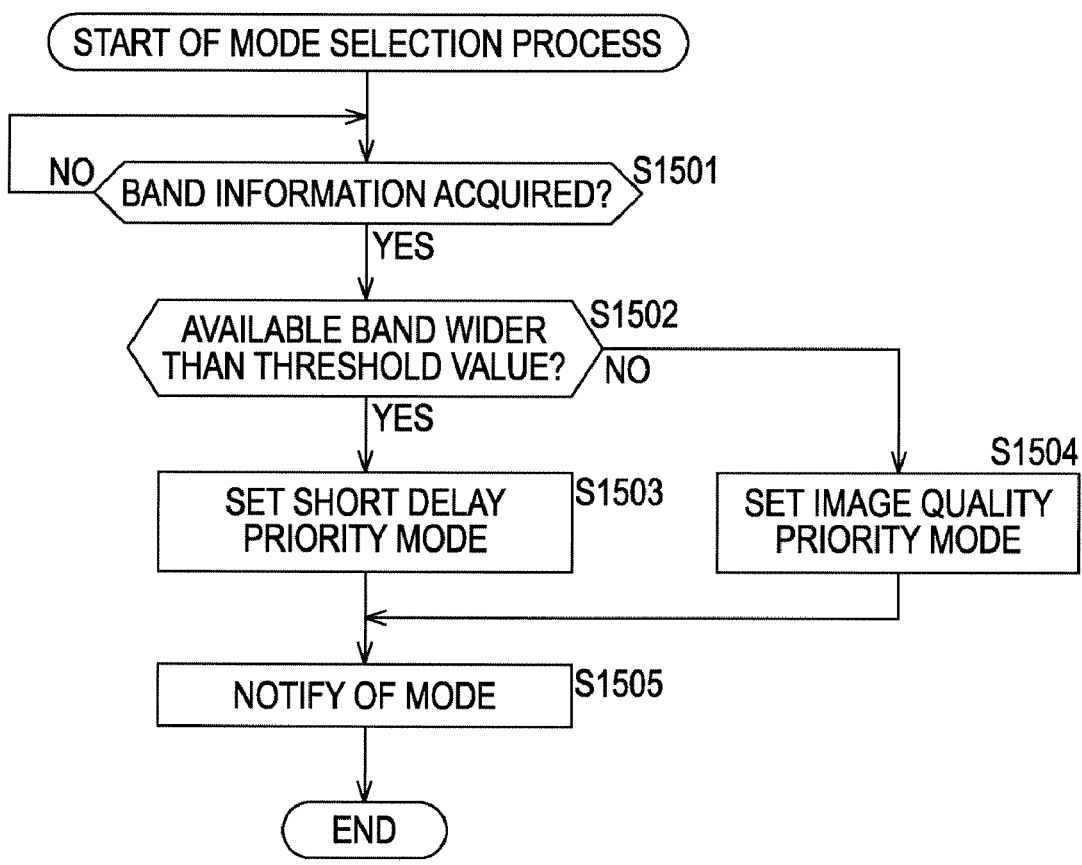
FIG. 86 is a flowchart illustrating a process flow of a mode selection process.

The process flow of the mode selection process is described below with reference to a flowchart of FIG. 86.

When the mode selection process starts, the band determiner 1520 determines in step S1501 whether the bandwidth information has been acquired from the communication unit 1512. The band determiner 1520 waits on standby until the bandwidth information has been acquired. The communication unit 1512 supplies the bandwidth information to the band determiner 1520 periodically or non-periodically.

Upon acquiring the bandwidth information, the band determiner 1520 determines in step S1502 whether the bandwidth available to transmit the encoded stream and the mode information is wider than a predetermined bandwidth. If it is determined the available bandwidth is wider than the predetermined bandwidth, data can be transmitted at high speed, and delay time is effectively reduced. If it is determined in step S1502 that the available bandwidth is wider than the predetermined bandwidth, the controller 1521 proceeds to step S1503 to set the short delay priority mode. Processing proceeds to step S1505.

If the available bandwidth is narrower than the predetermined bandwidth possibly because of network heavy traffic, the even short delay priority may cause a delay after all because of a low transmission rate. The short delay priority mode is thus less advantageous. If it is determined in step S1502 that the available bandwidth is wider than the predetermined bandwidth, the controller 1521 proceeds to step S1504 to set the image quality priority mode. Processing then proceeds to step S1505.

When the mode setting is completed, the notifier 1024 notifies the image decoding apparatus in step S1505 of the mode set by the controller 1521. The mode selection process thus ends.

As described above, the image encoding apparatus 1501 selects appropriately the mode in response to the bandwidth of the network to perform appropriately the encoding process. In this case as well, the mode can be switched in the middle of the encoding process.

Figure 87:
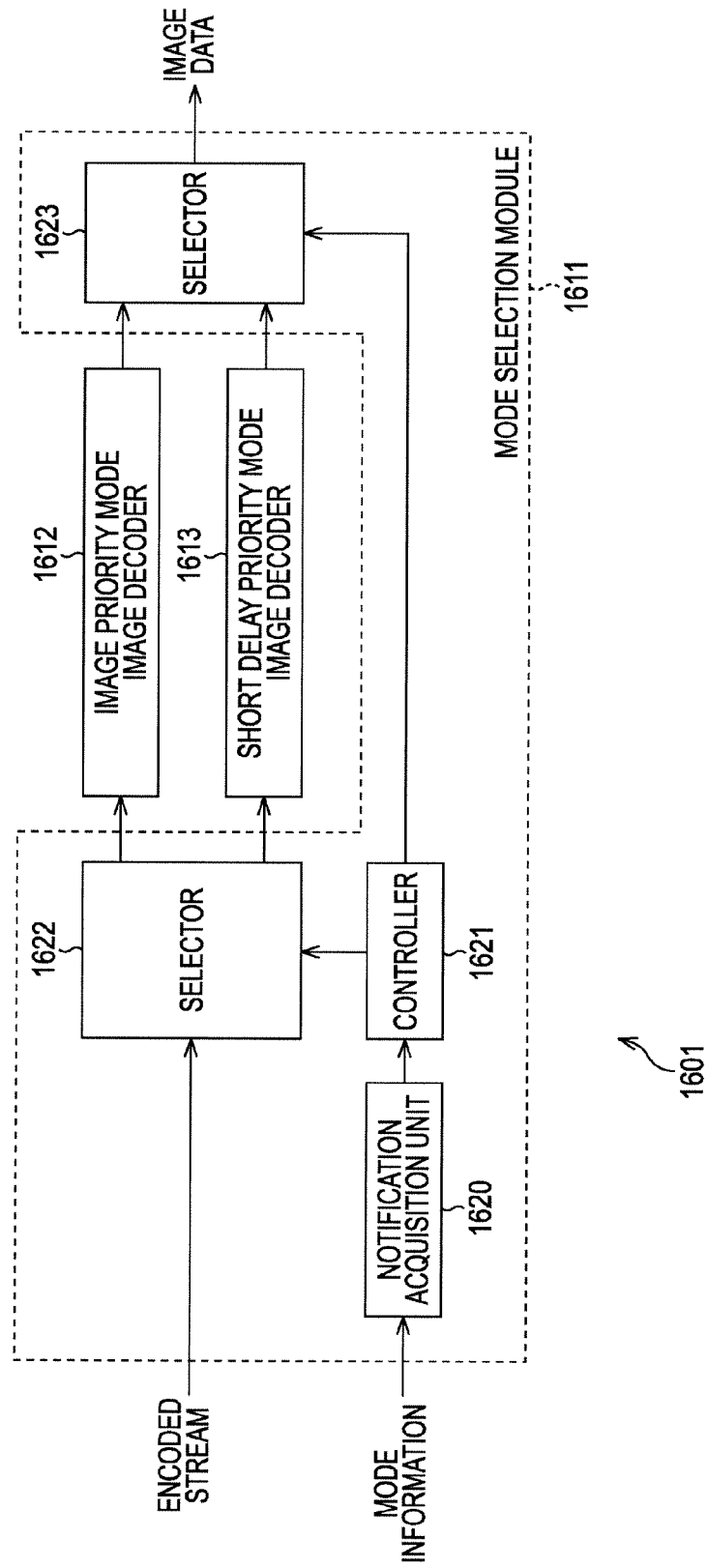
FIG. 87 is a block diagram illustrating the structure of an image decoding apparatus.

FIG. 87 is a block diagram illustrating the structure of the image decoding apparatus corresponding to the variety of image encoding apparatuses discussed with reference to FIGS. 73 through 86. As shown in FIG. 87, the image decoding apparatus 1601 includes two decoders, namely, an image quality priority mode image decoder 1612 and a short delay priority mode image decoder 1613 as opposed to the image encoding apparatus, and a mode selection module 1611. The image quality priority mode image decoder 1612 performs a decoding process corresponding to the encoding process with priority placed on high image quality. The short delay priority mode image decoder 1613 performs a decoding process corresponding to the encoding process with priority placed on short delay time. The mode selection module 1611 selects one of the decoding processes in response to mode information supplied from the image encoding apparatus.

The image quality priority mode image decoder 1612 corresponds to the image quality priority mode image encoder 1012. The image quality priority mode image decoder 1612 is constructed by combining each of the variety of intra decoders discussed with reference to FIGS. 28 through 61 with the intra decoder in each of the variety of image decoding apparatuses discussed with reference to FIGS. 1 through 27. The short delay priority mode image decoder 1613 corresponds to the low delay priority mode image encoder 1013. The short delay priority mode image decoder 1613 is constructed by adopting as an image decoding apparatus one of a variety of intra decoders discussed with reference to FIGS. 28 through 61.

The mode selection module 1611 includes a notification acquisition unit 1620, a controller 1621, a selector 1622 and a selector 1623. The notification acquisition unit 1620 acquires the mode information supplied from the image encoding apparatus, and supplies the acquired mode information to the controller 1621. In response to the mode information acquired by the notification acquisition unit 1620, the controller 1621 selects the mode of the decoding process. The selector 1622 and the selector 1623 controls the input and output of the image quality priority mode image decoder 1612 and the short delay priority mode image decoder 1613. The decoding process is thus performed by one of the image quality priority mode image decoder 1612 and the short delay priority mode image decoder 1613, responsive to the selected mode.

The encoded stream from the image encoding apparatus is supplied via the selector 1622 the image quality priority mode image decoder 1612 or the short delay priority mode image decoder 1613, whichever is selected by the controller 1621. The encoded stream is then decoded and then output as image data via the selector 1622.

Figure 88:
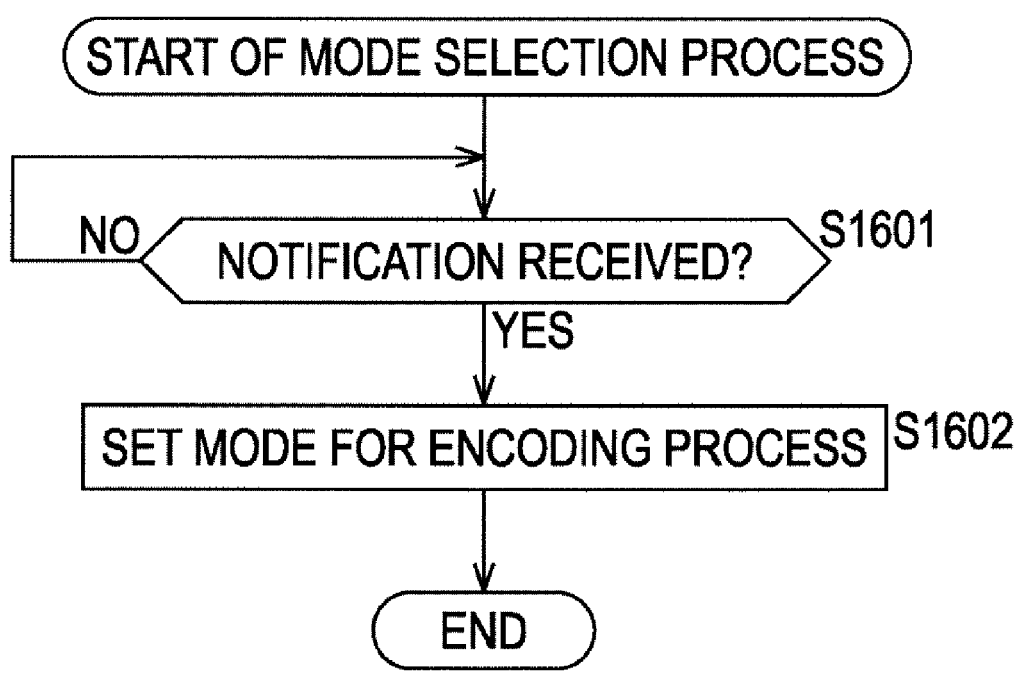
FIG. 88 is a flowchart illustrating a process flow of a mode selection process.

The process flow of the mode selection process is described below with reference to a flowchart of FIG. 88.

When the mode selection process starts, the notification acquisition unit 1620 determines in step S1601 whether a mode notification has been received from the outside. The notification acquisition unit 1620 waits on standby until the mode notification has been received.

Upon determining that the mode information has been received, the notification acquisition unit 1620 notifies the controller 1621 of the mode. In step S1602, the controller 1621 causes the mode of the decoding process to match the mode of the encoding process in response to the mode information.

When the two modes match, the controller 1621 ends the mode selection process.

Even if any mode is selected in the image encoding apparatus, the mode of the decoding process and the mode of the encoding process may be set to match each other, and the decoding process is appropriately performed.

The mode information may be transmitted as header information in a packetized encoded stream, or may be transmitted as data separate from the encoded stream.

The image decoding apparatus of the present invention is embodied in a variety of configurations in this way.

Applications of the image encoding apparatus and the image decoding apparatus are described below. In an embodiment to be discussed below, the image encoding apparatus and the image decoding apparatus described in each of the preceding embodiments are applied to a digital triax system.

In a triax system of a television broadcasting station or a production studio during studio recording or live coverage, a single coaxial cable interconnecting a video camera, a camera control unit, and a switcher transmits a plurality of signals including a video signal, an audio signal, a return audio signal, and a synchronization signal in a superimposed manner and feeds power therethrough.

The known triax system typically transmits analog signals. As more and more systems currently become a digital system, the triax system in the broadcasting industry also becomes digital.

In the known digital triax system, a digital video signal transmitted through the triax cable is a non-compressive video signal. This is because specification requirements are particularly rigorous in the delay time of the signals in the broadcasting industry, and require that the delay time from image capturing to the output of the image on a monitor be within one field (16.67 ms). In the compression encoding method such as MPEG 2 (Moving Pictures Experts Group 2) and MPEG 4 achieving high compression rate and high image quality, a delay time of several frames is needed to compression encode the video signal and to decode the encoded video signal. Because of this long delay time, such methods are not used in the triax system.

As previously discussed, each of the image encoding method and the image encoding method of the present embodiment has an extremely short delay time less than one field, e.g., from several lines to several tens of lines from the input of the image data to the output of the image, and finds appropriate applications in the digital triax system.

Figure 89:
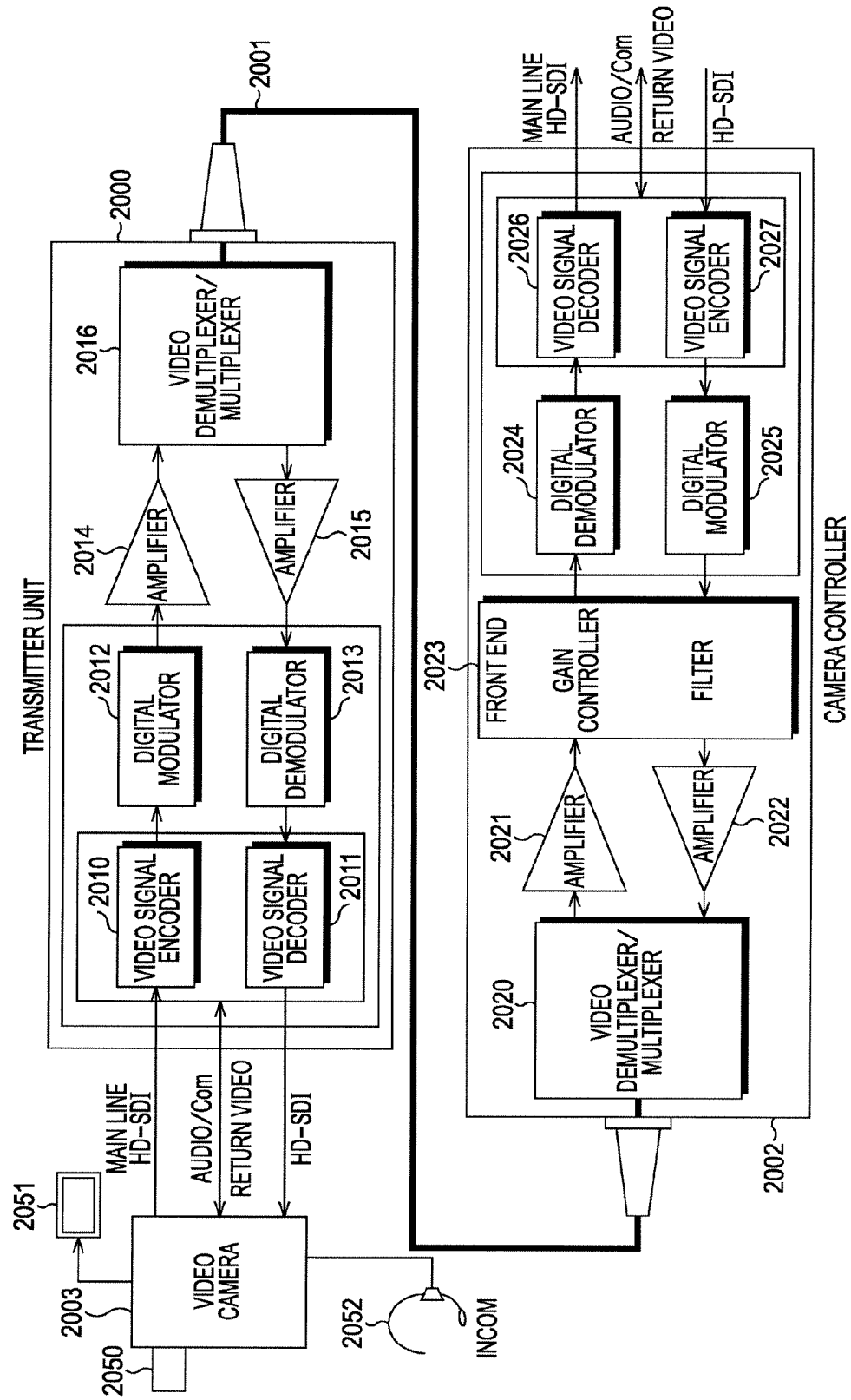
FIG. 89 is a block diagram illustrating the structure of a digital triax system of the present invention.

FIG. 89 illustrates one example of triax system to which the image encoding method and the image decoding method of the present invention are applicable. A transmitter unit 2000 is connected to a camera controller 2002 via a triax cable (coaxial cable) 2001. Via the triax cable 2001, a digital video signal and a digital audio signal (hereinafter referred to as main line signal) to be actually transmitted or to be used a material are transmitted, and an income audio signal and a return digital video signal are transmitted from the camera controller 2002 to a video camera 2003.

The transmitter unit 2000 is housed in a video camera apparatus, for example. Alternatively, the transmitter unit 2000 may be used as a device external to the video camera apparatus, and connected to the video camera apparatus during use. The camera controller 2002 is typically a device called CCU (Camera Control Unit).

The digital audio signal is only loosely related to the context of the present invention and is not discussed herein for simplicity of explanation.

The video camera 2003 is internal to the unshown video camera apparatus, and receives, on an unshown image pickup device such as a CCD (Charge Coupled Device) thereof, light from a subject entering via an optical system 2050 composed of a lens, a focusing mechanism, a zoom mechanism, an iris adjustment mechanism, etc. The image pickup device converts the received light into an electrical signal by means of photoelectric function thereof, performs predetermined processes on the electrical signal, and then outputs a resulting digital video signal of a baseband. The digital video signal is mapped in a HD-SDI (High Definition-Serial Data Interface) format before being output.

The video camera 2003 connects to a display 2051 as a monitor and an incom 2052 for voice communication with the outside.

The transmitter unit 2000 includes a video signal encoder 2010 and a video signal decoder 2011, a digital modulator 2012 and a digital demodulator 2013, an amplifier and an amplifier 2015, and a video demultiplexer/multiplexer 2016.

The video camera 2003 supplies to the transmitter unit 2000 the digital video signal of the baseband mapped in the HD-SDI format. The digital video signal is compression encoded into an encoded stream by the video signal encoder 2010 and the encoded stream is then supplied to the digital modulator 2012. The digital modulator 2012 modulates the supplied encoded stream into a signal in a format appropriate for transmission via the triax cable 2001. The signal output from the digital modulator 2012 is supplied to the video demultiplexer/multiplexer 2016 via the amplifier 2014. The video demultiplexer/multiplexer 2016 transmits the supplied signal via the triax cable 2001. This signal is then received by the camera controller 2002 via the triax cable 2001.

A signal output from the camera controller 2002 is received by the transmitter unit 2000 via the triax cable 2001. The received signal is supplied to the video demultiplexer/multiplexer 2016 and then demultiplexed into a portion of the digital video signal and the remaining signals. The portion of the digital video signal is supplied to the digital demodulator 2013 via the amplifier 2015. The digital demodulator 2013 demodulates into an encoded stream the digital video signal that has been modulated by the camera controller 2002 in the format appropriate for transmission via the triax cable 2001.

The encoded stream is supplied to the video signal decoder 2011. The encoded signal is thus decoded into a digital video signal of the baseband. The demodulated digital video signal is mapped in the HD-SDI format and then output. The digital video signal is then supplied to the video camera 2003 as a return digital video signal. The digital video signal is supplied to a display 2051 connected to the video camera 2003 to be displayed to a photographer.

The camera controller 2002 includes a video demultiplexer/multiplexer 2020, an amplifier 2021 and an amplifier 2022, a front end 2023, a digital demodulator 2024, a digital modulator 2025, a video signal decoder 2026 and a video signal encoder 2027.

The signal output from the transmitter unit 2000 is received by the camera controller 2002 via the triax cable 2001. The received signal is supplied to the video demultiplexer/multiplexer 2020. The video demultiplexer/multiplexer 2020 supplies the supplied signal to the digital demodulator 2024 via the amplifier 2021 and the front end 2023. The front end 2023 includes a gain controller for adjusting gain to the input signal and a filter for filtering the input signal.

The digital demodulator 2024 demodulates the signal that has been modulated by the camera controller 2002 in the format appropriate for transmission via the triax cable 2001. The digital demodulator 2024 thus restores the encoded stream. The encoded stream is then supplied to the video signal decoder 2026 to be decoded into a digital video signal of the base baseband. The decoded digital video signal is mapped in the HD-SDI format and then output as the main line signal.

The camera controller 2002 is supplied with a return digital video signal and a return audio signal from the outside. The digital audio signal is supplied to the incom 2052 of the photographer to convey a voice instruction from the outside to the photographer.

The return digital video signal is supplied to the video signal encoder 2027 to be compression encoded. The encoded digital video signal is then supplied to the digital modulator 2025. The digital modulator 2025 modulates the supplied encoded stream into a signal in a format appropriate for transmission via the camera controller 2002 and outputs the modulated signal. The signal output from the digital modulator 2025 is supplied to the video demultiplexer/multiplexer 2020 via the front end 2023 and the amplifier 2022. The video demultiplexer/multiplexer 2020 multiplexes the supplied signal with other signals and outputs the multiplexed signal via the triax cable 2001. The output signal is then received by the camera controller 2002 via the triax cable 2001.

In accordance with the present embodiment, the image encoding apparatus and the image encoding apparatus discussed in each of the preceding embodiments are applied to the video signal encoder 2010 and the video signal encoder 2027 and the video signal decoder 2011 and the video signal decoder 2026, respectively.

The arrangement to allow elements to perform the processes in parallel incorporated in each of the image encoding apparatus and the image decoding apparatus reduces a time delay involved when a video captured by the video camera 2003 is output from the camera controller 2002 or a time delay in the return digital video signal supplied to the camera controller 2002 from the outside and then transmitted to the video camera 2003. Such an arrangement finds applications as an embodiment of the present invention.

Since signal processing performance and memory size are appropriately set in each of the system, the transmitter unit 2000 and the camera controller 2002 of FIG. 89, the re-arrangement process of the coefficient data can be performed on either the transmitter unit 2000 and the camera controller 2002. The entropy encoding process can also be performed prior to or subsequent to the re-arrangement process.

The video signal encoder 2010 in the transmitter unit 2000 performs the wavelet transform process and the entropy encoding process of the method of the present invention on the supplied digital video signal. As previously discussed, the video signal encoder 2010 receives lines of the number matching the number of taps of the filter for use in the wavelet transform and the segmentation level of the wavelet transform, and starts the wavelet transform. When each of the image encoding apparatus and the image decoding apparatus (the intra encoder and the intra decoder) stores the coefficient data necessary for each element as previously discussed with reference to FIGS. 30, 31 and 36, the elements successively perform the processes thereof. When the process reaches the lower line of one frame or one field, the processing of the next frame or the next field starts.

When the return digital video signal is transmitted from the camera controller 2002 to the transmitter unit 2000, the same operation may be performed. More specifically, the video signal encoder 2027 in the camera controller 2002 performs the wavelet transform process and the entropy encoding process of the method of the present invention on the return digital video signal supplied from the outside. The video signal encoder 2027 then outputs an encoded stream.

The return digital video signal lower in image quality than the digital video signal of the main line is often acceptable. In such a case, the video signal encoder 2027 may reduce the bit rate during encoding. For example, in the video signal encoder 2027, the rate controller 214 (FIG. 28) may control the entropy encoder 215 (FIG. 28) to perform the entropy encoding process at a lower bit rate. For example, in the camera controller 2002, the intra encoder 201 (FIG. 28) in the video signal encoder 2027 performs the transform process to a higher segmentation level, while in the transmitter unit 2000, the inverse wavelet transformer 223 (FIG. 34) in the video signal decoder 2011 performs the inverse wavelet transform to a lower segmentation level. The process of the video signal encoder 2027 is not limited to such an operation. The segmentation level in the wavelet transform may be lowered to reduce workload involved in the transform process.

Figure 90:
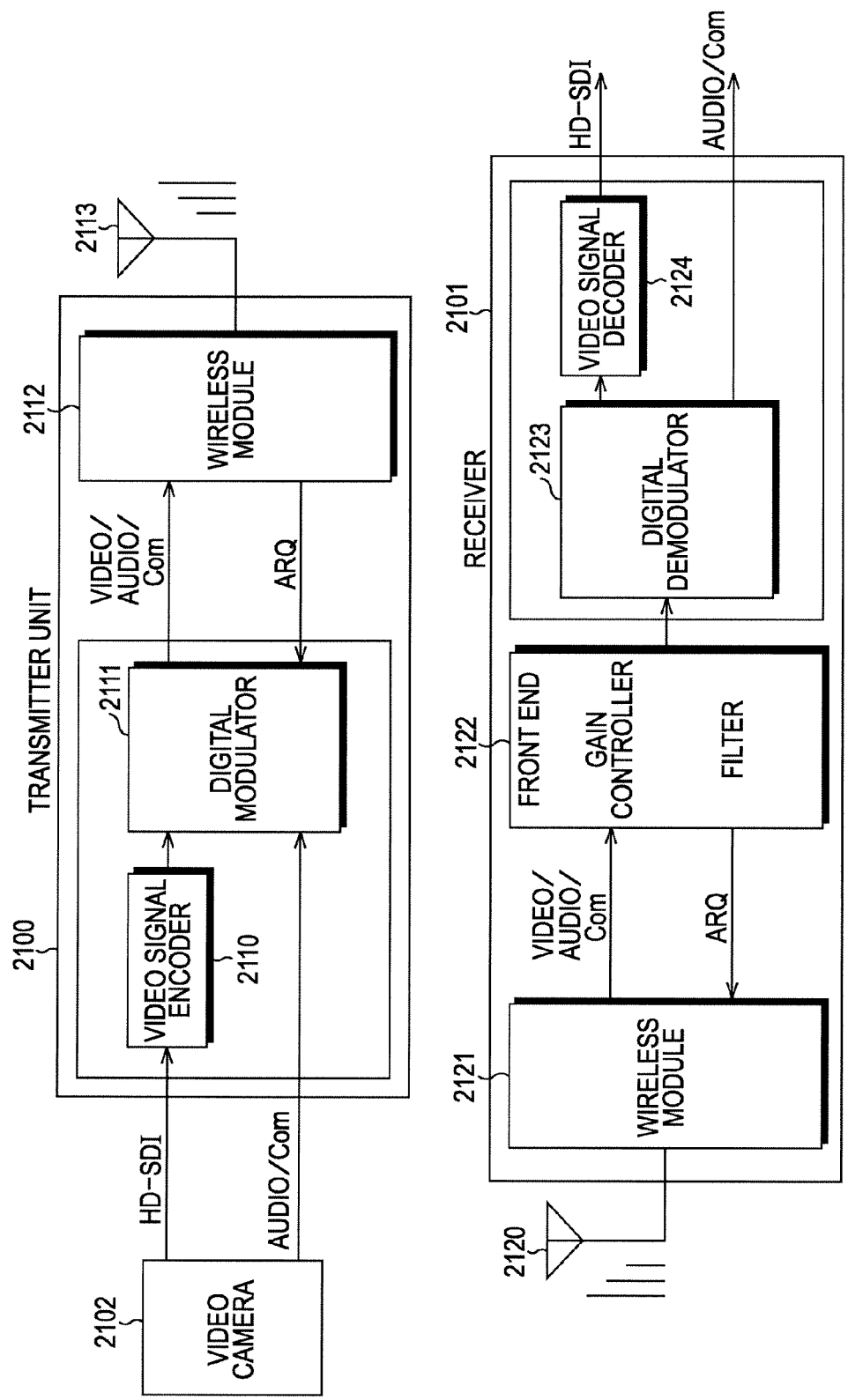
FIG. 90 is a block diagram illustrating the structure of a wireless transmission system of the present invention.

Another embodiment of the present invention is further described. In this embodiment, the data encoded by the image encoding apparatus of the present invention is transmitted to the image decoding apparatus using wireless communication. FIG. 90 is a block diagram illustrating the structure of a wireless transmission system in accordance with the present embodiment. As shown in FIG. 90, a video signal is transmitted one way from a video camera or a transmitter unit 2100 to a receiver 2101. An audio and other signals are communicated two way between the transmitter unit 2100 and the receiver 2101.

The transmitter unit 2100 is contained in an unshown video camera apparatus having the receiver 2101. The present invention is not limited to such an arrangement. The transmitter unit 2100 may be external to the video camera apparatus having the video camera 2102, and may be connected to the video camera apparatus during use.

For example, the video camera 2102 includes a predetermined optical system, an image pickup device such as a CCD, and a signal processor for outputting a signal output from the image pickup device as a digital video signal. The digital video signal mapped in the HD-SDI format is output from the video camera 2102. The present invention is not limited to the HD-SDI format. The digital video signal output from the video camera 2102 may be in another format.

The transmitter unit 2100 includes a video signal encoder 2110, a digital modulator 2111, and a wireless module 2112. The digital video signal of the baseband is mapped in the HD-SDI format in the receiver 2101 and then output. The video signal encoder 2110 compression encodes the digital video signal through the wavelet transform process and the entropy encoding process in accordance with the compression encoding method of the present invention. The resulting encoded stream is then supplied to the digital modulator 2111. The digital modulator 2111 modulates the supplied encoded stream into a signal in a format appropriate for transmission.

The digital modulator 2111 receives the digital audio signal and other signals including a predetermined command and data. The video camera 2102, including a microphone, converts a sound picked up by the microphone into an audio signal, A/D converts the audio signal into a digital audio signal, and then outputs the digital audio signal. The video camera 2102 outputs predetermined commands and data. The commands and data may be generated in the video camera 2102. Alternatively, an operation unit may be arranged in the video camera 2102, and commands or data may be generated in response to the operation input entered by the user on the operation unit. An input device for inputting commands and data may be connected to the video camera 2102.

The digital modulator 2111 digitally modulates the digital audio signal and the other signals and outputs the modulated signals. The digital modulated signal output from the digital modulator 2111 is supplied to the wireless module 2112 and then wireless transmitted as a radio wave from an antenna 2113.

Upon receiving an ARQ (Auto Repeat Request) from the receiver 2101, the wireless module 2112 notifies the digital modulator 2111 of the ARQ, and requests the digital modulator 2111 to send data again.

The radio wave transmitted from the antenna 2113 is received by an antenna 2120 of the receiver 2101, and the received signal is then supplied to a wireless module 2121. The wireless module 2121 supplies to a front end 2122 a digital modulated signal responsive to the received radio wave. The front end 2122 performs predetermined signal processes, such as gain control, on the supplied digital modulated signal, and supplies the resulting signal to a digital demodulator 2123. The digital demodulator 2123 demodulates the supplied digital modulated signal, thereby restoring the encoded stream.

The encoded stream restored by the digital demodulator 2123 is supplied to a video signal decoder 2124. The video signal decoder 2124 decodes the encoded stream in accordance with the decoding method of the present invention, thereby resulting in a decoded digital video signal. The digital video signal is then mapped in the HD-SDI format and then output.

The digital demodulator 2123 receives the digital audio signal and other signals digitally modulated and transmitted by the transmitter unit 2100. The digital demodulator 2123 demodulates the modulated digital audio data and other signals, thereby restoring and outputting the digital video signal and other signals.

The front end 2122 performs an error detection process on the received signal from the wireless module 2121 using a predetermined method. If an error indicating that a wrong error has been received is detected, the front end 2122 outputs an ARQ. The ARQ is supplied to the wireless module 2121 to be transmitted from the antenna 2120.

In the above arrangement, the transmitter unit 2100 may be housed in a relatively small video camera apparatus containing the video camera 2102. A monitor device may be connected to the receiver 2101. The digital video signal output from the video signal decoder 2124 is supplied to the monitor device. If the receiver 2101 is within a coverage area of the radio wave transmitted from the wireless module 2112, the video picked up by the video camera apparatus can be monitored on the monitor device with a delay within one field or one frame.

As shown in FIG. 90, wireless communication is established to transmit the video signal between the transmitter unit 2100 and the receiver 2101. Alternatively, the transmitter unit 2100 and the receiver 2101 may be connected to each other via a network such as the Internet. In such a case, each of the wireless module 2112 in the transmitter unit 2100 and the wireless module 2121 in the receiver 2101 is a communication interface enabled to communicate with IP (Internet Protocol).

The system of the present embodiment finds various applications. The system of the present embodiment may be applied to a television conference system. For example, a handy video camera apparatus supporting USB (Universal Serial Bus) connection is connected to a computer such as a personal computer, and the video signal encoder 2110 and the video signal decoder 2124 are installed on the computer. The video signal encoder 2110 and the video signal decoder 2124 installed on the computer may be implemented by hardware or software that runs on the computer.

For example, each member participating in a conference may be furnished with the computer and the video camera apparatus. The computer is connected via wired network and/or wireless network to a server that provides service for television conference system. The video signal output from the video camera apparatus is supplied to the computer via the USB cable, and the video signal encoder 2110 in the computer performs the encoding process of the present invention. The computer transmits the encoded stream of the video signal to the server via the network.

The server transmits the received encoded stream the computer of each participating member via the network. The encoded stream is received by the computer of each participating member, and the video signal decoder 2124 in the computer performs the decoding process of the present invention. The image data output from the video signal decoder 2124 is displayed as an image on a display of the computer.

The video picked up by the video camera apparatus of another participating member is displayed on the display of the computer of each participating member. A short delay time is involved from the encoding of the video signal in the video camera apparatus to decoding of the video signal on the computer of the other participating member. The system thus reduces strangeness caused by delay in the video of the other participating member displayed on the display of computer of each participating member.

The video signal encoder 2110 can be mounted on the video camera apparatus. For example, the transmitter unit 2100 may be contained in the video camera apparatus. Such an arrangement eliminates the need for connecting another apparatus such as a computer to the video camera apparatus.

Figure 91:
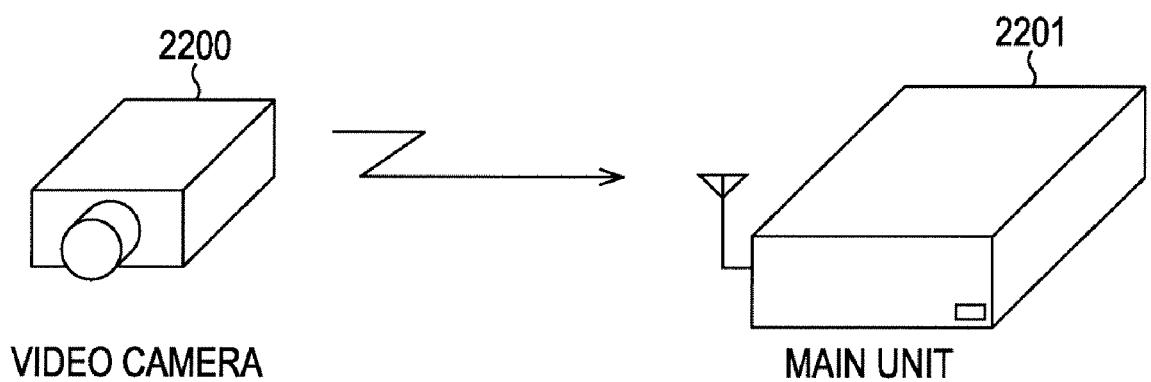
FIG. 91 illustrates a home game-playing machine of the present invention.

The system composed of the video camera apparatus containing the transmitter unit 2100 and the receiver 2101 finds a variety of applications in addition to the above-described television conference system. As generally shown in FIG. 91, the system may be applied to a home gaming machine. As shown in FIG. 91, a video camera 2200 contains the transmitter unit 2100 of the embodiment of the present invention.

The main unit 2201 of the home gaming machine has a computer like structure and includes a CPU, a RAM and a ROM, a disk drive supporting a CD-ROM (Compact Disc-Read Only Memory) or a DVD-ROM (Digital Versatile Disc-ROM), a graphic controller for converting a display control signal generated by the CPU into a video signal and outputting the video signal, an audio reproducing device for reproducing an audio signal, and a but for interconnecting these elements. The main unit 2201 of the home gaming machine is controlled by the CPU in accordance with a program prestored on the ROM or a program stored on the CD-ROM or DVD-ROM loaded on the disc drive. The RAM serves as a working memory. The main unit 2201 of the home gaming machine contains the receiver 2101. A digital video signal and other signals output from the receiver 2101 are supplied to the CPU via the bus.

A game software program is now initiated on such a system. The game software program allows a video responsive to the digital video signal supplied from the outside to be used as an image within a game. For example, in accordance with the game software program, an image responsive to the digital video signal supplied from the outside is used as an image in the game, and the movement of a character (player) in the image is recognized so that an action responsive to the recognized movement may be taken.

The video camera 2200 encodes the picked digital video signal with the video signal encoder 2110 in the transmitter unit 2100 contained therewithin in accordance with the encoding method of the invention. The encoded stream is modulated by the digital modulator 2111, and supplied to the wireless module 2112. The modulated signal is then transmitted from the antenna 2113 as a radio wave. The transmitted radio wave is received by the antenna 2120 in the receiver 2101 contained in the main unit 2201 of the home gaming machine. The received signal is supplied to the digital demodulator 2123 via the wireless module 2121 and the front end 2122. The received signal is then demodulated by the digital demodulator 2123 into an encoded stream, which is then supplied to the video signal decoder 2124. The video signal decoder 2124 decodes the supplied encoded stream in accordance with the decoding method of the present invention, thereby outputting a digital video signal of the baseband.

The digital video signal of the baseband output from the video signal decoder 2124 is transferred over the bus in the main unit 2201 of the home gaming machine for temporary storage on the RAM. In accordance with the predetermined program, the CPU reads the digital video signal from the RAM, thereby detecting the motion of the character in the image responsive to the digital video signal, and using the image in the game.

A short delay time elapses from the capturing of the image by the video camera 2200 and the encoding of the captured digital video signal to the decoding of the encoded stream by the main unit 2201 of the home game-playing machine into the image. Better response results to the motion of the player in the game software program operating on the main unit 2201 of the home gaming machine. Smooth game operation can thus be enjoyed.

The video camera 2200 used in conjunction with the home game-playing machine in this way typically has a simple structure from the cost and size requirements. Unlike computers, a high throughput CPU and a large capacity memory are not usually mounted.

The video camera 2200 is a peripheral device to the main unit 2201 of the home game-playing machine and is needed only when a game using the video camera 2200 is played. The video camera 2200 is not needed when a game is played using the main unit 2201 of the home game-playing machine. In such a case, the video camera 2200 is sold separate from the main unit 2201. If the video camera 2200 is furnished with a high throughput CPU and a large capacity memory and is sold at a high price, sales volume is likely to drop. The sales of the game software using the video camera 2200 may also be down, possibly leading a reduction in profit. In particular, the diffusion rate of home game playing programs is likely affect an amount of sales. If the diffusion rate of the video camera 2200 is low, the sales quantity is also low.

The diffusion rate may be increased by selling the video camera 2200 at a low price, and the sales amount and popularity of the home game playing software using the video camera 2200 are thus increased. This leads to consumers' willingness to buy the main unit 2201. The video camera 2200 is preferably simple structured.

The video signal encoder 2110 in the transmitter unit 2100 housed in the video camera 2200 may be designed to perform the wavelet transform at a lower segmentation level. In this way, a small memory capacity of the re-arranging buffer works.

The structure of the image encoding apparatus of FIG. 37 may be directly applied to the video signal encoder 2110. If the structure of the image encoding apparatus of FIG. 37 is directly applied to the video signal encoder 2110, the video signal encoder 2110 is free from the re-arrangement process of the wavelet transform coefficient data. Workload on the video camera 2200 is thus advantageously reduced. In this case, the receiver 2101 contained in the main unit 2201 of the home game-playing machine needs to use the image decoding apparatus of FIG. 41 as the video signal decoder 2124.

In the above discussion, the video camera 2200 and the main unit 2201 of the home game-playing machine are connected to each other using wireless communication. The present invention is not limited to this arrangement. Alternatively, the video camera 2200 and the main unit 2201 of the home game-playing machine are connected to each other by wireless communication using wired communication such as interface like USB, or IEEE1394.

The present invention may be implemented in a variety of embodiments and finds a variety of applications (general applications).

The above series of process steps may be executed using hardware or software. If the above series of process steps are performed using software, a program forming the software may be installed on a computer contained in a dedicated hardware system, on a general-purpose computer that performs a variety of functions by installing a variety of programs thereon, or on an information processing apparatus of an information processing system containing a plurality of apparatuses.

Figure 92:
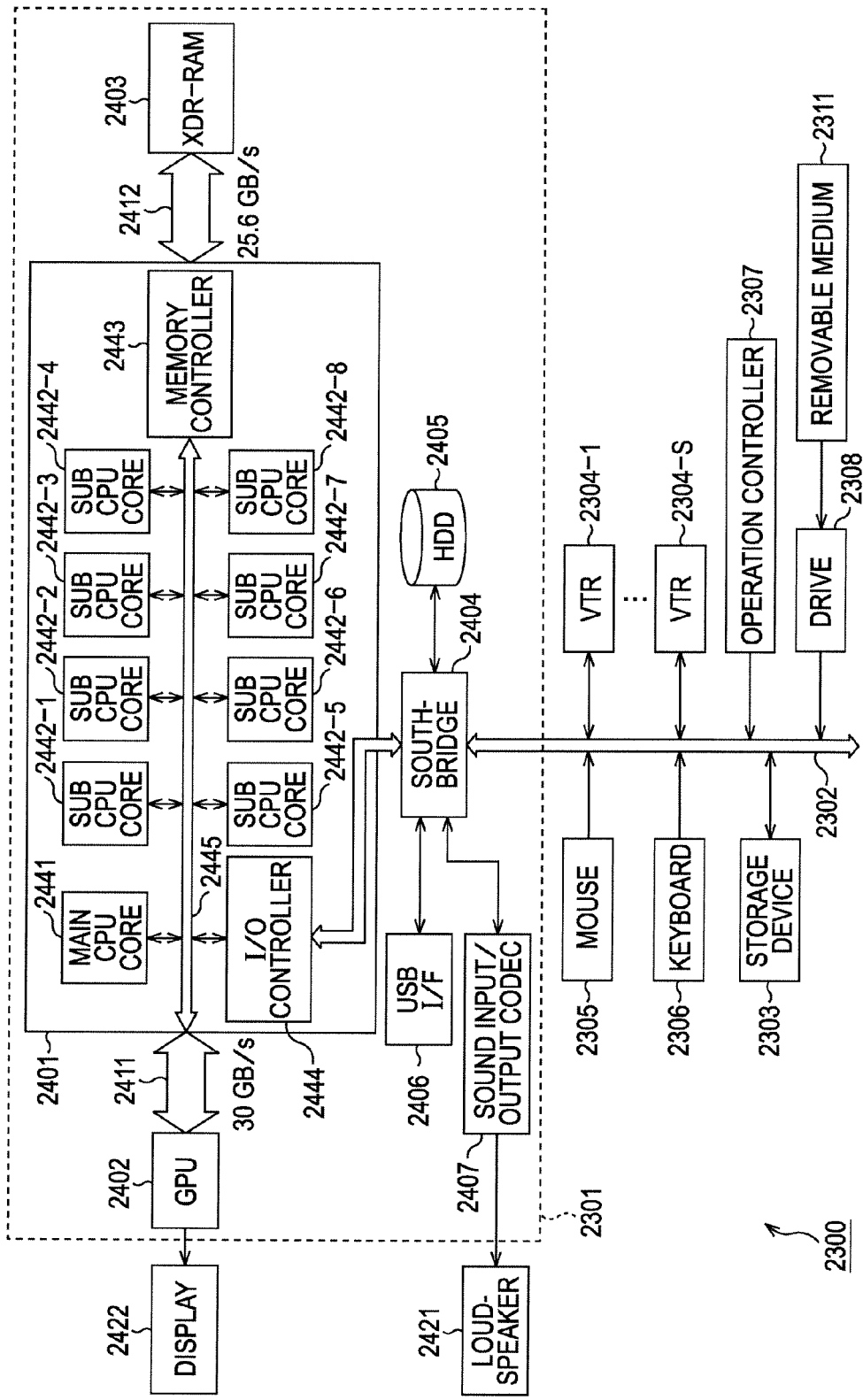
FIG. 92 illustrates the structure of an information processing apparatus of the present invention.

FIG. 92 is a block diagram illustrating the structure of an information processing system that performs the program of the above-referenced series of process steps.

As shown in FIG. 92, an information processing system 2300 includes an information processing apparatus 2301, a storage device 2303 connected to the information processing apparatus 2301 via a PCI bus 2302, a plurality of video tape recorders (VTRs) VTR 2304-1 through VTR 2304-S, a mouse 2305 for a user to enter an operational input to these VTRs, a keyboard 2306, and an operation controller 2307. The information processing system 2300 under the control of the installed program performs the above-referenced image encoding process and image decoding process.

The information processing apparatus 2301 in the information processing system 2300 causes the large volume storage device 2303 made of RAID (Redundant Arrays of Independent Disk) to store data that has been obtained by encoding moving image content stored on the storage device 2303, causes the storage device 2303 to store image data (moving image content) that is obtained by decoding the encoded data stored on the storage device 2303, and causes the encoded data and the decoded image data to be recorded on a video tape on the VTR 2304-1 through VTR 2304-S. The information processing apparatus 2301 can also retrieve into the storage device 2303 the moving image content recorded on the video tape loaded on the VTR 2304-1 through VTR 2304-S. In that case, the information processing apparatus 2301 may encode the moving image content.

The information processing apparatus 2301 includes a microprocessor 2401, GPU (Graphics Processing Unit) 2402, XDR (Extreme Data Rate)-RAM 2403, a southbridge 2404, HDD 2405, USB interface (USB I/F) 2406, and a sound input/output codec 2407.

The GPU 2042 is connected to the microprocessor 2401 via a dedicated bus 2411 thereof. The XDR-RAM 2403 is connected to the microprocessor 2401 via a dedicated bus 2412 thereof. The southbridge 2404 is connected to a I/O controller 2444 of the microprocessor 2401 via a dedicated bus thereof. The southbridge 2404 connects to the HDD 2405, the USB interface 2406, and the sound input/output codec 2407. The sound input/output codec 2407 connects to a loudspeaker 2421. The GPU 2402 connects to the display 2422.

The southbridge 2404 further connects via a PCI bus 2302 to the mouse 2305, the keyboard 2306, the VTR 2304-1 through VTR 2304-S, the storage device 2303 and the operation controller 2307.

The mouse 2305 and the keyboard 2306 receives a user operational input, and supplies a signal responsive the user operational input to the microprocessor 2401 via the PCI bus 2302 and the southbridge 2404. The storage device 2303 and the VTR 2304-1 through VTR 2304-S are designed to record or reproduce predetermined data.

The PCI bus 2302 further connects to the drive 2308 as necessary. The drive 2308 is loaded with a removable medium 2311, such as a magnetic disk, an optical disk, a magneto-optical disk, or a semiconductor memory. A computer program read from the removable medium 2311 is installed on the HDD 2405.

The microprocessor 2401 is a one-chip multi-core structure, and includes a general-purpose main CPU core 2441 for executing a basic program such as an OS (operating system), a plurality of RISC (Reduced Instruction Set Computer) type signal processors (8 processors in this case), sub CPUs 2442-1 through 2442-8 connected to the main CPU 2411 via an internal bus 2445, a memory controller 2443 for controlling the XDR-RAM 2403 having a memory size of 256 [Mbytes], an I/O (In/Out) controller 2444 for managing the input and output of data with the southbridge 2404. The microprocessor 2401 runs at an operation frequency of 4 [GHz].

At startup, the microprocessor 2401 reads a necessary application program from the HDD 2405 in accordance with a control program from the HDD 2405, and expands the application program on the XDR-RAM 2403. The microprocessor 2401 then performs a control process in accordance with the application program and the user operational input.

By executing the software program, the microprocessor 2401 performs the image encoding process and the image decoding process in each of the preceding embodiments, supplies the encoded stream obtained as a result of encoding to the HDD 2405 via the southbridge 2404 for storage and transfers a reproduced image of the moving image content obtained a result of decoding to the GPU 2402 to be displayed on the display 2422.

The usage of each CPU core of the microprocessor 2401 is optional. For example, the main CPU core 2441 controls the image encoding process and the image decoding process, thereby causing the eight sub CPU cores 2442-1 through 2442-8 to perform the entropy encoding, the wavelet transform, quantization, and dequantization concurrently in parallel as discussed with reference to FIG. 11. If the main CPU core 2441 may divide processes by line block (precinct) among the eight sub CPU core 2442-1 through 2442-8, the image encoding process and the image decoding process are performed concurrently in parallel as discussed with reference to FIG. 11. The efficiency of the image encoding process and the image decoding process is increased, the delay time of the entire process is shortened, and the workload, process time, and the memory size required to perform each process are reduced. Another method of using teach CPU core may also be used.

For example, some of the eight sub CPU cores 2442-1 through 2442-8 of the main CPU core 2441 may perform the encoding process and the other may perform the decoding process concurrently in parallel.

If an independent encoder, an independent decoder or an independent codec processing device is connected to the PCI bus 2302, the eight sub CPU cores 2442-1 through 2442-8 of the main CPU core 2441 may control the connected device. If a plurality of devices are connected, or if the connected device includes a plurality of encoders or decoders, the eight sub CPU cores 2442-1 through 2442-8 of the main CPU core 2441 divide and control the processes performed by the plurality of encoders and decoders.

The main CPU core 2441 manages the operation of the eight sub CPU cores 2442-1 through 2442-8, assigns a process to each sub CPU core and receives process results. The main CPU core 2441 performs a process other than the processes performed by the eight sub CPU cores 2442-1 through 2442-8. For example, the main CPU core 2441 receives via the southbridge 2404 commands from one of the mouse 2305, the keyboard 2306, and the operation controller 2307, and performs a variety of processes responsive to the received command.

The GPU 2402 performs a rendering process for finally rendering a texture to move a reproduced image of the moving content to be displayed on the display 2422. The GPU 2402 further performs a coordinates conversion calculation operation for displaying on the display 2422 at a time a plurality of images including a reproduced video of the moving image content and a still image of still image content, and a scale expansion and contraction operation for expanding or contracting the reproduced video of the moving image content and the still image of the still image content. The GPU 2402 thus reduces the workload of the microprocessor 2401.

The GPU 2402 under the control of the microprocessor 2401 performs a predetermined signal process on the video data of supplied moving image content and the image data of still image content, and outputs resulting video data and image data to the display 2422 to display an image responsive to the supplied data on the display 2422.

The reproduced video of a plurality of moving content units decoded currently in parallel by the eight sub CPU cores 2442-1 through 2442-8 of the microprocessor 2401 is transferred to the GPU 2402 via the bus 2411. The data rate is a maximum of 30 [Gbytes/s], and even a complex reproduced video having undergone special effects is smoothly displayed at high speed.

The microprocessor 2401 performs an audio mixing operation on the audio data of the video and audio data of the moving image content, and transfers resulting edited audio data to the loudspeaker 2421 via the southbridge 2404 and the sound input/output codec 2407. A sound responsive to the audio data is thus output from the loudspeaker 2421.

If the above-referenced process is executed using software, a program forming the software is installed via a network or from a recording medium.

The recording medium may be the removable medium 2311 supplied to the user separately from the apparatus as shown in FIG. 92 with the program stored thereon. The recording medium may include one of a magnetic disk (including flexible disk), an optical disk (such as CD-ROM or DVD), a magneto-optical disk (including MD), and a semiconductor memory. The recording medium may also include one of the HDD 2405 and the storage device 2303 supplied in the apparatus to the user with the program recorded thereon. The recording medium may also be a semiconductor memory such as a ROM or a flash memory.

In the above discussion, the microprocessor 2401 includes the eight sub CPU cores. The number of sub CPU cores is optional. It is not necessary that the microprocessor 2401 be composed of a plurality of cores such as sub CPU cores. The microprocessor 2401 may be composed of a single core. A plurality of CPUs may be used instead of the microprocessor 2401. A plurality of information processing apparatuses (executing in cooperation with each other the processes of the present invention) may be used.

In the specification of this present invention, the process steps forming the program recorded on the recording medium may be performed in the time-series order stated as above. Alternatively, the process steps may be performed in parallel or separately.

In the specification of the present invention, the system refers to an entire apparatus composed of a plurality of devices.

The structure of the apparatus discussed above may be split into a plurality of apparatuses. Conversely, the structures of a plurality of apparatuses discussed above may be integrated into one apparatus. A structure other then those discussed above may be attached to each of the above-referenced apparatuses. If the structure and operation of the system remains unchanged, part of the structure of one apparatus may be included into another apparatus.

Industrial Applicability

As described above, the present invention finds a variety of applications in an apparatus or system as long as the apparatus or system encodes an image, transfers the encoded image to a destination, and decodes the encoded image and outputs the image on the destination. The present invention is particularly appropriate for use in a system that handles moving image data in interlace scan.

In accordance with the present invention, a high subjective image quality is achieved in the decoded image data even if the bit rate of the encoded stream is low. Even a transmission path permitting a relatively low transmission capacity provides a high quality image on the decoding side. In other words, if a transmission path having a high transmission capacity is used, the encoded stream is transferred at high speed.

The present invention finds appropriate applications in remote medical diagnosis where a doctor performs a medical treatment using a magic hand while watching a video picked up by a video camera. The present invention also finds appropriate applications in a broadcasting station system where a digital video signal is encoded and transmitted, and compression encoded digital video signal is decoded.

The present invention also finds applications in a system where a live video is distributed, or a system where interactive communications are performed between teachers and students in education fields.

The present invention also finds applications in the transmission of image data picked up by a mobile terminal having an image pickup function, such as a cellular phone with camera function, a television conference system, or a system including a monitoring camera and a recorder recording a video picked up by the monitoring camera.

The invention claimed is:

1. An encoding apparatus for encoding image data, the apparatus including a processor and further comprising:
    an addition filter for filtering addition image data obtained by performing an addition operation on a first field and a second field, the first and second fields forming one frame of the image data, and generating a plurality of sub bands, containing addition coefficient data, segmented according to frequency band,
    a subtraction filter for filtering subtraction image data obtained by performing a subtraction operation between the first field and the second field, the first and second fields forming the one frame of the image data, and generating a plurality of sub bands, containing subtraction coefficient data, segmented according to frequency band,
    an intra encoder for generating addition encoded data by encoding the addition coefficient data and for generating subtraction encoded data by encoding the subtraction coefficient data, and
    an encoding multiplexer for generating encoded data by multiplexing the addition encoded data and the subtraction encoded data, wherein
    the intra encoder is configured to operate in, based on a determination, a first or second mode, the first mode including separately encoding the addition coefficient data and the subtraction coefficient data, each in a direction from an uppermost bit position to a lower bit position, and the second mode including integrally encoding the addition coefficient data and the subtraction coefficient data in a direction from an uppermost bit position to a lower bit position to generate encoded data, and
    the encoded data generated in the first or second mode is in a complete form for the one frame of the image data so that frames of the image data are encoded on a frame-by-frame basis.

2. The encoding apparatus according to claim 1, further comprising:
    an addition bit plane segmenter for segmenting the addition coefficient data generated by the addition filter into bit planes, and
    a subtraction bit plane segmenter for segmenting the subtraction coefficient data generated by the subtraction filter into bit planes, wherein
    in the first mode, the intra encoder encodes the addition coefficient data, segmented by the addition bit plane segmenter, on a bit plane by bit plane basis, in a direction from a bit plane at an uppermost bit position to a bit plane at a lower bit position, and separately encodes the subtraction coefficient data, segmented by the subtraction bit plane segmenter, on a bit plane by bit plane basis, in a direction from a bit plane at the uppermost bit position to a bit plane at a lower bit position, and
    in the second mode, the intra encoder integrally encodes the addition and subtraction coefficient data on a bit plane by bit plane basis, in a direction from a bit plane at an uppermost bit position to a bit plane at a lower bit position.

3. The encoding apparatus according to claim 2, wherein the intra encoder encodes, for each of the addition and subtraction coefficient data, the bit planes at the same bit position in a direction from a sub band at the lowest frequency region to a sub band at the highest frequency region.

4. The encoding apparatus according to claim 1, further comprising:
    a code amount controller for controlling independently an amount of code generated in the encoding operation of the intra encoder.

5. The encoding apparatus according to claim 4, wherein the code amount controller stops the encoding operation of generating addition encoded data by the intra encoder at the moment the amount of code generated in the encoding operation of the addition coefficient data reaches a target code amount.

6. The encoding apparatus according to claim 4, wherein the code amount controller stops the encoding operation of generating subtraction encoded data by the intra encoder at the moment the amount of code generated in the encoding operation of the subtraction coefficient data reaches a target code amount.

7. The encoding apparatus according to claim 4, further comprising a setter for setting a priority order according to which the amount of generated code is assigned to the type of addition coefficient data or the type of subtraction coefficient data.

8. The encoding apparatus according to claim 7, wherein the setter sets the priority order of a luminance component contained in the addition image data to be higher than the priority order of a color difference component contained in the addition image data.

9. The encoding apparatus according to claim 7, wherein the setter sets the priority order of a luminance component contained in the subtraction image data to be higher than the priority order of a color difference component contained in the subtraction image data.

10. The encoding apparatus according to claim 1, further comprising:
an addition image generator for generating the addition image data by performing the addition operation on the first field and the second field, the first and second fields forming the one frame of the image data, and
a subtraction image generator for generating the subtraction image data by performing the subtraction operation between the first field and the second field, the first and second fields forming the one frame of the image data.

11. The encoding apparatus according to claim 1,
wherein the addition filter filters line blocks on a line block by line block basis, each line block containing the image data of lines of the number needed to generate the addition coefficient data corresponding to one line of the sub band having at least the lowest frequency region, and
wherein the subtraction filter filters line blocks on a line block by line block basis, each line block containing the image data of lines of the number needed to generate the subtraction coefficient data corresponding to one line of the sub band having at least the lowest frequency region.

12. The encoding apparatus according to claim 11, further comprising:
an addition coefficient re-arranger for re-arranging in advance the addition coefficient data, generated by the addition filter, on a line block by line block basis in accordance with an order of multiplexing according to which the addition image data is generated by multiplexing the addition coefficient data of the plurality of sub bands segmented according to frequency band, and
a subtraction coefficient re-arranger for re-arranging in advance the subtraction coefficient data, generated by the subtraction filter, on a line block by line block basis in accordance with the order of multiplexing according to which the subtraction image data is generated by multiplexing the subtraction coefficient data of the plurality of sub bands segmented according to frequency band,
wherein the intra encoder encodes the addition coefficient data re-arranged by the addition coefficient re-arranger, and
wherein the intra encoder encodes the subtraction coefficient data re-arranged by the subtraction coefficient re-arranger.

13. The encoding apparatus according to claim 12, further comprising:
an addition controller for controlling the addition filter, the addition coefficient re-arranger and the intra encoder to operate in parallel on a line block by line block basis, and
a subtraction controller for controlling the subtraction filter, the subtraction coefficient re-arranger and the intra encoder to operate in parallel on a line block by line block basis.

14. The encoding apparatus according to claim 12,
wherein the addition filter, the addition coefficient re-arranger and the intra encoder perform operations thereof in parallel, and
wherein the subtraction filter, the subtraction coefficient re-arranger and the intra encoder perform operations thereof in parallel.

15. An encoding method of encoding image data, comprising:
an addition filtering step of filtering addition image data obtained by performing an addition operation on a first field and a second field, the first and second fields forming one frame of the image data, and generating a plurality of sub bands, containing addition coefficient data, segmented according to frequency band,
a subtraction filtering step of filtering subtraction image data obtained by performing a subtraction operation between the first field and the second field, the first and second fields forming the one frame of the image data, and generating a plurality of sub bands, containing subtraction coefficient data, segmented according to frequency band,
an encoding step of generating, by an encoder configured to operate in two modes based on a determination, addition encoded data by encoding the addition coefficient data and subtraction encoded data by encoding the subtraction coefficient data,
an operational control mode step of controlling the encoder to operate in a first or second mode, the first mode including separately encoding the addition coefficient data and the subtraction coefficient data, each in a direction from an uppermost bit position to a lower bit position, and the second mode including integrally encoding the addition coefficient data and the subtraction coefficient data in a direction from an uppermost bit position to a lower bit position to generate encoded data, and
in the first mode, an encoding multiplexing step of generating encoded data by multiplexing the addition encoded data generated by the addition encoder and the subtraction encoded data generated by the subtraction encoder, wherein
the encoded data generated in the first or second modes is in a complete form for the one frame of the image data so that frames of the image data are encoded on a frame-by-frame basis.

16. A decoding apparatus for decoding image data as encoded data, the apparatus including a processor and further comprising:
an intra decoder configured to operate in two modes, the intra decoder operating in a first mode based on a determination the encoded data contains addition encoded data and subtraction encoded data separately encoded and multiplexed to form the encoded data, and the intra decoder operating in a second mode based on a determination the encoded data contains addition encoded data and subtraction encoded data integrally encoded to form the encoded data, the intra decoder, in the first mode, operating a demultiplexer for demultiplexing the encoded data into addition encoded data and subtraction encoded data, the addition encoded data having been obtained by performing an addition operation on a first field and a second field to result in addition image data, the first and second fields forming one frame of image data, and by encoding addition coefficient data into which the addition image data is segmented according to frequency band, and the subtraction encoded data having been obtained by performing a subtraction operation on the first field and the second field to result in subtraction image data, the first and second fields forming the one frame of the image data, and by encoding subtraction coefficient data into which the subtraction image data is segmented according to frequency band, the encoded data being in a complete form for the one frame of the image data so that frames of the image data are encoded on a frame-by-frame basis, an addition decoder for generating addition coefficient data contained in a plurality of sub bands by decoding the addition encoded data demultiplexed by the demultiplexer, a subtraction decoder for generating subtraction coefficient data contained in a plurality of sub bands by decoding the subtraction encoded data demultiplexed by the demultiplexer, an addition filter for generating the addition image data by filtering the addition coefficient data generated by the addition decoder, a subtraction filter for generating the subtraction image data by filtering the subtraction coefficient data generated by the subtraction decoder, and an image data generator for generating image data from the addition image data generated by the addition filter and the subtraction image data generated by the subtraction filter on a frame-by-frame basis.

17. The decoding apparatus according to claim 16, wherein in the first mode, the addition encoded data is data that is obtained by segmenting the addition coefficient data into bit planes in a direction from a bit plane at an uppermost bit position to a bit plane at a lower bit position and encoding the bit planes of the addition coefficient data on a bit plane by bit plane basis, and the subtraction encoded data is data that is obtained by segmenting the subtraction coefficient data into bit planes in a direction from a bit plane at an uppermost bit position to a bit plane at a lower bit position and separately encoding the bit planes of the subtraction coefficient data on a bit plane by bit plane basis, and in the second mode, the encoded data is data that is obtained by integrally segmenting addition and subtraction coefficient data into bit planes in a direction from a bit plane at an uppermost bit position to a bit plane at a lower bit position and integrally encoding the bit planes of the addition and the subtraction coefficient data on a bit plane by bit plane basis.

18. A decoding method of decoding image data as encoded data, comprising:

an operation control mode step of operating a decoder configured to operate in two modes, the decoder operating in a first mode based on a determination the encoded data contains addition encoded data and subtraction encoded data separately encoded and multiplexed to form the encoded data, and the decoder operating in a second mode based on a determination the encoded data contains addition encoded data and subtraction encoded data integrally encoded to form the encoded data, when the decoder is operating in the first mode, a demultiplexing step of demultiplexing the encoded data into addition encoded data and subtraction encoded data, the addition encoded data having been obtained by performing an addition operation on a first field and a second field to result in addition image data, the first and second fields forming one frame of image data, and by encoding addition coefficient data into which the addition image data is segmented according to frequency band, and the subtraction encoded data having been obtained by performing a subtraction operation on the first field and the second field to result in subtraction image data, the first and second fields forming the one frame of the image data, and by encoding subtraction coefficient data into which the subtraction image data is segmented according to frequency band, the encoded data being in a complete form for the one frame of the image data so that frames of the image data are encoded on a frame-by-frame basis, an addition decoding step of generating addition coefficient data contained in a plurality of sub bands by decoding the addition encoded data demultiplexed in the demultiplexing step, a subtraction decoding step of generating subtraction coefficient data contained in a plurality of sub bands by decoding the subtraction encoded data demultiplexed in the demultiplexing step, an addition filtering step of generating the addition image data by filtering the addition coefficient data generated in the addition decoding step, a subtraction filtering step of generating the subtraction image data by filtering the subtraction coefficient data generated in the subtraction decoding step, and an image data generating step of generating image data from the addition image data generated in the addition filtering step and the subtraction image data generated in the subtraction filtering step on a frame-by-frame basis.

* * * * *